US012345859B2

(12) United States Patent
Baik et al.

(10) Patent No.: US 12,345,859 B2
(45) Date of Patent: *Jul. 1, 2025

(54) OPTICAL IMAGING SYSTEM

(71) Applicant: Samsung Electro-Mechanics Co., Ltd., Suwon-si (KR)

(72) Inventors: Jae Hyun Baik, Suwon-si (KR); Min Hyuk Im, Suwon-si (KR); Yong Joo Jo, Suwon-si (KR); Ga Young An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,874

(22) Filed: Mar. 22, 2023

(65) Prior Publication Data

US 2023/0228981 A1 Jul. 20, 2023

Related U.S. Application Data

(63) Continuation of application No. 17/088,675, filed on Nov. 4, 2020, now Pat. No. 11,789,239, which is a
(Continued)

(30) Foreign Application Priority Data

May 29, 2018 (KR) .................. 10-2018-0061393
Sep. 5, 2018 (KR) .................. 10-2018-0106185

(51) Int. Cl.
*G02B 13/00* (2006.01)
*G02B 9/64* (2006.01)
*H04N 23/55* (2023.01)

(52) U.S. Cl.
CPC .......... *G02B 13/0045* (2013.01); *G02B 9/64* (2013.01); *H04N 23/55* (2023.01)

(58) Field of Classification Search
CPC ...... G02B 13/0045; G02B 9/64; G02B 7/021; G02B 7/022; G02B 13/0015; G02B 13/18;
(Continued)

(56) References Cited

U.S. PATENT DOCUMENTS 8,599,495 B1 12/2013 Tsai et al.
9,423,595 B2 8/2016 Shinohara et al.
(Continued)

FOREIGN PATENT DOCUMENTS

CN 202886720 U 4/2013
CN 204359999 U 5/2015
(Continued)

OTHER PUBLICATIONS

United States Office Action issued on Mar. 3, 2021 in related U.S. Appl. No. 16/424,774 (8 pages in English).
(Continued)

*Primary Examiner* — Collin X Beatty
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system, wherein the optical imaging system satisfies $1<|f134567-f|/f$, where f134567 is a composite focal length of the first to seventh lenses calculated with an index of refraction of the second lens set to 1.0, f is an overall focal length of the optical imaging system, and f134567 and f are expressed in a same unit of measurement.

18 Claims, 59 Drawing Sheets

Related U.S. Application Data continuation of application No. 16/424,774, filed on May 29, 2019, now Pat. No. 11,353,686.

(58) Field of Classification Search
CPC .. G02B 27/0012; G02B 27/005; H04N 23/55; G03B 30/00
See application file for complete search history.

(56) References Cited

U.S. PATENT DOCUMENTS

| | | |
|---|---|---|
| 2013/0050846 A1 | 2/2013 | Huang |
| 2014/0043694 A1 | 2/2014 | Tsai et al. |
| 2014/0285906 A1 | 9/2014 | Huang |
| 2015/0212298 A1 | 7/2015 | Shinohara et al. |
| 2016/0025953 A1 | 1/2016 | Jung |
| 2016/0033742 A1 | 2/2016 | Huang |
| 2016/0033743 A1 | 2/2016 | Chen |
| 2016/0124191 A1 | 5/2016 | Hashimoto |
| 2016/0238825 A1 | 8/2016 | Minefuji |
| 2017/0184819 A1 | 6/2017 | Shi |
| 2017/0227744 A1 | 8/2017 | Sakata |
| 2017/0336605 A1 | 11/2017 | Lai et al. |
| 2018/0074298 A1 | 3/2018 | Jung et al. |
| 2018/0100991 A1 | 4/2018 | Sekine |
| 2019/0049700 A1 | 2/2019 | Kunimatsu et al. |
| 2019/0121066 A1 | 4/2019 | Yan et al. |
| 2019/0227279 A1* | 7/2019 | Yang ................. G02B 13/0045 |
| 2019/0302424 A1 | 10/2019 | Kuo et al. |
| 2019/0369360 A1 | 12/2019 | Jung et al. |
| 2019/0369362 A1 | 12/2019 | Son et al. |

FOREIGN PATENT DOCUMENTS

| | | |
|---|---|---|
| CN | 104965295 A | 10/2015 |
| CN | 105278074 A | 1/2016 |
| CN | 105319680 A | 2/2016 |
| CN | 105319681 A | 2/2016 |
| CN | 105988193 A | 10/2016 |
| CN | 105988199 A | 10/2016 |
| CN | 107402436 A | 11/2017 |
| CN | 107450160 A | 12/2017 |
| CN | 107608060 A | 1/2018 |
| CN | 107621683 A | 1/2018 |
| CN | 107678138 A | 2/2018 |
| CN | 109073862 A | 12/2018 |
| CN | 110542986 A | 12/2019 |
| CN | 209911627 U | 1/2020 |
| JP | 2015-72402 A | 4/2015 |
| JP | 2015-72403 A | 4/2015 |
| JP | 2016-85431 A | 5/2016 |
| JP | 2017-116911 A | 6/2017 |
| JP | WO 2017/199633 A1 | 11/2017 |
| KR | 10-2018-0029815 A | 3/2018 |

OTHER PUBLICATIONS

Chinese Office Action issued on Mar. 3, 2021 in counterpart Chinese Patent Application No. 201910441856.5 (9 pages in English and 11 pages in Chinese).
Korean Office Action issued on Sep. 13, 2021, in counterpart Korean Patent Application No. 10-2020-0007488 (9 pages in English and 6 pages in Korean).
Chinese Office Action issued on Oct. 26, 2021, in counterpart Chinese Patent Application No. 201910441856.5 (11 pages in English and 11 pages in Chinese).
Korean Office Action issued on Mar. 18, 2022, in counterpart Korean Patent Application No. 10-2020-0007488 (7 pages in English and 5 pages in Korean).
Chinese Office Action issued on Apr. 18, 2022, in counterpart Chinese Patent Application No. 202011032493.9 (8 pages in English and 8 pages in Chinese).
Notice of Reason for Rejection issued on Nov. 9, 2022, in counterpart Korean Patent Application No. 10-2021-0004540 (13 pages in English, 8 pages in Korean).
U.S. Appl. No. 17/088,675, filed Nov. 4, 2020, Baik et al., Samsung Electro-Mechanics Co., Ltd.
U.S. Appl. No. 16/424,774, filed May 29, 2019, Baik et al., Samsung Electro-Mechanics Co., Ltd.
Chinese Office Action Issued on Apr. 28, 2023, in Counterpart Chinese Patent Application No. 202011032493.9 (4 Pages in English, 7 Pages in Chinese).
Chinese Office Action issued on Feb. 21, 2024, in counterpart Chinese Patent Application No. 202011032493.9 (5 pages in English, 7 pages in Chinese).
Korean Office Action issued on Nov. 8, 2023, in counterpart Korean Patent Application No. 10-2023-0076943 (5 pages in English, 4 pages in Korean).
Korean Office Action issued on Jul. 25, 2024, in counterpart Korean Patent Application No. 10-2023-0076943 (7 pages in English, 6 pages in Korean).
Gross, et al. "Handbook of Optical Systems vol. 3: Aberration Theory and Correction of Optical Systems" Weinheim Germany, Wiley-VCH Verlag GmbH & Co. KGaA, pp. 377-379 (2007).
Korean Office Action Issued on Mar. 31, 2025, in Counterpart Korean Patent Application No. 10-2023-0076943 (5 Pages in English, 4 Pages in Korean).
Chinese Office Action issued on Mar. 17, 2025, in corresponding Chinese Patent Application No. 202211246476.4. (6 pages in English, 8 pages in Chinese).

* cited by examiner

OPTICAL IMAGING SYSTEM

CROSS-REFERENCE TO RELATED APPLICATIONS

This application is a continuation of U.S. patent application Ser. No. 17/088,675 filed on Nov. 4, 2020, now U.S. Pat. No. 11,789,239 issued on Oct. 17, 2023, which is a continuation of U.S. patent application Ser. No. 16/424,774 filed on May 29, 2019, now U.S. Pat. No. 11,353,686 issued on Jun. 7, 2022, which claims the benefit under 35 USC 119 (a) of Korean Patent Application Nos. 10-2018-0061393 filed on May 29, 2018, and 10-2018-0106185 filed on Sep. 5, 2018, in the Korean Intellectual Property Office, the entire disclosures of which are incorporated herein by reference for all purposes.

BACKGROUND

1. Field

This application relates to an optical imaging system including seven lenses.

2. Description of Related Art

A mobile terminal is commonly provided with a camera for video communications or capturing images. However, it is difficult to achieve high performance in such a camera for a mobile terminal due to space limitations inside the mobile terminal.

Accordingly, a demand for an optical imaging system capable of improving the performance of the camera without increasing a size of the camera has increased as a number of mobile terminals provided with a camera has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system, wherein the optical imaging system satisfies $1<|f134567-f|/f$, where f134567 is a composite focal length of the first to seventh lenses calculated with an index of refraction of the second lens set to 1.0, f is an overall focal length of the optical imaging system, and f134567 and f are expressed in a same unit of measurement.

An object-side surface of the first lens may be convex.

An image-side surface of the seventh lens may be concave.

At least one inflection point may be formed on either one or both of an object-side surface and an image-side surface of the sixth lens.

At least one inflection point may be formed on either one or both of an object-side surface and an image-side surface of the seventh lens.

A distance along the optical axis from an object-side surface of the first lens to the imaging plane may be 6.0 mm or less.

An F No. of the optical imaging system may be less than 1.7.

An object-side surface of the second lens may be convex.

An image-side surface of the third lens may be concave.

An object-side surface or an image-side surface of the fourth lens may be concave.

An image-side surface of the fifth lens may be concave.

Either one or both of an object-side surface and an image-side surface of the sixth lens may be convex.

The optical imaging system may further satisfy $0.1<L1w/L7w<0.3$, where L1w is a weight of the first lens, L7w is a weight of the seventh lens, and L1w and L7w are expressed in a same unit of measurement.

The optical imaging system may further include a spacer disposed between the sixth and seventh lenses, and the optical imaging system may further satisfy $0.5<S6d/f<1.2$, where S6d is an inner diameter of the spacer, f is the overall focal length of the optical imaging system, and S6d and f are expressed in a same unit of measurement.

The optical imaging system may further satisfy $0.4<L1TR/L7TR<0.7$, where L1TR is an overall outer diameter of the first lens, L7TR is an overall outer diameter of the seventh lens, and L1TR and L7TR are expressed in a same unit of measurement.

The optical imaging system may further satisfy $0.5<L1234TRavg/L7TR<0.75$, where L1234TRavg is an average value of overall outer diameters of the first to fourth lenses, L7TR is an overall diameter of the seventh lens, and L1234TRavg and L7TR are expressed in a same unit of measurement.

The optical imaging system may further satisfy $0.5<L12345TRavg/L7TR<0.76$, where L12345TRavg is an average value of overall outer diameters of the first to fifth lenses, L7TR is an overall outer diameter of the seventh lens, and L12345TRavg and L7TR are expressed in a same unit of measurement.

The second lens may have a positive refractive power.

The third lens may have a positive refractive power.

A paraxial region of an object-side surface of the seventh lens may be concave.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
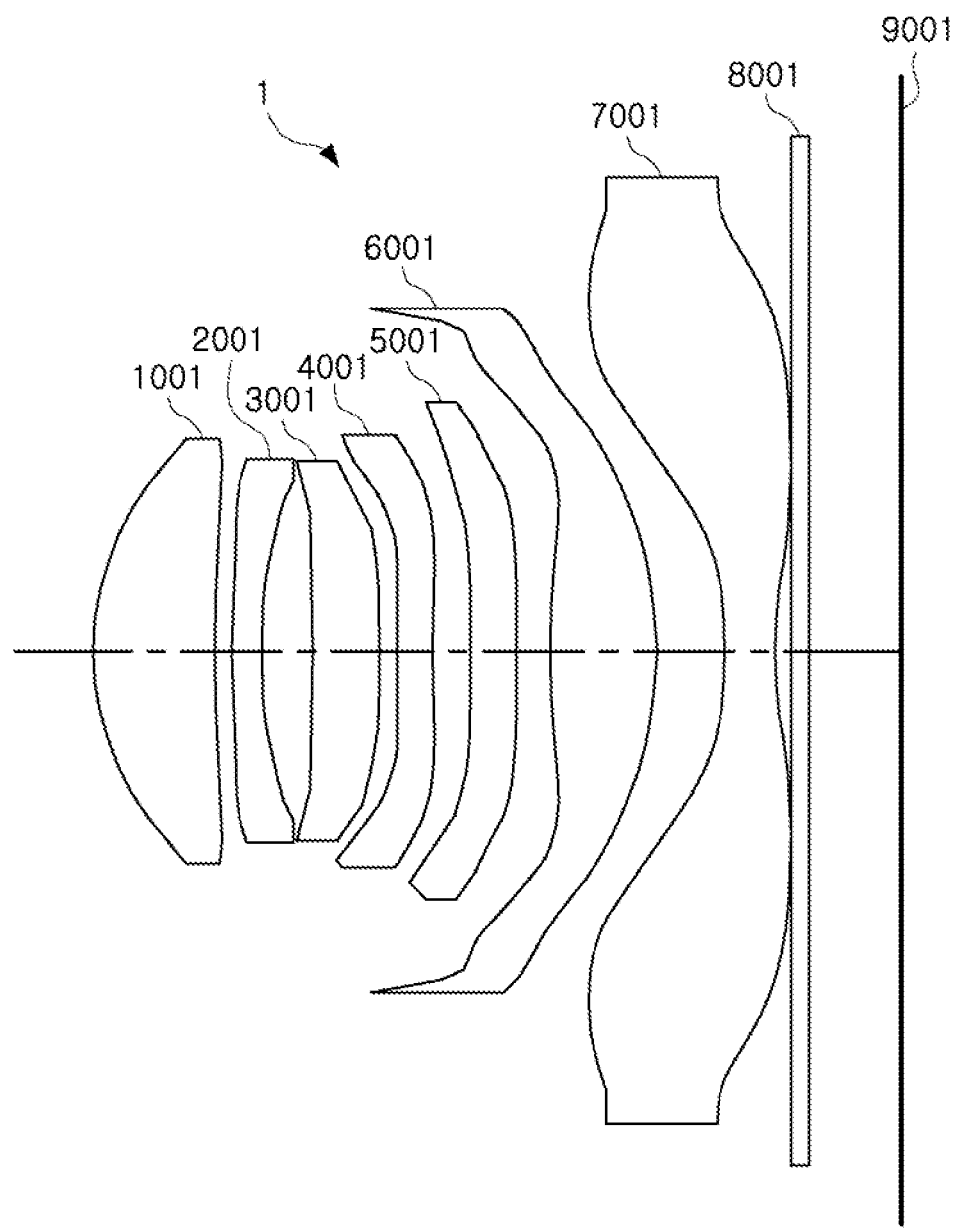
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on,"

"connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Thicknesses, sizes, and shapes of lenses illustrated in the drawings may have been slightly exaggerated for convenience of explanation. In addition, the shapes of spherical surfaces or aspherical surfaces of the lenses described in the detailed description and illustrated in the drawings are merely examples. That is, the shapes of the spherical surfaces or the aspherical surfaces of the lenses are not limited to the examples described herein.

Numerical values of radii of curvature of lenses, thicknesses of lenses, distances between elements including lenses or surfaces, effective aperture radii of lenses, focal lengths, and diameters, thicknesses, and lengths of various elements are expressed in millimeters (mm), and angles are expressed in degrees. Thicknesses of lenses and distances between elements including lenses or surfaces are measured along the optical axis of the optical imaging system.

The term "effective aperture radius" as used in this application refers to a radius of a portion of a surface of a lens or other element (an object-side surface or an image-side surface of a lens or other element) through which light actually passes. The effective aperture radius is equal to a distance measured perpendicular to an optical axis of the surface between the optical axis of the surface and the outermost point on the surface through which light actually passes. Therefore, the effective aperture radius may be equal to a radius of an optical portion of a surface, or may be smaller than the radius of the optical portion of the surface if light does not pass through a peripheral portion of the optical portion of the surface. The object-side surface and the image-side surface of a lens or other element may have different effective aperture radii.

In this application, unless stated otherwise, a reference to the shape of a lens surface means the shape of a paraxial region of the lens surface. A paraxial region of a lens surface is a central portion of the lens surface surrounding the optical axis of the lens surface in which light rays incident to the lens surface make a small angle $\theta$ to the optical axis and the approximations $\sin\theta \approx \theta$, $\tan\theta \approx \theta$, and $\cos\theta \approx 1$ are valid.

For example, a statement that the object-side surface of a lens is convex means that at least a paraxial region of the object-side surface of the lens is convex, and a statement that the image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

An optical imaging system includes a plurality of lenses. For example, the optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system. Thus, the first lens is a lens closest to an object (or a subject) to be imaged by the optical imaging system, while the seventh lens is a lens closest to the imaging plane.

Each lens of the optical imaging system includes an optical portion and a rib. The optical portion of the lens is a portion of the lens that is configured to refract light, and is generally formed in a central portion of the lens. The rib of the lens is an edge portion of the lens that enables the lens to be mounted in a lens barrel and the optical axis of the lens to be aligned with the optical axis of the optical imaging system. The rib of the lens extends radially outward from the optical portion. The optical portions of the lenses are generally not in contact with each other. For example, the first to seventh lenses are mounted in the lens barrel so that they are spaced apart from one other by predetermined distances along the optical axis of the optical imaging system. The ribs of the lenses may be selectively in contact with each other. For example, the ribs of the first to fourth lenses, or the first to fifth lenses, or the second to fourth lenses, may be in contact with each other so that the optical axes of these lenses may be easily aligned with the optical axis of the optical imaging system.

Next, a configuration of the optical imaging system will be described.

The optical imaging system includes a plurality of lenses. For example, the optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system.

The optical imaging system further includes an image sensor and a filter. The image sensor forms an imaging plane and converts light refracted by the first to seventh lenses into an electrical signal. The filter is disposed between the seventh lens and the imaging plane, and blocks infrared rays in the light refracted by the first to seventh lenses from being incident on the imaging plane.

The optical imaging system further includes a stop and spacers. The stop may be disposed in front of the first lens, or at a position of either an object-side surface or an image side-surface of one of the first to seventh lenses, or between two adjacent lenses of the first to seventh lenses, or between the object-side surface and the image-side surface of one of the first to seventh lenses, to adjust an amount of light incident on the imaging plane. Some examples may include two stops, one of which may be disposed in front of the first lens, or at the position of the object-side surface of the first lens, or between the object-side surface and the image-side surface of the first lens. Each of the spacers is disposed at a respective position between two lenses of the first to seventh lenses to maintain a predetermined distance between the two lenses. In addition, the spacers may be formed of a light-shielding material to block extraneous light from penetrating into the ribs of the lenses. There may be six or seven spacers. For example, a first spacer is disposed between the first lens and the second lens, a second spacer is disposed between the second lens and the third lens, a third spacer is disposed between the third lens and the fourth lens, a fourth spacer is disposed between the fourth lens and the fifth lens, a fifth spacer is disposed between the fifth lens and the sixth lens, and a sixth spacer is disposed between the sixth lens and the seventh lens. In addition, the optical imaging system may further include a seventh spacer disposed between the sixth lens and the sixth spacer.

Next, the lenses of the optical imaging system will be described.

The first lens has a refractive power. For example, the first lens has a positive refractive power or a negative refractive power. One surface of the first lens may be convex. For example, an object-side surface of the first lens may be convex. The first lens may include an aspherical surface. For example, one surface or both surfaces of the first lens may be aspherical.

The second lens has a refractive power. For example, the second lens has a positive refractive power or a negative refractive power. One surface or both surfaces of the second lens may be convex. For example, an object-side surface or both an object-side surface and an image-side surface of the second lens may be convex. The second lens may include an aspherical surface. For example, one surface or both surfaces of the second lens may be aspherical.

The third lens has a refractive power. For example, the third lens has a positive refractive power or a negative refractive power. One surface or both surfaces of the third lens may be convex. For example, an object-side surface, or an image-side surface, or both an object-side surface and an image-side surface of the third lens may be convex. The third lens may include an aspherical surface. For example, one surface or both surfaces of the third lens may be aspherical.

The fourth lens has a refractive power. For example, the fourth lens has a positive refractive power or a negative refractive power. One surface or both surfaces of the fourth lens may be convex. For example, an object-side surface, or an image-side surface, or both an object-side surface and an image-side surface of the fourth lens may be convex. The fourth lens may include an aspherical surface. For example, one surface or both surfaces of the fourth lens may be aspherical.

The fifth lens has a refractive power. For example, the fifth lens has a positive refractive power or a negative refractive power. One surface of the fifth lens may be convex. For example, an object-side surface or an image-side surface of the fifth lens may be convex. The fifth lens may include an aspherical surface. For example, one surface or both surfaces of the fifth lens may be aspherical.

The sixth lens has a refractive power. For example, the sixth lens has a positive refractive power or a negative refractive power. In some examples, one surface or both surfaces of the sixth lens may be convex. For example, an object-side surface or both an object-side surface and an image-side surface of the sixth lens may be convex. Also, in some examples, one surface or both surfaces of the sixth lens may be concave. For example, an image-side surface or both an object-side surface and an image-side surface of the sixth lens may be concave. At least one surface of the sixth lens may have at least one inflection point. An inflection point is a point where a lens surface changes from convex to concave, or from concave to convex. A number of inflection points is counted from a center of the lens to an outer edge of the optical portion of the lens. For example, at least one inflection point may be formed on either one or both of the object-side surface and the image-side surface of the sixth lens. Therefore, at least one surface of the sixth lens may have a paraxial region and a peripheral region having shapes that are different from each other. For example, a paraxial region of the image-side surface of the sixth lens may be concave, but a peripheral region thereof may be convex. The sixth lens may have an aspherical surface. For example, one surface or both surfaces of the sixth lens may be aspherical.

The seventh lens has a refractive power. For example, the seventh lens has a positive refractive power or a negative refractive power. One surface of the seventh lens may be concave. For example, an image-side surface or both an object-side surface and an image-side surface of the seventh lens may be concave. At least one surface of the seventh lens may have at least one inflection point. For example, at least one inflection point may be formed on either one or both of the object-side surface and the image-side surface of the seventh lens. Therefore, at least one surface of the seventh lens may have a paraxial region and a peripheral region having shapes that are different from each other. For example, a paraxial region of the image-side surface of the seventh lens may be concave, but a peripheral region thereof may be convex. The seventh lens may include an aspherical surface. For example, one surface or both surfaces of the seventh lens may be aspherical.

The lenses of the optical imaging system may be made of a light material having a high light transmittance. For example, the first to seventh lenses may be made of a plastic material. However, a material of the first to seventh lenses is not limited to the plastic material.

The aspherical surfaces of the first to seventh lenses may be represented by the following Equation 1:

$$Z = \frac{cY^2}{1 + \sqrt{1 - (1+K)c^2Y^2}} + AY^4 + BY^6 + CY^8 + DY^{10} + EY^{12} + FY^{14} + GY^{16} + HY^{18} + \ldots \quad (1)$$

In Equation 1, c is a curvature of a lens surface and is equal to an inverse of a radius of curvature of the lens surface at an optical axis of the lens surface, K is a conic constant, Y is a distance from a certain point on an aspherical surface of the lens to an optical axis of the lens in a direction perpendicular to the optical axis, A to H are aspherical constants, and Z (or sag) is a distance between the certain point on the aspherical surface of the lens at the distance Y to the optical axis and a tangential plane perpendicular to the optical axis meeting the apex of the aspherical surface of the lens. Some of the examples disclosed in this application include an aspherical constant J. An additional term of $JY^{20}$ may be added to the right side of Equation 1 to reflect the effect of the aspherical constant J.

The optical imaging system may satisfy one or more of the following Conditional Expressions 1 to 6:

$0.1 < L1w/L7w < 0.4$ (Conditional Expression 1)

$0.5 < S6d/f < 1.4$ (Conditional Expression 2)

$0.4 < L1TR/L7TR < 0.8$ (Conditional Expression 3)

$0.5 < L1234TRavg/L7TR < 0.9$ (Conditional Expression 4)

$0.5 < L12345TRavg/L7TR < 0.9$ (Conditional Expression 5)

$1 < |f134567-f|/f$ (Conditional Expression 6)

In the above Conditional Expressions, L1w is a weight of the first lens, and L7w is a weight of the seventh lens.

S6d is an inner diameter of the sixth spacer, and f is an overall focal length of the optical imaging system.

L1TR is an overall outer diameter of the first lens, and L7TR is an overall outer diameter of the seventh lens. The overall outer diameter of a lens is a diameter of the lens including both the optical portion of the lens and the rib of the lens.

L1234TRavg is an average value of overall outer diameters of the first to fourth lenses, and L12345TRavg is an average value of overall outer diameters of the first to fifth lenses.

f134567 is a composite focal length of the first to seventh lenses calculated with an index of refraction of the second lens set to 1.0, which is substantially equal to an index of refraction of air. When the index of refraction of the second lens is set to 1.0, the second lens does not refract light. Thus, by comparing f134567 with f, which is the overall focal length of the optical system, it is possible to evaluate the effect of the second lens on f. For example, the second lens may shorten f, or lengthen f, or have no effect on f In other words, f134567 may be greater than f, or less than f, or equal to f.

Conditional Expressions 1 and 3 specify ranges of a weight ratio and an overall outer diameter ratio between the first lens and the seventh lens to facilitate a self-alignment between the lenses and an alignment by a lens barrel.

Conditional Expression 2 specifies a range of a ratio of the inner diameter of the sixth spacer to the overall focal length of the optical imaging system for minimizing a flare phenomenon.

Conditional Expressions 4 and 5 specify overall outer diameter ratios between the lenses to facilitate aberration correction.

Conditional Expression 6 specifies a lower limit of a degree of shortening of f, which is the overall focal length of the optical imaging system, by the second lens. The lower limit of 1 for |f134567−f|/f in Conditional Expression 6 corresponds to an example in which the second lens shortens f to 50% of f134567. Thus, Conditional Expression 6 covers examples in which f is 50% or less of f134567.

The optical imaging system may also satisfy one or more of the following Conditional Expressions 7 to 12:

$0.1 < L1w/L7w < 0.3$ (Conditional Expression 7)

$0.5 < S6d/f < 1.2$ (Conditional Expression 8)

$0.4 < L1TR/L7TR < 0.7$ (Conditional Expression 9)

$0.5 < L1234TRavg/L7TR < 0.75$ (Conditional Expression 10)

$0.5 < L12345TRavg/L7TR < 0.76$ (Conditional Expression 11)

$1 < |f134567-f|/f < 100$ (Conditional Expression 12)

Conditional Expressions 7 to 12 are the same as Conditional Expressions 1 to 6, except that Conditional Expressions 7 to 12 specify narrower ranges.

The optical imaging system may also satisfy one or more of the following Conditional Expressions 13 to 33:

$0.01 < R1/R4 < 1.3$ (Conditional Expression 13)

$0.1 < R1/R5 < 0.7$ (Conditional Expression 14)

$0.05 < R1/R6 < 0.9$ (Conditional Expression 15)

$0.2 < R1/R11 < 1.2$ (Conditional Expression 16)

$0.8 < R1/R14 < 1.2$ (Conditional Expression 17)

$0.6 < (R11+R14)/(2*R1) < 3.0$ (Conditional Expression 18)

$0.4 < D13/D57 < 1.2$ (Conditional Expression 19)

$0.1 < (1/f1+1/f2+1/f3+1/f4+1/f5+1/f6+1/f7)/(1/f) < 10$ (Conditional Expression 20)

$0.1 < (1/f1+1/f2+1/f3+1/f4+1/f5+1/f6+1/f7)/(TTL) < 1$ (Conditional Expression 21)

$0.2 < TD1/D67 < 0.8$ (Conditional Expression 22)

$0.1 < (R11+R14)/(R5+R6) < 1.0$ (Conditional Expression 23)

$SD12 < SD34$ (Conditional Expression 24)

$SD56 < SD67$ (Conditional Expression 25)

$SD56 < SD34$ (Conditional Expression 26)

$0.6 < TTL/(2*(IMG\ HT)) < 0.9$ (Conditional Expression 27)

$0.2 < \Sigma SD/\Sigma TD < 0.7$ (Conditional Expression 28)

$0 < \min(f1;f3)/\max(f4;f7) < 0.4$ (Conditional Expression 29)

$0.4 < (\Sigma TD)/TTL < 0.7$ (Conditional Expression 30)

$0.7 < SL/TTL < 1.0$ (Conditional Expression 31)

$0.81 < f12/f123 < 0.96$ (Conditional Expression 32)

$0.6 < f12/f1234 < 0.84$ (Conditional Expression 33)

In the above Conditional Expressions, R1 is a radius of curvature of an object-side surface of the first lens, R4 is a radius of curvature of an image-side surface of the second lens, R5 is a radius of curvature of an object-side surface of the third lens, R6 is a radius of curvature of an image-side surface of the third lens, R11 is a radius of curvature of an object-side surface of the sixth lens, and R14 is a radius of curvature of an image-side surface of the seventh lens.

D13 is a distance along an optical axis of the optical imaging system from the object-side surface of the first lens to the image-side surface of the third lens, and D57 is a distance along the optical axis from an object-side surface of the fifth lens to the image-side surface of the seventh lens.

f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f is an overall focal length of the optical imaging system, and TTL is a distance along the optical axis from the object-side surface of the first lens to an imaging plane of an image sensor of the optical imaging system.

TD1 is a thickness along the optical axis of the first lens, and D67 is a distance along the optical axis from the object-side surface of the sixth lens to the image-side surface of the seventh lens.

SD12 is a distance along the optical axis from an image-side surface of the first lens to an object-side surface of the second lens, SD34 is a distance along the optical axis from the image-side surface of the third lens to an object-side surface of the fourth lens, SD56 is a distance along the optical axis from an image-side surface of the fifth lens to the object-side surface of the sixth lens, and SD67 is a distance along the optical axis from an image-side surface of the sixth lens to an object-side surface of the seventh lens.

IMG HT is one-half of a diagonal length of the imaging plane of the image sensor.

$\Sigma SD$ is a sum of air gaps along the optical axis between the lenses, and $\Sigma TD$ is a sum of thicknesses along the optical axis of the lenses. An air gap is a distance along the optical axis between adjacent lenses.

min(f1:f3) is a minimum value of absolute values of the focal lengths of the first to third lenses, and max(f4:f7) is a maximum value of absolute values of the focal lengths of the fourth to seventh lenses.

SL is a distance along the optical axis from a stop to the imaging plane of the image sensor.

f12 is a composite focal length of the first and second lenses, f123 is a composite focal length of the first to third lenses, and f1234 is a composite focal length of the first to fourth lenses.

Conditional Expression 13 specifies a design range of the second lens for minimizing aberration caused by the first lens. For example, it is difficult to expect a sufficient correction of longitudinal spherical aberration for the second lens having a radius of curvature that exceeds the upper limit value of Conditional Expression 13, and it is difficult to expect a sufficient correction of astigmatic field curves for the second lens having a radius of curvature that is below the lower limit value of Conditional Expression 13.

Conditional Expressions 14 and 15 specify a design range of the third lens for minimizing aberration caused by the first lens. For example, it is difficult to expect a sufficient correction of longitudinal spherical aberration for the third lens having a radius of curvature that exceeds the upper limit value of Conditional Expression 14 or 15, and it is difficult to expect a correction of astigmatic field curves for the third lens having a radius of curvature that is below the lower limit value of Conditional Expression 14 or 15.

Conditional Expression 16 specifies a design range of the sixth lens for minimizing aberration caused by the first lens. For example, it is difficult to expect a sufficient correction of longitudinal spherical aberration for the sixth lens having a radius of curvature that exceeds the upper limit value of Conditional Expression 16, and the sixth lens having a radius of curvature that is below the lower limit value of Conditional Expression 16 is apt to cause a flare phenomenon.

Conditional Expression 17 specifies a design range of the seventh lens for minimizing aberration caused by the first lens. For example, it is difficult to expect a sufficient correction of longitudinal spherical aberration for the seventh lens having a radius of curvature that exceeds the upper limit value of Conditional Expression 17, and the seventh lens having a radius of curvature that is below the lower limit value of Conditional Expression 17 tends to cause a curvature of the imaging plane.

Conditional Expression 18 specifies a ratio of a sum of radii of curvature of the sixth lens and the seventh lens to twice a radius of curvature of the first lens for correcting the longitudinal spherical aberration and achieving excellent optical performance.

Conditional Expression 19 specifies a ratio of an optical imaging system mountable in a small terminal. For example, an optical imaging system having a ratio that exceeds the upper limit value of Conditional Expression 19 may cause a problem that the total length of the optical imaging system becomes long, and an optical imaging system having a ratio that is below the lower limit value of Conditional Expression 19 may cause a problem that a size of a lateral cross-section of the optical imaging system becomes large.

Conditional Expressions 20 and 21 specify a refractive power ratio of the first to seventh lenses for facilitating mass production of the optical imaging system. For example, an optical imaging system that exceeds the upper limit value of Conditional Expression 20 or 21 or is below the lower limit value of Conditional Expression 20 or 21 is difficult to commercialize because the refractive power of one or more of the first to seventh lenses is too great.

Conditional Expression 22 specifies a thickness range of the first lens for implementing a compact optical imaging system. For example, the first lens having a thickness that exceeds the upper limit value of Conditional Expression 22 or is below the lower limit value of Conditional Expression 22 is too thick or too thin to be manufactured.

Conditional Expression 24 specifies a design condition of the first to fourth lenses for improving chromatic aberration. For example, a case in which a distance between the first lens and the second lens is shorter than a distance between the third lens and the fourth lens is advantageous for improving the chromatic aberration.

Conditional Expressions 27 to 30 specify design conditions for implementing a compact optical imaging system. For example, lenses that deviate from the numerical range of Conditional Expression 28 or 30 are difficult to form by injection molding and process.

Conditional Expressions 31 to 33 specify design conditions of an optical imaging system in consideration of a position of the stop. For example, an optical imaging system that does not satisfy one or more of Conditional Expressions 31 to 33 may have a longer overall length due to the refractive power of the lenses disposed behind the stop.

Next, various examples of the optical imaging system will be described. In the tables that appear in the following examples, S1 denotes an object-side surface of the first lens, S2 denotes an image-side surface of the first lens, S3 denotes an object-side surface of the second lens, S4 denotes an image-side surface of the second lens, S5 denotes an object-side surface of the third lens, S6 denotes an image-side surface of the third lens, S7 denotes an object-side surface of the fourth lens, S8 denotes an image-side surface of the fourth lens, S9 denotes an object-side surface of the fifth lens, S10 denotes an image-side surface of the fifth lens, S11 denotes an object-side surface of the sixth lens, S12 denotes an image-side surface of the sixth lens, S13 denotes an object-side surface of the seventh lens, S14 denotes an image-side surface of the seventh lens, S15 denotes an object-side surface of the filter, S16 denotes an image-side surface of the filter, and S17 denotes the imaging plane.

First Example

Figure 2:
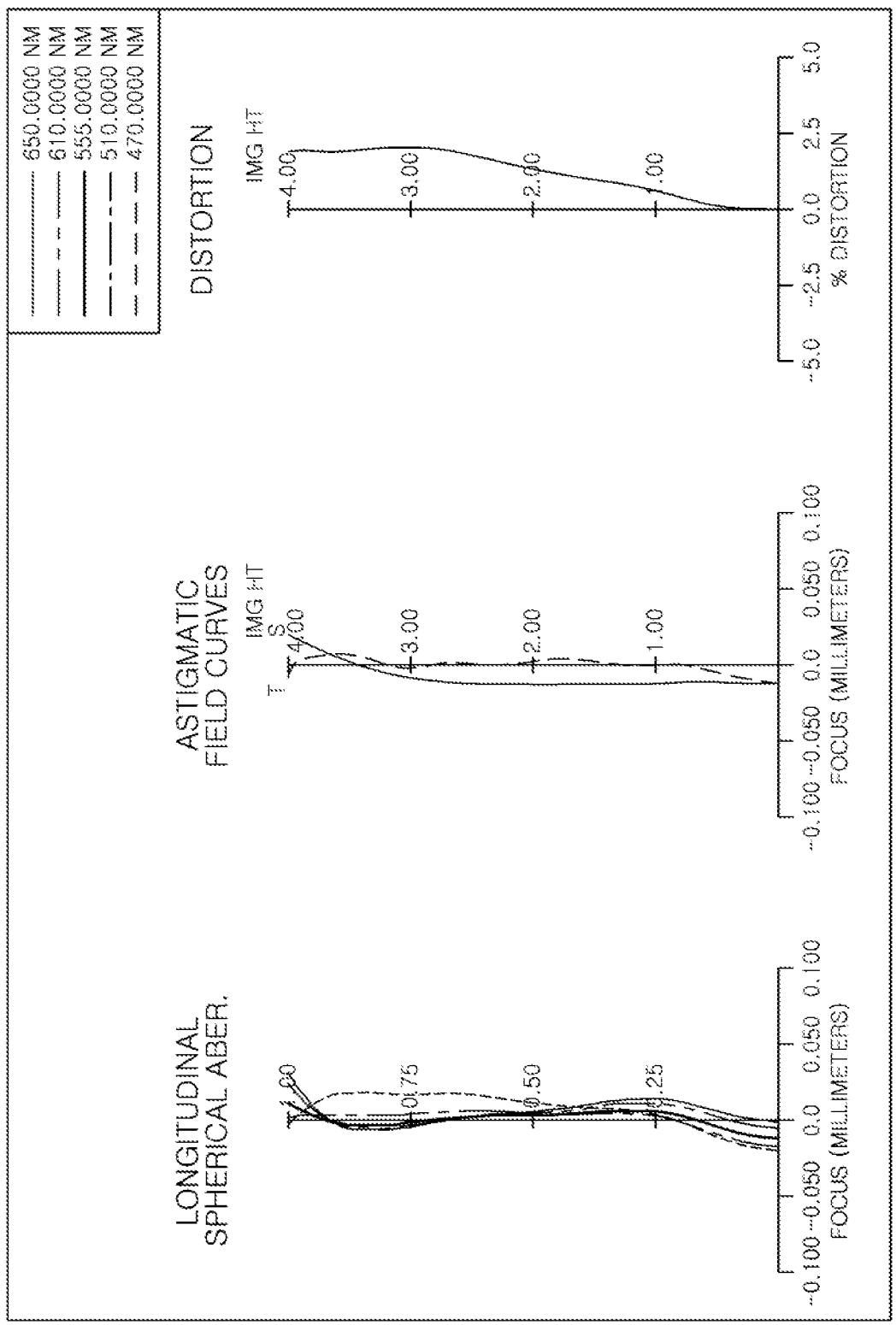
FIG. 2 illustrates aberration curves of the optical imaging system of FIG. 1.

FIG. 1 is a view illustrating a first example of an optical imaging system, and FIG. 2 illustrates aberration curves of the optical imaging system of FIG. 1.

An optical imaging system 1 includes a first lens 1001, a second lens 2001, a third lens 3001, a fourth lens 4001, a fifth lens 5001, a sixth lens 6001, and a seventh lens 7001.

The first lens 1001 has a positive refractive power, and an object-side surface thereof is convex and an image-side surface thereof is concave. The second lens 2001 has a negative refractive power, and an object-side surface thereof is convex and an image-side surface thereof is concave. The third lens 3001 has a positive refractive power, and an object-side surface thereof is convex and an image-side surface thereof is convex. The fourth lens 4001 has a negative refractive power, and an object-side surface thereof is convex and an image-side surface thereof is concave. The fifth lens 5001 has a negative refractive power, and an object-side surface thereof is convex and an image-side surface thereof is concave. The sixth lens 6001 has a positive refractive power, and an object-side surface thereof is convex and an image-side surface thereof is convex. In addition, at least one inflection point is formed on either one or both of the object-side surface and the image-side surface of the sixth lens 6001. The seventh lens 7001 has a negative refractive power, and an object-side surface thereof is concave and an image-side surface thereof is concave. In addition, one inflection point is formed on each of the object-side surface and the image-side surface of the seventh lens 7001.

The optical imaging system 1 further includes a stop, a filter 8001, and an image sensor 9001. The stop is disposed between the first lens 1001 and the second lens 2001 to adjust an amount of light incident on the image sensor 9001. The filter 8001 is disposed between the seventh lens 7001 and the image sensor 9001 to block infrared rays. The image sensor 9001 forms an imaging plane on which an image of a subject is formed. Although not illustrated in FIG. 1, the stop is disposed at a distance of 0.9035 mm from the object-side surface of the first lens 1001 toward the imaging plane of the optical imaging system 1. This distance is equal to TTL-SL and can be calculated from the values of TTL and SL for Example 1 listed in Table 57 that appears later in this application.

Table 1 below shows physical properties of the lenses and other elements of the optical imaging system of FIG. 1, and Table 2 below shows aspherical surface coefficients of the lenses of FIG. 1.

TABLE 1

| Surface No. | Element | Radius of Curvature | Thickness/ Distance | Index of Refraction | Abbe Number | Effective Aperture Radius |
|---|---|---|---|---|---|---|
| S1 | First | 2.0536 | 0.9035 | 1.546 | 56.114 | 1.568 |
| S2 | Lens (Stop) | 8.6990 | 0.1210 | | | 1.513 |
| S3 | Second | 5.7984 | 0.2300 | 1.669 | 20.353 | 1.411 |
| S4 | Lens | 3.2822 | 0.3720 | | | 1.251 |
| S5 | Third | 18.2423 | 0.5020 | 1.546 | 56.114 | 1.280 |
| S6 | Lens | −30.8318 | 0.1292 | | | 1.403 |
| S7 | Fourth | 9.4556 | 0.2600 | 1.669 | 20.353 | 1.421 |
| S8 | Lens | 6.8529 | 0.2842 | | | 1.592 |
| S9 | Fifth | 114.7177 | 0.3399 | 1.669 | 20.353 | 1.703 |
| S10 | Lens | 7.7503 | 0.2357 | | | 1.957 |
| S11 | Sixth | 3.8296 | 0.8015 | 1.546 | 56.114 | 2.275 |
| S12 | Lens | −2.3157 | 0.5095 | | | 2.531 |
| S13 | Seventh | −2.7231 | 0.3800 | 1.546 | 56.114 | 3.250 |
| S14 | Lens | 2.7638 | 0.1236 | | | 3.501 |
| S15 | Filter | Infinity | 0.1100 | 1.519 | 64.197 | 3.788 |
| S16 | | Infinity | 0.6860 | | | 3.823 |
| S17 | Imaging Plane | Infinity | 0.0120 | | | 4.187 |

TABLE 2

| | K | A | B | C | D | E | F | G | H | J |
|---|---|---|---|---|---|---|---|---|---|---|
| S1 | −1.0628 | 0.0139 | 0.0094 | −0.0141 | 0.0168 | −0.0121 | 0.0052 | −0.0012 | 0.0001 | 0 |
| S2 | 10.994 | −0.0496 | 0.0432 | −0.0268 | 0.0108 | −0.0042 | 0.0015 | −0.0004 | 3E−05 | 0 |
| S3 | 0 | 0 | 0 | 0 | 0 | 0 | 0 | 0 | 0 | 0 |
| S4 | −1.5785 | −0.0696 | 0.0645 | 0.0114 | −0.0726 | 0.0789 | −0.0411 | 0.0103 | −0.0006 | 0 |
| S5 | 0 | −0.025 | 0.0128 | −0.0683 | 0.1144 | −0.1136 | 0.0622 | −0.0169 | 0.0018 | 0 |
| S6 | −95 | −0.0612 | −0.0021 | 0.0182 | −0.0574 | 0.0781 | −0.0583 | 0.0229 | −0.0037 | 0 |
| S7 | 0 | −0.1305 | 0.0429 | −0.1213 | 0.1851 | −0.1579 | 0.0797 | −0.0225 | 0.0028 | 0 |
| S8 | 0 | −0.1024 | 0.076 | −0.1473 | 0.1804 | −0.1345 | 0.0601 | −0.015 | 0.0016 | 0 |
| S9 | 0 | −0.1299 | 0.161 | −0.1553 | 0.1065 | −0.0538 | 0.0179 | −0.0035 | 0.0003 | 0 |
| S10 | 3.6183 | −0.1952 | 0.1484 | −0.1106 | 0.0696 | −0.0319 | 0.0091 | −0.0014 | 9E−05 | 0 |
| S11 | −19.534 | −0.0262 | −0.0142 | 0.0017 | 0.002 | −0.0013 | 0.0003 | −3E−05 | 6E−07 | 0 |
| S12 | −0.7774 | 0.0934 | −0.0701 | 0.0245 | −0.0058 | 0.0012 | 0.0002 | 2E−05 | −7E−07 | 0 |
| S13 | −17.906 | −0.104 | 0.0087 | 0.0102 | −0.0036 | 0.0006 | −5E−05 | 2E−06 | −4E−08 | 0 |
| S14 | −0.5975 | −0.11 | 0.0366 | −0.009 | 0.0016 | −0.0002 | 2E−05 | −2E−06 | 6E−08 | −1.12E−09 |

Second Example

Figure 3:
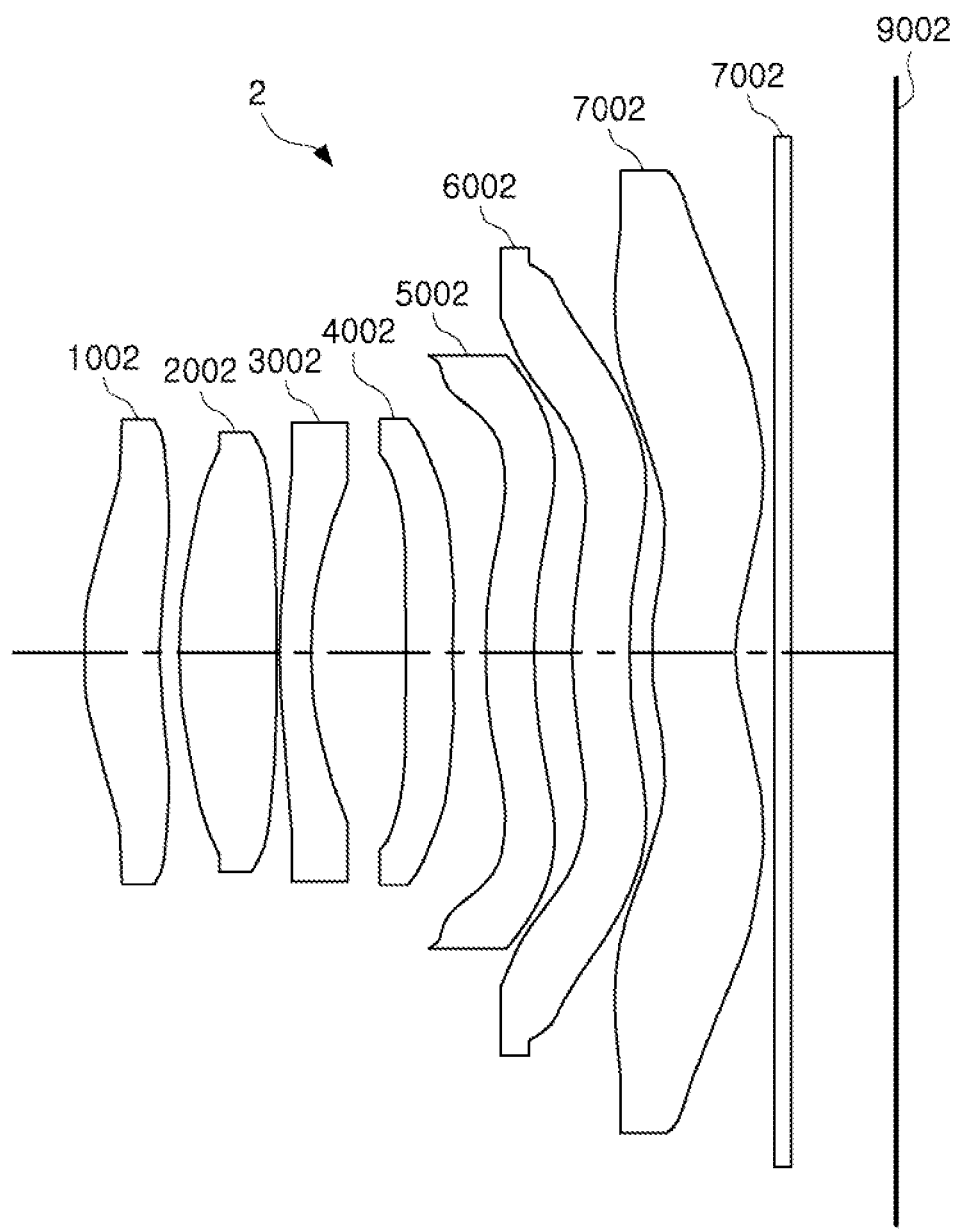
FIG. 3 is a view illustrating a second example of an optical imaging system.
Figure 4:
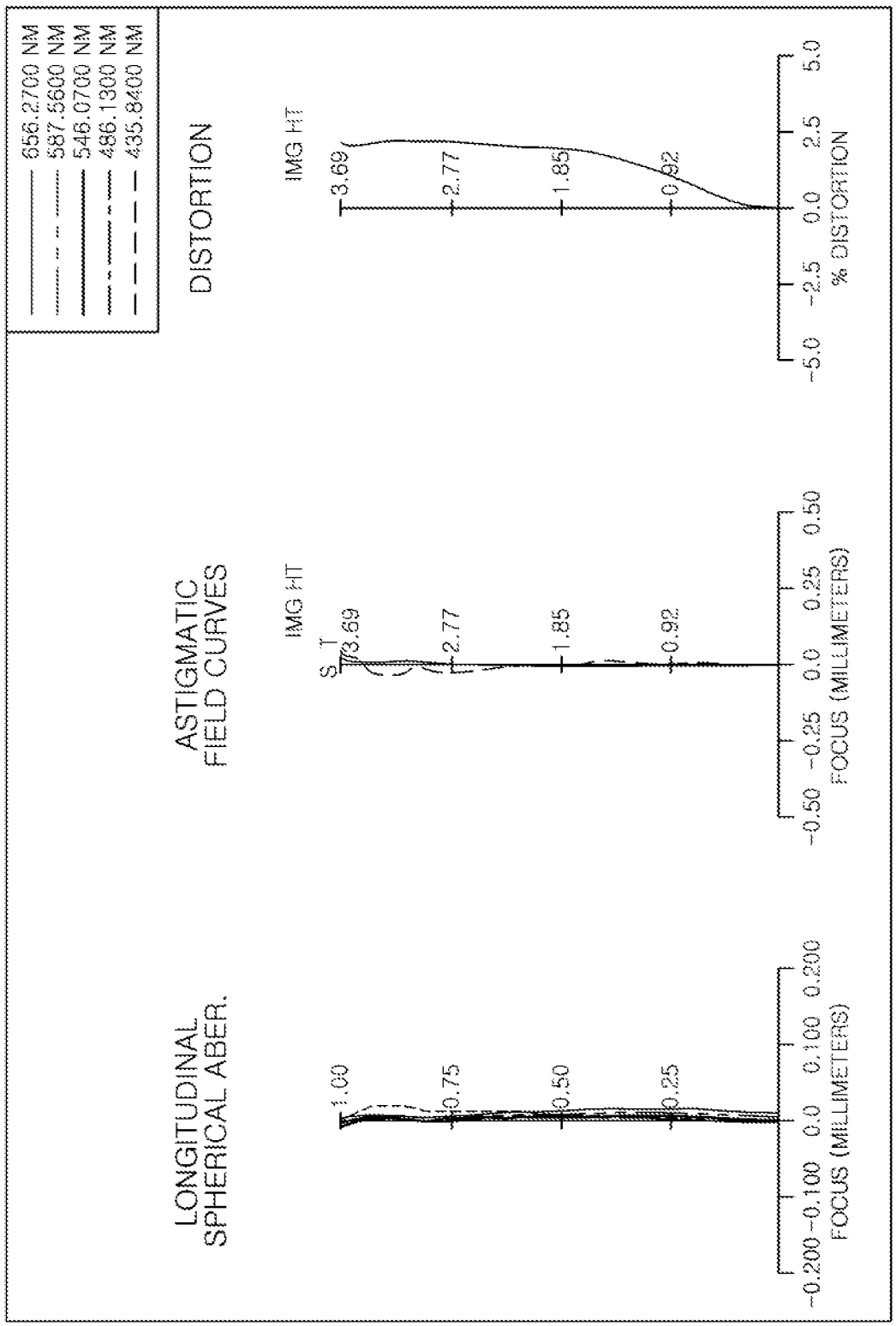
FIG. 4 illustrates aberration curves of the optical imaging system of FIG. 3.

FIG. 3 is a view illustrating a second example of an optical imaging system, and FIG. 4 illustrates aberration curves of the optical imaging system of FIG. 3.

An optical imaging system 2 includes a first lens 1002, a second lens 2002, a third lens 3002, a fourth lens 4002, a fifth lens 5002, a sixth lens 6002, and a seventh lens 7002.

The first lens 1002 has a positive refractive power, and an object-side surface thereof is convex and an image-side surface thereof is concave. The second lens 2002 has a positive refractive power, and an object-side surface thereof is convex and an image-side surface thereof is convex. The third lens 3002 has a negative refractive power, and an object-side surface thereof is convex and an image-side surface thereof is concave. The fourth lens 4002 has a positive refractive power, and an object-side surface thereof is concave and an image-side surface thereof is convex. The fifth lens 5002 has a positive refractive power, and an object-side surface thereof is convex and an image-side surface thereof is concave. The sixth lens 6002 has a negative refractive power, and an object-side surface thereof is convex and an image-side surface thereof is concave. In addition, at least one inflection point is formed on either one or both of the object-side surface and the image-side surface of the sixth lens 6002. The seventh lens 7002 has a positive refractive power, and an object-side surface thereof is convex and an image-side surface thereof is concave. In addition, two inflection points are formed on the object-side surface of the seventh lens 7002, and one inflection point is formed on the image-side surface of the seventh lens 7002.

The optical imaging system 2 further includes a stop, a filter 8002, and an image sensor 9002. The stop is disposed between the second lens 2002 and the third lens 3002 to adjust an amount of light incident on the image sensor 9002. The filter 8002 is disposed between the seventh lens 7002 and the image sensor 9002 to block infrared rays. The image sensor 9002 forms an imaging plane on which an image of a subject is formed. Although not illustrated in FIG. 3, the stop is disposed at distance of 1.2514 mm from the object-side surface of the first lens 1002 toward the imaging plane of the optical imaging system 2. This distance is equal to TTL-SL and can be calculated from the values of TTL and SL for Example 2 listed in Table 57 that appears later in this application.

Table 3 below shows physical properties of the lenses and other elements of the optical imaging system of FIG. 3, and Table 4 below shows aspherical surface coefficients of the lenses of FIG. 3.

TABLE 3

| Surface No. | Element | Radius of Curvature | Thickness/ Distance | Index of Refraction | Abbe Number | Effective Aperture Radius |
| --- | --- | --- | --- | --- | --- | --- |
| S1 | First | 2.0977 | 0.4848 | 1.546 | 56.114 | 1.410 |
| S2 | Lens | 3.2123 | 0.1235 | | | 1.350 |
| S3 | Second | 2.8957 | 0.6231 | 1.546 | 56.114 | 1.310 |
| S4 | Lens | −16.0261 | 0.0200 | | | 1.271 |
| S5 | (Stop) | 4.6472 | 0.2000 | 1.679 | 19.236 | 1.157 |
| S6 | Third Lens | 2.3076 | 0.6031 | | | 1.095 |
| S7 | Fourth | −1200.00 | 0.2984 | 1.679 | 19.236 | 1.270 |
| S8 | Lens | −1200.00 | 0.2107 | | | 1.456 |
| S9 | Fifth | 3.3656 | 0.3072 | 1.546 | 56.114 | 1.712 |
| S10 | Lens | 3.2933 | 0.2365 | | | 2.000 |
| S11 | Sixth | 3.2587 | 0.3776 | 1.679 | 19.236 | 2.150 |
| S12 | Lens | 2.6817 | 0.1409 | | | 2.500 |
| S13 | Seventh | 1.5589 | 0.5411 | 1.537 | 53.955 | 2.871 |
| S14 | Lens | 1.3718 | 0.2430 | | | 3.050 |
| S15 | Filter | Infinity | 0.1100 | 1.519 | 64.166 | 3.347 |
| S16 | | Infinity | 0.6673 | | | 3.379 |
| S17 | Imaging Plane | Infinity | 0.0026 | | | 3.708 |

TABLE 4

| | K | A | B | C | D | E | F | G | H | J |
| --- | --- | --- | --- | --- | --- | --- | --- | --- | --- | --- |
| S1 | −7.583 | 0.0707 | −0.0815 | 0.0542 | −0.0479 | 0.0209 | −0.0011 | −0.0013 | 0.0002 | 0 |
| S2 | −20.327 | −0.0052 | −0.1116 | 0.0603 | 0.0221 | −0.0313 | 0.0098 | −0.0002 | −0.0003 | 0 |
| S3 | −0.2671 | −0.0365 | −0.0311 | −0.0159 | 0.08 | −0.0164 | −0.04 | 0.0265 | −0.0051 | 0 |
| S4 | 0 | 0.0221 | −0.096 | 0.0722 | 0.0909 | −0.2138 | 0.1659 | −0.0596 | 0.0083 | 0 |
| S5 | −4.5253 | −0.0697 | 0.0432 | −0.146 | 0.4306 | −0.6073 | 0.4481 | −0.1664 | 0.0247 | 0 |
| S6 | 0.5431 | −0.098 | 0.1133 | −0.1737 | 0.2753 | −0.3038 | 0.2109 | −0.0818 | 0.0149 | 0 |
| S7 | 0 | −0.0194 | −0.0742 | 0.1045 | −0.1099 | 0.1045 | −0.0888 | 0.0459 | −0.0098 | 0 |
| S8 | 0 | −0.0129 | −0.0975 | 0.0464 | 0.0472 | −0.0702 | 0.033 | −0.0054 | 0 | 0 |
| S9 | −43.017 | 0.1335 | −0.1604 | 0.0703 | −0.0277 | 0.0168 | −0.01 | 0.003 | −0.0003 | 0 |
| S10 | −5.2037 | −0.0285 | 0.0684 | −0.1295 | 0.1018 | −0.0463 | 0.0125 | −0.0018 | 0.0001 | 0 |
| S11 | −1.699 | 0.0274 | −0.1873 | 0.1887 | −0.126 | 0.0512 | −0.0118 | 0.0014 | −7E−05 | 0 |
| S12 | −0.0013 | −0.0788 | −0.0314 | 0.0355 | −0.0206 | 0.0072 | −0.0014 | 0.0001 | −6E−06 | 0 |
| S13 | −0.8015 | −0.4138 | 0.198 | −0.0635 | 0.0157 | −0.003 | 0.0004 | −4E−05 | 2E−06 | −5E−08 |
| S14 | −1.2781 | −0.3 | 0.1664 | −0.0696 | 0.021 | −0.0044 | 0.0006 | −5E−05 | 3E−06 | −5E−08 |

Third Example

Figure 5:
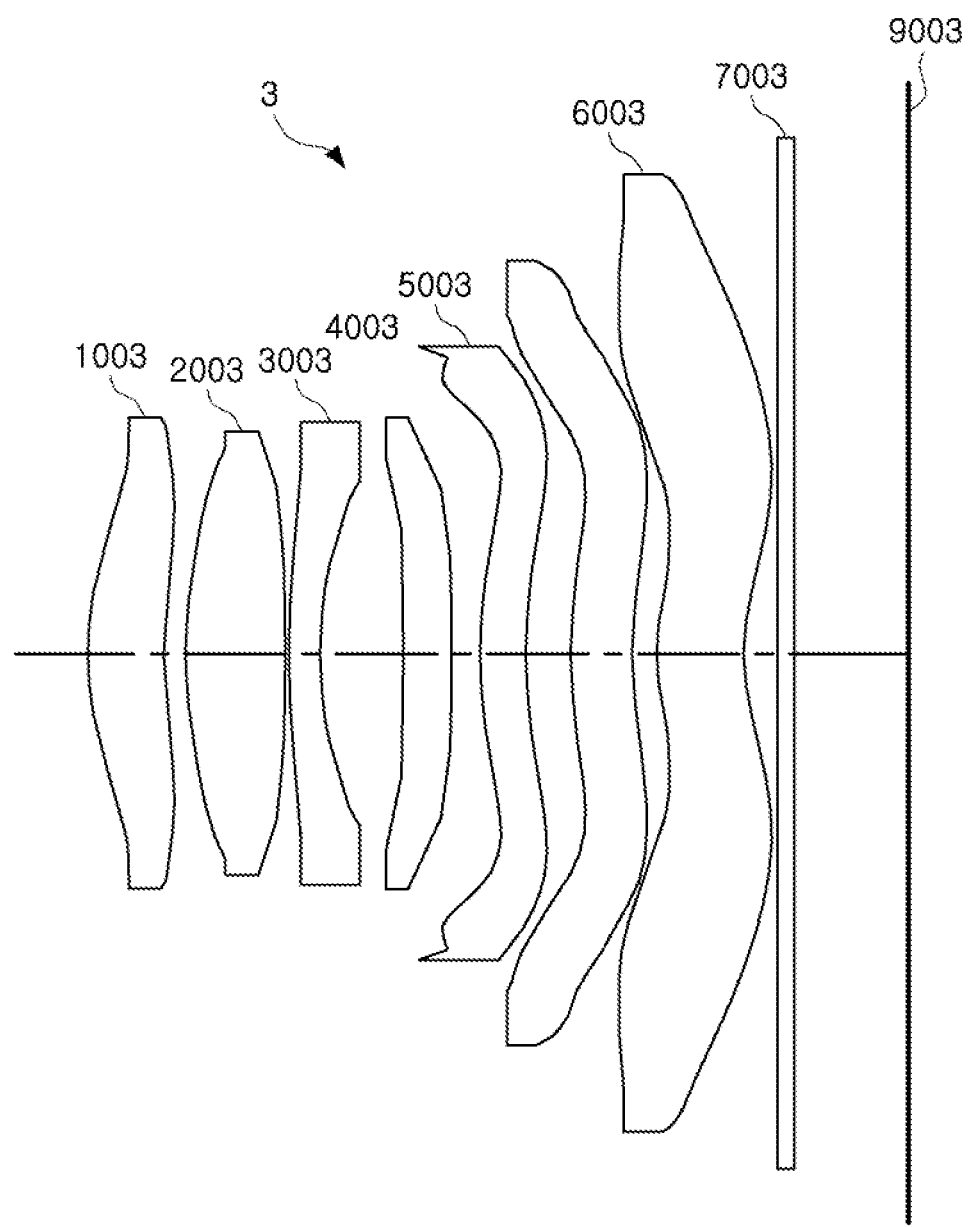
FIG. 5 is a view illustrating a third example of an optical imaging system.
Figure 6:
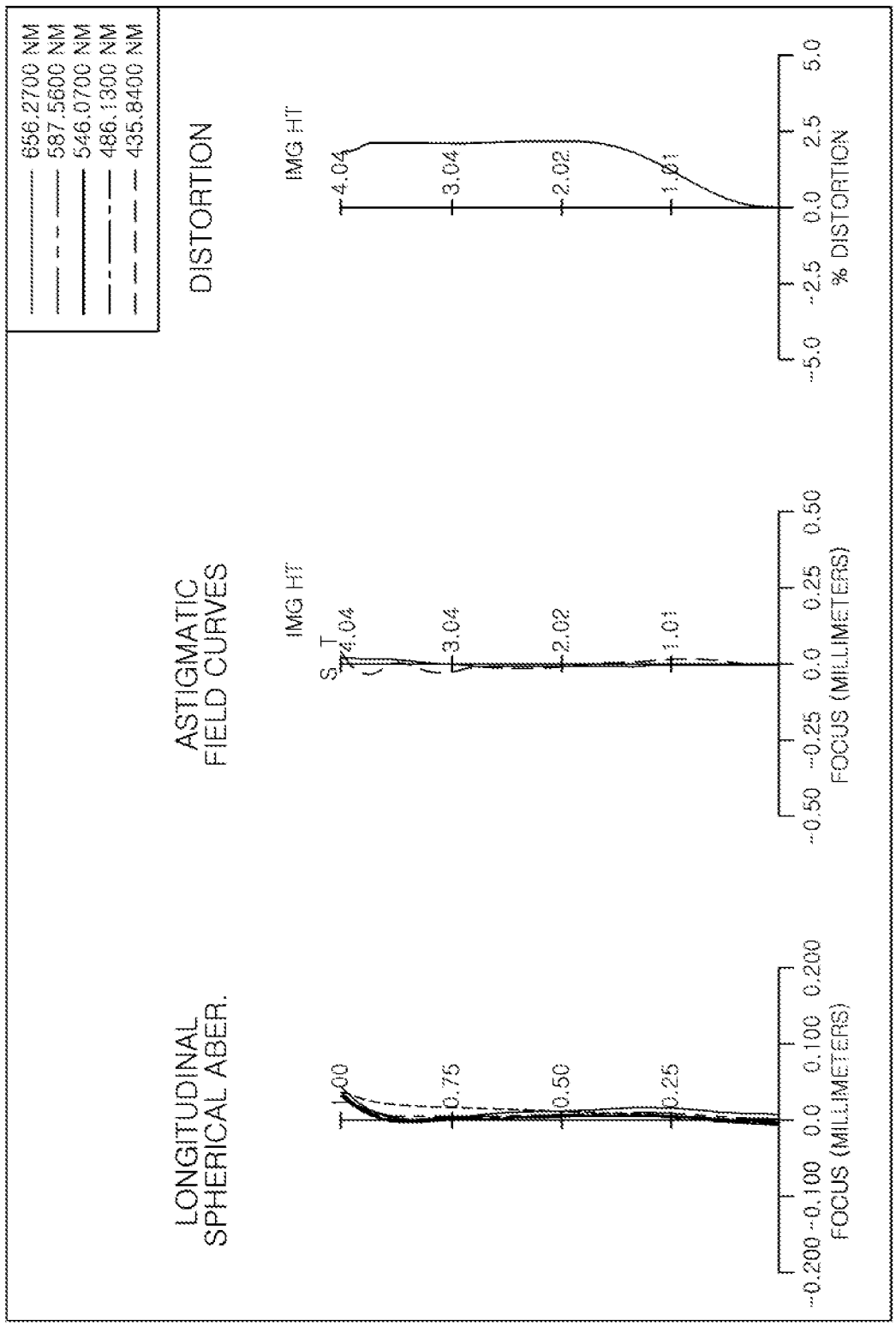
FIG. 6 illustrates aberration curves of the optical imaging system of FIG. 5.

FIG. 5 is a view illustrating a third example of an optical imaging system, and FIG. 6 illustrates aberration curves of the optical imaging system of FIG. 5.

An optical imaging system 3 includes a first lens 1003, a second lens 2003, a third lens 3003, a fourth lens 4003, a fifth lens 5003, a sixth lens 6003, and a seventh lens 7003.

The first lens 1003 has a positive refractive power, and an object-side surface thereof is convex and an image-side surface thereof is concave. The second lens 2003 has a positive refractive power, and an object-side surface thereof is convex and an image-side surface thereof is convex. The third lens 3003 has a negative refractive power, and an object-side surface thereof is convex and an image-side surface thereof is concave. The fourth lens 4003 has a positive refractive power, and an object-side surface thereof is concave and an image-side surface thereof is convex. The fifth lens 5003 has a positive refractive power, and an object-side surface thereof is convex and an image-side surface thereof is concave. The sixth lens 6003 has a negative refractive power, and an object-side surface thereof is convex and an image-side surface thereof is concave. In addition, at least one inflection point is formed on either one or both of the object-side surface and the image-side surface of the sixth lens 6003. The seventh lens 7003 has a positive refractive power, and an object-side surface thereof is convex and an image-side surface thereof is concave. In addition, two inflection points are formed on the object-side surface of the seventh lens 7003, and one inflection point is formed on the image-side surface of the seventh lens 7003.

The optical imaging system 3 further includes a stop, a filter 8003, and an image sensor 9003. The stop is disposed between the second lens 2003 and the third lens 3003 to adjust an amount of light incident on the image sensor 9003. The filter 8003 is disposed between the seventh lens 7003 and the image sensor 9003 to block infrared rays. The image sensor 9003 forms an imaging plane on which an image of a subject is formed. Although not illustrated in FIG. 5, the stop is disposed at a distance of 1.4250 mm from the object-side surface of the first lens 1003 toward the imaging plane of the optical imaging system 3. This distance is equal to TTL-SL and can be calculated from the values of TTL and SL for Example 3 listed in Table 57 that appears later in this application.

Table 5 below shows physical properties of the lenses and other elements of the optical imaging system of FIG. 5, and Table 6 below shows aspherical surface coefficients of the lenses of FIG. 5.

TABLE 5

| Surface No. | Element | Radius of Curvature | Thickness/ Distance | Index of Refraction | Abbe Number | Effective Aperture Radius |
|---|---|---|---|---|---|---|
| S1 | First | 2.3706 | 0.5431 | 1.546 | 56.114 | 1.572 |
| S2 | Lens | 3.8377 | 0.1516 | | | 1.517 |
| S3 | Second | 3.4329 | 0.7078 | 1.546 | 56.114 | 1.478 |
| S4 | Lens | −17.0251 | 0.0225 | | | 1.428 |
| S5 | (Stop) | 5.1429 | 0.2247 | 1.679 | 19.236 | 1.300 |
| S6 | Third Lens | 2.5333 | 0.5888 | | | 1.230 |
| S7 | Fourth | −1446.167 | 0.3404 | 1.679 | 19.236 | 1.404 |
| S8 | Lens | −1446.167 | 0.2070 | | | 1.600 |
| S9 | Fifth | 3.6434 | 0.3264 | 1.546 | 56.114 | 1.857 |
| S10 | Lens | 3.8224 | 0.3171 | | | 2.199 |
| S11 | Sixth | 3.8509 | 0.4406 | 1.679 | 19.236 | 2.415 |
| S12 | Lens | 3.0494 | 0.1774 | | | 2.808 |
| S13 | Seventh | 1.7430 | 0.6133 | 1.537 | 53.955 | 3.115 |
| S14 | Lens | 1.5635 | 0.2466 | | | 3.314 |
| S15 | Filter | Infinity | 0.1100 | 1.519 | 64.166 | 3.655 |
| S16 | | Infinity | 0.8047 | | | 3.688 |
| S17 | Imaging Plane | Infinity | 0.0051 | | | 4.075 |

TABLE 6

| | K | A | B | C | D | E | F | G | H | J |
|---|---|---|---|---|---|---|---|---|---|---|
| S1 | −7.5196 | 0.0476 | −0.039 | 0.0108 | −0.0002 | −0.006 | 0.0045 | −0.0012 | 0.0001 | 0 |
| S2 | −19.661 | −0.0106 | −0.0481 | 0.0183 | 0.0105 | −0.0109 | 0.0039 | −0.0006 | 3E−05 | 0 |
| S3 | 0.042 | −0.0249 | −0.0196 | 0.0094 | 0.0041 | 0.0108 | −0.014 | 0.0056 | −0.0008 | 0 |
| S4 | 0 | 0.0098 | −0.0507 | 0.0341 | 0.0229 | −0.0518 | 0.0341 | −0.0103 | 0.0012 | 0 |
| S5 | −5.6502 | −0.0476 | 0.0152 | −0.0398 | 0.11 | −0.1327 | 0.082 | −0.0252 | 0.0031 | 0 |
| S6 | 0.5327 | −0.067 | 0.0583 | −0.0705 | 0.0922 | −0.0854 | 0.0499 | −0.0161 | 0.0024 | 0 |
| S7 | 0 | −0.0158 | −0.0083 | −0.0305 | 0.0756 | −0.0736 | 0.035 | −0.0077 | 0.0005 | 0 |
| S8 | 0 | −0.0099 | −0.0427 | 0.0077 | 0.0285 | −0.0272 | 0.01 | −0.0013 | 0 | 0 |
| S9 | −44.395 | 0.1048 | −0.1251 | 0.08 | −0.0437 | 0.0187 | −0.0058 | 0.001 | −7E−05 | 0 |
| S10 | −4.0715 | −0.0175 | 0.0211 | −0.0368 | 0.0252 | −0.01 | 0.0024 | −0.0003 | 2E−05 | 0 |
| S11 | −1.1211 | 0.0034 | −0.0742 | 0.0637 | −0.0381 | 0.0134 | −0.0026 | 0.0003 | −1E−05 | 0 |
| S12 | 0.0464 | −0.092 | 0.0339 | −0.0168 | 0.0044 | −0.0005 | 1E−05 | 3E−06 | −2E−07 | 0 |
| S13 | −0.795 | −0.2987 | 0.11 | −0.0259 | 0.0046 | −0.0007 | 7E−05 | −5E−06 | 2E−07 | −5E−09 |
| S14 | −1.3233 | −0.199 | 0.0846 | −0.0285 | 0.0073 | −0.0013 | 0.0002 | −1E−05 | 5E−07 | −9E−09 |

Fourth Example

Figure 7:
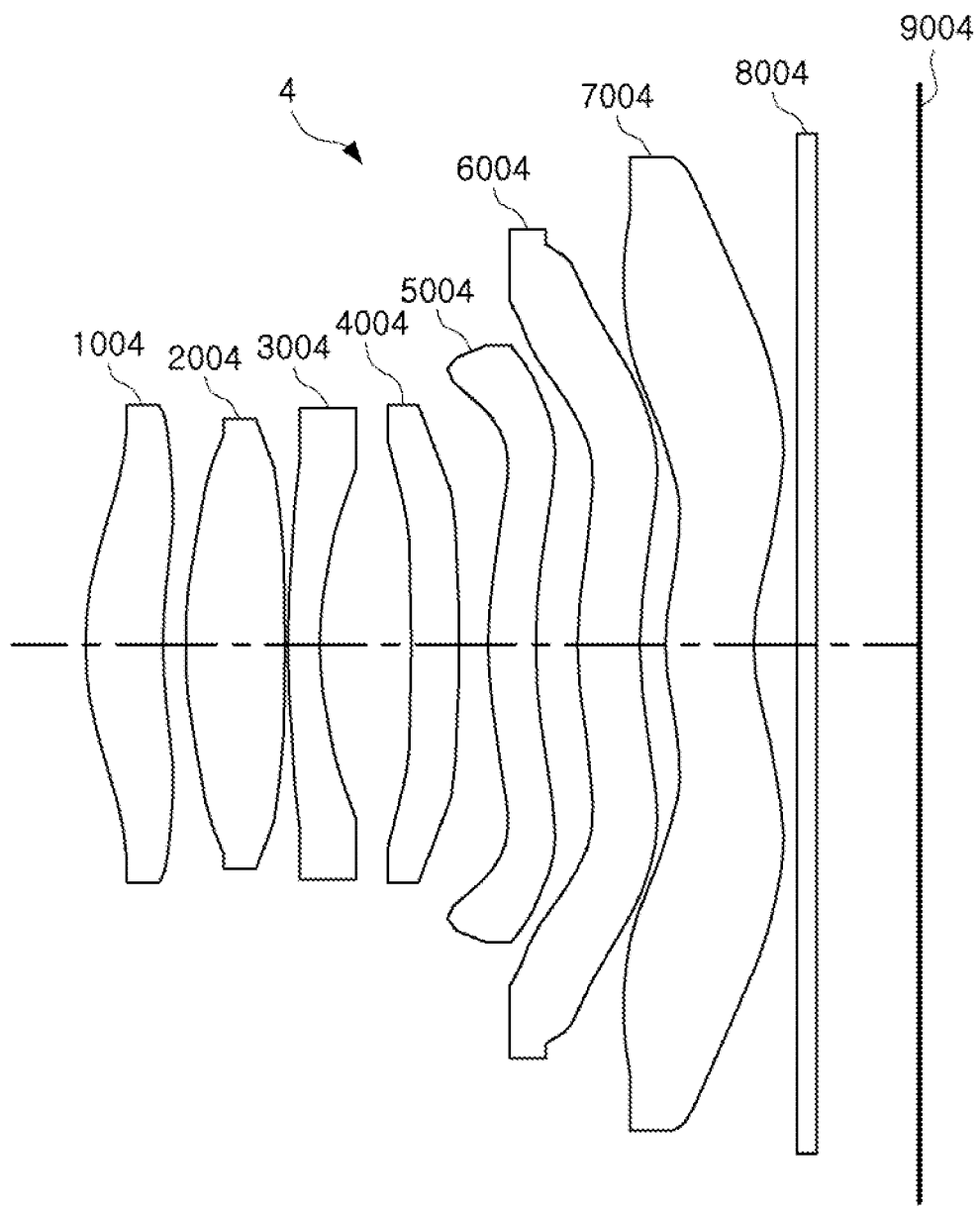
FIG. 7 is a view illustrating a fourth example of an optical imaging system.
Figure 8:
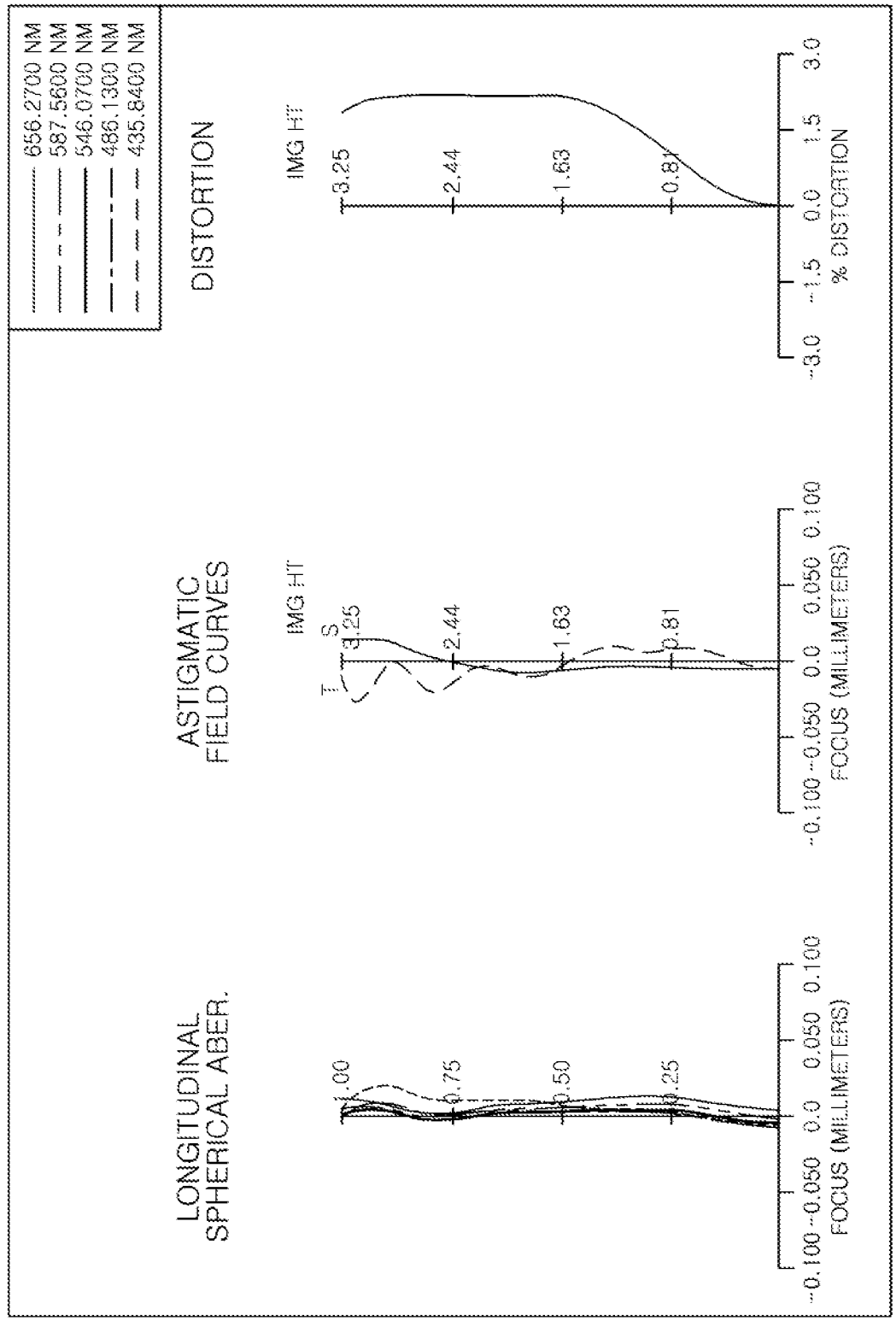
FIG. 8 illustrates aberration curves of the optical imaging system of FIG. 7.

FIG. 7 is a view illustrating a fourth example of an optical imaging system, and FIG. 8 illustrates aberration curves of the optical imaging system of FIG. 7.

An optical imaging system 4 includes a first lens 1004, a second lens 2004, a third lens 3004, a fourth lens 4004, a fifth lens 5004, a sixth lens 6004, and a seventh lens 7004.

The first lens 1004 has a positive refractive power, and an object-side surface thereof is convex and an image-side surface thereof is concave. The second lens 2004 has a positive refractive power, and an object-side surface thereof is convex and an image-side surface thereof is convex. The third lens 3004 has a negative refractive power, and an object-side surface thereof is convex and an image-side surface thereof is concave. The fourth lens 4004 has a negative refractive power, and an object-side surface thereof is concave and an image-side surface thereof is convex. The fifth lens 5004 has a positive refractive power, and an object-side surface thereof is convex and an image-side surface thereof is concave. The sixth lens 6004 has a negative refractive power, and an object-side surface thereof is convex and an image-side surface thereof is concave. In addition, at least one inflection point is formed on either one or both of the object-side surface and the image-side surface of the sixth lens 6004. The seventh lens 7004 has a positive refractive power, and an object-side surface thereof is convex and an image-side surface thereof is concave. In addition, two inflection points are formed on the object-side surface of the seventh lens 7004, and one inflection point is formed on the image-side surface of the seventh lens 7004.

The optical imaging system 4 further includes a stop, a filter 8004, and an image sensor 9004. The stop is disposed between the second lens 2004 and the third lens 3004 to adjust an amount of light incident on the image sensor 9004. The filter 8004 is disposed between the seventh lens 7004 and the image sensor 9004 to block infrared rays. The image sensor 9004 forms an imaging plane on which an image of a subject is formed. Although not illustrated in FIG. 7, the stop is disposed at a distance of 1.1686 mm from the object-side surface of the first lens 1004 toward the imaging plane of the optical imaging system 4. This distance is equal to TTL-SL and can be calculated from the values of TTL and SL for Example 4 listed in Table 57 that appears later in this application.

Table 7 below shows physical properties of the lenses and other elements of the optical imaging system of FIG. 7, and Table 8 below shows aspherical surface coefficients of the lenses of FIG. 7.

TABLE 7

| Surface No. | Element | Radius of Curvature | Thickness/Distance | Index of Refraction | Abbe Number | Effective Aperture Radius |
|---|---|---|---|---|---|---|
| S1 | First | 1.9512 | 0.4488 | 1.546 | 56.114 | 1.307 |
| S2 | Lens | 3.1152 | 0.1260 | | | 1.253 |
| S3 | Second | 2.8686 | 0.5753 | 1.546 | 56.114 | 1.214 |
| S4 | Lens | −12.9825 | 0.0186 | | | 1.180 |
| S5 | (Stop) | 4.5064 | 0.1856 | 1.679 | 19.236 | 1.074 |
| S6 | Third | 2.1969 | 0.5197 | | | 1.016 |
| | Lens | | | | | |
| S7 | Fourth | −2108.865 | 0.2796 | 1.679 | 19.236 | 1.179 |
| S8 | Lens | −6755.436 | 0.1715 | | | 1.338 |
| S9 | Fifth | 3.1135 | 0.2734 | 1.546 | 56.114 | 1.528 |
| S10 | Lens | 3.2672 | 0.2417 | | | 1.808 |
| S11 | Sixth | 3.2228 | 0.3650 | 1.679 | 19.236 | 1.996 |
| S12 | Lens | 2.5388 | 0.1438 | | | 2.320 |
| S13 | Seventh | 1.4451 | 0.5122 | 1.537 | 53.955 | 2.500 |
| S14 | Lens | 1.2680 | 0.2501 | | | 2.738 |
| S15 | Filter | Infinity | 0.1100 | 1.519 | 64.166 | 2.940 |
| S16 | | Infinity | 0.5924 | | | 2.971 |
| S17 | Imaging Plane | Infinity | 0.0054 | | | 3.251 |

TABLE 8

| | K | A | B | C | D | E | F | G | H | J |
|---|---|---|---|---|---|---|---|---|---|---|
| S1 | −7.5279 | 0.0857 | −0.105 | 0.0528 | −0.0256 | −0.0221 | 0.0379 | −0.0166 | 0.0023 | 0 |
| S2 | −19.893 | −0.0142 | −0.1337 | 0.0682 | 0.0621 | −0.0783 | 0.0306 | −0.0031 | −0.0006 | 0 |
| S3 | −0.0142 | −0.0449 | −0.0418 | −0.0147 | 0.1136 | 0.012 | −0.1333 | 0.0892 | −0.0193 | 0 |
| S4 | 0 | 0.0281 | −0.189 | 0.276 | −0.0808 | −0.2297 | 0.2908 | −0.1382 | 0.024 | 0 |
| S5 | −6.2325 | −0.0763 | −0.0054 | −0.0795 | 0.6054 | −1.1875 | 1.107 | −0.5047 | 0.0912 | 0 |
| S6 | 0.4782 | −0.115 | 0.1396 | −0.2676 | 0.5637 | −0.7991 | 0.6898 | −0.325 | 0.0682 | 0 |
| S7 | 0 | −0.0188 | −0.0772 | 0.0717 | 0.0184 | −0.081 | 0.0225 | 0.0277 | −0.0139 | 0 |
| S8 | 0 | −0.0127 | −0.1356 | 0.0837 | 0.0781 | −0.1502 | 0.0847 | −0.0163 | 0 | 0 |
| S9 | −49.08 | 0.1815 | −0.3205 | 0.2837 | −0.2161 | 0.1317 | −0.0595 | 0.0158 | −0.0017 | 0 |
| S10 | −5.4303 | −0.0205 | 0.025 | −0.1003 | 0.1046 | −0.0624 | 0.0222 | −0.0043 | 0.0003 | 0 |
| S11 | −1.136 | 0.0314 | −0.2615 | 0.3261 | 0.133 | −0.0369 | 0.0053 | −0.0003 | 0 | 0 |
| S12 | 0.0272 | −0.1293 | 0.0241 | 5E−05 | −0.0123 | 0.0085 | −0.0024 | 0.0003 | −2E−05 | 0 |
| S13 | −0.8 | −0.5247 | 0.2994 | −0.1227 | 0.0414 | −0.0108 | 0.002 | −0.0002 | 2E−05 | −4E−07 |
| S14 | −1.3207 | −0.3666 | 0.2425 | −0.1248 | 0.0468 | −0.0121 | 0.002 | −0.0002 | 1E−05 | −3E−07 |

Fifth Example

Figure 9:
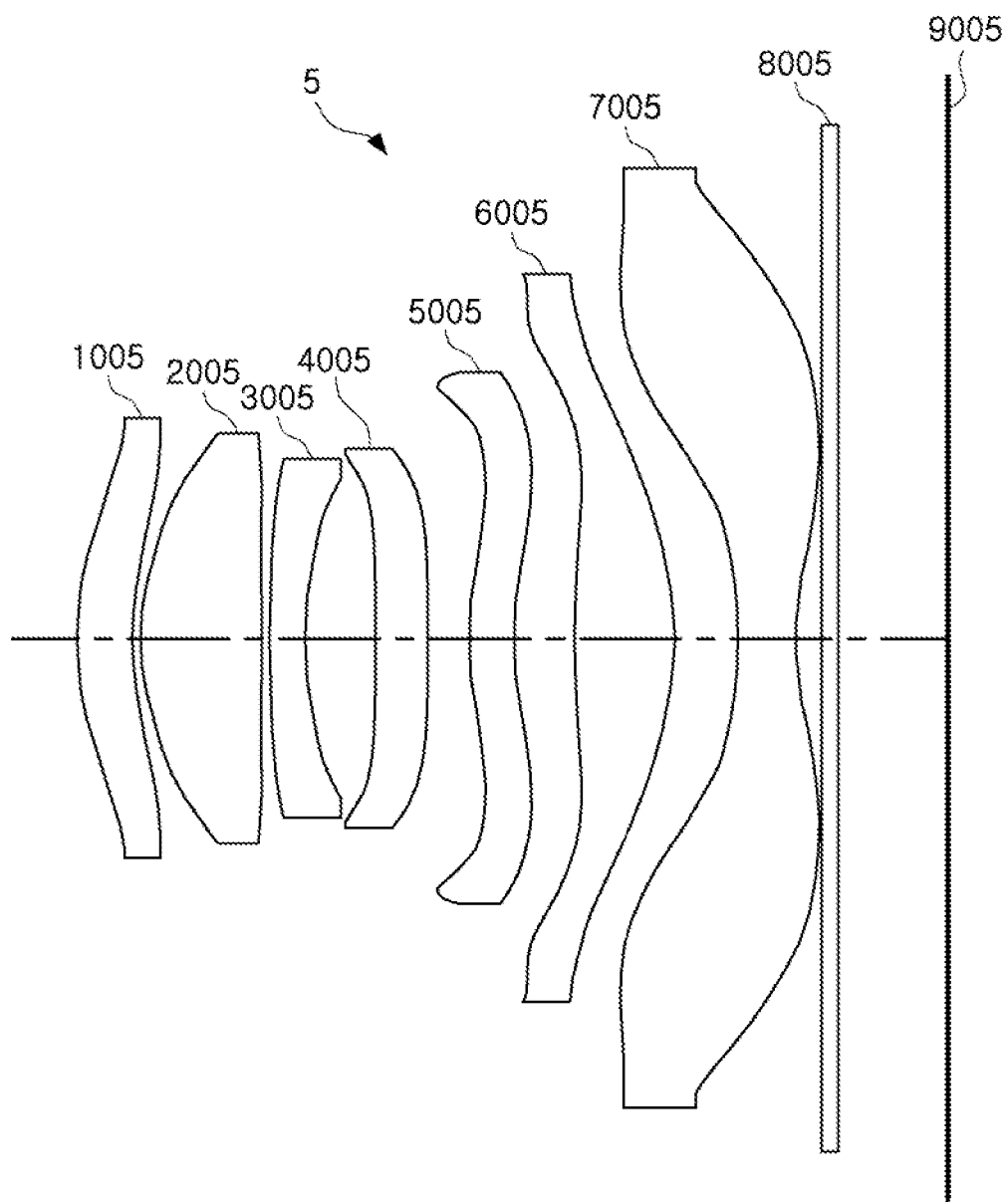
FIG. 9 is a view illustrating a fifth example of an optical imaging system.
Figure 10:
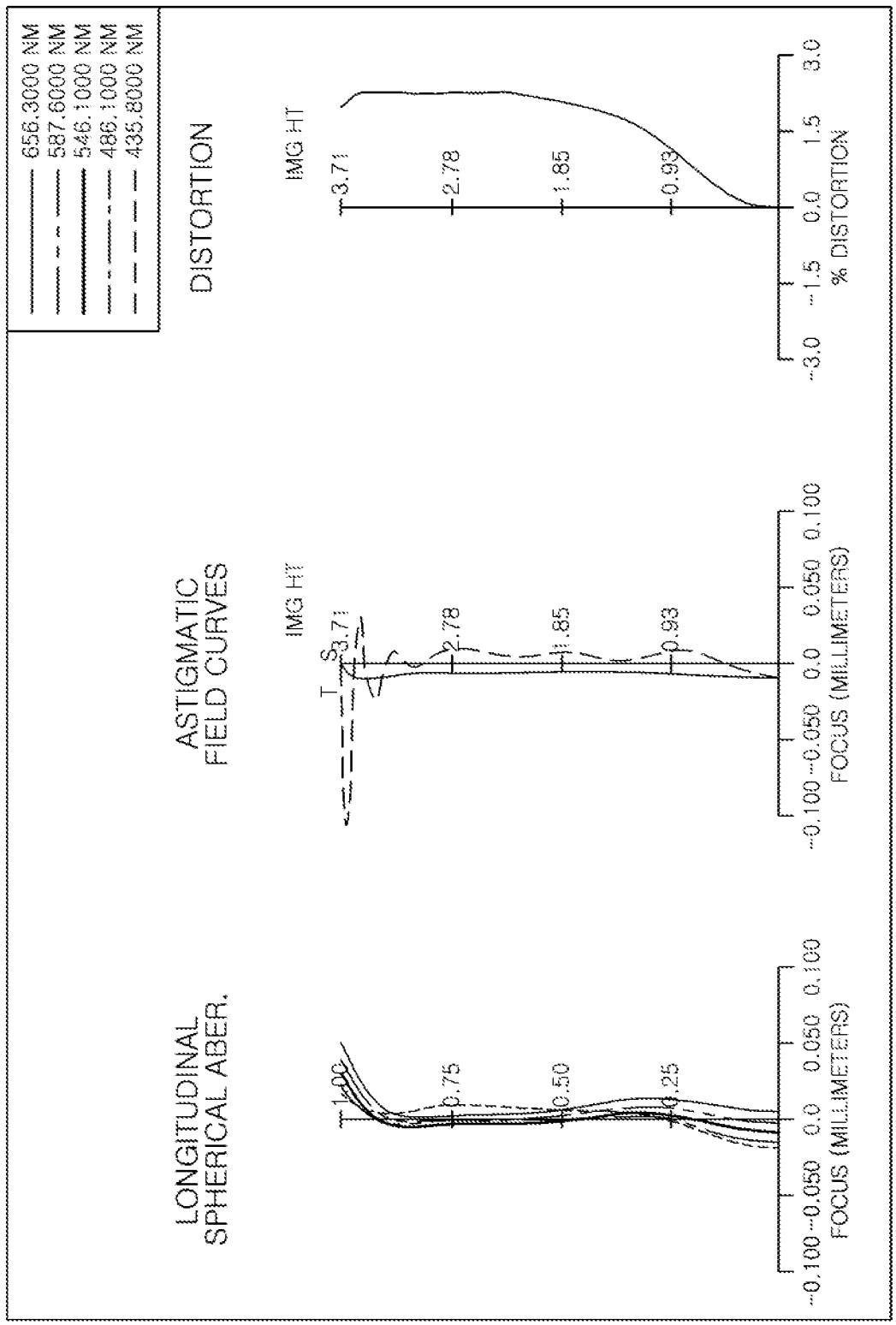
FIG. 10 illustrates aberration curves of the optical imaging system of FIG. 9.

FIG. 9 is a view illustrating a fifth example of an optical imaging system, and FIG. 10 illustrates aberration curves of the optical imaging system of FIG. 9.

An optical imaging system 5 includes a first lens 1005, a second lens 2005, a third lens 3005, a fourth lens 4005, a fifth lens 5005, a sixth lens 6005, and a seventh lens 7005.

The first lens 1005 has a negative refractive power, and an object-side surface thereof is convex and an image-side surface thereof is concave. The second lens 2005 has a positive refractive power, and an object-side surface thereof is convex and an image-side surface thereof is concave. The third lens 3005 has a negative refractive power, and an object-side surface thereof is convex and an image-side surface thereof is concave. The fourth lens 4005 has a negative refractive power, and an object-side surface thereof is convex and an image-side surface thereof is concave. The fifth lens 5005 has a positive refractive power, and an object-side surface thereof is convex and an image-side surface thereof is concave. The sixth lens 6005 has a positive refractive power, and an object-side surface thereof is convex and an image-side surface thereof is convex. In addition, at least one inflection point is formed on either one or both of the object-side surface and the image-side surface of the sixth lens 6005. The seventh lens 7005 has a negative refractive power, and an object-side surface thereof is concave and an image-side surface thereof is concave. In addition, one inflection point is formed on each of the object-side surface and the image-side surface of the seventh lens 7005.

The optical imaging system 5 further includes a stop, a filter 8005, and an image sensor 9005. The stop is disposed between the first lens 1005 and the second lens 2005 to adjust an amount of light incident on the image sensor 9005. The filter 8005 is disposed between the seventh lens 7005 and the image sensor 9005 to block infrared rays. The image sensor 9005 forms an imaging plane on which an image of a subject is formed. Although not illustrated in FIG. 9, the stop is disposed at distance of 0.3830 mm from the object-side surface of the first lens 1005 toward the imaging plane of the optical imaging system 5. This distance is equal to TTL-SL and can be calculated from the values of TTL and SL for Example 5 listed in Table 57 that appears later in this application.

Table 9 below shows physical properties of the lenses and other elements of the optical imaging system of FIG. 9, and Table 10 below shows aspherical surface coefficients of the lenses of FIG. 9.

TABLE 9

| Surface No. | Element | Radius of Curvature | Thickness/ Distance | Index of Refraction | Abbe Number | Effective Aperture Radius |
|---|---|---|---|---|---|---|
| S1 | First | 2.1824 | 0.3329 | 1.546 | 56.114 | 1.380 |
| S2 | Lens | 1.9439 | 0.0500 | | | 1.369 |
| S3 | (Stop) | 1.6857 | 0.7322 | 1.546 | 56.114 | 1.335 |
| S4 | Second | 28.3727 | 0.0500 | | | 1.264 |
| | Lens | | | | | |
| S5 | Third | 7.1536 | 0.2200 | 1.679 | 19.236 | 1.185 |
| S6 | Lens | 2.9223 | 0.4264 | | | 1.050 |
| S7 | Fourth | 46.9146 | 0.3121 | 1.646 | 23.528 | 1.112 |
| S8 | Lens | 17.5860 | 0.2616 | | | 1.268 |
| S9 | Fifth | 2.2655 | 0.2700 | 1.646 | 23.528 | 1.774 |
| S10 | Lens | 2.3143 | 0.3731 | | | 1.839 |
| S11 | Sixth | 8.5186 | 0.6078 | 1.546 | 56.114 | 2.160 |
| S12 | Lens | -1.9871 | 0.3782 | | | 2.308 |
| S13 | Seventh | -4.7165 | 0.3600 | 1.546 | 56.114 | 2.780 |
| S14 | Lens | 1.8919 | 0.1457 | | | 2.998 |
| S15 | Filter | Infinity | 0.1100 | 1.519 | 64.166 | 3.353 |

TABLE 9-continued

| Surface No. | Element | Radius of Curvature | Thickness/ Distance | Index of Refraction | Abbe Number | Effective Aperture Radius |
|---|---|---|---|---|---|---|
| S16 | | Infinity | 0.6600 | | | 3.385 |
| S17 | Imaging Plane | Infinity | 0.0100 | | | 3.712 |

TABLE 10

| | K | A | B | C | D | E | F | G | H |
|---|---|---|---|---|---|---|---|---|---|
| S1 | -3.5715 | 0.0005 | 0.0011 | -0.0181 | 0.0025 | 0.0107 | -0.0084 | 0.0026 | -0.0003 |
| S2 | -9.1496 | -0.0513 | -0.0055 | 0.0116 | 0.0161 | -0.0207 | 0.0078 | -0.001 | 0 |
| S3 | -2.5622 | -0.0879 | 0.1115 | -0.1204 | 0.1625 | -0.1325 | 0.0578 | -0.0118 | 0.0006 |
| S4 | -90 | -0.078 | 0.2103 | -0.4384 | 0.6397 | -0.6153 | 0.3736 | -0.1288 | 0.0189 |
| S5 | 0 | -0.1133 | 0.2975 | -0.5447 | 0.7496 | -0.7199 | 0.4525 | -0.1642 | 0.0257 |
| S6 | 4.6946 | -0.0705 | 0.1434 | -0.2144 | 0.1998 | -0.0956 | -0.0142 | 0.0399 | -0.0137 |
| S7 | 0 | -0.0972 | 0.1221 | -0.3303 | 0.5457 | -0.6222 | 0.4555 | -0.1995 | 0.0405 |
| S8 | 0 | -0.1596 | 0.2027 | -0.3281 | 0.3412 | -0.2472 | 0.1212 | -0.0385 | 0.0064 |
| S9 | -18.27 | -0.0564 | -0.0069 | 0.0518 | -0.0566 | 0.0228 | -0.0011 | -0.0019 | 0.0004 |
| S10 | -15.127 | -0.0603 | -0.0145 | 0.0594 | -0.0601 | 0.0318 | -0.0096 | 0.0015 | -1E-04 |
| S11 | 0 | 0.0027 | -0.0398 | 0.025 | -0.0137 | 0.005 | -0.001 | 1E-04 | -4E-06 |
| S12 | -1.1693 | 0.1224 | -0.1006 | 0.0535 | -0.0195 | 0.005 | -0.0008 | 8E-05 | -3E-06 |
| S13 | -4.4446 | -0.097 | -0.0137 | 0.0358 | -0.0141 | 0.0028 | -0.0003 | 2E-05 | -5E-07 |
| S14 | -8.7431 | -0.0906 | 0.0342 | -0.009 | 0.0017 | -0.0002 | 2E-05 | -1E-06 | 3E-08 |

Sixth Example

Figure 11:
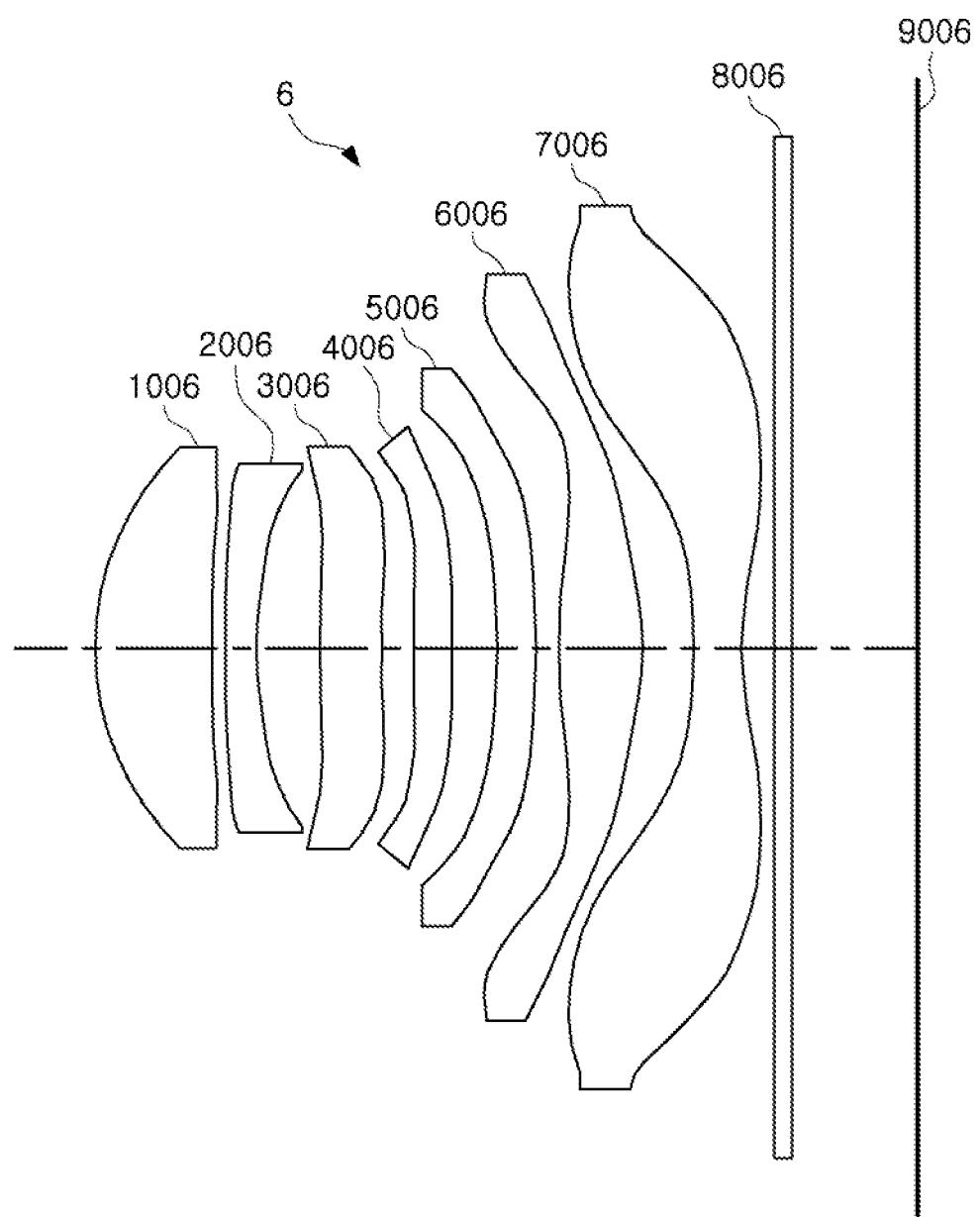
FIG. 11 is a view illustrating a sixth example of an optical imaging system.
Figure 12:
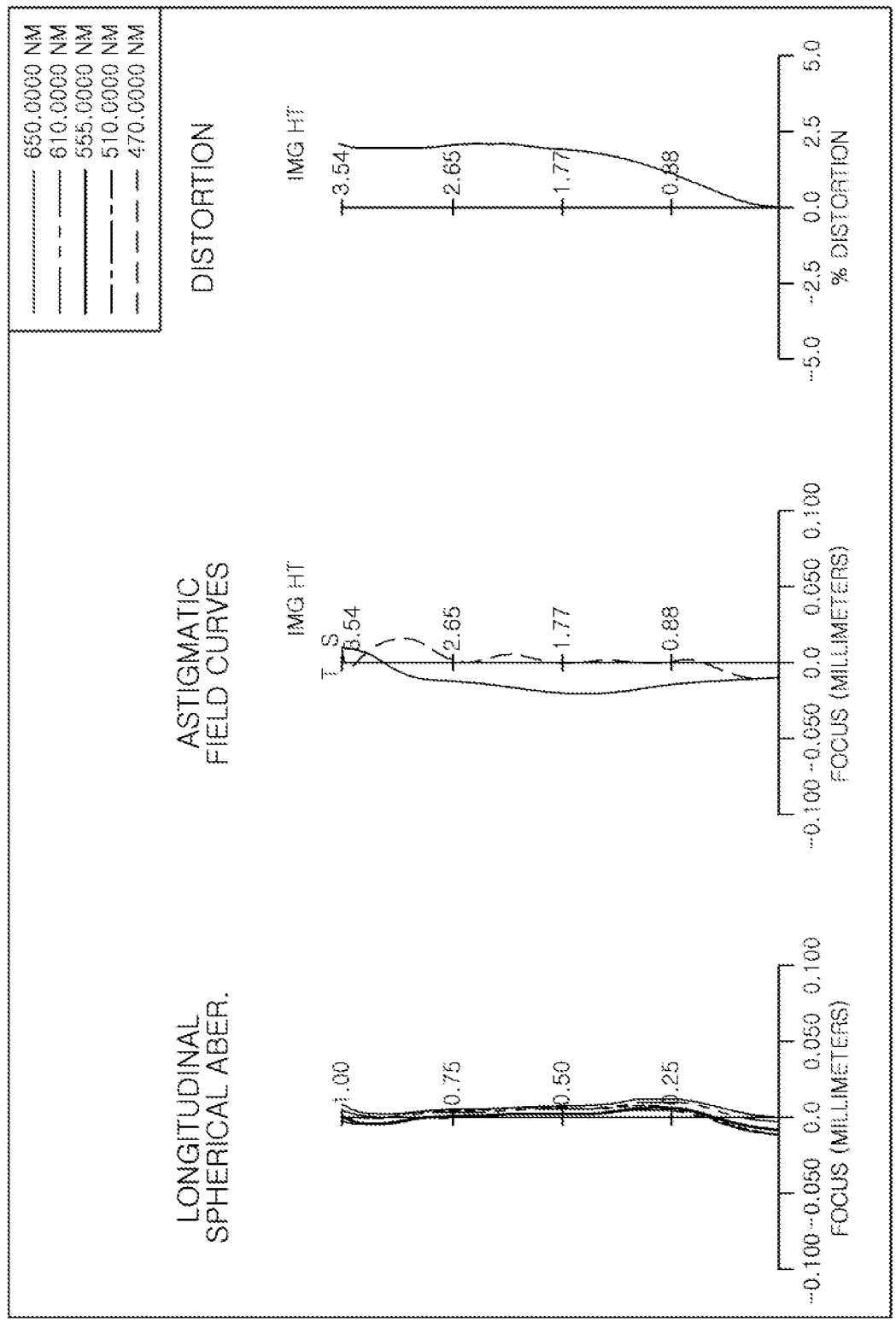
FIG. 12 illustrates aberration curves of the optical imaging system of FIG. 11.

FIG. 11 is a view illustrating a sixth example of an optical imaging system, and FIG. 12 illustrates aberration curves of the optical imaging system of FIG. 11.

An optical imaging system 6 includes a first lens 1006, a second lens 2006, a third lens 3006, a fourth lens 4006, a fifth lens 5006, a sixth lens 6006, and a seventh lens 7006.

The first lens 1006 has a positive refractive power, and an object-side surface thereof is convex and an image-side surface thereof is concave. The second lens 2006 has a negative refractive power, and an object-side surface thereof is convex and an image-side surface thereof is concave. The third lens 3006 has a negative refractive power, and an object-side surface thereof is convex and an image-side surface thereof is concave. The fourth lens 4006 has a positive refractive power, and an object-side surface thereof is convex and an image-side surface thereof is concave. The fifth lens 5006 has a negative refractive power, and an object-side surface thereof is concave and an image-side surface thereof is convex. The sixth lens 6006 has a positive refractive power, and an object-side surface thereof is convex and an image-side surface thereof is convex. In addition, at least one inflection point is formed on either one or both of the object-side surface and the image-side surface of the sixth lens 6006. The seventh lens 7006 has a negative refractive power, and an object-side surface thereof is concave and an image-side surface thereof is concave. In addition, one inflection point is formed on each of the object-side surface and the image-side surface of the seventh lens 7006.

The optical imaging system 6 further includes a stop, a filter 8006, and an image sensor 9006. The stop is disposed between the first lens 1006 and the second lens 2006 to adjust an amount of light incident on the image sensor 9006. The filter 8006 is disposed between the seventh lens 7006 and the image sensor 9006 to block infrared rays. The image sensor 9006 forms an imaging plane on which an image of a subject is formed. Although not illustrated in FIG. 11, the stop is disposed at a distance of 0.7312 mm from the object-side surface of the first lens 1006 toward the imaging plane of the optical imaging system 6. This distance is equal to TTL-SL and can be calculated from the values of TTL and SL for Example 6 listed in Table 57 that appears later in this application.

Table 11 below shows physical properties of the lenses and other elements of the optical imaging system of FIG. 11, and Table 12 below shows aspherical surface coefficients of the lenses of FIG. 11.

TABLE 11

| Surface No. | Element | Radius of Curvature | Thickness/ Distance | Index of Refraction | Abbe Number | Effective Aperture Radius |
|---|---|---|---|---|---|---|
| S1 | First | 1.73233 | 0.73124 | 1.546 | 56.114 | 1.250 |
| S2 | Lens (Stop) | 12.53699 | 0.07002 | | | 1.181 |
| S3 | Second | 5.58930 | 0.20000 | 1.667 | 20.353 | 1.147 |
| S4 | Lens | 2.57397 | 0.39715 | | | 1.100 |
| S5 | Third | 8.06552 | 0.38474 | 1.546 | 56.114 | 1.128 |
| S6 | Lens | 7.83668 | 0.19259 | | | 1.247 |
| S7 | Fourth | 6.68716 | 0.24423 | 1.546 | 56.114 | 1.276 |
| S8 | Lens | 30.32847 | 0.27130 | | | 1.374 |
| S9 | Fifth | −3.28742 | 0.24968 | 1.667 | 20.353 | 1.481 |
| S10 | Lens | −4.51593 | 0.13884 | | | 1.734 |
| S11 | Sixth | 5.67988 | 0.51987 | 1.546 | 56.114 | 2.150 |
| S12 | Lens | −1.89003 | 0.31663 | | | 2.318 |
| S13 | Seventh | −3.93255 | 0.30000 | 1.546 | 56.114 | 2.640 |
| S14 | Lens | 1.74183 | 0.19371 | | | 2.747 |
| S15 | Filter | Infinity | 0.11000 | 1.518 | 64.166 | 3.146 |
| S16 | | Infinity | 0.77000 | | | |
| S17 | Imaging Plane | Infinity | 0.01000 | 3.536 | | 3.177 |

TABLE 12

| | K | A | B | C | D | E | F | G | H | J |
|---|---|---|---|---|---|---|---|---|---|---|
| S1 | −0.7464 | 0.0139 | 0.0344 | −0.0749 | 0.1029 | −0.0706 | 0.0173 | 0.0042 | −0.0023 | 0 |
| S2 | 36.669 | −0.0823 | 0.195 | −0.3067 | 0.3634 | −0.323 | 0.1902 | −0.0632 | 0.0086 | 0 |
| S3 | −1.3559 | −0.1603 | 0.3305 | −0.4059 | 0.3324 | −0.1787 | 0.0673 | −0.0166 | 0.0018 | 0 |
| S4 | −0.4109 | −0.0907 | 0.1444 | 0.1155 | −0.7969 | 1.5009 | −1.4406 | 0.7219 | −0.147 | 0 |
| S5 | 0 | −0.0739 | 0.0463 | −0.1203 | 0.1165 | −0.0578 | −0.0089 | 0.0233 | −0.0057 | 0 |
| S6 | 0 | −0.0932 | 0.0034 | 0.0521 | −0.1827 | 0.2457 | −0.2173 | 0.1126 | −0.0241 | 0 |
| S7 | 25.148 | −0.1235 | −0.1887 | 0.3763 | −0.554 | 0.6731 | −0.5796 | 0.2782 | −0.0538 | 0 |
| S8 | −99 | −9E−05 | −0.3274 | 0.3588 | −0.3195 | 0.3451 | −0.2608 | 0.0995 | −0.0144 | 0 |
| S9 | −70.894 | 0.0205 | 0.0483 | −0.5284 | 0.7583 | −0.4915 | 0.1636 | −0.0271 | 0.0018 | 0 |
| S10 | 2.2832 | 0.1759 | −0.3448 | 0.2283 | −0.0716 | 0.011 | −0.0007 | −4E−06 | 1E−06 | 0 |
| S11 | −99 | 0.1188 | −0.2169 | 0.1675 | −0.0871 | 0.0276 | −0.0049 | 0.0005 | −2E−05 | 0 |
| S12 | −3.3067 | 0.1644 | −0.1849 | 0.1159 | −0.049 | 0.0138 | −0.0024 | 0.0002 | −9E−06 | 0 |
| S13 | −2.4772 | −0.1026 | −0.0482 | 0.074 | −0.0308 | 0.0067 | −0.0008 | 6E−05 | −2E−06 | 0 |
| S14 | −1.1028 | −0.2935 | 0.2033 | −0.1127 | 0.0457 | −0.0129 | 0.0024 | −0.0003 | 2E−05 | −5E−07 |

Seventh Example

Figure 13:
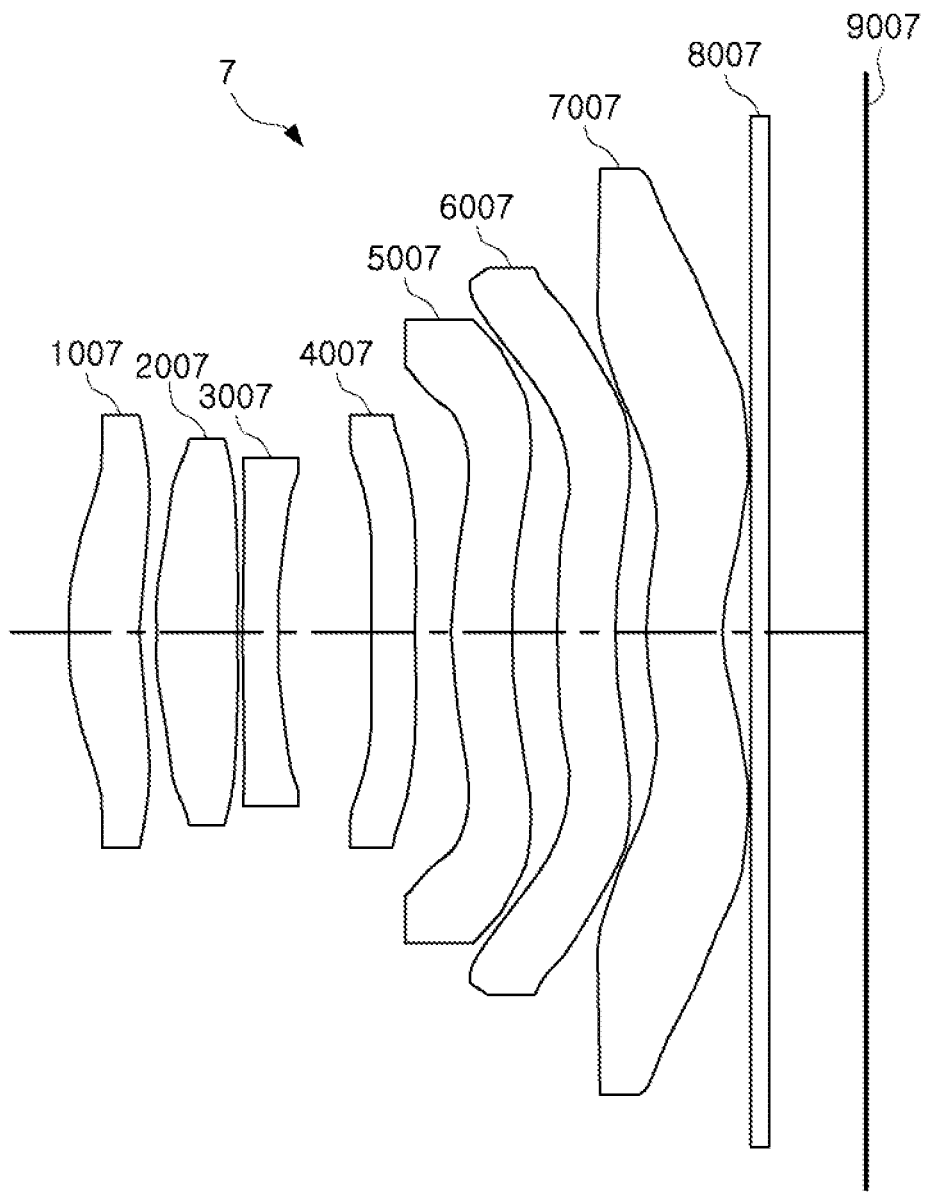
FIG. 13 is a view illustrating a seventh example of an optical imaging system.
Figure 14:
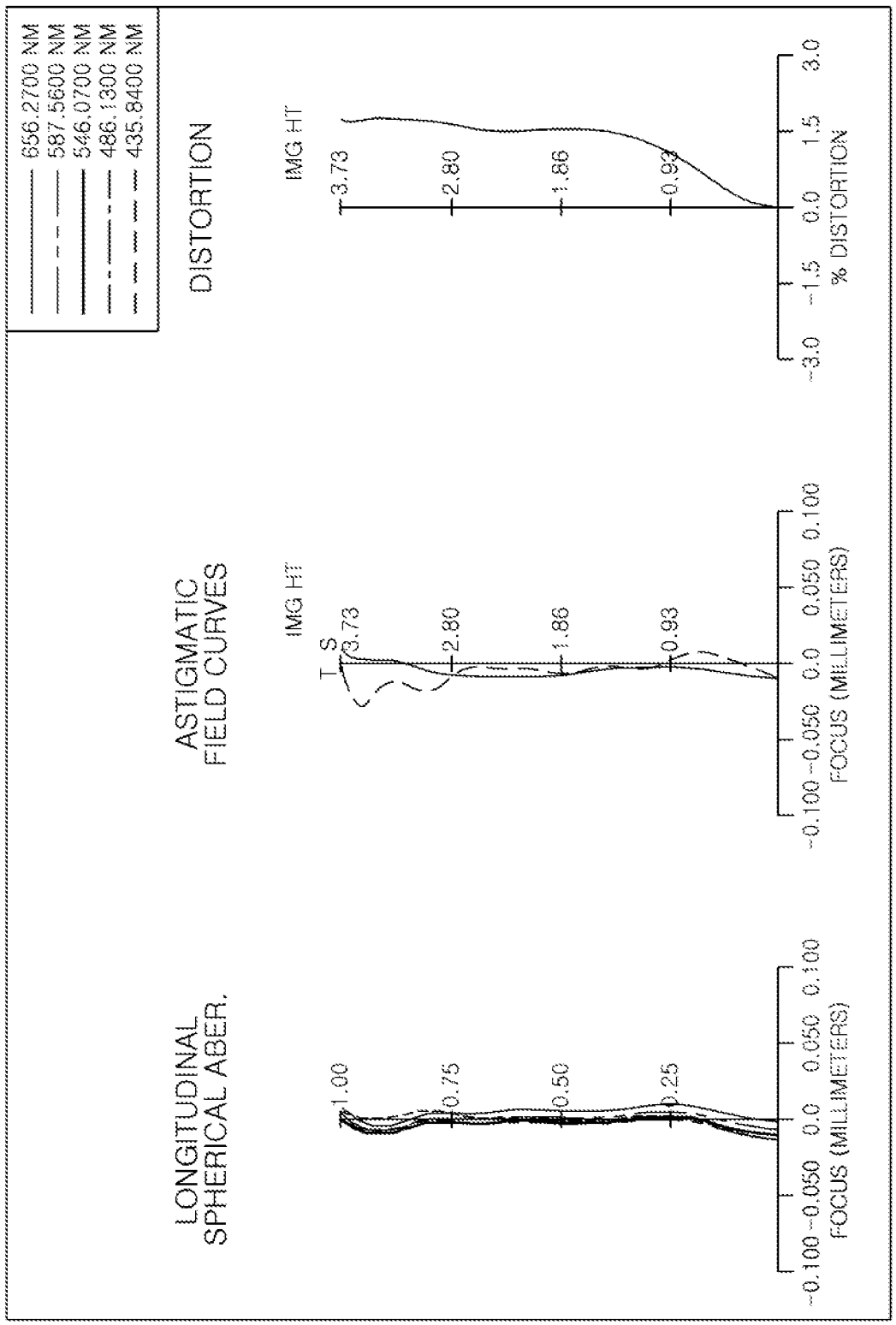
FIG. 14 illustrates aberration curves of the optical imaging system of FIG. 13.

FIG. 13 is a view illustrating a seventh example of an optical imaging system, and FIG. 14 illustrates aberration curves of the optical imaging system of FIG. 13.

An optical imaging system 7 includes a first lens 1007, a second lens 2007, a third lens 3007, a fourth lens 4007, a fifth lens 5007, a sixth lens 6007, and a seventh lens 7007.

The first lens 1007 has a positive refractive power, and an object-side surface thereof is convex and an image-side surface thereof is concave. The second lens 2007 has a positive refractive power, and an object-side surface thereof is convex and an image-side surface thereof is convex. The third lens 3007 has a negative refractive power, and an object-side surface thereof is convex and an image-side surface thereof is concave. The fourth lens 4007 has a negative refractive power, and an object-side surface thereof is convex and an image-side surface thereof is concave. The fifth lens 5007 has a positive refractive power, and an object-side surface thereof is convex and an image-side surface thereof is concave. The sixth lens 6007 has a negative refractive power, and an object-side surface thereof is convex and an image-side surface thereof is concave. In addition, at least one inflection point is formed on either one or both of the object-side surface and the image-side surface of the sixth lens 6007. The seventh lens 7007 has a negative refractive power, and an object-side surface thereof is convex and an image-side surface thereof is concave. In addition, two inflection points are formed on the object-side surface of the seventh lens 7007, and one inflection point is formed on the image-side surface of the seventh lens 7007.

The optical imaging system 7 further includes a stop, a filter 8007, and an image sensor 9007. The stop is disposed between the second lens 2007 and the third lens 3007 to adjust an amount of light incident on the image sensor 9007. The filter 8007 is disposed between the seventh lens 7007 and the image sensor 9007 to block infrared rays. The image sensor 9007 forms an imaging plane on which an image of a subject is formed. Although not illustrated in FIG. 13, the stop is disposed at a distance of 1.1577 mm from the object-side surface of the first lens 1007 toward the imaging plane of the optical imaging system 7. This distance is equal to TTL-SL and can be calculated from the values of TTL and SL for Example 7 listed in Table 57 that appears later in this application.

Table 13 below shows physical properties of the lenses and other elements of the optical imaging system of FIG. 13, and Table 14 below shows aspherical surface coefficients of the lenses of FIG. 13.

TABLE 13

| Surface No. | Element | Radius of Curvature | Thickness/ Distance | Index of Refraction | Abbe Number | Effective Aperture Radius |
|---|---|---|---|---|---|---|
| S1 | First | 2.141 | 0.481 | 1.546 | 56.114 | 1.450 |
| S2 | Lens | 3.251 | 0.110 | | | 1.350 |
| S3 | Second | 3.253 | 0.542 | 1.546 | 56.114 | 1.285 |
| S4 | Lens | −15.773 | 0.025 | | | 1.232 |
| S5 | (Stop) | 8.425 | 0.230 | 1.679 | 19.236 | 1.157 |
| S6 | Third Lens | 3.514 | 0.625 | | | 1.095 |
| S7 | Fourth | 25.986 | 0.296 | 1.679 | 19.236 | 1.265 |
| S8 | Lens | 15.894 | 0.230 | | | 1.452 |
| S9 | Fifth | 3.048 | 0.400 | 1.546 | 56.114 | 1.675 |
| S10 | Lens | 3.616 | 0.290 | | | 2.092 |
| S11 | Sixth | 3.762 | 0.400 | 1.679 | 19.236 | 2.153 |
| S12 | Lens | 2.792 | 0.204 | | | 2.476 |

TABLE 13-continued

| Surface No. | Element | Radius of Curvature | Thickness/ Distance | Index of Refraction | Abbe Number | Effective Aperture Radius |
|---|---|---|---|---|---|---|
| S13 | Seventh | 1.614 | 0.510 | 1.537 | 53.955 | 2.938 |
| S14 | Lens | 1.326 | 0.196 | | | 3.102 |
| S15 | Filter | Infinity | 0.110 | 1.518 | 64.197 | 3.420 |
| S16 | | Infinity | 0.639 | | | 3.450 |
| S17 | Imaging Plane | Infinity | 0.011 | | | 3.730 |

TABLE 14

| | K | A | B | C | D | E | F | G | H | J |
|---|---|---|---|---|---|---|---|---|---|---|
| S1 | −8.038 | 0.0707 | −0.0797 | 0.0334 | 0.0072 | −0.0491 | 0.0465 | −0.0186 | 0.0032 | −0.0002 |
| S2 | −20.594 | −0.0019 | −0.1494 | 0.2041 | −0.2922 | 0.3755 | −0.3085 | 0.1486 | −0.0387 | 0.0042 |
| S3 | −0.0908 | −0.0339 | −0.0641 | 0.1368 | −0.2821 | 0.4921 | −0.4815 | 0.2605 | −0.0746 | 0.0088 |
| S4 | −0.4822 | −0.0436 | 0.1761 | −0.3256 | 0.1999 | 0.1916 | −0.4291 | 0.3203 | −0.1141 | 0.0162 |
| S5 | −1.1841 | −0.1073 | 0.2544 | −0.4683 | 0.4991 | −0.2863 | 0.0565 | 0.0325 | −0.0229 | 0.0044 |
| S6 | 0.8733 | −0.0693 | 0.0357 | 0.2048 | −0.8833 | 1.7328 | −1.9742 | 1.3464 | −0.5106 | 0.083 |
| S7 | −0.4999 | −0.0314 | 0.0135 | −0.2894 | 0.9716 | −1.7181 | 1.7923 | −1.1152 | 0.3837 | −0.0563 |
| S8 | −1E−06 | −0.0273 | −0.1177 | 0.212 | −0.2544 | 0.2157 | −0.1264 | 0.0469 | −0.0093 | 0.0007 |
| S9 | −41.843 | 0.1624 | −0.3487 | 0.4016 | −0.3105 | 0.1396 | −0.027 | −0.0038 | 0.0026 | −0.0003 |
| S10 | −5.1424 | 0.0397 | −0.1364 | 0.1569 | −0.1229 | 0.0633 | −0.0212 | 0.0044 | −0.0005 | 3E−05 |
| S11 | −2.1666 | 0.0356 | −0.1809 | 0.1985 | −0.1438 | 0.0641 | −0.0173 | 0.0028 | −0.0002 | 9E−06 |
| S12 | −0.0207 | −0.1043 | 0.0239 | −0.0063 | −0.0007 | 0.0007 | −3E−06 | −4E−05 | 7E−06 | −4E−07 |
| S13 | −0.7948 | −0.4128 | 0.1863 | −0.0516 | 0.0101 | −0.0015 | 0.0002 | −1E−05 | 6E−07 | −1E−08 |
| S14 | −1.3226 | −0.3105 | 0.1713 | −0.0712 | 0.0213 | −0.0043 | 0.0006 | −5E−05 | 2E−06 | −5E−08 |

Eighth Example

Figure 15:
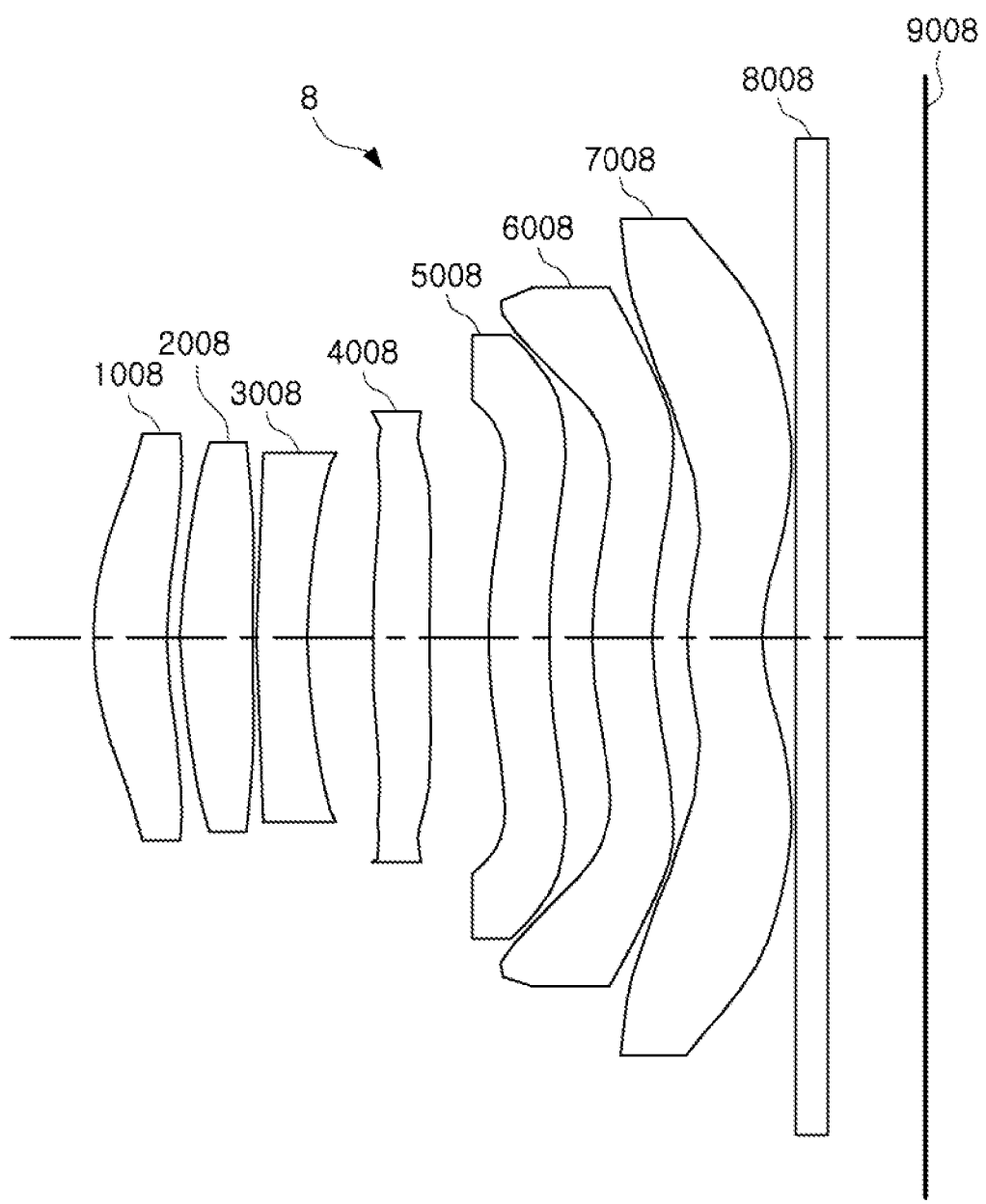
FIG. 15 is a view illustrating an eighth example of an optical imaging system.
Figure 16:
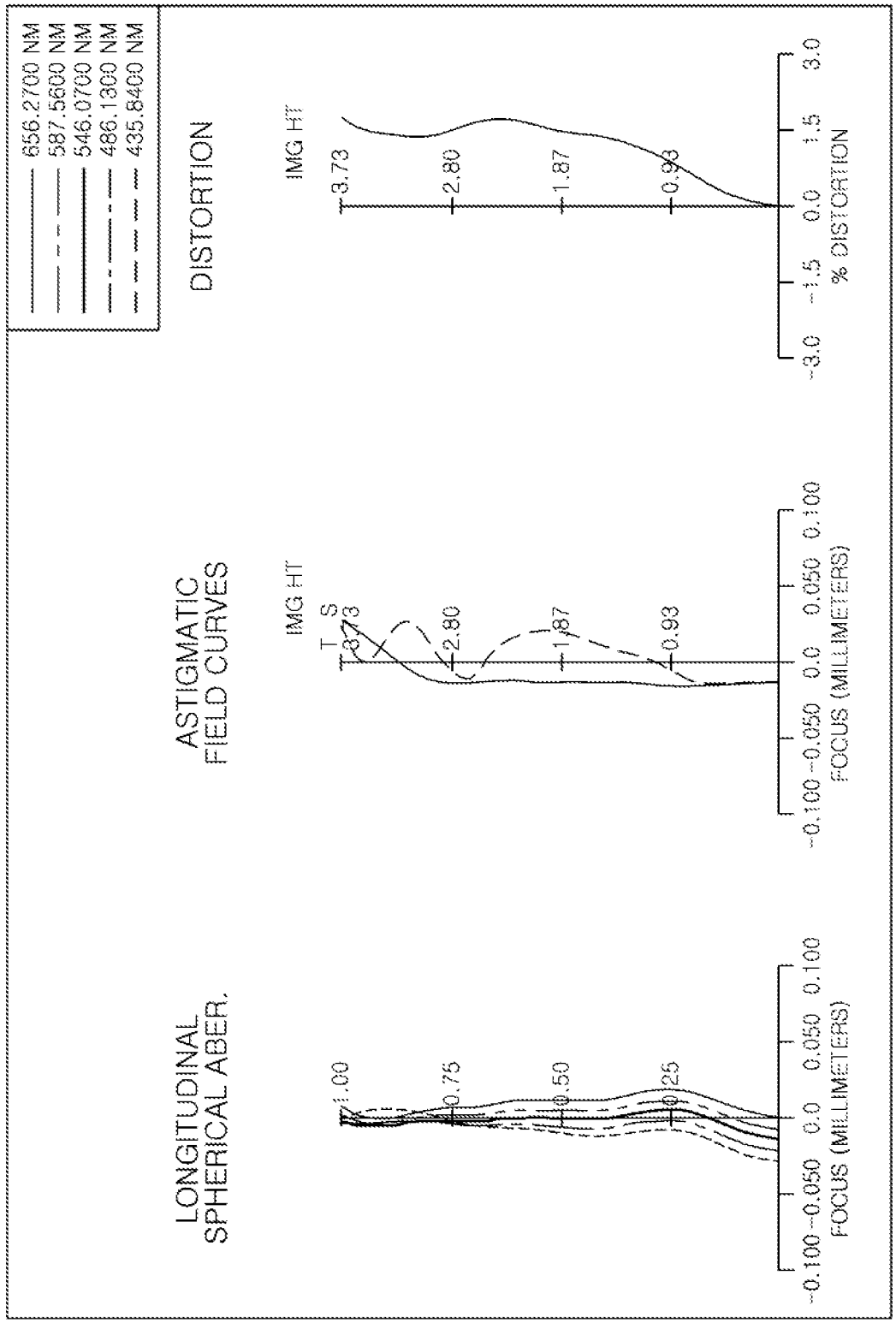
FIG. 16 illustrates aberration curves of the optical imaging system of FIG. 15.

FIG. 15 is a view illustrating an eighth example of an optical imaging system, and FIG. 16 illustrates aberration curves of the optical imaging system of FIG. 15.

An optical imaging system 8 includes a first lens 1008, a second lens 2008, a third lens 3008, a fourth lens 4008, a fifth lens 5008, a sixth lens 6008, and a seventh lens 7008.

The first lens 1008 has a positive refractive power, and an object-side surface thereof is convex and an image-side surface thereof is concave. The second lens 2008 has a positive refractive power, and an object-side surface thereof is convex and an image-side surface thereof is concave. The third lens 3008 has a negative refractive power, and an object-side surface thereof is convex and an image-side surface thereof is concave. The fourth lens 4008 has a positive refractive power, and an object-side surface thereof is convex and an image-side surface thereof is concave. The fifth lens 5008 has a positive refractive power, and an object-side surface thereof is convex and an image-side surface thereof is concave. The sixth lens 6008 has a negative refractive power, and an object-side surface thereof is convex and an image-side surface thereof is concave. In addition, at least one inflection point is formed on either one or both of the object-side surface and the image-side surface of the sixth lens 6008. The seventh lens 7008 has a negative refractive power, and an object-side surface thereof is convex and an image-side surface thereof is concave. In addition, one inflection point is formed on each of the object-side surface and the image-side surface of the seventh lens 7008.

The optical imaging system 8 further includes a stop, a filter 8008, and an image sensor 9008. The stop is disposed between the second lens 2008 and the third lens 3008 to adjust an amount of light incident on the image sensor 9008. The filter 8008 is disposed between the seventh lens 7008 and the image sensor 9008 to block infrared rays. The image sensor 9008 forms an imaging plane on which an image of a subject is formed. Although not illustrated in FIG. 15, the stop is disposed at a distance of 1.0800 mm from the object-side surface of the first lens 1008 toward the imaging plane of the optical imaging system 8. This distance is equal to TTL-SL and can be calculated from the values of TTL and SL for Example 8 listed in Table 57 that appears later in this application.

Table 15 below shows physical properties of the lenses and other elements of the optical imaging system of FIG. 15, and Table 16 below shows aspherical surface coefficients of the lenses of FIG. 15.

TABLE 15

| Surface No. | Element | Radius of Curvature | Thickness/ Distance | Index of Refraction | Abbe Number | Effective Aperture Radius |
|---|---|---|---|---|---|---|
| S1 | First | 2.1367244 | 0.486053 | 1.546 | 56.114 | 1.360 |
| S2 | Lens | 2.8897668 | 0.087572 | | | 1.331 |
| S3 | Second | 3.1970288 | 0.481363 | 1.546 | 56.114 | 1.301 |
| S4 | Lens | 109.26781 | 0.025 | | | 1.264 |
| S5 | (Stop) | 8.2164833 | 0.333222 | 1.679 | 19.236 | 1.218 |
| S6 | Third Lens | 3.6430265 | 0.428709 | | | 1.229 |
| S7 | Fourth | 5.149363 | 0.374385 | 1.546 | 56.114 | 1.353 |
| S8 | Lens | 7.9835412 | 0.393693 | | | 1.392 |
| S9 | Fifth | 3.8134324 | 0.4 | 1.546 | 56.114 | 1.576 |
| S10 | Lens | 4.8504303 | 0.288816 | | | 2.010 |
| S11 | Sixth | 3.8912859 | 0.4 | 1.546 | 56.114 | 1.916 |
| S12 | Lens | 3.0824847 | 0.229858 | | | 2.371 |
| S13 | Seventh | 1.6011178 | 0.493312 | 1.546 | 56.114 | 2.526 |
| S14 | Lens | 1.2142472 | 0.218016 | | | 2.787 |

TABLE 15-continued

| Surface No. | Element | Radius of Curvature | Thickness/ Distance | Index of Refraction | Abbe Number | Effective Aperture Radius |
|---|---|---|---|---|---|---|
| S15 | Filter | Infinity | 0.21 | 1.518 | 64.197 | 3.238 |
| S16 | | Infinity | 0.634932 | | | 3.316 |
| S17 | Imaging Plane | Infinity | 0.015 | | | 3.728 |

TABLE 16

| | K | A | B | C | D | E | F | G | H | J |
|---|---|---|---|---|---|---|---|---|---|---|
| S1 | −1 | −0.0136 | 0.0247 | −0.0811 | 0.0925 | −0.0456 | −0.0139 | 0.0275 | −0.0118 | 0.0017 |
| S2 | −13.222 | 0.0184 | −0.091 | −0.0856 | 0.3055 | −0.3421 | 0.2293 | −0.0976 | 0.0238 | −0.0025 |
| S3 | −1.2237 | −0.0255 | 0.013 | −0.2994 | 0.6492 | −0.662 | 0.4089 | −0.1567 | 0.0332 | −0.0029 |
| S4 | −7.0515 | −0.018 | 0.0942 | −0.4684 | 1.1965 | −1.7785 | 1.5984 | −0.8543 | 0.2492 | −0.0305 |
| S5 | 8.9885 | −0.0606 | 0.147 | −0.5476 | 1.4146 | −2.2793 | 2.2356 | −1.2976 | 0.4106 | −0.0546 |
| S6 | 1.6556 | −0.053 | 0.0664 | −0.1724 | 0.4882 | −0.9461 | 1.1092 | −0.7563 | 0.2786 | −0.0429 |
| S7 | −4.3409 | −0.0524 | −0.0067 | 0.1244 | −0.3711 | 0.5503 | −0.4701 | 0.228 | −0.0561 | 0.0052 |
| S8 | 5.8589 | −0.0866 | 0.13 | −0.4361 | 0.9157 | −1.2163 | 1.0086 | −0.506 | 0.1405 | −0.0165 |
| S9 | −43.521 | 0.0853 | −0.1755 | 0.2257 | −0.2234 | 0.1539 | −0.0732 | 0.0221 | −0.0038 | 0.0003 |
| S10 | −3.1047 | 0.0435 | −0.1427 | 0.1592 | −0.1109 | 0.05 | −0.0153 | 0.0031 | −0.0004 | 2E−05 |
| S11 | −16.199 | 0.1264 | −0.2435 | 0.2571 | −0.2182 | 0.1176 | −0.0381 | 0.0072 | −0.0007 | 3E−05 |
| S12 | 0.1758 | −0.0767 | 0.0734 | −0.0745 | 0.0337 | −0.008 | 0.0011 | −7E−05 | 2E−06 | −1E−08 |
| S13 | −0.8173 | −0.4272 | 0.2044 | −0.0489 | 0.002 | 0.0021 | −0.0006 | 8E−05 | −6E−06 | 2E−07 |
| S14 | −1.397 | −0.3515 | 0.2336 | −0.1198 | 0.0447 | −0.0113 | 0.0019 | −0.0002 | 1E−05 | −3E−07 |

Ninth Example

Figure 17:
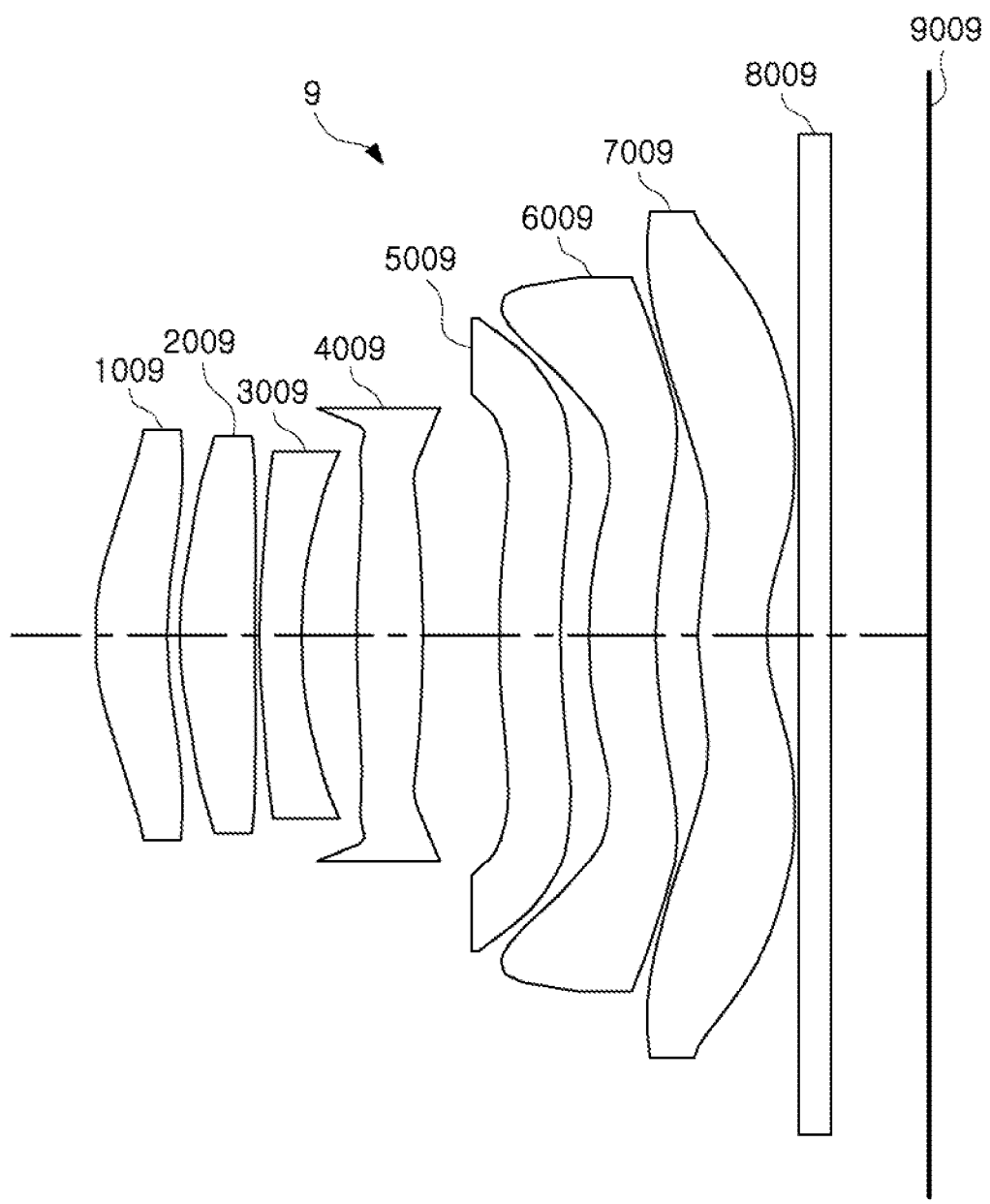
FIG. 17 is a view illustrating a ninth example of an optical imaging system.
Figure 18:
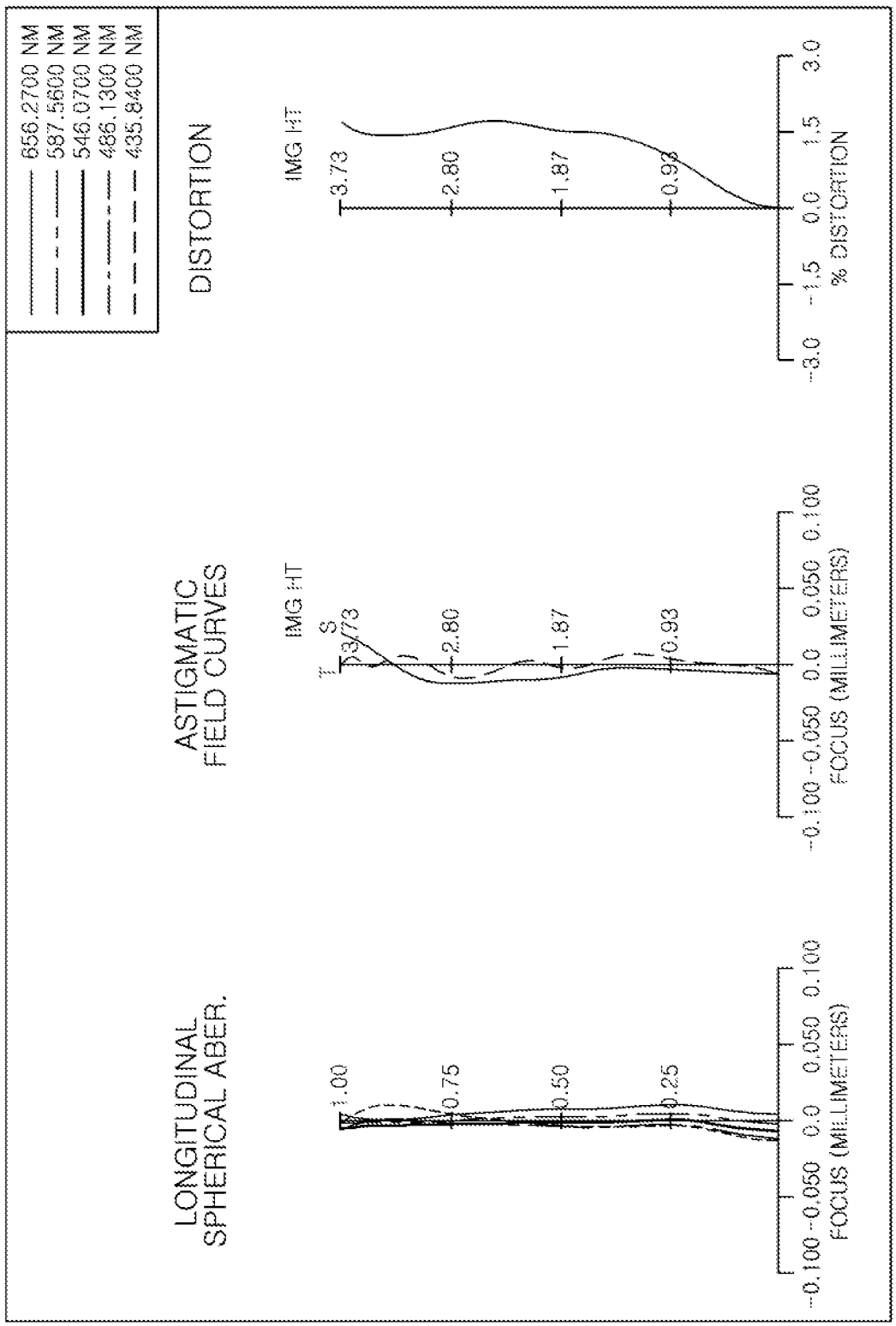
FIG. 18 illustrates aberration curves of the optical imaging system of FIG. 17.

FIG. 17 is a view illustrating a ninth example of an optical imaging system, and FIG. 18 illustrates aberration curves of the optical imaging system of FIG. 17.

An optical imaging system 9 includes a first lens 1009, a second lens 2009, a third lens 3009, a fourth lens 4009, a fifth lens 5009, a sixth lens 6009, and a seventh lens 7009.

The first lens 1009 has a positive refractive power, and an object-side surface thereof is convex and an image-side surface thereof is concave. The second lens 2009 has a positive refractive power, and an object-side surface thereof is convex and an image-side surface thereof is concave. The third lens 3009 has a negative refractive power, and an object-side surface thereof is convex and an image-side surface thereof is concave. The fourth lens 4009 has a positive refractive power, and an object-side surface thereof is convex and an image-side surface thereof is concave. The fifth lens 5009 has a negative refractive power, and an object-side surface thereof is convex and an image-side surface thereof is concave. The sixth lens 6009 has a positive refractive power, and an object-side surface thereof is convex and an image-side surface thereof is concave. In addition, at least one inflection point is formed on either one or both of the object-side surface and the image-side surface of the sixth lens 6009. The seventh lens 7009 has a negative refractive power, and an object-side surface thereof is convex and an image-side surface thereof is concave. In addition, two inflection points are formed on the object-side surface of the seventh lens 7009, and one inflection point is formed on the image-side surface of the seventh lens 7009.

The optical imaging system 9 further includes a stop, a filter 8009, and an image sensor 9009. The stop is disposed between the second lens 2009 and the third lens 3009 to adjust an amount of light incident on the image sensor 9009. The filter 8009 is disposed between the seventh lens 7009 and the image sensor 9009 to block infrared rays. The image sensor 9009 forms an imaging plane on which an image of a subject is formed. Although not illustrated in FIG. 17, the stop is disposed at a distance of 1.0767 mm from the object-side surface of the first lens 1009 toward the imaging plane of the optical imaging system 9. This distance is equal to TTL-SL and can be calculated from the values of TTL and SL for Example 9 listed in Table 57 that appears later in this application.

Table 17 below shows physical properties of the lenses and other elements of the optical imaging system of FIG. 17, and Table 18 below shows aspherical surface coefficients of the lenses of FIG. 17.

TABLE 17

| Surface No. | Element | Radius of Curvature | Thickness/ Distance | Index of Refraction | Abbe Number | Effective Aperture Radius |
|---|---|---|---|---|---|---|
| S1 | First | 2.1183051 | 0.467301 | 1.546 | 56.114 | 1.360 |
| S2 | Lens | 2.7465072 | 0.088291 | | | 1.343 |
| S3 | Second | 2.805316 | 0.495083 | 1.546 | 56.114 | 1.313 |
| S4 | Lens | 29.972181 | 0.026058 | | | 1.266 |
| S5 | (Stop) | 5.6204988 | 0.273577 | 1.679 | 19.236 | 1.212 |
| S6 | Third Lens | 2.8589333 | 0.365293 | | | 1.199 |
| S7 | Fourth | 6.0851103 | 0.415715 | 1.546 | 56.114 | 1.285 |
| S8 | Lens | 19.143835 | 0.530007 | | | 1.350 |

TABLE 17-continued

| Surface No. | Element | Radius of Curvature | Thickness/ Distance | Index of Refraction | Abbe Number | Effective Aperture Radius |
|---|---|---|---|---|---|---|
| S9 | Fifth | 5.7830909 | 0.4 | 1.679 | 19.236 | 1.600 |
| S10 | Lens | 4.5644102 | 0.188701 | | | 2.100 |
| S11 | Sixth | 2.807724 | 0.444625 | 1.546 | 56.114 | 1.903 |
| S12 | Lens | 3.201154 | 0.276382 | | | 2.470 |
| S13 | Seventh | 1.6500839 | 0.458527 | 1.546 | 56.114 | 2.646 |
| S14 | Lens | 1.1944054 | 0.21044 | | | 2.806 |
| S15 | Filter | Infinity | 0.21 | 1.518 | 64.197 | 3.241 |
| S16 | | Infinity | 0.643292 | | | 3.319 |
| S17 | Imaging Plane | Infinity | 0.006708 | | | 3.729 |

TABLE 18

| | K | A | B | C | D | E | F | G | H | J |
|---|---|---|---|---|---|---|---|---|---|---|
| S1 | −1 | −0.0103 | 0.0078 | −0.0588 | 0.0925 | −0.0904 | 0.0486 | −0.0119 | 0.0004 | 0.0002 |
| S2 | −13.05 | 0.0258 | −0.1274 | 0.035 | 0.0617 | −0.0405 | 0.0003 | 0.0049 | −0.0007 | −0.0001 |
| S3 | −1.2154 | −0.0166 | −0.0602 | −0.0171 | 0.0625 | 0.0481 | −0.1007 | 0.0511 | −0.0092 | 0.0002 |
| S4 | −7.0515 | −0.047 | 0.2681 | −0.8387 | 1.4546 | −1.5426 | 1.0264 | −0.4201 | 0.0974 | −0.0099 |
| S5 | 8.8287 | −0.0982 | 0.3106 | −0.8268 | 1.4538 | −1.7174 | 1.3464 | −0.6715 | 0.1944 | −0.025 |
| S6 | 1.7217 | −0.0695 | 0.0939 | −0.1196 | 0.1421 | −0.2108 | 0.2773 | −0.2257 | 0.0997 | −0.0182 |
| S7 | −1.4309 | −0.0448 | −0.0056 | 0.0299 | −0.0484 | −0.0039 | 0.0856 | −0.1013 | 0.0511 | −0.0095 |
| S8 | 5.8592 | −0.0455 | −0.0133 | 0.0337 | −0.0729 | 0.0922 | −0.0766 | 0.0411 | −0.0128 | 0.0018 |
| S9 | −43.521 | 0.0008 | −0.0239 | 0.0222 | −0.0173 | 0.0051 | −0.002 | −0.0003 | 5E−05 | 5E−06 |
| S10 | −11.855 | −0.0163 | −0.0578 | 0.0832 | −0.067 | 0.0334 | −0.0109 | 0.0023 | −0.0003 | 1E−05 |
| S11 | −16.199 | 0.1024 | −0.1959 | 0.1931 | −0.1564 | 0.0797 | −0.0243 | 0.0044 | −0.0004 | 2E−05 |
| S12 | 0.1668 | −0.0913 | 0.11 | −0.1075 | 0.0537 | −0.0157 | 0.0029 | −0.0003 | 2E−05 | −6E−07 |
| S13 | −0.8022 | −0.4375 | 0.2118 | −0.049 | 0.0016 | 0.0021 | −0.0006 | 7E−05 | −4E−06 | 1E−07 |
| S14 | −1.407 | −0.3709 | 0.2499 | −0.1268 | 0.0461 | −0.0114 | 0.0018 | −0.0002 | 1E−05 | −3E−07 |

Tenth Example

Figure 19:
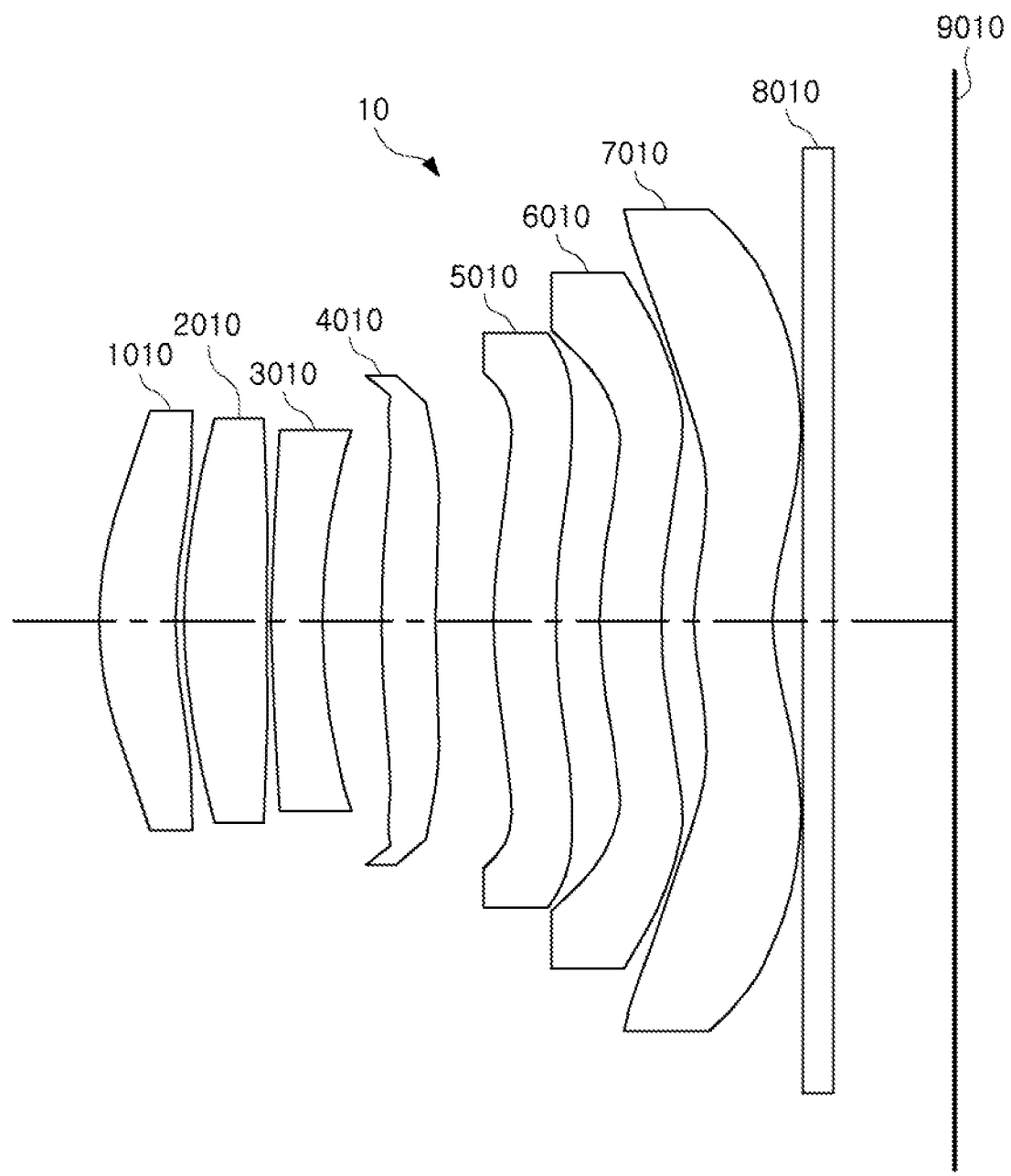
FIG. 19 is a view illustrating a tenth example of an optical imaging system.
Figure 20:
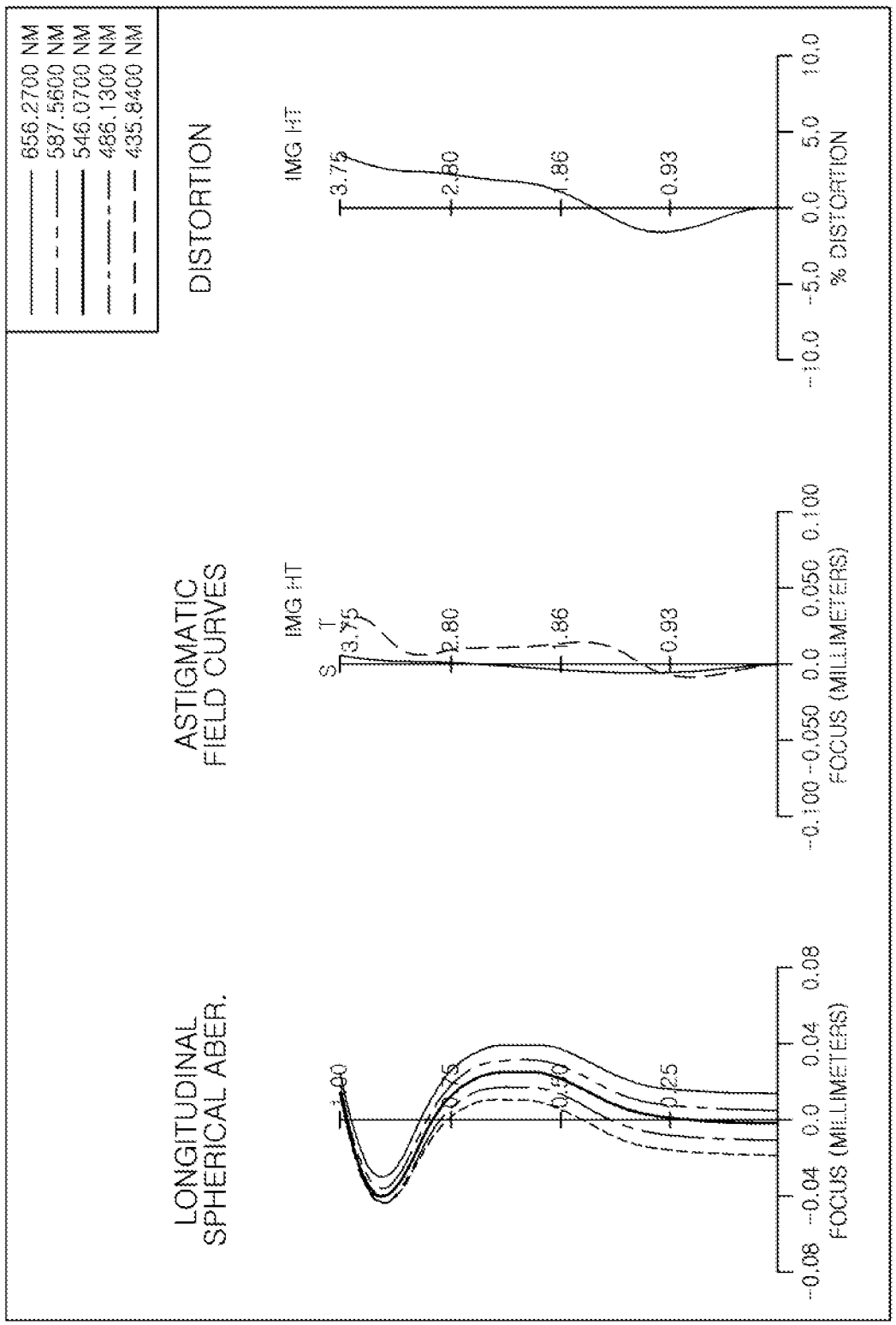
FIG. 20 illustrates aberration curves of the optical imaging system of FIG. 19.

FIG. 19 is a view illustrating a tenth example of an optical imaging system, and FIG. 20 illustrates aberration curves of the optical imaging system of FIG. 19.

An optical imaging system 10 includes a first lens 1010, a second lens 2010, a third lens 3010, a fourth lens 4010, a fifth lens 5010, a sixth lens 6010, and a seventh lens 7010.

The first lens 1010 has a positive refractive power, and an object-side surface thereof is convex and an image-side surface thereof is concave. The second lens 2010 has a positive refractive power, and an object-side surface thereof is convex and an image-side surface thereof is concave. The third lens 3010 has a negative refractive power, and an object-side surface thereof is convex and an image-side surface thereof is concave. The fourth lens 4010 has a positive refractive power, and an object-side surface thereof is convex and an image-side surface thereof is concave. The fifth lens 5010 has a positive refractive power, and an object-side surface thereof is convex and an image-side surface thereof is concave. The sixth lens 6010 has a negative refractive power, and an object-side surface thereof is convex and an image-side surface thereof is concave. In addition, at least one inflection point is formed on either one or both of the object-side surface and the image-side surface of the sixth lens 6010. The seventh lens 7010 has a negative refractive power, and an object-side surface thereof is convex and an image-side surface thereof is concave. In addition, one inflection point is formed on each of the object-side surface and the image-side surface of the seventh lens 7010.

The optical imaging system 10 further includes a stop, a filter 8010, and an image sensor 9010. The stop is disposed between the second lens 2010 and the third lens 3010 to adjust an amount of light incident on the image sensor 9010. The filter 8010 is disposed between the seventh lens 7010 and the image sensor 9010 to block infrared rays. The image sensor 9010 forms an imaging plane on which an image of a subject is formed. Although not illustrated in FIG. 19, the stop is disposed at a distance of 1.1782 mm from the object-side surface of the first lens 1010 toward the imaging plane of the optical imaging system 10. This distance is equal to TTL-SL and can be calculated from the values of TTL and SL for Example 10 listed in Table 57 that appears later in this application.

Table 19 below shows physical properties of the lenses and other elements of the optical imaging system of FIG. 19, and Table 20 below shows aspherical surface coefficients of the lenses of FIG. 19.

TABLE 19

| Surface No. | Element | Radius of Curvature | Thickness/ Distance | Index of Refraction | Abbe Number | Effective Aperture Radius |
|---|---|---|---|---|---|---|
| S1 | First | 2.3673866 | 0.52496 | 1.546 | 56.114 | 1.449 |
| S2 | Lens | 3.194732 | 0.05968 | | | 1.420 |
| S3 | Second | 3.4203396 | 0.567044 | 1.546 | 56.114 | 1.396 |

TABLE 19-continued

| Surface No. | Element | Radius of Curvature | Thickness/ Distance | Index of Refraction | Abbe Number | Effective Aperture Radius |
|---|---|---|---|---|---|---|
| S4 | Lens | 70.973752 | 0.026546 | | | 1.328 |
| S5 | (Stop) | 7.7783333 | 0.350469 | 1.679 | 19.236 | 1.286 |
| S6 | Third Lens | 3.8162291 | 0.409426 | | | 1.313 |
| S7 | Fourth Lens | 5.5916886 | 0.369187 | 1.546 | 56.114 | 1.426 |
| S8 | | 7.9939167 | 0.39653 | | | 1.495 |
| S9 | Fifth Lens | 4.1003359 | 0.426003 | 1.546 | 56.114 | 1.707 |
| S10 | | 5.3728393 | 0.303377 | | | 1.986 |
| S11 | Sixth Lens | 4.360929 | 0.424063 | 1.679 | 19.236 | 1.999 |
| S12 | | 3.5684544 | 0.223456 | | | 2.401 |
| S13 | Seventh Lens | 1.7878712 | 0.541352 | 1.546 | 56.114 | 2.495 |
| S14 | | 1.3975055 | 0.200463 | | | 2.837 |
| S15 | Filter | Infinity | 0.21 | 1.518 | 64.197 | 3.186 |
| S16 | | Infinity | 0.831011 | | | 3.256 |
| S17 | Imaging Plane | Infinity | 0.001244 | | | 3.785 |

TABLE 20

| | K | A | B | C | D | E | F | G | H | J |
|---|---|---|---|---|---|---|---|---|---|---|
| S1 | −1 | −0.006 | −0.0037 | −0.012 | 0.012 | 0.0136 | −0.0351 | 0.0267 | −0.009 | 0.0011 |
| S2 | −13.101 | 0.0148 | −0.0546 | −0.0452 | 0.1269 | −0.1111 | 0.056 | −0.0175 | 0.0031 | −0.0002 |
| S3 | −1.2472 | −0.0205 | 0.0163 | −0.1488 | 0.2518 | −0.2171 | 0.1218 | −0.045 | 0.0097 | −0.0009 |
| S4 | −7.0515 | −0.0205 | 0.1049 | −0.3805 | 0.7515 | −0.8792 | 0.6257 | −0.2656 | 0.0617 | −0.006 |
| S5 | 8.9156 | −0.0324 | −0.0045 | 0.0638 | −0.1003 | 0.0567 | 0.0072 | −0.0234 | 0.0103 | −0.0015 |
| S6 | 1.6638 | −0.0267 | −0.1125 | 0.5983 | −1.3543 | 1.7261 | −1.3193 | 0.5999 | −0.1494 | 0.0157 |
| S7 | −4.619 | −0.0378 | −0.0049 | 0.0644 | −0.1511 | 0.1787 | −0.1225 | 0.0479 | −0.0096 | 0.0007 |
| S8 | 5.6116 | −0.0667 | 0.143 | −0.4869 | 0.9313 | −1.0571 | 0.7241 | −0.2938 | 0.0651 | −0.006 |
| S9 | −44.124 | 0.0571 | −0.0758 | 0.0454 | −0.0145 | 0.0009 | 5E−05 | 0.0002 | −8E−05 | 9E−06 |
| S10 | −4.9813 | 0.0353 | −0.0999 | 0.1024 | −0.0647 | 0.026 | −0.0068 | 0.0011 | −0.0001 | 4E−06 |
| S11 | −15.42 | 0.099 | −0.1649 | 0.1482 | −0.103 | 0.0426 | −0.0109 | 0.0016 | −0.0001 | 5E−06 |
| S12 | 0.1791 | −0.0585 | 0.0531 | −0.0451 | 0.0177 | −0.0038 | 0.0005 | −4E−05 | 2E−06 | −3E−08 |
| S13 | −0.825 | −0.303 | 0.1166 | −0.0228 | 0.0011 | 0.0005 | −0.0001 | 1E−05 | −7E−07 | 1E−08 |
| S14 | −1.3872 | −0.2937 | 0.1877 | −0.0863 | 0.0269 | −0.0055 | 0.0007 | −6E−05 | 3E−06 | −5E−08 |

Eleventh Example

Figure 21:
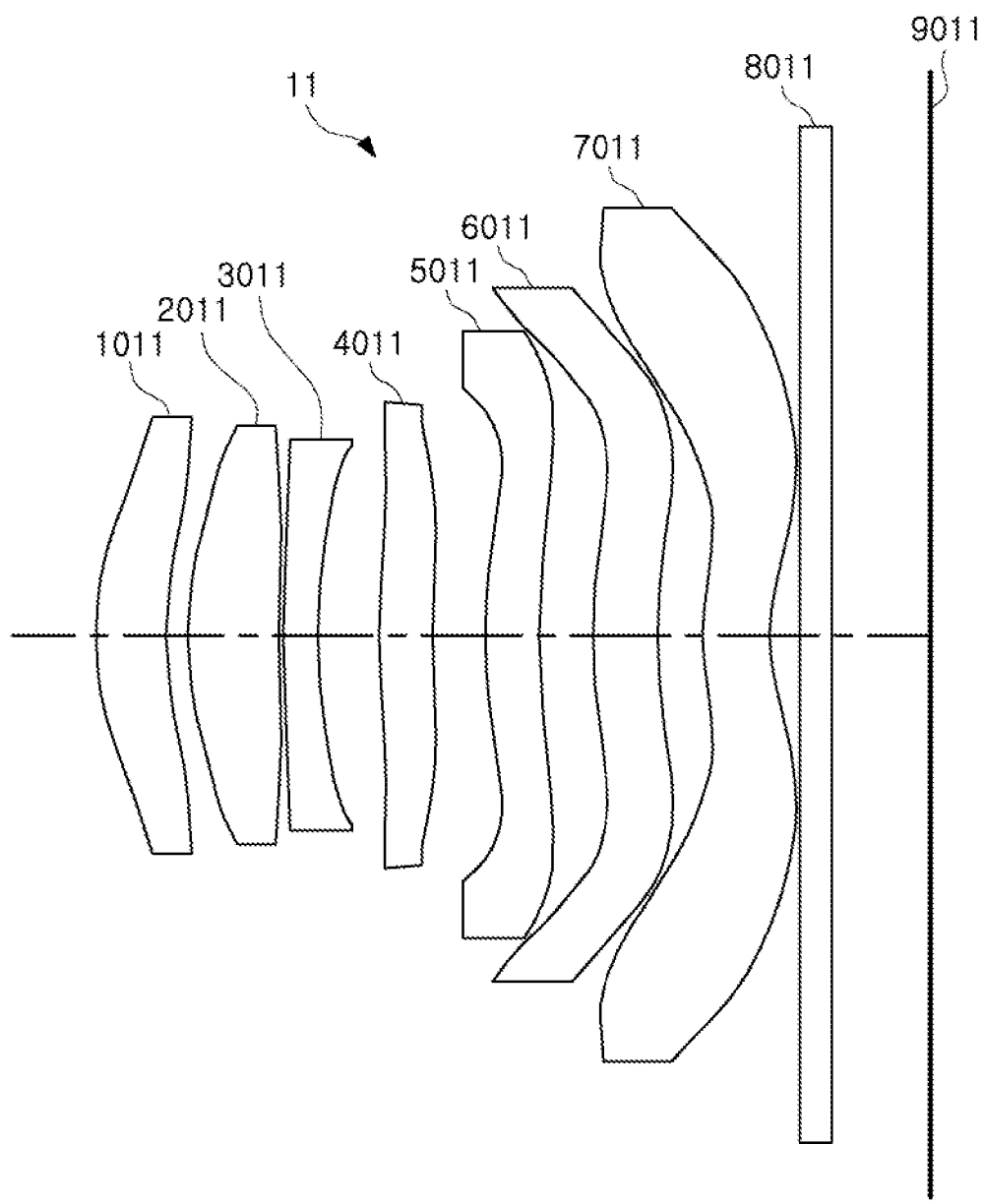
FIG. 21 is a view illustrating an eleventh example of an optical imaging system.
Figure 22:
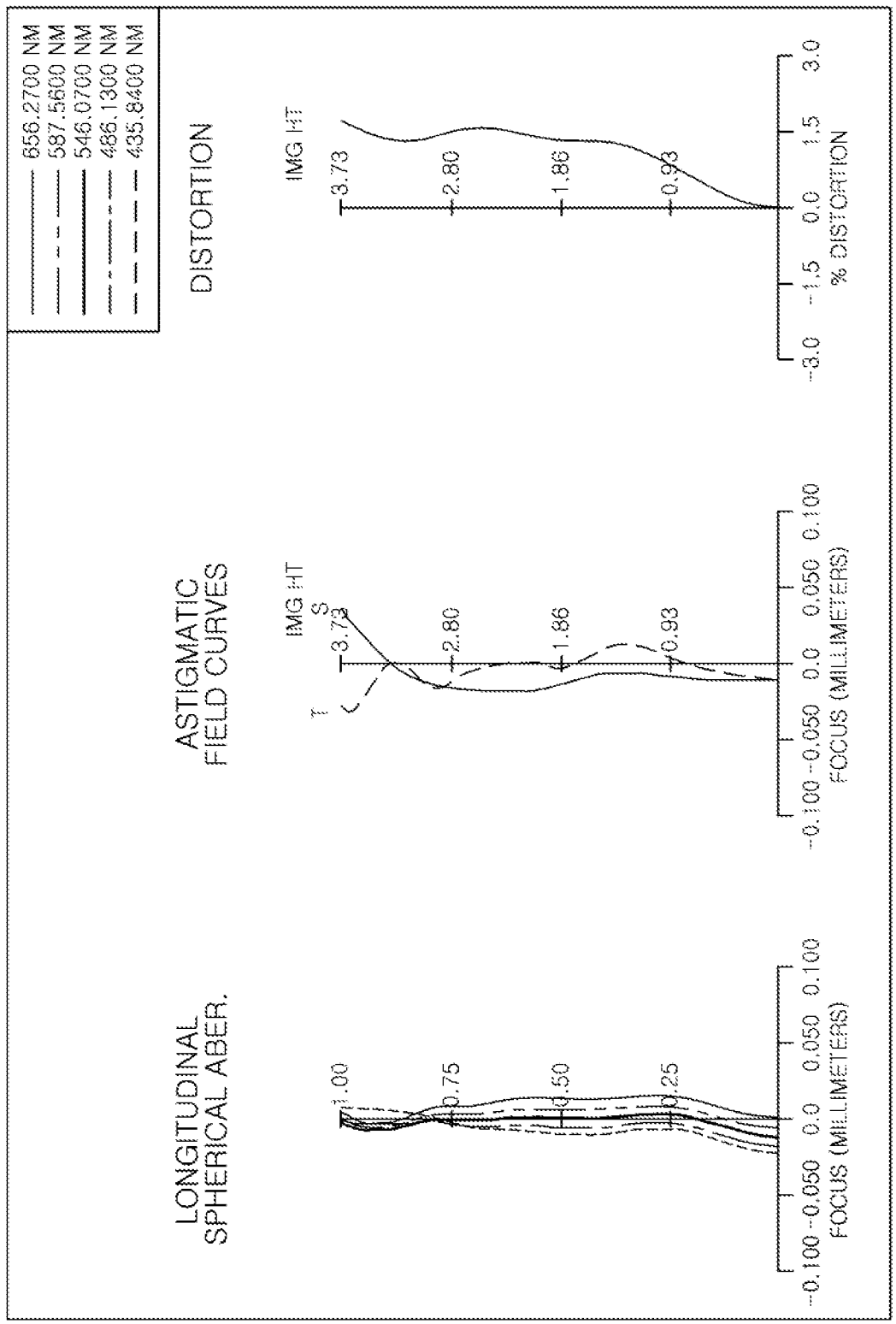
FIG. 22 illustrates aberration curves of the optical imaging system of FIG. 21.

FIG. 21 is a view illustrating an eleventh example of an optical imaging system, and FIG. 22 illustrates aberration curves of the optical imaging system of FIG. 21.

An optical imaging system 11 includes a first lens 1011, a second lens 2011, a third lens 3011, a fourth lens 4011, a fifth lens 5011, a sixth lens 6011, and a seventh lens 7011.

The first lens 1011 has a positive refractive power, and an object-side surface thereof is convex and an image-side surface thereof is concave. The second lens 2011 has a positive refractive power, and an object-side surface thereof is convex and an image-side surface thereof is concave. The third lens 3011 has a negative refractive power, and an object-side surface thereof is convex and an image-side surface thereof is concave. The fourth lens 4011 has a positive refractive power, and an object-side surface thereof is convex and an image-side surface thereof is concave. The fifth lens 5011 has a positive refractive power, and an object-side surface thereof is convex and an image-side surface thereof is concave. The sixth lens 6011 has a negative refractive power, and an object-side surface thereof is convex and an image-side surface thereof is concave. In addition, at least one inflection point is formed on either one or both of the object-side surface and the image-side surface of the sixth lens 6011. The seventh lens 7011 has a negative refractive power, and an object-side surface thereof is convex and an image-side surface thereof is concave. In addition, two inflection points are formed on the object-side surface of the seventh lens 7011, and one inflection point is formed on the image-side surface of the seventh lens 7011.

The optical imaging system 11 further includes a stop, a filter 8011, and an image sensor 9011. The stop is disposed between the second lens 2011 and the third lens 3011 to adjust an amount of light incident on the image sensor 9011. The filter 8011 is disposed between the seventh lens 7011 and the image sensor 9011 to block infrared rays. The image sensor 9011 forms an imaging plane on which an image of a subject is formed. Although not illustrated in FIG. 21, the stop is disposed at a distance of 1.2296 mm from the object-side surface of the first lens 1011 toward the imaging plane of the optical imaging system 11. This distance is equal to TTL-SL and can be calculated from the values of TTL and SL for Example 11 listed in Table 57 that appears later in this application.

Table 21 below shows physical properties of the lenses and other elements of the optical imaging system of FIG. 21, and Table 22 below shows aspherical surface coefficients of the lenses of FIG. 21.

TABLE 21

| Surface No. | Element | Radius of Curvature | Thickness/ Distance | Index of Refraction | Abbe Number | Effective Aperture Radius |
|---|---|---|---|---|---|---|
| S1 | First | 2.0759937 | 0.461868 | 1.546 | 56.114 | 1.450 |
| S2 | Lens | 2.4626776 | 0.142767 | | | 1.423 |
| S3 | Second | 2.5138054 | 0.6 | 1.546 | 56.114 | 1.392 |
| S4 | Lens | 29.011046 | 0.025 | | | 1.339 |
| S5 | (Stop) | 8.6847676 | 0.23 | 1.679 | 19.236 | 1.295 |
| S6 | Third Lens | 3.5580278 | 0.403456 | | | 1.273 |
| S7 | Fourth | 4.7911408 | 0.352214 | 1.546 | 56.114 | 1.378 |
| S8 | Lens | 7.0752276 | 0.349153 | | | 1.451 |
| S9 | Fifth | 4.2812245 | 0.35 | 1.546 | 56.114 | 1.632 |
| S10 | Lens | 6.1353451 | 0.360979 | | | 2.012 |
| S11 | Sixth | 4.4147672 | 0.43 | 1.679 | 19.236 | 2.013 |
| S12 | Lens | 3.9218806 | 0.295711 | | | 2.303 |
| S13 | Seventh | 1.740331 | 0.438887 | 1.546 | 56.114 | 2.548 |
| S14 | Lens | 1.2235575 | 0.199966 | | | 2.831 |
| S15 | Filter | Infinity | 0.21 | 1.518 | 64.197 | 3.299 |
| S16 | | Infinity | 0.637453 | | | 3.370 |
| S17 | Imaging Plane | Infinity | 0.012547 | | | 3.731 |

TABLE 22

| | K | A | B | C | D | E | F | G | H | J |
|---|---|---|---|---|---|---|---|---|---|---|
| S1 | −1 | −0.0092 | 0.003 | −0.0414 | 0.0636 | −0.0562 | 0.026 | −0.0049 | −0.0002 | 0.0001 |
| S2 | −11.557 | 0.0601 | −0.1844 | 0.2568 | −0.3524 | 0.3604 | −0.23 | 0.0871 | −0.018 | 0.0016 |
| S3 | −0.8307 | −0.0024 | −0.0852 | 0.1656 | −0.3174 | 0.3977 | −0.2764 | 0.1063 | −0.0212 | 0.0016 |
| S4 | 33.131 | −0.027 | 0.1754 | −0.4193 | 0.3931 | −0.0382 | −0.2294 | 0.1977 | −0.0691 | 0.0091 |
| S5 | 14.848 | −0.09 | 0.2473 | −0.422 | 0.2881 | 0.1413 | −0.4099 | 0.3093 | −0.1063 | 0.0142 |
| S6 | 2.0645 | −0.0757 | 0.0883 | 0.0177 | −0.3102 | 0.6013 | −0.6108 | 0.357 | −0.1119 | 0.0146 |
| S7 | −10.536 | −0.0399 | −0.0508 | 0.2144 | −0.4431 | 0.5288 | −0.3825 | 0.1604 | −0.034 | 0.0025 |
| S8 | 1.3378 | −0.0489 | −0.0512 | 0.1032 | −0.1013 | 0.0149 | 0.0599 | −0.0576 | 0.0222 | −0.0032 |
| S9 | −44.096 | 0.0784 | −0.1355 | 0.1317 | −0.0913 | 0.0374 | −0.0091 | 0.001 | 4E−05 | −1E−05 |
| S10 | −6.651 | 0.049 | −0.1189 | 0.1277 | −0.0852 | 0.0342 | −0.0083 | 0.0012 | −1E−04 | 3E−06 |
| S11 | −13.816 | 0.0584 | −0.1268 | 0.1161 | −0.0837 | 0.0379 | −0.0102 | 0.0016 | −0.0001 | 5E−06 |
| S12 | 1.0596 | −0.0574 | 0.0273 | −0.0248 | 0.0087 | −0.0016 | 0.0002 | −9E−06 | 2E−07 | −5E−10 |
| S13 | −0.8717 | −0.4042 | 0.1652 | −0.0262 | −0.0057 | 0.0037 | −0.0008 | 9E−05 | −6E−06 | 1E−07 |
| S14 | −1.3714 | −0.3652 | 0.2385 | −0.1205 | 0.0439 | −0.0107 | 0.0017 | −0.0002 | 9E−06 | −2E−07 |

Twelfth Example

Figure 23:
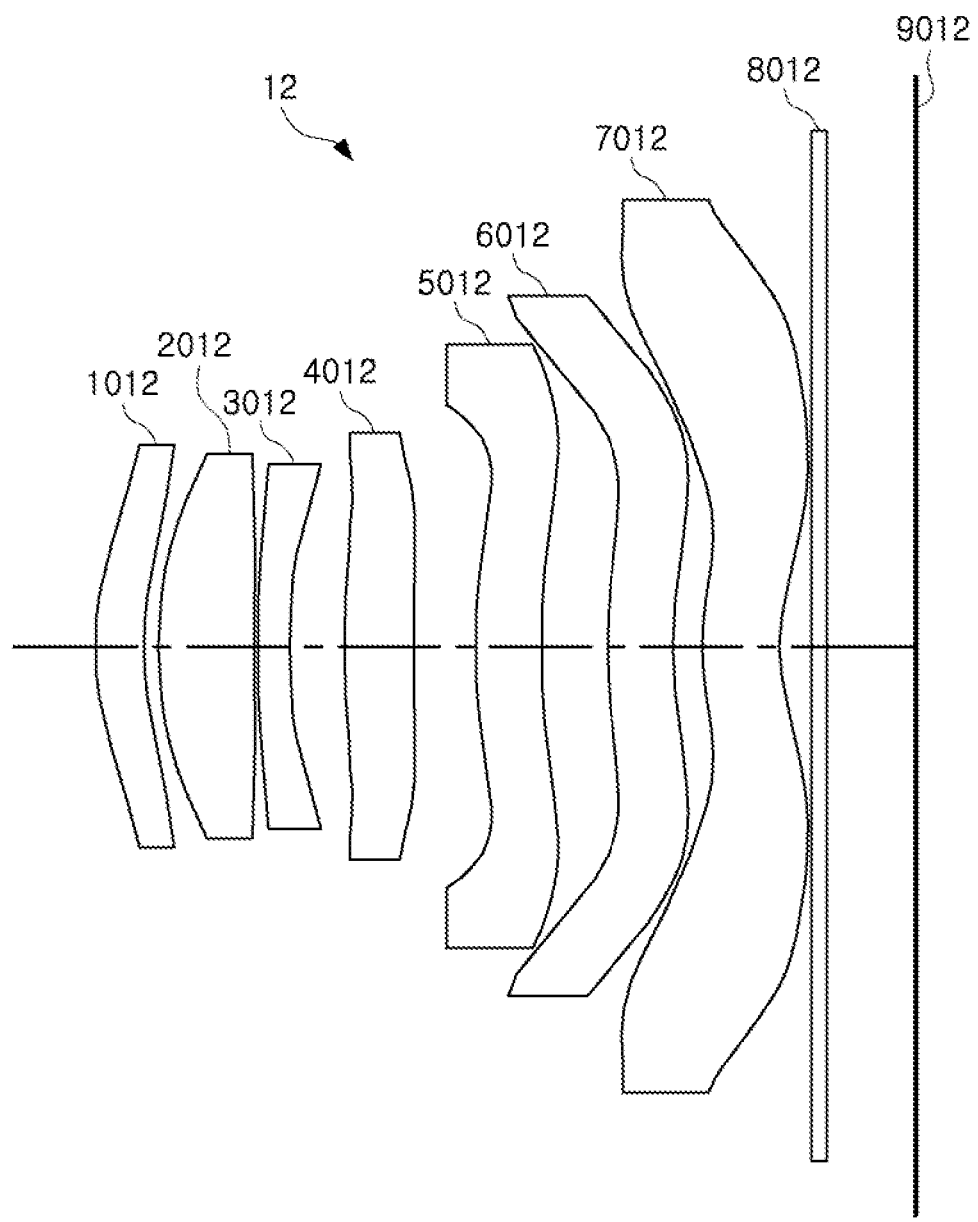
FIG. 23 is a view illustrating a twelfth example of an optical imaging system.
Figure 24:
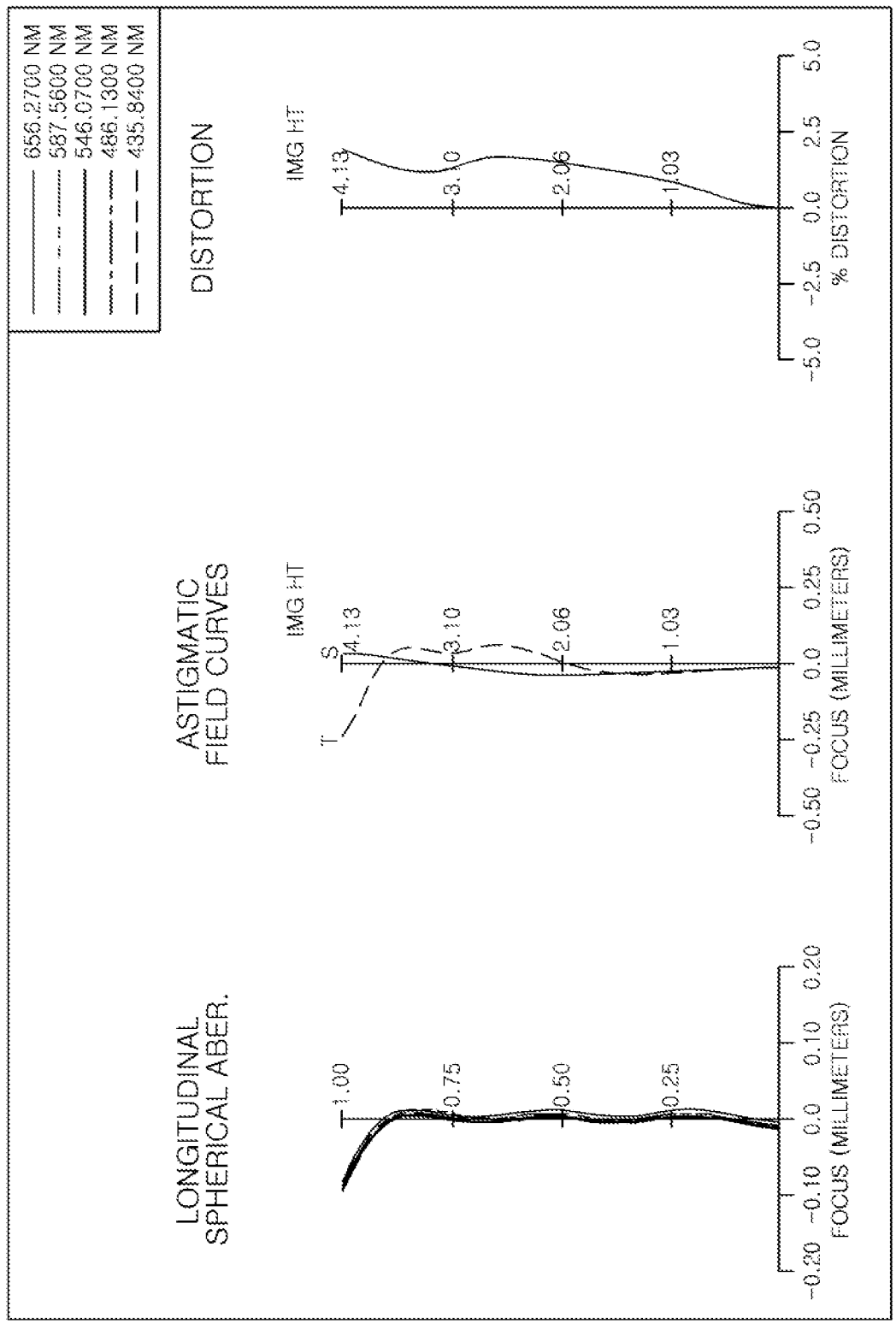
FIG. 24 illustrates aberration curves of the optical imaging system of FIG. 23.

FIG. 23 is a view illustrating a twelfth example of an optical imaging system, and FIG. 24 illustrates aberration curves of the optical imaging system of FIG. 23.

An optical imaging system 12 includes a first lens 1012, a second lens 2012, a third lens 3012, a fourth lens 4012, a fifth lens 5012, a sixth lens 6012, and a seventh lens 7012.

The first lens 1012 has a positive refractive power, and an object-side surface thereof is convex and an image-side surface thereof is concave. The second lens 2012 has a positive refractive power, and an object-side surface thereof is convex and an image-side surface thereof is concave. The third lens 3012 has a negative refractive power, and an object-side surface thereof is convex and an image-side surface thereof is concave. The fourth lens 4012 has a positive refractive power, and an object-side surface thereof is convex and an image-side surface thereof is concave. The fifth lens 5012 has a positive refractive power, and an object-side surface thereof is convex and an image-side surface thereof is concave. The sixth lens 6012 has a negative refractive power, and an object-side surface thereof is convex and an image-side surface thereof is concave. In addition, at least one inflection point is formed on either one or both of the object-side surface and the image-side surface of the sixth lens 6012. The seventh lens 7012 has a negative refractive power, and an object-side surface thereof is convex and an image-side surface thereof is concave. In addition, two inflection points are formed on the object-side surface of the seventh lens 7012, and one inflection point is formed on the image-side surface of the seventh lens 7012.

The optical imaging system 12 further includes a stop, a filter 8012, and an image sensor 9012. The stop is disposed between the second lens 2012 and the third lens 3012 to adjust an amount of light incident on the image sensor 9012. The filter 8012 is disposed between the seventh lens 7012 and the image sensor 9012 to block infrared rays. The image sensor 9012 forms an imaging plane on which an image of a subject is formed. Although not illustrated in FIG. 23, the stop is disposed at a distance of 1.1793 mm from the object-side surface of the first lens 1012 toward the imaging plane of the optical imaging system 12. This distance is equal to TTL-SL and can be calculated from the values of TTL and SL for Example 12 listed in Table 57 that appears later in this application.

Table 23 below shows physical properties of the lenses and other elements of the optical imaging system of FIG. 23, and Table 24 below shows aspherical surface coefficients of the lenses of FIG. 23.

TABLE 23

| Surface No. | Element | Radius of Curvature | Thickness/ Distance | Index of Refraction | Abbe Number | Effective Aperture Radius |
|---|---|---|---|---|---|---|
| S1 | First | 2.3878602 | 0.35 | 1.546 | 56.114 | 1.470 |
| S2 | Lens | 2.621324 | 0.10425 | | | 1.439 |
| S3 | Second | 2.5382264 | 0.7 | 1.546 | 56.114 | 1.405 |
| S4 | Lens | 36.207255 | 0.025 | | | 1.322 |
| S5 | (Stop) | 7.7960711 | 0.23 | 1.679 | 19.236 | 1.287 |
| S6 | Third Lens | 3.4912075 | 0.396134 | | | 1.325 |
| S7 | Fourth | 5.4331241 | 0.505386 | 1.546 | 56.114 | 1.461 |
| S8 | Lens | 9.3905062 | 0.443673 | | | 1.563 |
| S9 | Fifth | 4.6788866 | 0.484222 | 1.546 | 56.114 | 1.772 |
| S10 | Lens | 9.5732832 | 0.475792 | | | 2.209 |
| S11 | Sixth | 7.1894204 | 0.475353 | 1.679 | 19.236 | 2.238 |
| S12 | Lens | 3.8397107 | 0.215445 | | | 2.557 |
| S13 | Seventh | 1.8137383 | 0.559854 | 1.546 | 56.114 | 3.026 |
| S14 | Lens | 1.3872365 | 0.230078 | | | 3.262 |
| S15 | Filter | Infinity | 0.11 | 1.518 | 64.197 | 3.724 |
| S16 | | Infinity | 0.635 | | | 3.763 |
| S17 | Imaging Plane | Infinity | 0.015 | | | 4.160 |

TABLE 24

| | K | A | B | C | D | E | F | G | H | J |
|---|---|---|---|---|---|---|---|---|---|---|
| S1 | −0.9977 | −0.0046 | −0.0139 | −0.024 | 0.0712 | −0.0925 | 0.0658 | −0.0257 | 0.0051 | −0.0004 |
| S2 | −10.008 | 0.0879 | −0.2624 | 0.4378 | −0.5581 | 0.4751 | −0.2476 | 0.0753 | −0.0122 | 0.0008 |
| S3 | −0.5121 | −0.0082 | 0.0297 | −0.2049 | 0.402 | −0.4509 | 0.3219 | −0.1392 | 0.0325 | −0.0031 |
| S4 | 42.587 | −0.0077 | −0.0816 | 0.5107 | −1.169 | 1.3206 | −0.8193 | 0.2839 | −0.0514 | 0.0038 |
| S5 | 14.891 | −0.0724 | 0.0409 | 0.4245 | −1.2505 | 1.5731 | −1.0799 | 0.4229 | −0.0892 | 0.0079 |
| S6 | 1.8054 | −0.0886 | 0.1906 | −0.2777 | 0.2837 | −0.2167 | 0.1131 | −0.0327 | 0.0033 | 0.0002 |
| S7 | −10.152 | 0.028 | −0.4038 | 1.2639 | −2.2626 | 2.4845 | −1.6998 | 0.7029 | −0.16 | 0.0153 |
| S8 | 1.7534 | −0.0643 | 0.1117 | −0.3935 | 0.7438 | −0.8306 | 0.565 | −0.2306 | 0.0519 | −0.005 |
| S9 | −44.62 | 0.0891 | −0.1333 | 0.115 | −0.0807 | 0.043 | −0.017 | 0.0044 | −0.0006 | 4E−05 |
| S10 | −4.9001 | 0.0976 | −0.137 | 0.0999 | −0.0465 | 0.0132 | −0.0022 | 0.0002 | −1E−05 | 2E−07 |
| S11 | −13.159 | 0.0954 | −0.1535 | 0.1202 | −0.0703 | 0.0264 | −0.006 | 0.0008 | −6E−05 | 2E−06 |
| S12 | 0.7792 | −0.0211 | −0.0288 | 0.0188 | −0.0093 | 0.003 | −0.0006 | 6E−05 | −4E−06 | 9E−08 |
| S13 | −0.8786 | −0.3003 | 0.0918 | −0.0015 | −0.0073 | 0.0023 | −0.0004 | 3E−05 | −1E−06 | 3E−08 |
| S14 | −1.3086 | −0.2504 | 0.1203 | −0.0427 | 0.0114 | −0.0021 | 0.0003 | −2E−05 | 9E−07 | −2E−08 |

Thirteenth Example

Figure 25:
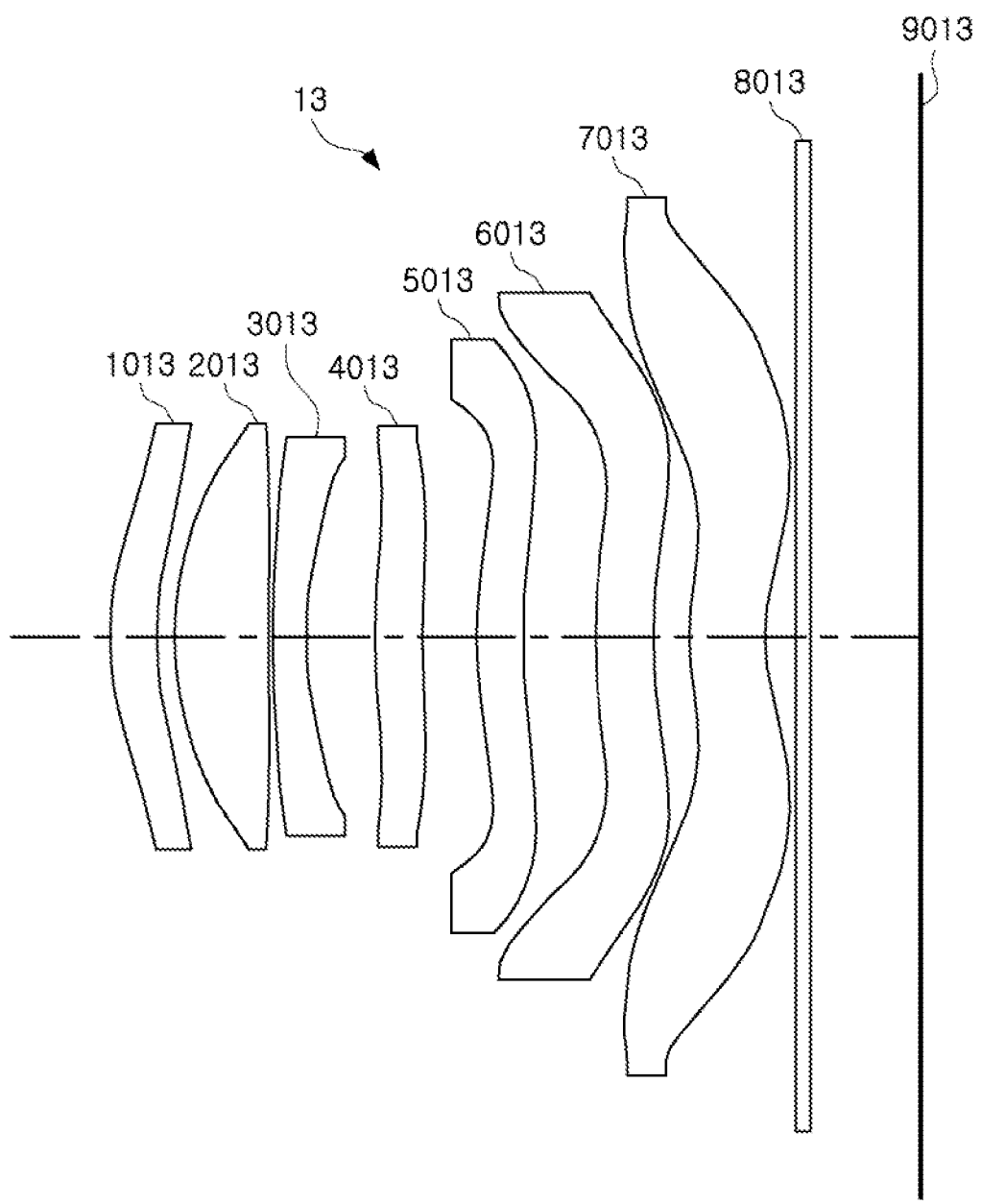
FIG. 25 is a view illustrating a thirteenth example of an optical imaging system.
Figure 26:
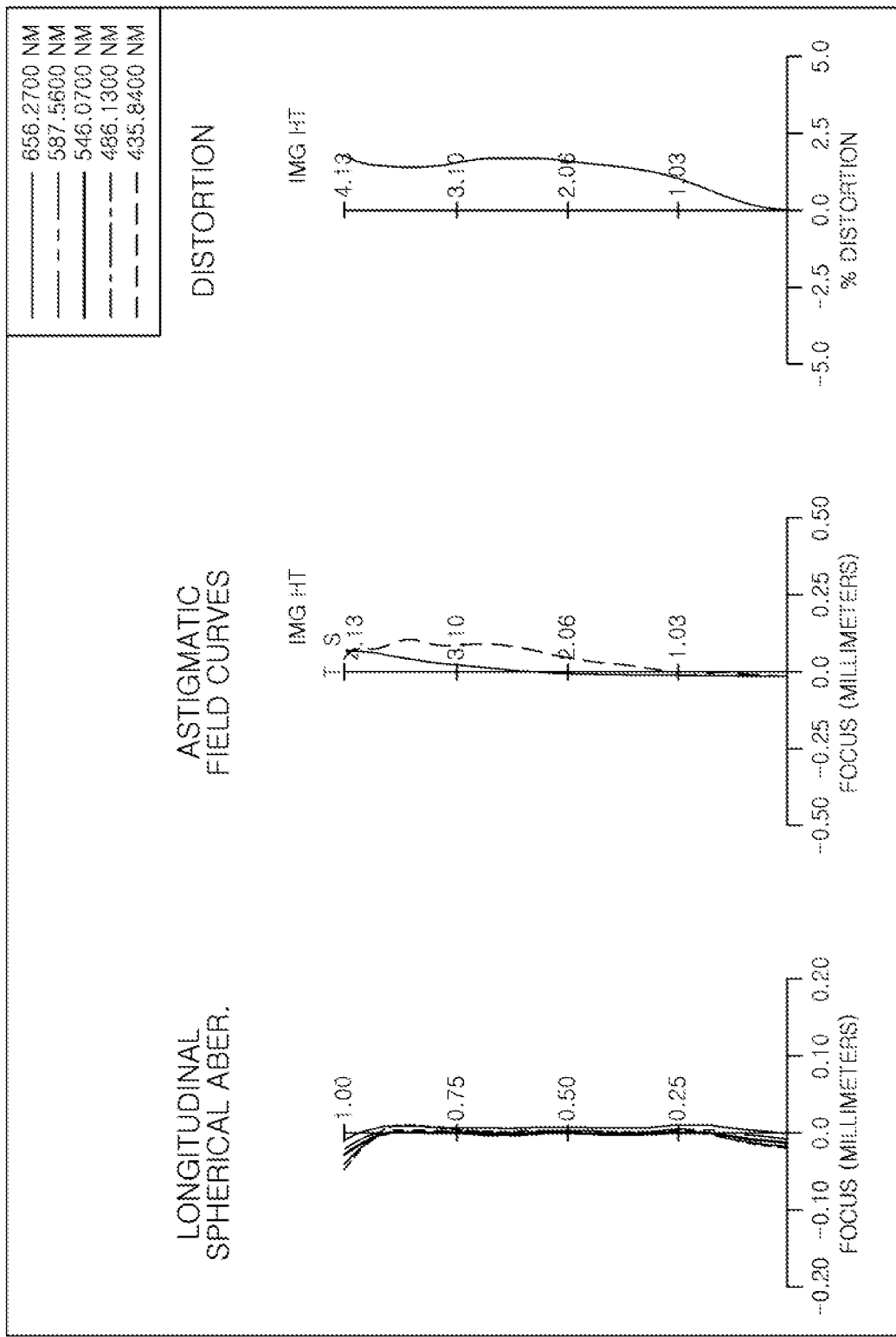
FIG. 26 illustrates aberration curves of the optical imaging system of FIG. 25.

FIG. 25 is a view illustrating a thirteenth example of an optical imaging system, and FIG. 26 illustrates aberration curves of the optical imaging system of FIG. 25.

An optical imaging system 13 includes a first lens 1013, a second lens 2013, a third lens 3013, a fourth lens 4013, a fifth lens 5013, a sixth lens 6013, and a seventh lens 7013.

The first lens 1013 has a positive refractive power, and an object-side surface thereof is convex and an image-side surface thereof is concave. The second lens 2013 has a positive refractive power, and an object-side surface thereof is convex and an image-side surface thereof is concave. The third lens 3013 has a negative refractive power, and an object-side surface thereof is convex and an image-side surface thereof is concave. The fourth lens 4013 has a positive refractive power, and an object-side surface thereof is convex and an image-side surface thereof is concave. The fifth lens 5013 has a positive refractive power, and an object-side surface thereof is convex and an image-side surface thereof is concave. The sixth lens 6013 has a negative refractive power, and an object-side surface thereof is convex and an image-side surface thereof is concave. In addition, at least one inflection point is formed on either one or both of the object-side surface and the image-side surface of the sixth lens 6013. The seventh lens 7013 has a negative refractive power, and an object-side surface thereof is convex and an image-side surface thereof is concave. In addition, two inflection points are formed on the object-side surface of the seventh lens 7013, and one inflection point is formed on the image-side surface of the seventh lens 7013.

The optical imaging system 13 further includes a stop, a filter 8013, and an image sensor 9013. The stop is disposed between the second lens 2013 and the third lens 3013 to adjust an amount of light incident on the image sensor 9013. The filter 8013 is disposed between the seventh lens 7013 and the image sensor 9013 to block infrared rays. The image sensor 9013 forms an imaging plane on which an image of a subject is formed. Although not illustrated in FIG. 25, the stop is disposed at a distance of 1.2052 mm from the object-side surface of the first lens 1013 toward the imaging plane of the optical imaging system 13. This distance is equal to TTL-SL and can be calculated from the values of TTL and SL for Example 13 listed in Table 57 that appears later in this application.

Table 25 below shows physical properties of the lenses and other elements of the optical imaging system of FIG. 25, and Table 26 below shows aspherical surface coefficients of the lenses of FIG. 25.

TABLE 25

| Surface No. | Element | Radius of Curvature | Thickness/ Distance | Index of Refraction | Abbe Number | Effective Aperture Radius |
|---|---|---|---|---|---|---|
| S1 | First | 2.3421801 | 0.35 | 1.546 | 56.114 | 1.570 |
| S2 | Lens | 2.4608227 | 0.130273 | | | 1.582 |
| S3 | Second | 2.309069 | 0.7 | 1.546 | 56.114 | 1.578 |
| S4 | Lens | 38.833557 | 0.025 | | | 1.553 |
| S5 | (Stop) | 7.6526629 | 0.25298 | 1.679 | 19.236 | 1.474 |
| S6 | Third Lens | 3.3272174 | 0.504716 | | | 1.325 |
| S7 | Fourth | 5.6743754 | 0.346649 | 1.679 | 19.236 | 1.461 |
| S8 | Lens | 6.5811075 | 0.40646 | | | 1.563 |
| S9 | Fifth | 4.7925509 | 0.35 | 1.546 | 56.114 | 1.772 |
| S10 | Lens | 10.114446 | 0.527822 | | | 2.209 |
| S11 | Sixth | 6.1622692 | 0.43 | 1.679 | 19.236 | 2.238 |
| S12 | Lens | 3.9299512 | 0.26246 | | | 2.557 |
| S13 | Seventh | 1.9665801 | 0.564397 | 1.546 | 56.114 | 3.026 |
| S14 | Lens | 1.490457 | 0.226843 | | | 3.262 |
| S15 | Filter | Infinity | 0.11 | 1.518 | 64.197 | 3.641 |
| S16 | | Infinity | 0.797349 | | | 3.681 |
| S17 | Imaging Plane | Infinity | 0.015 | | | 4.171 |

TABLE 26

| | K | A | B | C | D | E | F | G | H | J |
|---|---|---|---|---|---|---|---|---|---|---|
| S1 | −1 | −0.0146 | 0.01 | −0.0522 | 0.0643 | −0.0468 | 0.0217 | −0.0061 | 0.0009 | −6E−05 |
| S2 | −9.9316 | 0.0529 | −0.0805 | 0.0187 | 0.0015 | 0.0183 | −0.0206 | 0.0089 | −0.0018 | 0.0001 |
| S3 | −0.3035 | −0.0312 | 0.1094 | −0.2703 | 0.3068 | −0.1783 | 0.0505 | −0.0026 | −0.0019 | 0.0003 |
| S4 | 42.587 | −0.14 | 0.5905 | −1.3419 | 1.845 | −1.6056 | 0.8858 | −0.299 | 0.0561 | −0.0045 |
| S5 | 14.878 | −0.1698 | 0.5798 | −1.2212 | 1.6455 | −1.4398 | 0.807 | −0.2778 | 0.0533 | −0.0044 |
| S6 | 2.4782 | −0.0974 | 0.3302 | −0.8477 | 1.4713 | −1.6606 | 1.1916 | −0.5238 | 0.1288 | −0.0136 |
| S7 | −10.89 | −0.0126 | −0.1352 | 0.3555 | −0.5088 | 0.426 | −0.2043 | 0.0479 | −0.0019 | −0.0008 |
| S8 | 2.4559 | −0.0438 | −0.0219 | −0.0159 | 0.1351 | −0.2288 | 0.1952 | −0.0929 | 0.0235 | −0.0025 |
| S9 | −44.519 | 0.0902 | −0.1408 | 0.1256 | −0.0754 | 0.0253 | −0.0032 | −0.0008 | 0.0003 | −3E−05 |
| S10 | 2.7864 | 0.0708 | −0.1198 | 0.1033 | −0.057 | 0.0193 | −0.004 | 0.0005 | −3E−05 | 9E−07 |
| S11 | −17.823 | 0.0653 | −0.1084 | 0.075 | −0.0394 | 0.0131 | −0.0026 | 0.0003 | −2E−05 | 5E−07 |
| S12 | 0.5903 | −0.0273 | −0.0096 | 0.0039 | −0.0025 | 0.001 | −0.0002 | 2E−05 | −1E−06 | 3E−08 |
| S13 | −0.8439 | −0.2851 | 0.1057 | −0.0237 | 0.0034 | −0.0003 | 5E−07 | 2E−06 | −1E−07 | 4E−09 |
| S14 | −1.3672 | −0.238 | 0.119 | −0.0473 | 0.0138 | −0.0027 | 0.0003 | −3E−05 | 1E−06 | −2E−08 |

Fourteenth Example

Figure 27:
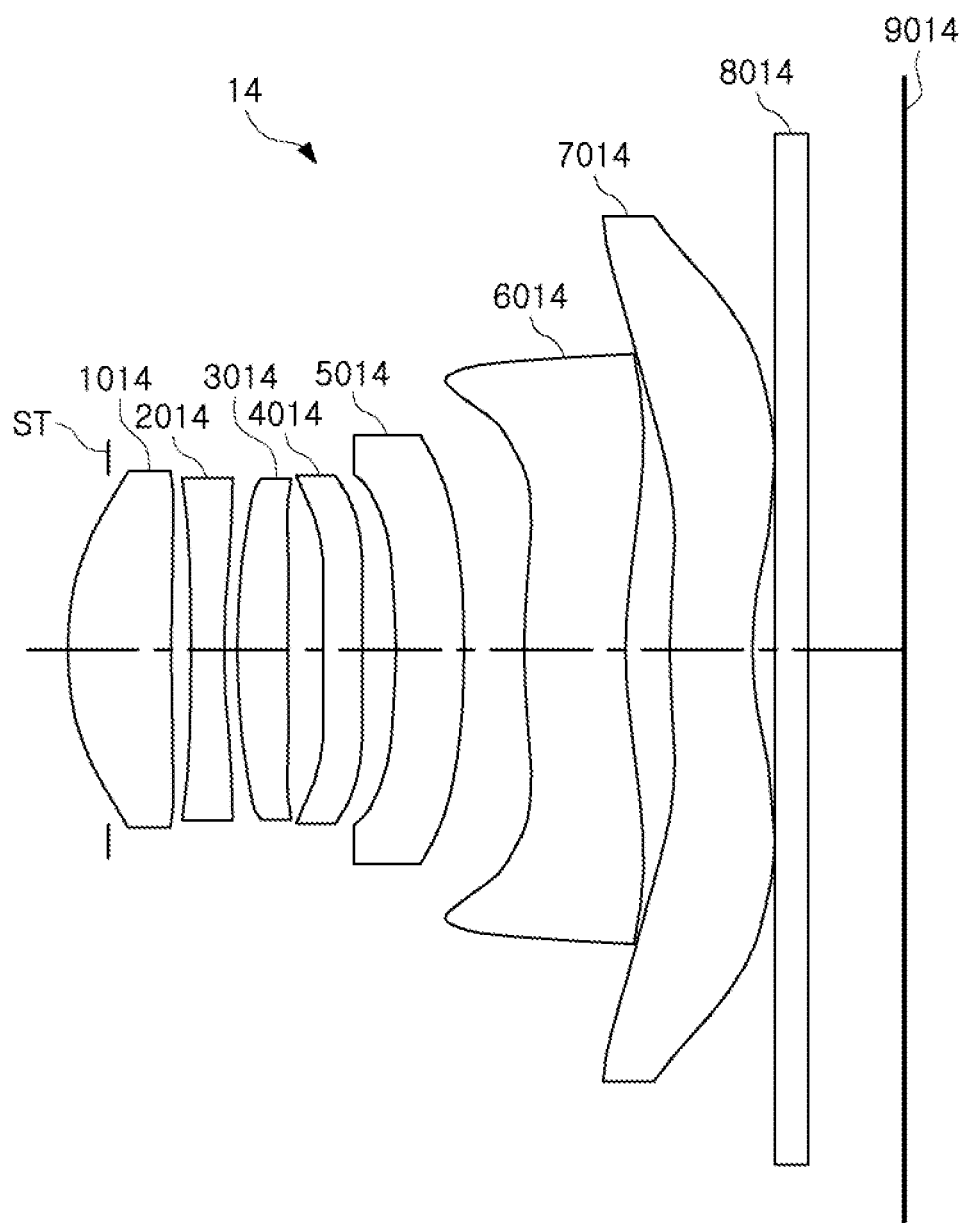
FIG. 27 is a view illustrating a fourteenth example of an optical imaging system.
Figure 28:
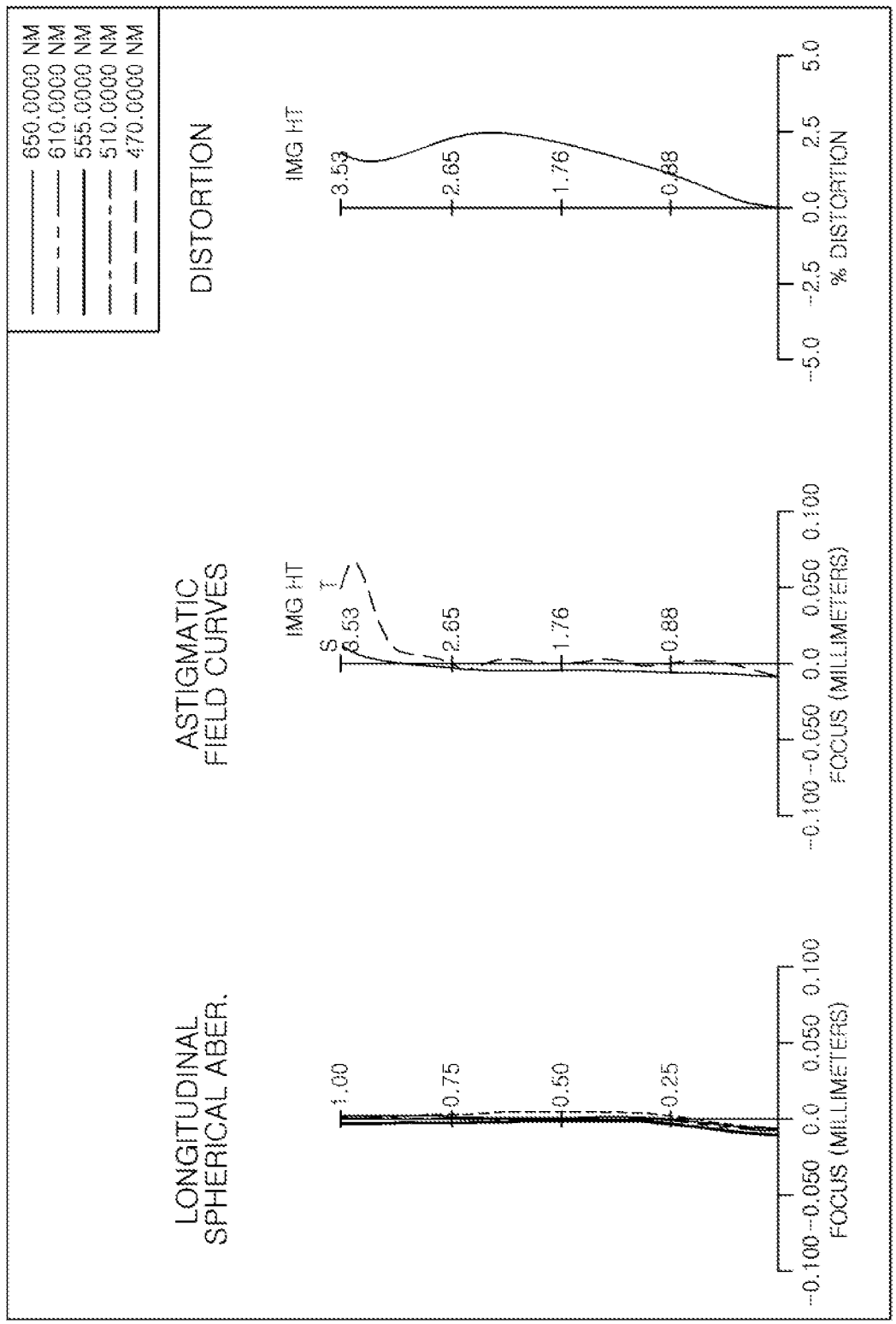
FIG. 28 illustrates aberration curves of the optical imaging system of FIG. 27.

FIG. 27 is a view illustrating a fourteenth example of an optical imaging system, and FIG. 28 illustrates aberration curves of the optical imaging system of FIG. 27.

An optical imaging system 14 includes a first lens 1014, a second lens 2014, a third lens 3014, a fourth lens 4014, a fifth lens 5014, a sixth lens 6014, and a seventh lens 7014.

The first lens 1014 has a positive refractive power, and an object-side surface thereof is convex and an image-side surface thereof is concave. The second lens 2014 has a negative refractive power, and an object-side surface thereof is convex and an image-side surface thereof is concave. The third lens 3014 has a positive refractive power, and an object-side surface thereof is convex and an image-side surface thereof is concave. The fourth lens 4014 has a positive refractive power, and an object-side surface thereof is convex and an image-side surface thereof is concave. The fifth lens 5014 has a negative refractive power, and an object-side surface thereof is concave and an image-side surface thereof is convex. The sixth lens 6014 has a negative refractive power, and an object-side surface thereof is convex and an image-side surface thereof is concave. In addition, at least one inflection point is formed on either one or both of the object-side surface and the image-side surface of the sixth lens 6014. The seventh lens 7014 has a negative refractive power, and an object-side surface thereof is convex and an image-side surface thereof is concave. In addition, one inflection point is formed on each of the object-side surface and the image-side surface of the seventh lens 7014.

The optical imaging system 14 further includes a stop, a filter 8014, and an image sensor 9014. The stop is disposed in front of the first lens 1014 to adjust an amount of light incident on the image sensor 9014. The filter 8014 is disposed between the seventh lens 7014 and the image sensor 9014 to block infrared rays. The image sensor 9014 forms an imaging plane on which an image of a subject is formed. Although not illustrated in FIG. 27, the stop is disposed at a distance of 0.2500 mm from the object-side surface of the first lens 1014 toward the imaging plane of the optical imaging system 14. This distance is equal to TTL-SL and can be calculated from the values of TTL and SL for Example 14 listed in Table 57 that appears later in this application.

Table 27 below shows physical properties of the lenses and other elements of the optical imaging system of FIG. 27, and Table 28 below shows aspherical surface coefficients of the lenses of FIG. 27.

TABLE 27

| Surface No. | Element | Radius of Curvature | Thickness/ Distance | Index of Refraction | Abbe Number | Effective Aperture Radius |
|---|---|---|---|---|---|---|
| S1 | (Stop) | 1.7211 | 0.6349 | 1.544 | 56.114 | 1.100 |
| S2 | First Lens | 11.4571 | 0.1212 | | | 1.071 |
| S3 | Second | 119.1721 | 0.2033 | 1.661 | 20.353 | 1.057 |
| S4 | Lens | 4.4758 | 0.0843 | | | 1.043 |
| S5 | Third | 4.5258 | 0.3109 | 1.544 | 56.114 | 1.051 |
| S6 | Lens | 20.6082 | 0.2158 | | | 1.015 |
| S7 | Fourth | 13.2152 | 0.2369 | 1.544 | 56.114 | 1.019 |
| S8 | Lens | 16.2733 | 0.2103 | | | 1.070 |
| S9 | Fifth | −6.5732 | 0.4119 | 1.651 | 21.494 | 1.076 |
| S10 | Lens | −10.4553 | 0.3710 | | | 1.320 |
| S11 | Sixth | 3.4779 | 0.6318 | 1.544 | 56.114 | 1.556 |
| S12 | Lens | 3.1994 | 0.2672 | | | 2.337 |
| S13 | Seventh | 2.8804 | 0.5060 | 1.544 | 56.114 | 2.489 |
| S14 | Lens | 1.7054 | 0.1384 | | | 2.666 |
| S15 | Filter | Infinity | 0.2100 | | | 3.102 |
| S16 | | Infinity | 0.5794 | | | 3.177 |
| S17 | Imaging Plane | Infinity | 0.0106 | | | 3.529 |

TABLE 28

| | K | A | B | C | D | E | F | G | H |
|---|---|---|---|---|---|---|---|---|---|
| S1 | 0.0432 | −0.0088 | 0.0131 | −0.0627 | 0.1199 | −0.1345 | 0.077 | −0.018 | −0.0004 |
| S2 | −26.097 | −0.0562 | 0.051 | −0.0514 | 0.0595 | −0.0683 | 0.0462 | −0.0139 | −7E−05 |
| S3 | −99 | −0.1283 | 0.1953 | −0.2779 | 0.5135 | −0.8812 | 0.9662 | −0.5723 | 0.1395 |
| S4 | −16.567 | −0.0971 | 0.1552 | −0.3608 | 0.985 | −2.059 | 2.5647 | −1.6683 | 0.4378 |
| S5 | −1.6774 | −0.0377 | 0.065 | −0.4515 | 1.687 | −3.5163 | 4.2391 | −2.6607 | 0.6752 |
| S6 | 57.913 | −0.0559 | 0.0533 | −0.341 | 1.3373 | −2.8539 | 3.4811 | −2.2114 | 0.5781 |
| S7 | −66.305 | −0.1749 | −0.0635 | 0.0963 | −0.2061 | 0.5819 | −0.9 | 0.6874 | −0.1979 |
| S8 | 19.549 | −0.1228 | −0.0686 | 0.0207 | 0.1647 | −0.2695 | 0.1725 | −0.0616 | 0.0161 |
| S9 | 29.709 | −0.0709 | 0.0826 | −0.3062 | 0.6009 | −0.6459 | 0.3344 | −0.0761 | 0 |
| S10 | −31.338 | −0.1255 | 0.1076 | −0.1494 | 0.1908 | −0.1423 | 0.0506 | −0.0065 | 0 |

TABLE 28-continued

|     | K       | A       | B       | C       | D       | E       | F       | G       | H     |
|-----|---------|---------|---------|---------|---------|---------|---------|---------|-------|
| S11 | −46.453 | 0.0038  | −0.1455 | 0.1534  | −0.126  | 0.0705  | −0.0225 | 0.0029  | 0     |
| S12 | −31.504 | 0.0093  | −0.0326 | 0.0149  | −0.0033 | 0.0003  | −1E−05  | −7E−07  | 0     |
| S13 | −0.5233 | −0.2947 | 0.1709  | −0.0627 | 0.0154  | −0.0025 | 0.0003  | −1E−05  | 3E−07 |
| S14 | −0.8257 | −0.2584 | 0.1353  | −0.0565 | 0.0166  | −0.0032 | 0.0004  | −3E−05  | 7E−07 |

Fifteenth Example

Figure 29:
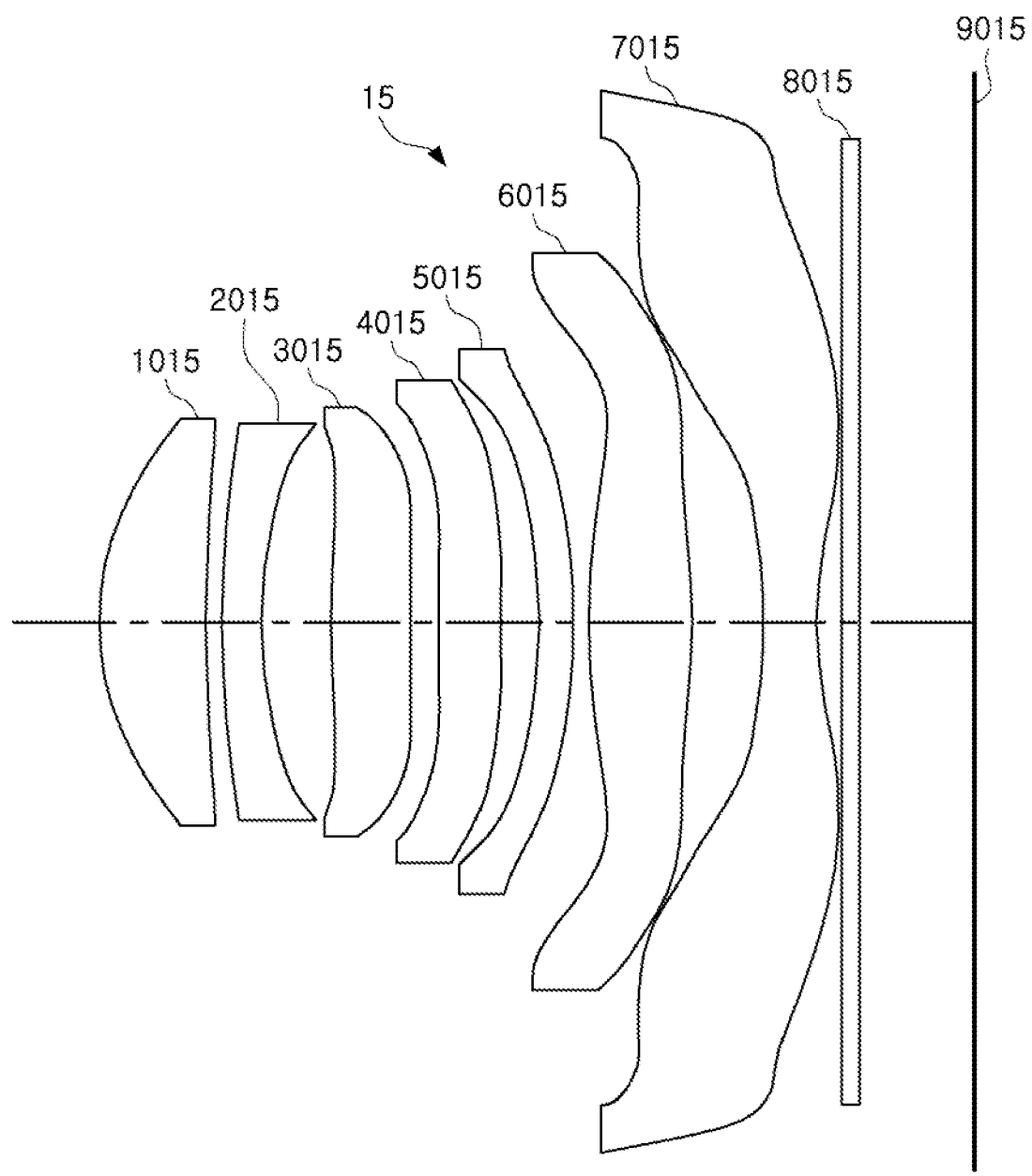
FIG. 29 is a view illustrating a fifteenth example of an optical imaging system.
Figure 30:
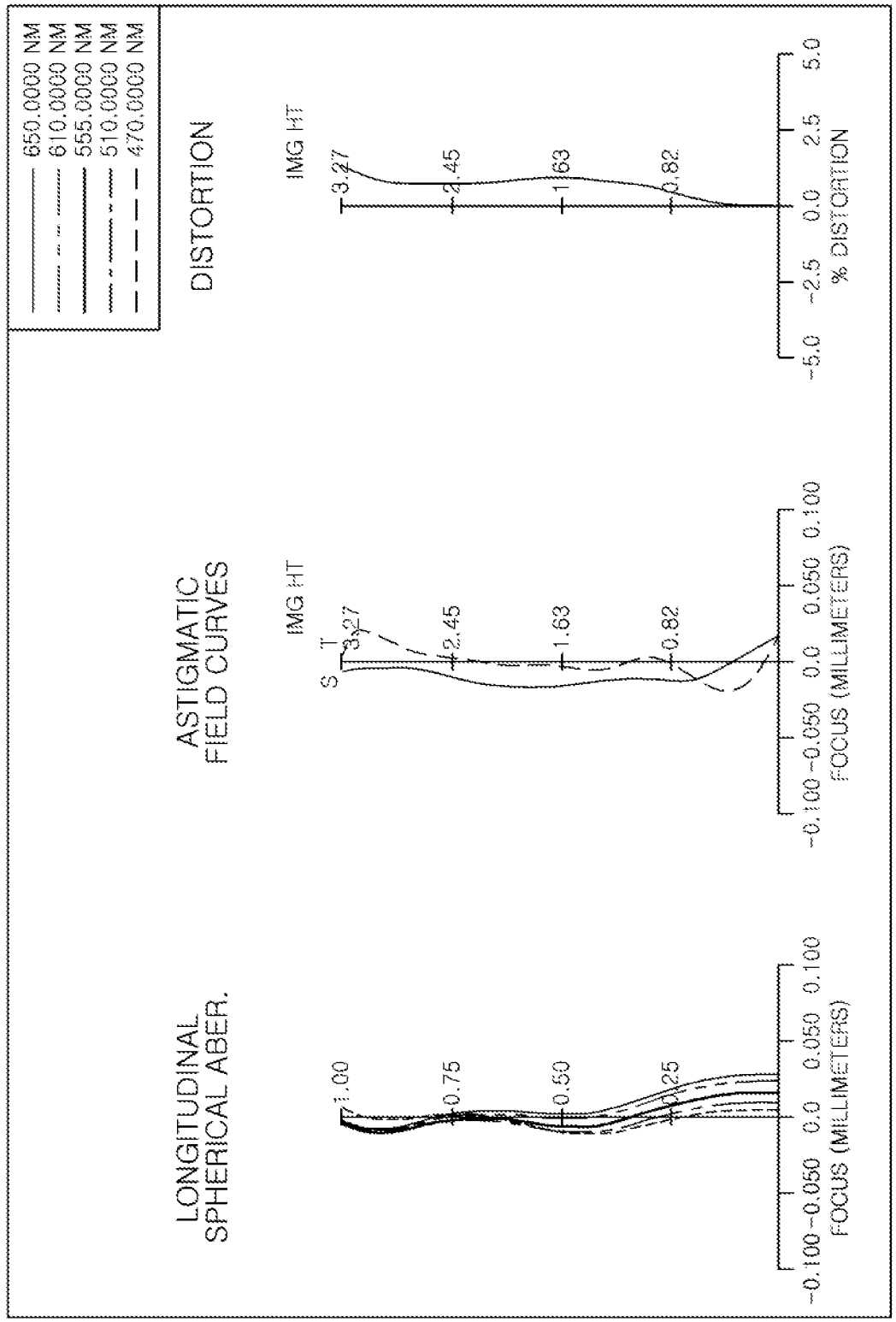
FIG. 30 illustrates aberration curves of the optical imaging system of FIG. 29.

FIG. 29 is a view illustrating a fifteenth example of an optical imaging system, and FIG. 30 illustrates aberration curves of the optical imaging system of FIG. 29.

An optical imaging system 15 includes a first lens 1015, a second lens 2015, a third lens 3015, a fourth lens 4015, a fifth lens 5015, a sixth lens 6015, and a seventh lens 7015.

The first lens 1015 has a positive refractive power, and an object-side surface thereof is convex and an image-side surface thereof is concave. The second lens 2015 has a negative refractive power, and an object-side surface thereof is convex and an image-side surface thereof is concave. The third lens 3015 has a positive refractive power, and an object-side surface thereof is convex and an image-side surface thereof is concave. The fourth lens 4015 has a positive refractive power, and an object-side surface thereof is convex and an image-side surface thereof is convex. The fifth lens 5015 has a negative refractive power, and an object-side surface thereof is concave and an image-side surface thereof is convex. The sixth lens 6015 has a positive refractive power, and an object-side surface thereof is convex and an image-side surface thereof is convex. In addition, at least one inflection point is formed on either one or both of the object-side surface and the image-side surface of the sixth lens 6015. The seventh lens 7015 has a negative refractive power, and an object-side surface thereof is concave and an image-side surface thereof is concave. In addition, one inflection point is formed on each of the object-side surface and the image-side surface of the seventh lens 7015.

The optical imaging system 15 further includes a stop, a filter 8015, and an image sensor 9015. The stop is disposed between the first lens 1015 and the second lens 2015 to adjust an amount of light incident on the image sensor 9015. The filter 8015 is disposed between the seventh lens 7015 and the image sensor 9015 to block infrared rays. The image sensor 9015 forms an imaging plane on which an image of a subject is formed.

Table 29 below shows physical properties of the lenses and other elements of the optical imaging system of FIG. 29, and Table 30 below shows aspherical surface coefficients of the lenses of FIG. 29.

TABLE 29

| Surface No. | Element | Radius of Curvature | Thickness/ Distance | Index of Refraction | Abbe Number | Effective Aperture Radius |
|---|---|---|---|---|---|---|
| S1  | First          | 1.7773   | 0.6238  | 1.544 | 56.114 | 1.217 |
| S2  | Lens (Stop)    | 6.4566   | 0.1000  |       |        | 1.158 |
| S3  | Second         | 4.4103   | 0.2363  | 1.661 | 20.353 | 1.157 |
| S4  | Lens           | 2.6584   | 0.4138  |       |        | 1.184 |
| S5  | Third          | 6.5879   | 0.4640  | 1.544 | 56.114 | 1.177 |
| S6  | Lens           | 10.5233  | 0.1777  |       |        | 1.282 |
| S7  | Fourth         | 13.4749  | 0.3627  | 1.544 | 56.114 | 1.306 |
| S8  | Lens           | −20.2300 | 0.2325  |       |        | 1.444 |
| S9  | Fifth          | −3.1831  | 0.2000  | 1.661 | 20.353 | 1.456 |
| S10 | Lens           | −4.2151  | 0.1000  |       |        | 1.625 |
| S11 | Sixth          | 6.7646   | 0.6089  | 1.544 | 56.114 | 2.207 |
| S12 | Lens           | −2.8792  | 0.4211  |       |        | 2.145 |
| S13 | Seventh        | −6.9958  | 0.3200  | 1.544 | 56.114 | 2.280 |
| S14 | Lens           | 1.6934   | 0.1485  |       |        | 3.165 |
| S15 | Filter         | Infinity | 0.1100  |       |        | 2.850 |
| S16 |                | Infinity | 0.7007  |       |        | 2.888 |
| S17 | Imaging Plane  | Infinity | −0.0200 |       |        | 3.276 |

TABLE 30

|     | K       | A       | B       | C       | D       | E       | F       | G       | H       | J      |
|-----|---------|---------|---------|---------|---------|---------|---------|---------|---------|--------|
| S1  | −0.5383 | 0.0108  | 0.0209  | −0.0477 | 0.0729  | −0.06   | 0.0243  | −0.0027 | −0.0007 | 0      |
| S2  | 5.8135  | −0.0459 | 0.0189  | 0.0248  | −0.0559 | 0.0486  | −0.026  | 0.0094  | −0.0019 | 0      |
| S3  | −10.011 | −0.085  | 0.066   | 0.02    | −0.0808 | 0.0756  | −0.0332 | 0.0069  | −0.0006 | 0      |
| S4  | −0.1875 | −0.0544 | 0.0068  | 0.26    | −0.6655 | 0.9329  | −0.7519 | 0.3313  | −0.061  | 0      |
| S5  | 0       | −0.0569 | 0.0063  | −0.0275 | −0.0046 | 0.0401  | −0.0485 | 0.0264  | −0.0053 | 0      |
| S6  | 0       | −0.0775 | −0.0976 | 0.271   | −0.5329 | 0.5567  | −0.3323 | 0.1128  | −0.0176 | 0      |
| S7  | 47.015  | −0.0863 | −0.1024 | 0.2298  | −0.2721 | 0.1091  | 0.0392  | −0.0378 | 0.0065  | 0      |
| S8  | −99     | −0.0603 | −0.0348 | 0.057   | −0.0468 | 0.0241  | −0.007  | 0.001   | −6E−05  | 0      |
| S9  | −99     | −0.2672 | 0.6153  | −0.9745 | 0.9138  | −0.5236 | 0.1786  | −0.0332 | 0.0026  | 0      |
| S10 | −0.0701 | 0.0268  | −0.0377 | −0.0253 | 0.035   | −0.0133 | 0.0024  | −0.0002 | 7E−06   | 0      |
| S11 | −97.721 | 0.1556  | −0.2109 | 0.1424  | −0.0678 | 0.02    | −0.0033 | 0.0003  | −1E−05  | 0      |
| S12 | −1.5998 | 0.2298  | −0.1811 | 0.0905  | −0.0342 | 0.0088  | −0.0014 | 0.0001  | −4E−06  | 0      |
| S13 | 4.8341  | −0.1142 | −0.0024 | 0.0306  | −0.013  | 0.0027  | −0.0003 | 2E−05   | −5E−07  | 0      |
| S14 | −1.0993 | −0.2618 | 0.1449  | −0.0599 | 0.0171  | −0.0032 | 0.0004  | −3E−05  | 1E−06   | −2E−08 |

Sixteenth Example

Figure 31:
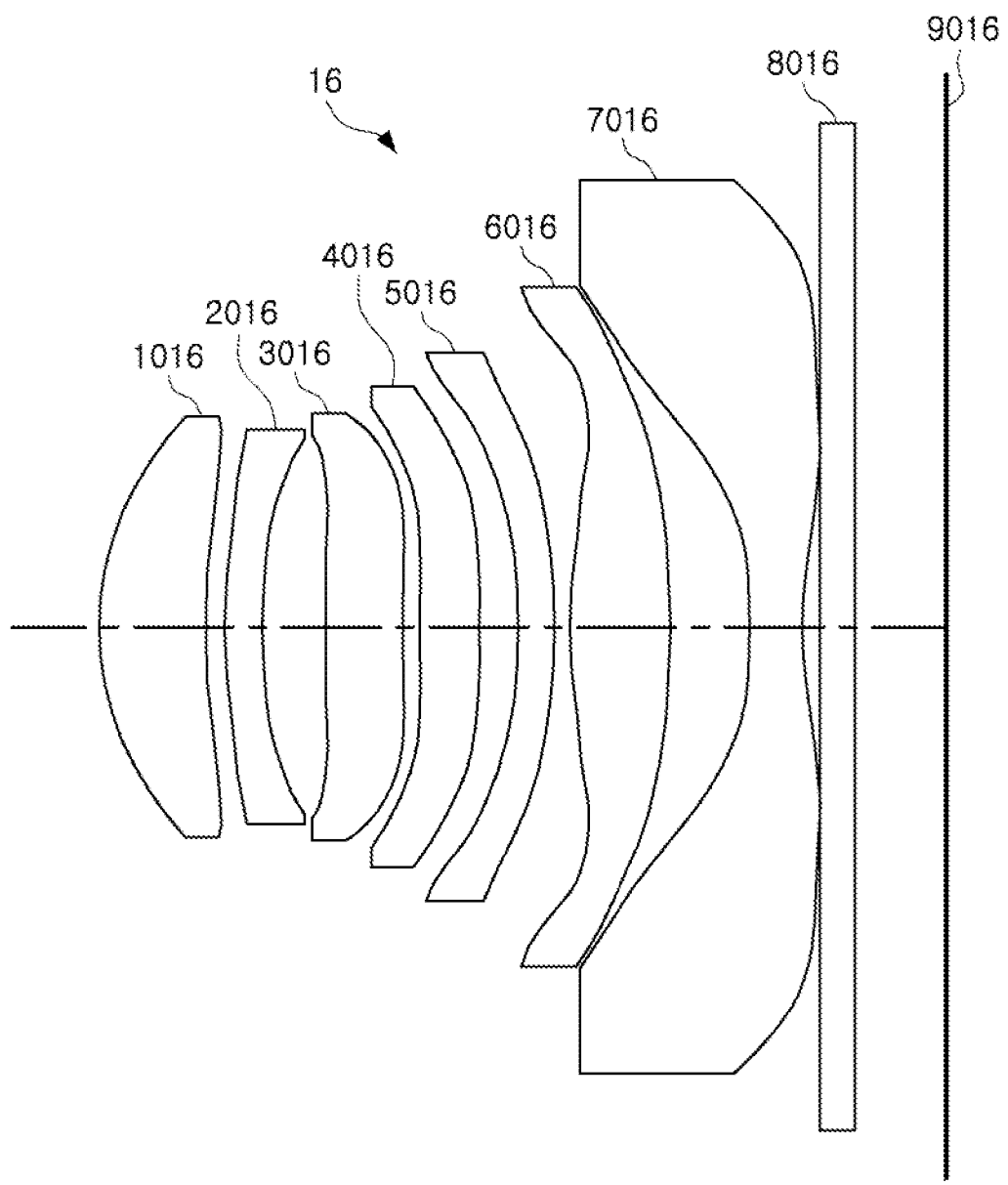
FIG. 31 is a view illustrating a sixteenth example of an optical imaging system.
Figure 32:
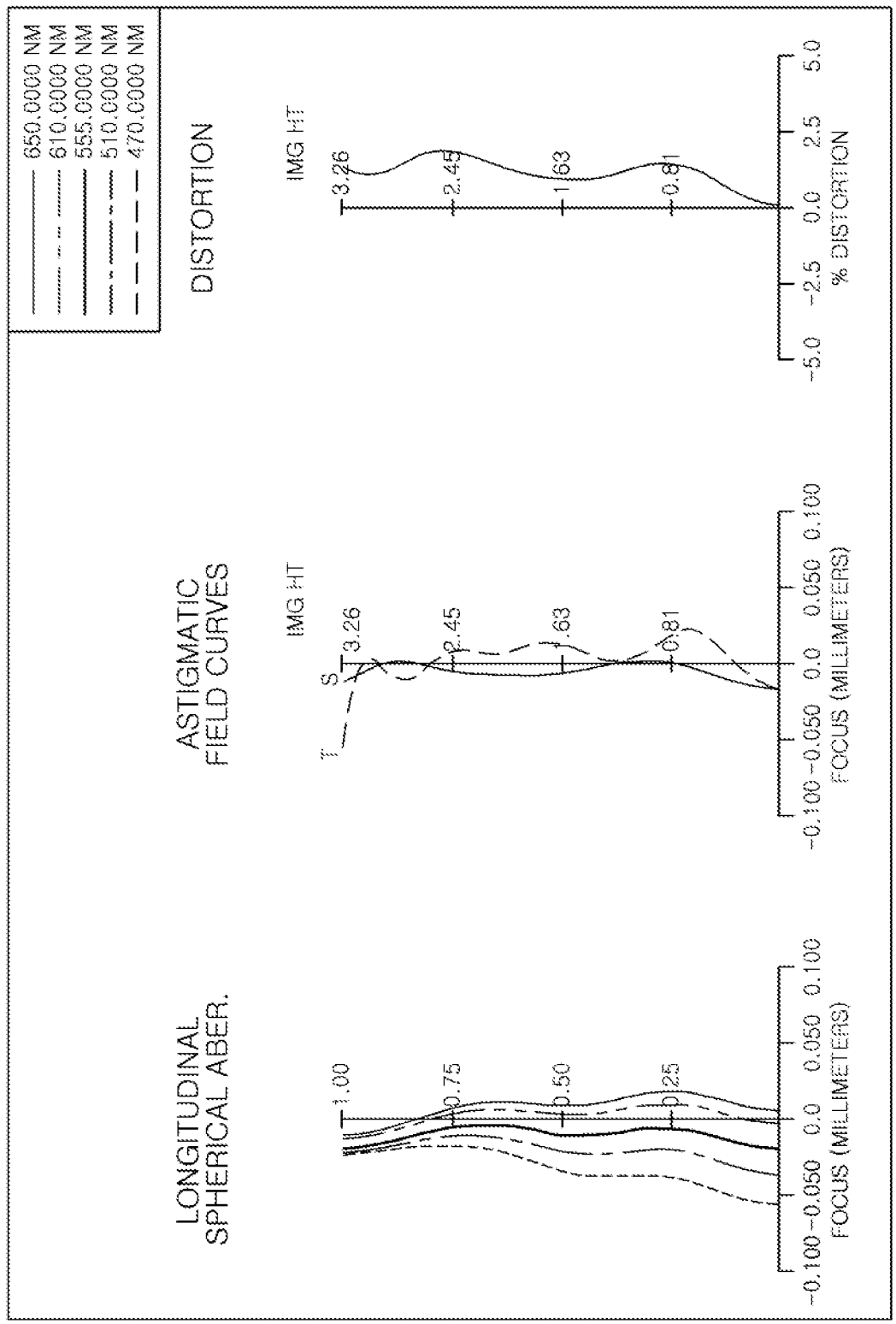
FIG. 32 illustrates aberration curves of the optical imaging system of FIG. 31.

FIG. 31 is a view illustrating a sixteenth example of an optical imaging system, and FIG. 32 illustrates aberration curves of the optical imaging system of FIG. 31.

An optical imaging system 16 includes a first lens 1016, a second lens 2016, a third lens 3016, a fourth lens 4016, a fifth lens 5016, a sixth lens 6016, and a seventh lens 7016.

The first lens 1016 has a positive refractive power, and an object-side surface thereof is convex and an image-side surface thereof is concave. The second lens 2016 has a negative refractive power, and an object-side surface thereof is convex and an image-side surface thereof is concave. The third lens 3016 has a negative refractive power, and an object-side surface thereof is convex and an image-side surface thereof is concave. The fourth lens 4016 has a positive refractive power, and an object-side surface thereof is convex and an image-side surface thereof is concave. The fifth lens 5016 has a positive refractive power, and an object-side surface thereof is concave and an image-side surface thereof is convex. The sixth lens 6016 has a positive refractive power, and an object-side surface thereof is convex and an image-side surface thereof is convex. In addition, at least one inflection point is formed on either one or both of the object-side surface and the image-side surface of the sixth lens 6016. The seventh lens 7016 has a negative refractive power, and an object-side surface thereof is concave and an image-side surface thereof is concave. In addition, no inflection point is formed on the object-side surface of the seventh lens 7016, and one inflection point is formed on the image-side surface of the seventh lens 7016.

The optical imaging system 16 further includes a stop, a filter 8016, and an image sensor 9016. The stop is disposed between the first lens 1016 and the second lens 2016 to adjust an amount of light incident on the image sensor 9016. The filter 8016 is disposed between the seventh lens 7016 and the image sensor 9016 to block infrared rays. The image sensor 9016 forms an imaging plane on which an image of a subject is formed. Although not illustrated in FIG. 31, the stop is disposed at a distance of 0.6409 mm from the object-side surface of the first lens 1016 toward the imaging plane of the optical imaging system 16. This distance is equal to TTL-SL and can be calculated from the values of TTL and SL for Example 16 listed in Table 57 that appears later in this application.

Table 31 below shows physical properties of the lenses and other elements of the optical imaging system of FIG. 31, and Table 32 below shows aspherical surface coefficients of the lenses of FIG. 31.

TABLE 31

| Surface No. | Element | Radius of Curvature | Thickness/ Distance | Index of Refraction | Abbe Number | Effective Aperture Radius |
|---|---|---|---|---|---|---|
| S1 | First | 1.7977 | 0.6409 | 1.544 | 56.114 | 1.270 |
| S2 | Lens (Stop) | 3.7422 | 0.1191 | | | 1.211 |
| S3 | Second | 3.0573 | 0.2200 | 1.661 | 20.353 | 1.190 |
| S4 | Lens | 2.7951 | 0.3931 | | | 1.130 |
| S5 | Third | 10.6215 | 0.4640 | 1.544 | 56.114 | 1.153 |
| S6 | Lens | 9.0266 | 0.1000 | | | 1.289 |
| S7 | Fourth | 7.9876 | 0.3621 | 1.544 | 56.114 | 1.328 |
| S8 | Lens | 138.7678 | 0.2334 | | | 1.454 |
| S9 | Fifth | −4.1765 | 0.2198 | 1.661 | 20.353 | 1.518 |
| S10 | Lens | −4.1394 | 0.1000 | | | 1.656 |
| S11 | Sixth | 4.6134 | 0.6089 | 1.544 | 56.114 | 2.000 |
| S12 | Lens | −3.5921 | 0.4726 | | | 2.038 |
| S13 | Seventh | −7.0016 | 0.3200 | 1.544 | 56.114 | 2.049 |
| S14 | Lens | 1.6938 | 0.1107 | | | 2.685 |
| S15 | Filter | Infinity | 0.2100 | | | 2.942 |
| S16 | | Infinity | 0.5300 | | | 3.008 |
| S17 | Imaging Plane | Infinity | 0.0200 | | | 3.292 |

TABLE 32

| | K | A | B | C | D | E | F | G | H | J |
|---|---|---|---|---|---|---|---|---|---|---|
| S1 | −0.812 | 0.0136 | 0.0311 | −0.0769 | 0.1226 | −0.1099 | 0.0531 | −0.0116 | 0.0005 | 0 |
| S2 | −6.6917 | −0.0631 | 0.0174 | 0.0714 | −0.1648 | 0.1763 | −0.1086 | 0.0376 | −0.0059 | 0 |
| S3 | −14.579 | −0.0707 | 0.0068 | 0.1319 | −0.2129 | 0.173 | −0.0715 | 0.0127 | −0.0005 | 0 |
| S4 | −0.188 | −0.0614 | −0.0138 | 0.3338 | −0.7392 | 0.9251 | −0.6781 | 0.276 | −0.0477 | 0 |
| S5 | 0 | −0.0572 | 0.0435 | −0.1733 | 0.2724 | −0.2421 | 0.0931 | −0.0042 | −0.0038 | 0 |
| S6 | 0 | −0.1356 | −0.0309 | 0.2183 | −0.5547 | 0.6931 | −0.486 | 0.1856 | −0.0304 | 0 |
| S7 | 30.023 | −0.2107 | 0.0007 | 0.1568 | −0.2854 | 0.2586 | −0.1154 | 0.0236 | −0.0019 | 0 |
| S8 | −99 | −0.1858 | −0.0192 | 0.2616 | −0.4111 | 0.3392 | −0.1538 | 0.0357 | −0.0033 | 0 |
| S9 | −98.995 | −0.2935 | 0.5043 | −0.5157 | 0.2657 | −0.0658 | 0.0056 | 0.0005 | −8E−05 | 0 |
| S10 | −0.0701 | −0.0775 | 0.2223 | −0.2703 | 0.1529 | −0.0452 | 0.0073 | −0.0006 | 2E−05 | 0 |
| S11 | −97.878 | 0.1479 | −0.1956 | 0.1288 | −0.0598 | 0.0172 | −0.0028 | 0.0002 | −8E−06 | 0 |
| S12 | 1.4166 | 0.1234 | −0.1416 | 0.087 | −0.0341 | 0.0088 | −0.0014 | 0.0001 | −4E−06 | 0 |
| S13 | 9.5503 | −0.2864 | 0.1096 | 0.0149 | −0.0214 | 0.0064 | −0.0009 | 6E−05 | −2E−06 | 0 |
| S14 | −1.2786 | −0.3076 | 0.1777 | −0.0626 | 0.0143 | −0.0022 | 0.0002 | −1E−05 | 5E−07 | −7E−09 |

Seventeenth Example

Figure 33:
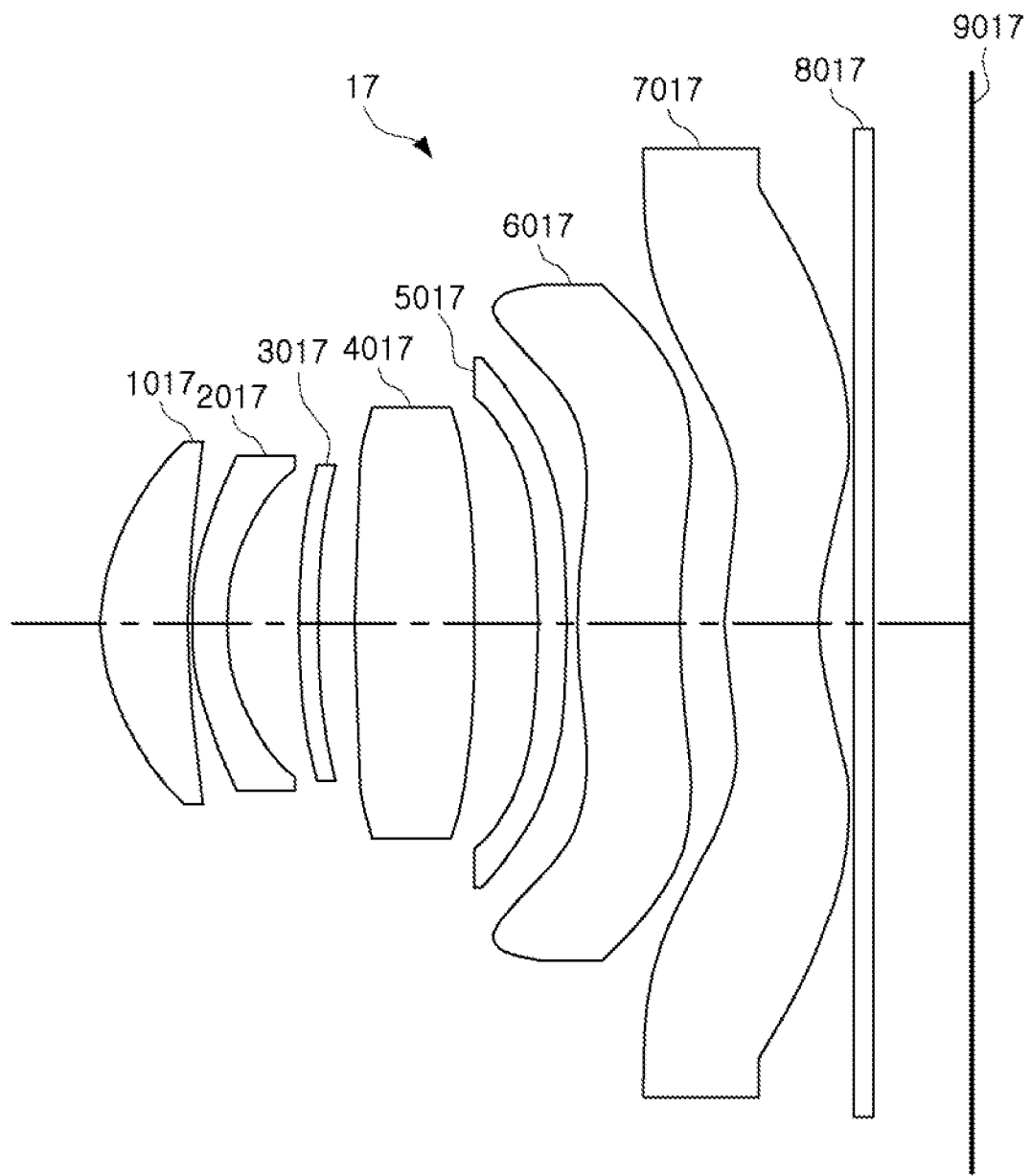
FIG. 33 is a view illustrating a seventeenth example of an optical imaging system.
Figure 34:
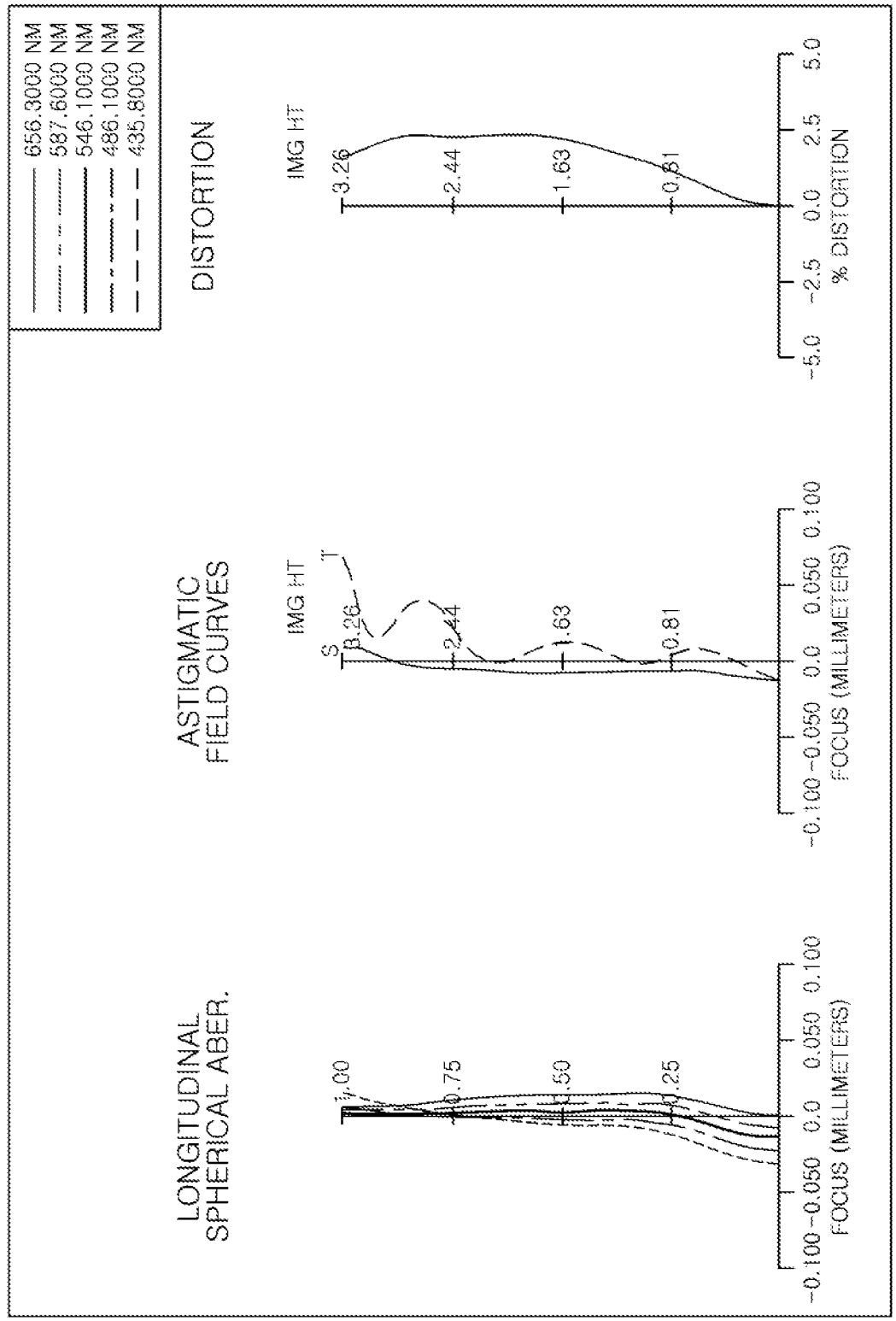
FIG. 34 illustrates aberration curves of the optical imaging system of FIG. 33.

FIG. 33 is a view illustrating a seventeenth example of an optical imaging system, and FIG. 34 illustrates aberration curves of the optical imaging system of FIG. 33.

An optical imaging system 17 includes a first lens 1017, a second lens 2017, a third lens 3017, a fourth lens 4017, a fifth lens 5017, a sixth lens 6017, and a seventh lens 7017.

The first lens 1017 has a positive refractive power, and an object-side surface thereof is convex and an image-side surface thereof is concave. The second lens 2017 has a negative refractive power, and an object-side surface thereof is convex and an image-side surface thereof is concave. The third lens 3017 has a negative refractive power, and an object-side surface thereof is convex and an image-side surface thereof is concave. The fourth lens 4017 has a positive refractive power, and an object-side surface thereof is convex and an image-side surface thereof is convex. The fifth lens 5017 has a negative refractive power, and an object-side surface thereof is concave and an image-side surface thereof is convex. The sixth lens 6017 has a negative refractive power, and an object-side surface thereof is convex and an image-side surface thereof is concave. In addition, at least one inflection point is formed on either one or both of the object-side surface and the image-side surface of the sixth lens 6017. The seventh lens 7017 has a negative refractive power, and an object-side surface thereof is convex and an image-side surface thereof is concave. In addition, one inflection point is formed on each of the object-side surface and the image-side surface of the seventh lens 7017.

The optical imaging system 17 further includes a stop, a filter 8017, and an image sensor 9017. The stop is disposed between the second lens 2017 and the third lens 3017 to adjust an amount of light incident on the image sensor 9017. The filter 8017 is disposed between the seventh lens 7017 and the image sensor 9017 to block infrared rays. The image sensor 9017 forms an imaging plane on which an image of a subject is formed. Although not illustrated in FIG. 33, the stop is disposed at a distance of 0.6811 mm from the object-side surface of the first lens 1017 toward the imaging plane of the optical imaging system 17. This distance is equal to TTL-SL and can be calculated from the values of TTL and SL for Example 17 listed in Table 57 that appears later in this application.

Table 33 below shows physical properties of the lenses and other elements of the optical imaging system of FIG. 33, and Table 34 below shows aspherical surface coefficients of the lenses of FIG. 33.

TABLE 33

| Surface No. | Element | Radius of Curvature | Thickness/ Distance | Index of Refraction | Abbe Number | Effective Aperture Radius |
|---|---|---|---|---|---|---|
| S1 | First | 1.5114 | 0.4703 | 1.547 | 56.114 | 1.072 |
| S2 | Lens | 6.0961 | 0.0200 | | | 1.048 |
| S3 | Second | 1.7572 | 0.1895 | 1.660 | 20.400 | 0.992 |
| S4 | Lens (Stop) | 1.2936 | 0.3871 | | | 0.909 |
| S5 | Third | 3.5767 | 0.1000 | 1.660 | 20.400 | 0.903 |
| S6 | Lens | 3.3323 | 0.2006 | | | 0.933 |
| S7 | Fourth | 8.9505 | 0.6399 | 1.547 | 56.114 | 1.084 |
| S8 | Lens | −56.3031 | 0.3491 | | | 1.273 |
| S9 | Fifth | −8.7735 | 0.1490 | 1.650 | 21.494 | 1.334 |
| S10 | Lens | −11.1487 | 0.0575 | | | 1.573 |
| S11 | Sixth | 4.0153 | 0.5539 | 1.650 | 21.494 | 1.601 |
| S12 | Lens | 3.7824 | 0.2451 | | | 1.999 |
| S13 | Seventh | 1.9199 | 0.5114 | 1.537 | 55.711 | 2.819 |

TABLE 33-continued

| Surface No. | Element | Radius of Curvature | Thickness/ Distance | Index of Refraction | Abbe Number | Effective Aperture Radius |
|---|---|---|---|---|---|---|
| S14 | Lens | 1.4533 | 0.1829 | | | 2.581 |
| S15 | Filter | Infinity | 0.1100 | | | 2.895 |
| S16 | | Infinity | 0.5173 | | | 2.935 |
| S17 | Imaging Plane | Infinity | 0.0150 | | | 3.262 |

TABLE 34

| | K | A | B | C | D | E | F | G | H | J |
|---|---|---|---|---|---|---|---|---|---|---|
| S1 | −0.0872 | 0.0085 | 0.0157 | −0.0318 | 0.0507 | −0.0457 | 0.0214 | −0.0042 | 0 | 0 |
| S2 | 25.924 | −0.1035 | 0.4079 | −0.9853 | 1.3538 | −1.1103 | 0.5053 | −0.1003 | 0 | 0 |
| S3 | −2.0252 | −0.1329 | 0.5024 | −1.13 | 1.5305 | −1.218 | 0.5394 | −0.1043 | 0 | 0 |
| S4 | −0.1481 | −0.094 | 0.1762 | −0.1747 | −0.0182 | 0.4162 | −0.4298 | 0.1625 | 0 | 0 |
| S5 | 0.829 | −0.1421 | 0.1795 | −0.2535 | 0.4392 | −0.4879 | 0.3327 | −0.0954 | 0 | 0 |
| S6 | 6.8952 | −0.1777 | 0.1545 | −0.1149 | 0.1034 | −0.051 | 0.0095 | −0.0002 | 0 | 0 |
| S7 | 21.918 | −0.0605 | 0.0485 | −0.0459 | 0.0715 | −0.0485 | 0.0135 | −0.0013 | 0 | 0 |
| S8 | 25.736 | −0.0682 | 0.0239 | −0.012 | 0.0083 | −0.0027 | 0.0004 | −2E−05 | 0 | 0 |
| S9 | 1.6857 | −0.1292 | 0.2433 | −0.407 | 0.387 | −0.2241 | 0.0741 | −0.011 | 0 | 0 |
| S10 | 43.884 | −0.107 | 0.1148 | −0.1454 | 0.095 | −0.0303 | 0.0045 | −0.0003 | 0 | 0 |
| S11 | −52.836 | 0.0701 | −0.2199 | 0.2058 | −0.1343 | 0.0526 | −0.0106 | 0.0009 | 0 | 0 |
| S12 | 0 | −0.0577 | −0.027 | 0.0237 | −0.0104 | 0.0019 | 0.0002 | −0.0001 | 2E−05 | −6E−07 |
| S13 | −0.9427 | −0.3217 | 0.0977 | −0.0029 | −0.0058 | 0.0017 | −0.0002 | 2E−05 | −4E−07 | 0 |
| S14 | −1.0048 | −0.2798 | 0.1282 | −0.0461 | 0.0122 | −0.0022 | 0.0002 | −1E−05 | 4E−07 | 0 |

Eighteenth Example

Figure 35:
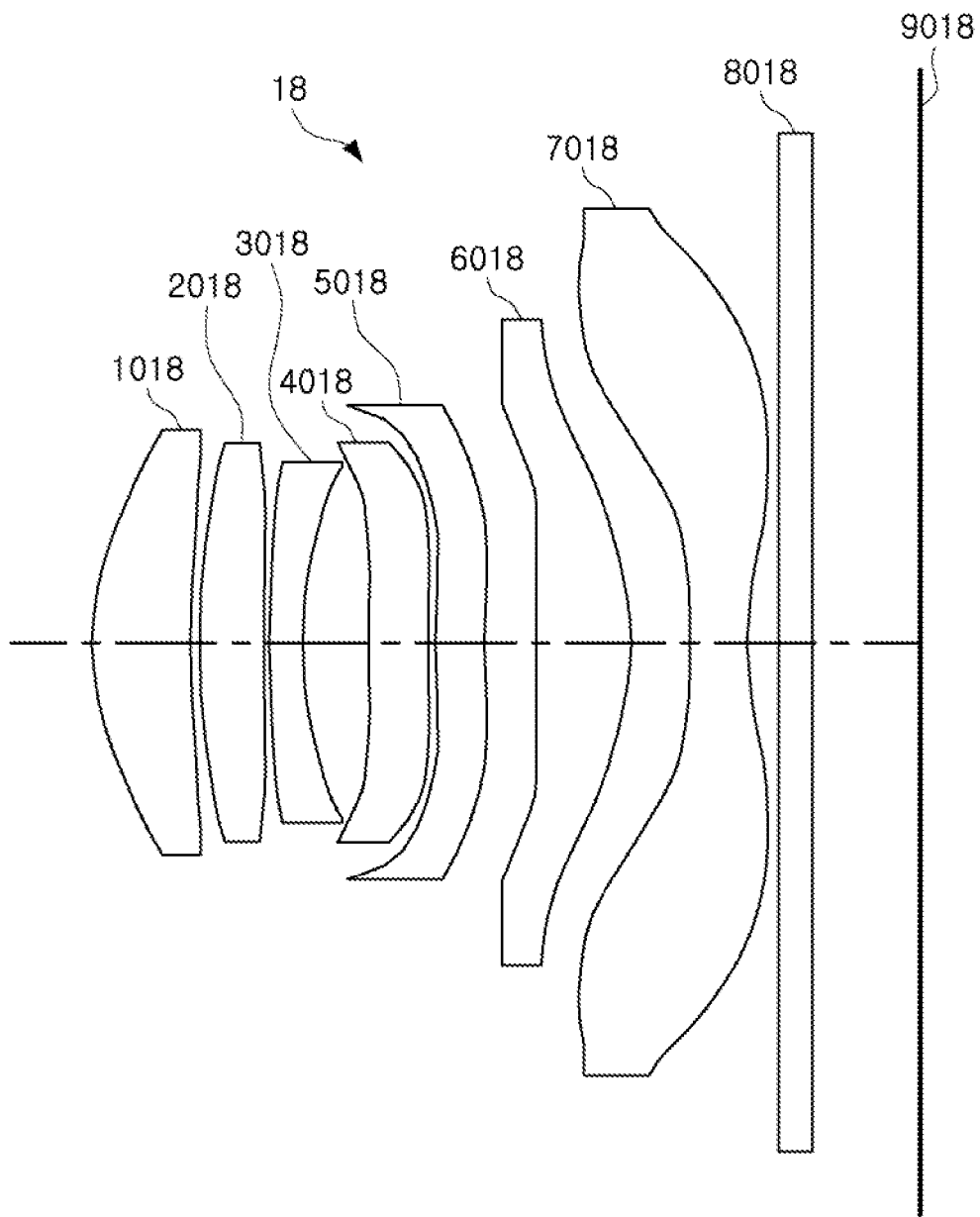
FIG. 35 is a view illustrating an eighteenth example of an optical imaging system.
Figure 36:
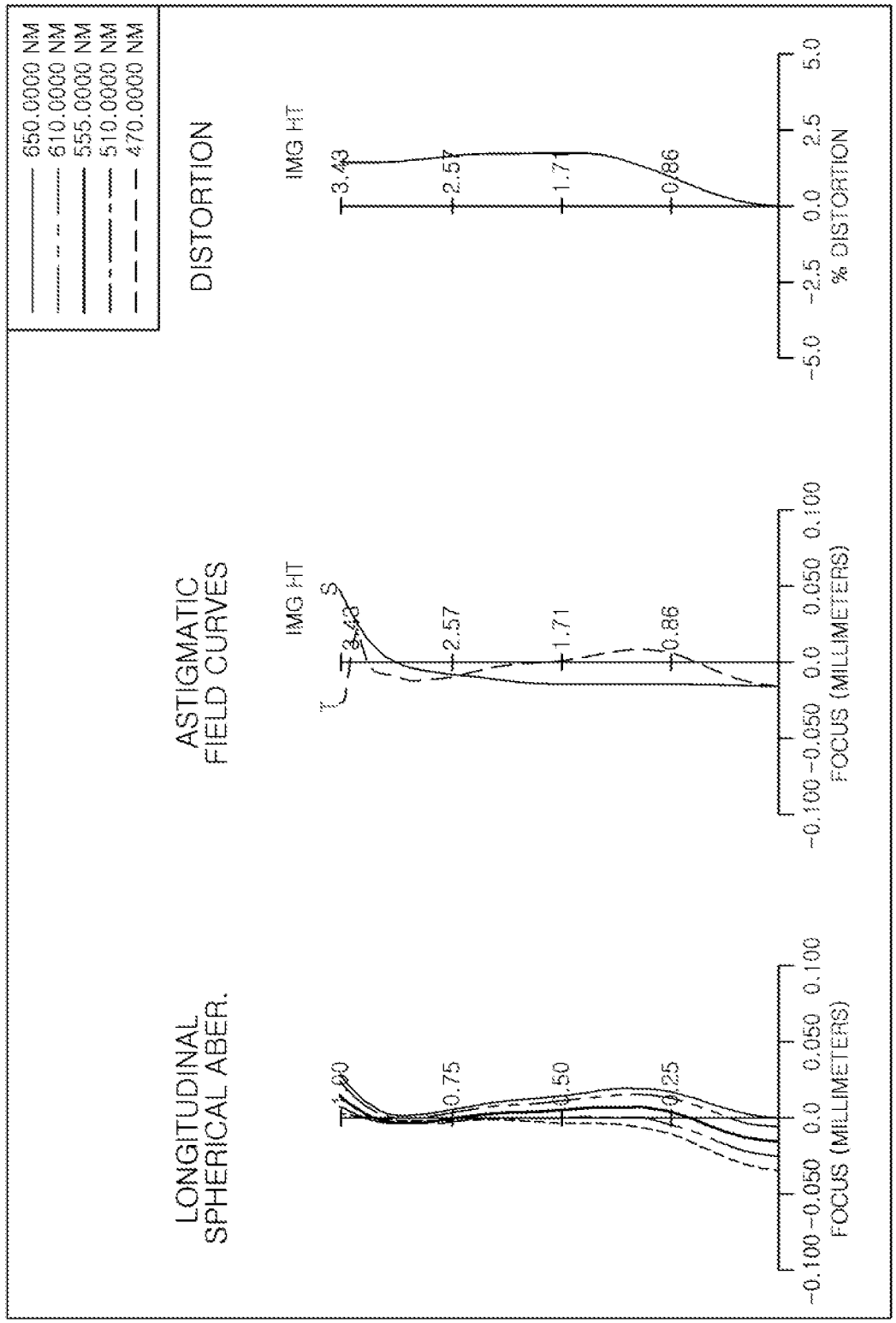
FIG. 36 illustrates aberration curves of the optical imaging system of FIG. 35.

FIG. 35 is a view illustrating an eighteenth example of an optical imaging system, and FIG. 36 illustrates aberration curves of the optical imaging system of FIG. 35.

An optical imaging system 18 includes a first lens 1018, a second lens 2018, a third lens 3018, a fourth lens 4018, a fifth lens 5018, a sixth lens 6018, and a seventh lens 7018.

The first lens 1018 has a positive refractive power, and an object-side surface thereof is convex and an image-side surface thereof is concave. The second lens 2018 has a positive refractive power, and an object-side surface thereof is convex and an image-side surface thereof is concave. The third lens 3018 has a negative refractive power, and an object-side surface thereof is convex and an image-side surface thereof is concave. The fourth lens 4018 has a negative refractive power, and an object-side surface thereof is convex and an image-side surface thereof is concave. The fifth lens 5018 has a positive refractive power, and an object-side surface thereof is convex and an image-side surface thereof is concave. The sixth lens 6018 has a positive refractive power, and an object-side surface thereof is convex and an image-side surface thereof is convex. In addition, at least one inflection point is formed on either one or both of the object-side surface and the image-side surface of the sixth lens 6018. The seventh lens 7018 has a negative refractive power, and an object-side surface thereof is concave and an image-side surface thereof is concave. In addition, one inflection point is formed on each of the object-side surface and the image-side surface of the seventh lens 7018.

The optical imaging system 18 further includes a stop, a filter 8018, and an image sensor 9018. The stop is disposed between the second lens 2018 and the third lens 3018 to adjust an amount of light incident on the image sensor 9018. The filter 8018 is disposed between the seventh lens 7018 and the image sensor 9018 to block infrared rays. The image sensor 9018 forms an imaging plane on which an image of a subject is formed. Although not illustrated in FIG. 35, the stop is disposed at a distance of 1.0512 mm from the object-side surface of the first lens 1018 toward the imaging plane of the optical imaging system 18. This distance is equal to TTL-SL and can be calculated from the values of TTL and SL for Example 18 listed in Table 57 that appears later in this application.

Table 35 below shows physical properties of the lenses and other elements of the optical imaging system of FIG. 35, and Table 36 below shows aspherical surface coefficients of the lenses of FIG. 35.

TABLE 35

| Surface No. | Element | Radius of Curvature | Thickness/ Distance | Index of Refraction | Abbe Number | Effective Aperture Radius |
|---|---|---|---|---|---|---|
| S1 | First | 1.8221 | 0.5822 | 1.544 | 56.114 | 1.275 |
| S2 | Lens | 4.8276 | 0.0564 | | | 1.231 |
| S3 | Second | 4.5461 | 0.3826 | 1.544 | 56.114 | 1.199 |
| S4 | Lens | 15.5127 | 0.0300 | | | 1.152 |
| S5 | (Stop) | 3.9113 | 0.2000 | 1.661 | 20.350 | 1.086 |
| S6 | Third Lens | 2.2301 | 0.3911 | | | 1.050 |
| S7 | Fourth | 14.8039 | 0.3510 | 1.544 | 56.114 | 1.050 |
| S8 | Lens | 6.0045 | 0.0516 | | | 1.178 |
| S9 | Fifth | 4.0426 | 0.2943 | 1.639 | 21.525 | 1.235 |
| S10 | Lens | 6.0069 | 0.3029 | | | 1.433 |
| S11 | Sixth | 50.3009 | 0.5717 | 1.544 | 56.114 | 1.650 |
| S12 | Lens | −1.4551 | 0.3562 | | | 2.029 |
| S13 | Seventh | −3.9227 | 0.3400 | 1.544 | 56.114 | 2.473 |
| S14 | Lens | 1.8149 | 0.1800 | | | 2.629 |
| S15 | Filter | Infinity | 0.2100 | 1.518 | 64.197 | |
| S16 | | Infinity | 0.6200 | | | |
| S17 | Imaging Plane | Infinity | 0.0200 | | | |

TABLE 36

| | K | A | B | C | D | E | F | G | H |
|---|---|---|---|---|---|---|---|---|---|
| S1 | −1.7971 | 0.02 | 0.0153 | −0.0575 | 0.0794 | −0.0689 | 0.0296 | −0.0048 | 0 |
| S2 | 0 | −0.0249 | −0.1102 | 0.1727 | −0.1632 | 0.1101 | −0.0441 | 0.0076 | 0 |
| S3 | 0 | 0.0215 | −0.1293 | 0.2068 | −0.2278 | 0.2 | −0.1022 | 0.0204 | 0 |
| S4 | 72.117 | −0.0714 | 0.2664 | −0.6184 | 0.7522 | −0.5313 | 0.203 | −0.0324 | 0 |
| S5 | −15.337 | −0.2046 | 0.4728 | −0.8108 | 0.9542 | −0.6926 | 0.2852 | −0.0496 | 0 |
| S6 | −5.3786 | −0.102 | 0.2031 | −0.1151 | −0.1096 | 0.3352 | −0.285 | 0.0916 | 0 |
| S7 | 0 | −0.0443 | −0.0061 | −0.1088 | 0.0952 | −0.0067 | −0.0694 | 0.0382 | 0 |
| S8 | 0 | −0.1919 | 0.079 | 0.0071 | −0.1552 | 0.1775 | −0.0954 | 0.0212 | 0 |
| S9 | −54.709 | −0.2046 | −0.0908 | 0.3474 | −0.3213 | 0.1526 | −0.0388 | 0.0033 | 0 |
| S10 | 0 | −0.1486 | −0.156 | 0.3054 | −0.2298 | 0.1087 | −0.0342 | 0.0052 | 0 |
| S11 | 0 | 0.0817 | −0.1186 | −0.0496 | 0.1291 | −0.0835 | 0.0241 | −0.0026 | 0 |
| S12 | −1.7559 | 0.2122 | −0.171 | 0.0184 | 0.0388 | −0.0196 | 0.0037 | −0.0003 | 0 |
| S13 | −4.6993 | 0.0063 | −0.2121 | 0.1837 | −0.071 | 0.0154 | −0.0019 | 0.0001 | −4E−06 |
| S14 | −1.1263 | −0.2142 | 0.0916 | −0.0298 | 0.0072 | −0.0012 | 0.0001 | −9E−06 | 3E−07 |

Nineteenth Example

Figure 37:
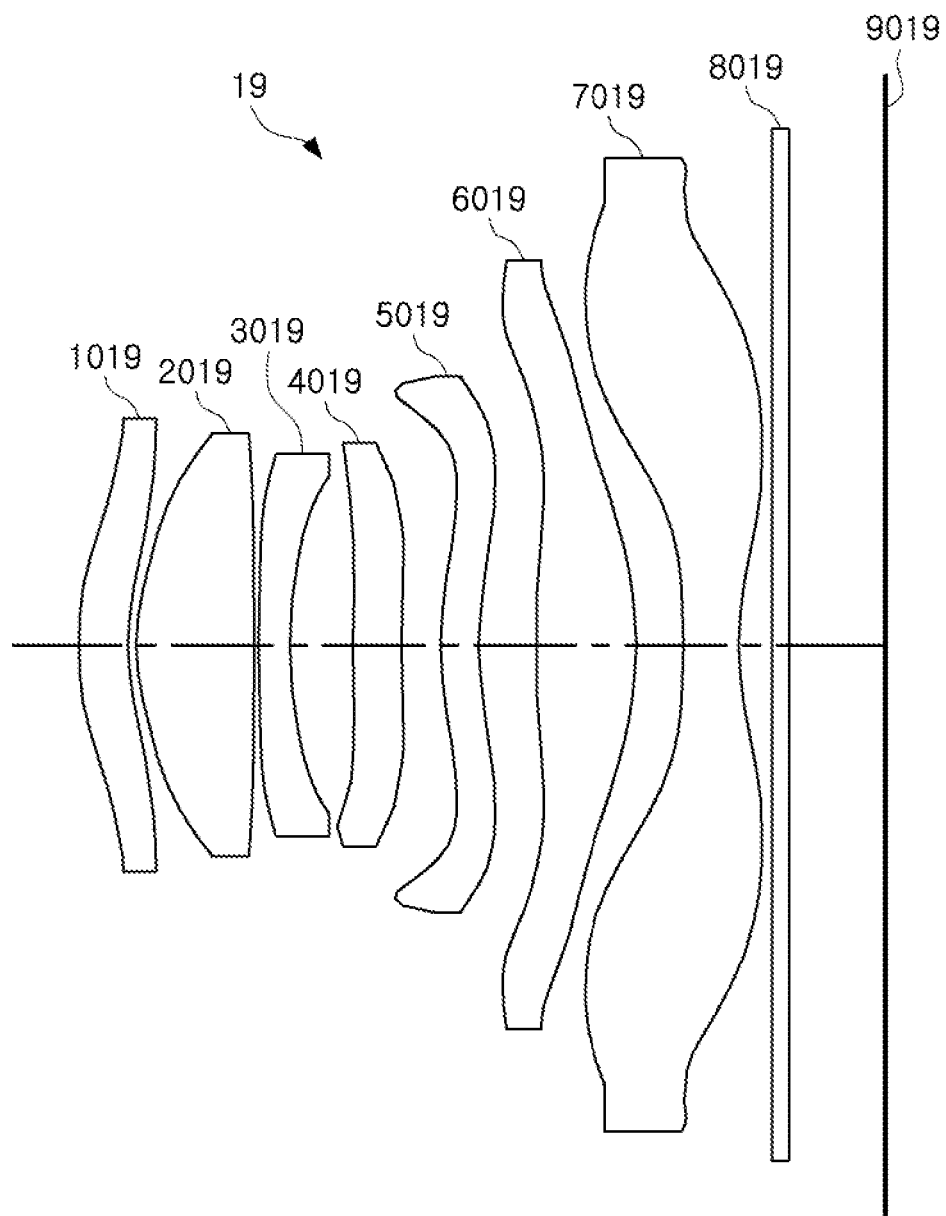
FIG. 37 is a view illustrating a nineteenth example of an optical imaging system.
Figure 38:
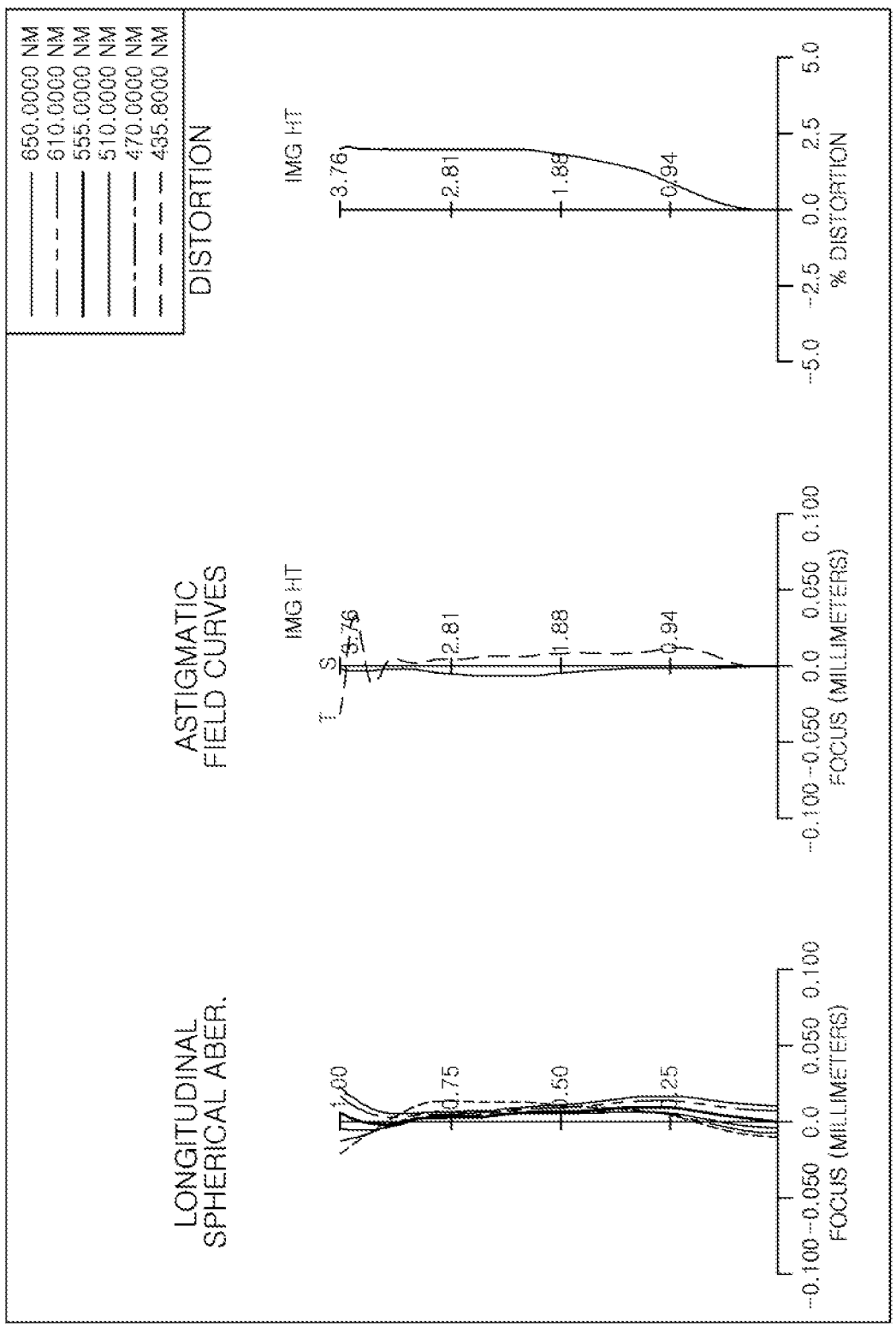
FIG. 38 illustrates aberration curves of the optical imaging system of FIG. 37.

FIG. 37 is a view illustrating a nineteenth example of an optical imaging system, and FIG. 38 illustrates aberration curves of the optical imaging system of FIG. 37.

An optical imaging system 19 includes a first lens 1019, a second lens 2019, a third lens 3019, a fourth lens 4019, a fifth lens 5019, a sixth lens 6019, and a seventh lens 7019.

The first lens 1019 has a negative refractive power, and an object-side surface thereof is convex and an image-side surface thereof is concave. The second lens 2019 has a positive refractive power, and an object-side surface thereof is convex and an image-side surface thereof is concave. The third lens 3019 has a negative refractive power, and an object-side surface thereof is convex and an image-side surface thereof is concave. The fourth lens 4019 has a negative refractive power, and an object-side surface thereof is convex and an image-side surface thereof is concave. The fifth lens 5019 has a positive refractive power, and an object-side surface thereof is convex and an image-side surface thereof is concave. The sixth lens 6019 has a positive refractive power, and an object-side surface thereof is convex and an image-side surface thereof is convex. In addition, at least one inflection point is formed on either one or both of the object-side surface and the image-side surface of the sixth lens 6019. The seventh lens 7019 has a negative refractive power, and an object-side surface thereof is concave and an image-side surface thereof is concave. In addition, one inflection point is formed on the object-side surface of the seventh lens 7019, and two inflection points are formed on the image-side surface of the seventh lens 7019.

The optical imaging system 19 further includes a stop, a filter 8019, and an image sensor 9019. The stop is disposed between the first lens 1019 and the second lens 2019 to adjust an amount of light incident on the image sensor 9019. The filter 8019 is disposed between the seventh lens 7019 and the image sensor 9019 to block infrared rays. The image sensor 9019 forms an imaging plane on which an image of a subject is formed. Although not illustrated in FIG. 37, the stop is disposed at a distance of 0.3740 mm from the object-side surface of the first lens 1019 toward the imaging plane of the optical imaging system 19. This distance is equal to TTL-SL and can be calculated from the values of TTL and SL for Example 19 listed in Table 57 that appears later in this application.

Table 37 below shows physical properties of the lenses and other elements of the optical imaging system of FIG. 37, and Table 38 below shows aspherical surface coefficients of the lenses of FIG. 37.

TABLE 37

| Surface No. | Element | Radius of Curvature | Thickness/ Distance | Index of Refraction | Abbe Number | Effective Aperture Radius |
|---|---|---|---|---|---|---|
| S1 | First | 2.1873 | 0.3243 | 1.546 | 56.114 | 1.450 |
| S2 | Lens | 1.8391 | 0.0497 | | | 1.441 |

TABLE 37-continued

| Surface No. | Element | Radius of Curvature | Thickness/ Distance | Index of Refraction | Abbe Number | Effective Aperture Radius |
|---|---|---|---|---|---|---|
| S3 | (Stop) | 1.6361 | 0.7740 | 1.546 | 56.114 | 1.415 |
| S4 | Second Lens | 30.6063 | 0.0300 | | | 1.354 |
| S5 | Third | 7.2628 | 0.2100 | 1.678 | 19.236 | 1.270 |
| S6 | Lens | 2.9652 | 0.4149 | | | 1.120 |
| S7 | Fourth | 14.3312 | 0.3269 | 1.645 | 23.528 | 1.182 |
| S8 | Lens | 12.1292 | 0.2502 | | | 1.337 |
| S9 | Fifth | 2.1804 | 0.2500 | 1.645 | 23.528 | 1.580 |
| S10 | Lens | 2.1733 | 0.3831 | | | 1.892 |
| S11 | Sixth | 8.6678 | 0.6610 | 1.546 | 56.114 | 2.429 |
| S12 | Lens | −1.9375 | 0.3110 | | | 2.544 |
| S13 | Seventh | −7.6533 | 0.3650 | 1.546 | 56.114 | 2.916 |
| S14 | Lens | 1.6261 | 0.2200 | | | 3.075 |
| S15 | Filter | Infinity | 0.1100 | 1.518 | 64.166 | 3.378 |
| S16 | | Infinity | 0.6351 | | | 3.414 |
| S17 | Imaging Plane | Infinity | 0.0049 | | | 3.763 |

TABLE 38

| | K | A | B | C | D | E | F | G | H |
|---|---|---|---|---|---|---|---|---|---|
| S1 | −3.7488 | 0.0012 | −0.0066 | −0.0004 | −0.0198 | 0.0252 | −0.0132 | 0.0034 | −0.0004 |
| S2 | −7.1577 | −0.061 | −0.0104 | 0.0163 | 0.0115 | −0.0163 | 0.0063 | −0.0009 | 0 |
| S3 | −2.6408 | −0.0742 | 0.0698 | −0.0582 | 0.0727 | −0.0412 | 0.0034 | 0.0048 | −0.0013 |
| S4 | −99 | −0.0752 | 0.197 | −0.3925 | 0.5174 | −0.4377 | 0.2286 | −0.0663 | 0.008 |
| S5 | 0 | −0.1076 | 0.2644 | −0.4642 | 0.6109 | −0.5485 | 0.3128 | −0.0997 | 0.0134 |
| S6 | 4.364 | −0.0584 | 0.0882 | −0.068 | −0.0405 | 0.1629 | −0.1817 | 0.0962 | −0.0201 |
| S7 | 0 | −0.0603 | 0.0743 | −0.2389 | 0.4197 | −0.4882 | 0.353 | −0.1472 | 0.0274 |
| S8 | 0 | −0.1174 | 0.165 | −0.2983 | 0.348 | −0.2864 | 0.1556 | −0.0507 | 0.0077 |
| S9 | −15.429 | −0.0562 | 0.0005 | 0.0397 | −0.0576 | 0.0355 | −0.0117 | 0.0015 | 3E−05 |
| S10 | −9.1654 | −0.1003 | 0.0623 | −0.0379 | 0.0141 | −0.0032 | 5E−05 | 0.0002 | −3E−05 |
| S11 | 0 | −0.001 | −0.0216 | 0.0157 | −0.0111 | 0.0043 | −0.0009 | 8E−05 | −3E−06 |
| S12 | −1.7327 | 0.1074 | −0.0935 | 0.0649 | −0.0289 | 0.0078 | −0.0012 | 0.0001 | −4E−06 |
| S13 | 0.6082 | −0.1509 | 0.0462 | 0.0036 | −0.0043 | 0.001 | −0.0001 | 6E−06 | −2E−07 |
| S14 | −8.5925 | −0.0951 | 0.041 | −0.0124 | 0.0026 | −0.0004 | 4E−05 | −2E−06 | 4E−08 |

Twentieth Example

Figure 39:
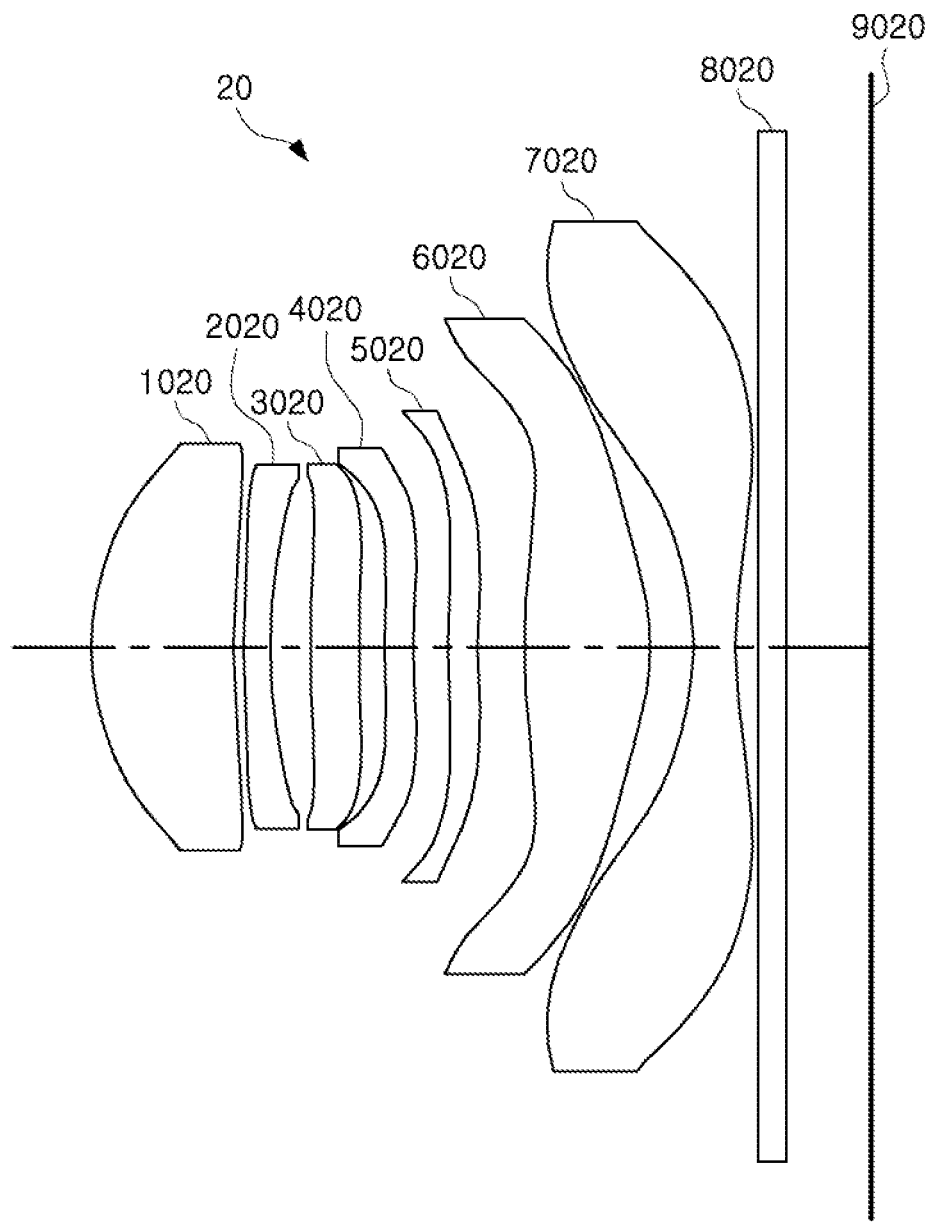
FIG. 39 is a view illustrating a twentieth example of an optical imaging system.
Figure 40:
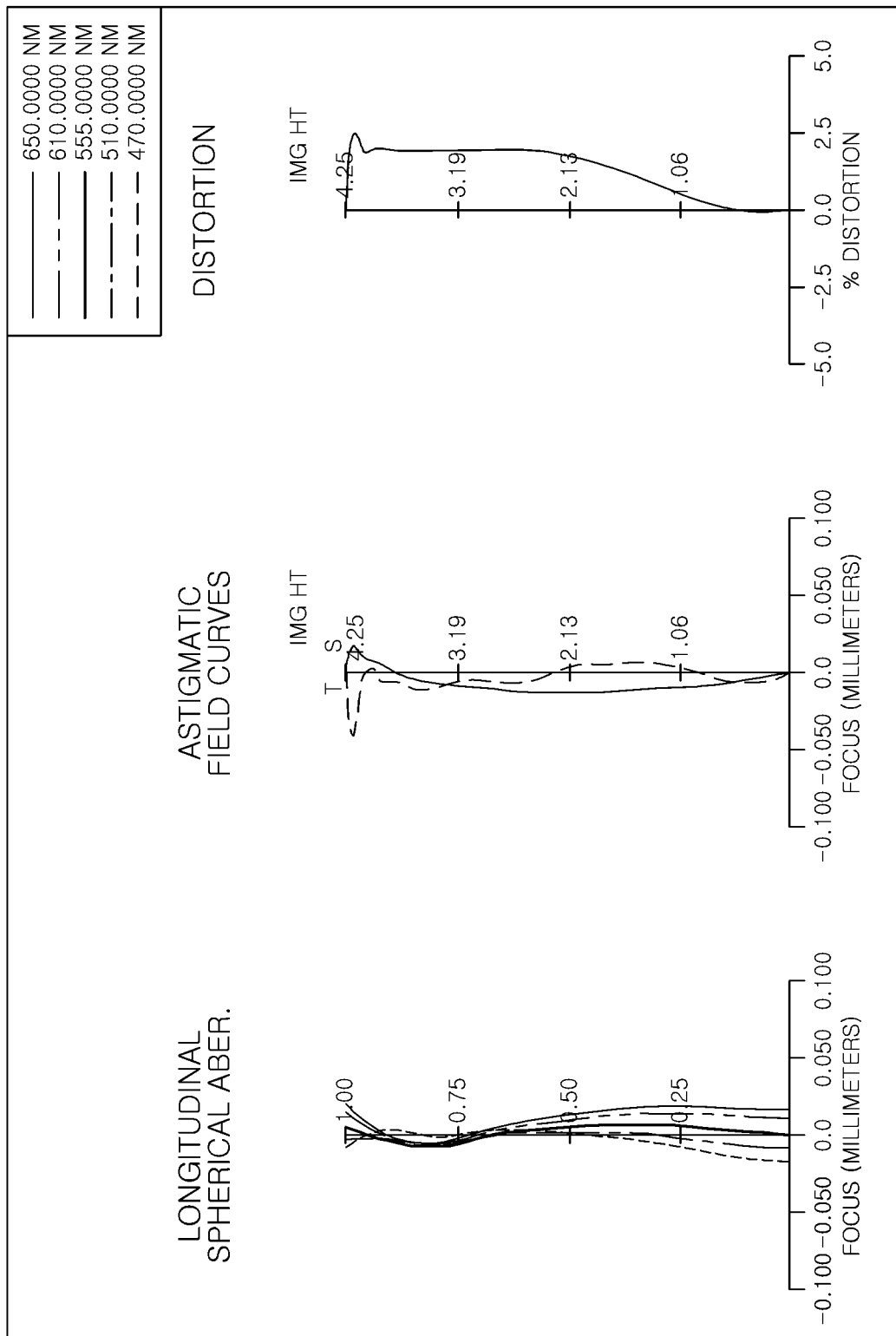
FIG. 40 illustrates aberration curves of the optical imaging system of FIG. 39.

FIG. 39 is a view illustrating a twentieth example of an optical imaging system, and FIG. 40 illustrates aberration curves of the optical imaging system of FIG. 39.

An optical imaging system 20 includes a first lens 1020, a second lens 2020, a third lens 3020, a fourth lens 4020, a fifth lens 5020, a sixth lens 6020, and a seventh lens 7020.

The first lens 1020 has a positive refractive power, and an object-side surface thereof is convex and an image-side surface thereof is concave. The second lens 2020 has a negative refractive power, and an object-side surface thereof is convex and an image-side surface thereof is concave. The third lens 3020 has a positive refractive power, and an object-side surface thereof is convex and an image-side surface thereof is concave. The fourth lens 4020 has a negative refractive power, and an object-side surface thereof is convex and an image-side surface thereof is concave. The fifth lens 5020 has a negative refractive power, and an object-side surface thereof is convex and an image-side surface thereof is concave. The sixth lens 6020 has a positive refractive power, and an object-side surface thereof is convex and an image-side surface thereof is convex. In addition, at least one inflection point is formed on either one or both of the object-side surface and the image-side surface of the sixth lens 6020. The seventh lens 7020 has a negative refractive power, and an object-side surface thereof is concave and an image-side surface thereof is concave. In addition, one inflection point is formed on the object-side surface of the seventh lens 7020, and two inflection points are formed on the image-side surface of the seventh lens 7020.

The optical imaging system 20 further includes a stop, a filter 8020, and an image sensor 9020. The stop is disposed between the first lens 1020 and the second lens 2020 to adjust an amount of light incident on the image sensor 9020. The filter 8020 is disposed between the seventh lens 7020 and the image sensor 9020 to block infrared rays. The image sensor 9020 forms an imaging plane on which an image of a subject is formed. Although not illustrated in FIG. 39, the stop is disposed at a distance of 1.0601 mm from the object-side surface of the first lens 1020 toward the imaging plane of the optical imaging system 20. This distance is equal to TTL-SL and can be calculated from the values of TTL and SL for Example 20 listed in Table 57 that appears later in this application.

Table 39 below shows physical properties of the lenses and other elements of the optical imaging system of FIG. 39, and Table 40 below shows aspherical surface coefficients of the lenses of FIG. 39.

TABLE 39

| Surface No. | Element | Radius of Curvature | Thickness/ Distance | Index of Refraction | Abbe Number | Effective Aperture Radius |
|---|---|---|---|---|---|---|
| S1 | First | 2.0122 | 1.0601 | 1.546 | 56.114 | 1.510 |
| S2 | Lens (Stop) | 5.8868 | 0.0711 | | | 1.375 |
| S3 | Second | 5.4922 | 0.2000 | 1.677 | 19.238 | 1.353 |
| S4 | Lens | 3.7029 | 0.2969 | | | 1.240 |
| S5 | Third | 9.9760 | 0.3703 | 1.546 | 56.114 | 1.270 |
| S6 | Lens | 29.4320 | 0.1826 | | | 1.356 |
| S7 | Fourth | 8.6841 | 0.2108 | 1.667 | 20.377 | 1.355 |
| S8 | Lens | 6.0112 | 0.2603 | | | 1.479 |
| S9 | Fifth | 5.7445 | 0.2195 | 1.619 | 25.960 | 1.750 |
| S10 | Lens | 5.0434 | 0.3482 | | | 1.736 |
| S11 | Sixth | 4.8476 | 0.9335 | 1.546 | 56.114 | 2.400 |
| S12 | Lens | −1.7967 | 0.3268 | | | 2.438 |
| S13 | Seventh | −1.9512 | 0.3000 | 1.546 | 56.114 | 2.692 |
| S14 | Lens | 2.8062 | 0.1700 | | | 3.158 |
| S15 | Filter | Infinity | 0.2100 | 1.518 | 64.197 | 3.744 |
| S16 | | Infinity | 0.6441 | | | 3.826 |
| S17 | Imaging Plane | Infinity | −0.0041 | | | 4.252 |

TABLE 40

|     | K       | A       | B       | C       | D       | E       | F       | G       | H       | J     |
|-----|---------|---------|---------|---------|---------|---------|---------|---------|---------|-------|
| S1  | −1.1332 | 0.0154  | 0.0091  | −0.0108 | 0.01    | −0.0053 | 0.0015  | −0.0002 | −1E−05  | 0     |
| S2  | 12.901  | −0.0771 | 0.0315  | 0.036   | −0.0911 | 0.0858  | −0.0454 | 0.0132  | −0.0016 | 0     |
| S3  | 9.6379  | −0.1255 | 0.0603  | 0.0962  | −0.2261 | 0.222   | −0.1214 | 0.036   | −0.0045 | 0     |
| S4  | −0.8719 | −0.061  | 0.0524  | 0.0027  | 0.0041  | −0.069  | 0.0931  | −0.0498 | 0.0101  | 0     |
| S5  | 0       | −0.0121 | 0.0151  | −0.088  | 0.1573  | −0.1697 | 0.1016  | −0.0315 | 0.004   | 0     |
| S6  | −99     | −0.0237 | −0.0073 | 0.0365  | −0.1182 | 0.1732  | −0.1421 | 0.0603  | −0.0104 | 0     |
| S7  | 0       | −0.104  | −0.0751 | 0.2741  | −0.5665 | 0.6635  | −0.4435 | 0.1557  | −0.0222 | 0     |
| S8  | 0       | −0.1088 | 0.0332  | −0.0258 | −0.0057 | 0.0249  | −0.0175 | 0.0048  | −0.0003 | 0     |
| S9  | 0       | −0.1824 | 0.192   | −0.1693 | 0.1022  | −0.0423 | 0.0117  | −0.002  | 0.0002  | 0     |
| S10 | −96.971 | −0.1318 | 0.0661  | −0.0223 | −0.0048 | 0.0087  | −0.0034 | 0.0006  | −4E−05  | 0     |
| S11 | −34.065 | −0.0075 | −0.0001 | −0.0106 | 0.0081  | −0.0035 | 0.0008  | −1E−04  | 4E−06   | 0     |
| S12 | −2.7443 | 0.1131  | −0.0726 | 0.0291  | −0.0078 | 0.0012  | −9E−05  | 1E−06   | 1E−07   | 0     |
| S13 | −10.221 | −0.0393 | −0.0198 | 0.0148  | −0.0036 | 0.0005  | −3E−05  | 1E−06   | −2E−08  | 0     |
| S14 | −1.2844 | −0.0938 | 0.0319  | −0.0092 | 0.002   | −0.0003 | 4E−05   | −3E−06  | 1E−07   | −3E−09 |

Twenty-First Example

Figure 41:
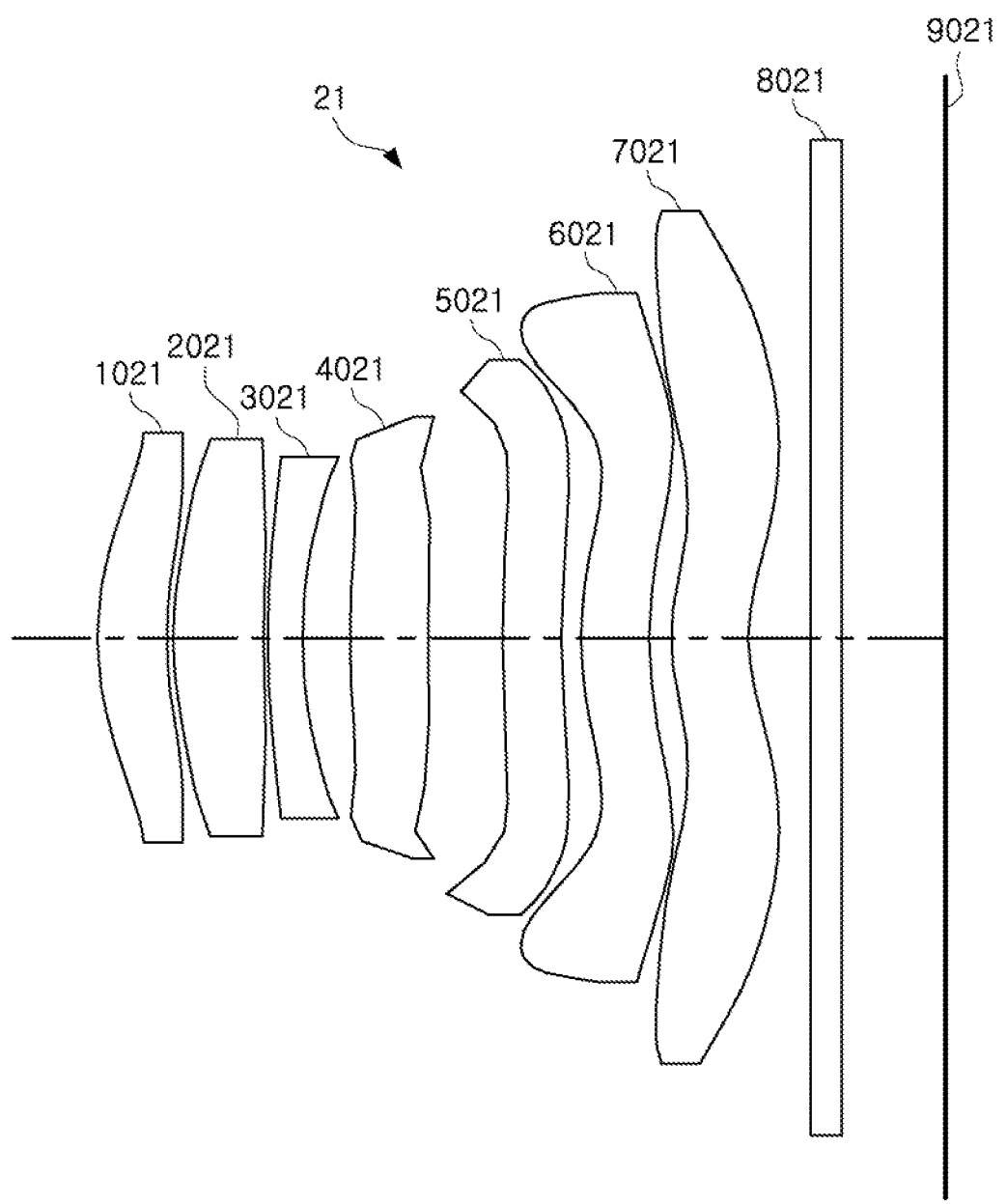
FIG. 41 is a view illustrating a twenty-first example of an optical imaging system.
Figure 42:
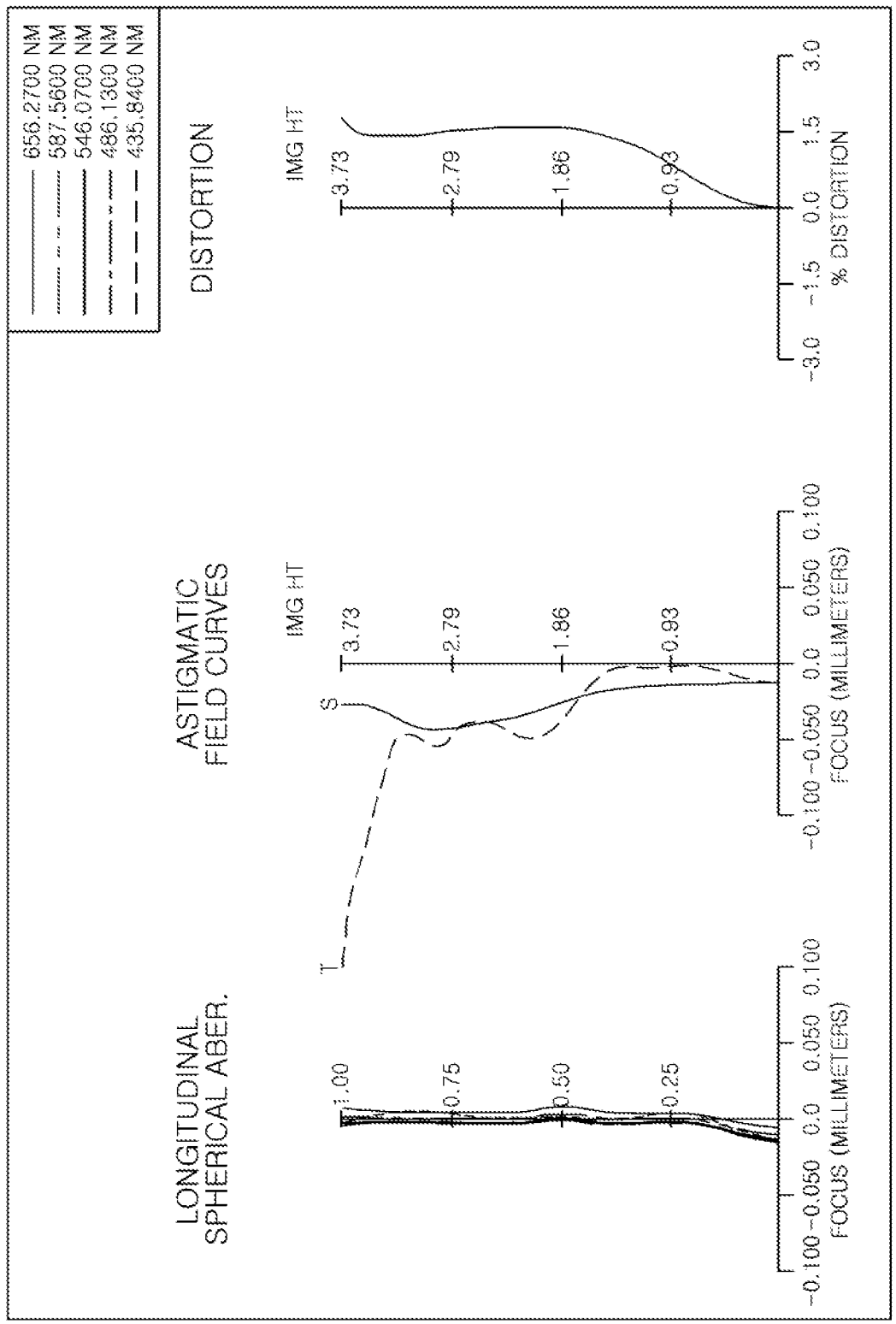
FIG. 42 illustrates aberration curves of the optical imaging system of FIG. 41.

FIG. 41 is a view illustrating a twenty-first example of an optical imaging system, and FIG. 42 illustrates aberration curves of the optical imaging system of FIG. 41.

An optical imaging system 21 includes a first lens 1021, a second lens 2021, a third lens 3021, a fourth lens 4021, a fifth lens 5021, a sixth lens 6021, and a seventh lens 7021.

The first lens 1021 has a positive refractive power, and an object-side surface thereof is convex and an image-side surface thereof is concave. The second lens 2021 has a positive refractive power, and an object-side surface thereof is convex and an image-side surface thereof is concave. The third lens 3021 has a negative refractive power, and an object-side surface thereof is convex and an image-side surface thereof is concave. The fourth lens 4021 has a positive refractive power, and an object-side surface thereof is convex and an image-side surface thereof is concave. The fifth lens 5021 has a negative refractive power, and an object-side surface thereof is convex and an image-side surface thereof is concave. The sixth lens 6021 has a positive refractive power, and an object-side surface thereof is convex and an image-side surface thereof is concave. In addition, at least one inflection point is formed on either one or both of the object-side surface and the image-side surface of the sixth lens 6021. The seventh lens 7021 has a positive refractive power, and an object-side surface thereof is convex and an image-side surface thereof is concave. In addition, two inflection points are formed on the object-side surface of the seventh lens 7021, and one inflection point is formed on the image-side surface of the seventh lens 7021.

The optical imaging system 21 further includes a stop, a filter 8021, and an image sensor 9021. The stop is disposed between the second lens 2021 and the third lens 3021 to adjust an amount of light incident on the image sensor 9021. The filter 8021 is disposed between the seventh lens 7021 and the image sensor 9021 to block infrared rays. The image sensor 9021 forms an imaging plane on which an image of a subject is formed. Although not illustrated in FIG. 41, the stop is disposed at a distance of 1.1280 mm from the object-side surface of the first lens 1021 toward the imaging plane of the optical imaging system 21. This distance is equal to TTL-SL and can be calculated from the values of TTL and SL for Example 21 listed in Table 57 that appears later in this application.

Table 41 below shows physical properties of the lenses and other elements of the optical imaging system of FIG. 41, and Table 42 below shows aspherical surface coefficients of the lenses of FIG. 41.

TABLE 41

| Surface No. | Element | Radius of Curvature | Thickness/ Distance | Index of Refraction | Abbe Number | Effective Aperture Radius |
|-----|---------|----------|--------|-------|--------|-------|
| S1  | First   | 2.1378   | 0.4606 | 1.546 | 56.114 | 1.360 |
| S2  | Lens    | 2.7210   | 0.0424 |       |        | 1.346 |
| S3  | Second  | 2.7717   | 0.6000 | 1.546 | 56.114 | 1.322 |
| S4  | Lens    | 33.8379  | 0.0250 |       |        | 1.253 |
| S5  | (Stop)  | 5.9058   | 0.2300 | 1.679 | 19.236 | 1.199 |
| S6  | Third   | 2.9580   | 0.3150 |       |        | 1.193 |
|     | Lens    |          |        |       |        |       |
| S7  | Fourth  | 6.7061   | 0.5156 | 1.546 | 56.114 | 1.246 |
| S8  | Lens    | 15.6197  | 0.4883 |       |        | 1.350 |
| S9  | Fifth   | 9.4476   | 0.3912 | 1.679 | 19.236 | 1.600 |
| S10 | Lens    | 5.2667   | 0.1323 |       |        | 2.100 |
| S11 | Sixth   | 2.4900   | 0.4534 | 1.546 | 56.114 | 1.951 |
| S12 | Lens    | 2.6058   | 0.1501 |       |        | 2.440 |
| S13 | Seventh | 1.4290   | 0.5074 | 1.546 | 56.114 | 2.691 |
| S14 | Lens    | 1.2861   | 0.4042 |       |        | 2.841 |
| S15 | Filter  | Infinity | 0.2100 | 1.518 | 64.197 | 3.245 |
| S16 |         | Infinity | 0.6767 |       |        | 3.316 |
| S17 | Imaging | Infinity | 0.0150 |       |        | 3.733 |
|     | Plane   |          |        |       |        |       |

TABLE 42

|     | K       | A       | B       | C       | D       | E       | F       | G       | H       | J       |
|-----|---------|---------|---------|---------|---------|---------|---------|---------|---------|---------|
| S1  | −0.9855 | −0.0214 | 0.0439  | −0.0925 | 0.0633  | 0.0064  | −0.0479 | 0.0372  | −0.0126 | 0.0016  |
| S2  | −12.849 | 0.0234  | −0.0441 | −0.1546 | −0.0352 | 0.7096  | −1.0004 | 0.6322  | −0.1959 | 0.0242  |
| S3  | −1.1002 | −0.0276 | 0.0854  | −0.4269 | 0.4011  | 0.3152  | −0.8128 | 0.5995  | −0.2021 | 0.0266  |
| S4  | −7.367  | −0.1684 | 1.4677  | −5.7804 | 12.64   | −16.742 | 13.734  | −6.8183 | 1.8769  | −0.22   |
| S5  | 9.3187  | −0.2245 | 1.5162  | −5.8569 | 13.059  | −17.823 | 15.121  | −7.7778 | 2.2231  | −0.2714 |
| S6  | 1.6265  | −0.0856 | 0.2704  | −0.9806 | 2.415   | −3.7649 | 3.6777  | −2.1905 | 0.7327  | −0.1058 |
| S7  | −4.7815 | 0.0264  | −0.5178 | 1.9131  | −4.2532 | 5.8667  | −5.0521 | 2.6239  | −0.7455 | 0.0886  |
| S8  | 5.8592  | −0.0338 | −0.0317 | 0.0097  | 0.0291  | −0.0644 | 0.0612  | −0.0311 | 0.0084  | −0.0008 |
| S9  | −43.521 | −0.002  | −0.0021 | 0.0436  | −0.1236 | 0.1389  | −0.0871 | 0.0311  | −0.0059 | 0.0005  |
| S10 | −12.729 | −0.0608 | 0.0286  | 0.0052  | −0.0244 | 0.0182  | −0.0074 | 0.0018  | −0.0002 | 1E−05   |

TABLE 42-continued

|  | K | A | B | C | D | E | F | G | H | J |
|---|---|---|---|---|---|---|---|---|---|---|
| S11 | −16.199 | 0.1227 | −0.2762 | 0.2845 | −0.2154 | 0.1043 | −0.0311 | 0.0056 | −0.0006 | 2E−05 |
| S12 | 0.0242 | −0.0902 | 0.058 | −0.0568 | 0.029 | −0.0088 | 0.0017 | −0.0002 | 2E−05 | −5E−07 |
| S13 | −0.8394 | −0.4114 | 0.2062 | −0.0647 | 0.0137 | −0.0021 | 0.0003 | −2E−05 | 2E−06 | −5E−08 |
| S14 | −1.3743 | −0.2983 | 0.1734 | −0.0777 | 0.0258 | −0.006 | 0.0009 | −9E−05 | 5E−06 | −1E−07 |

Twenty-Second Example

Figure 43:
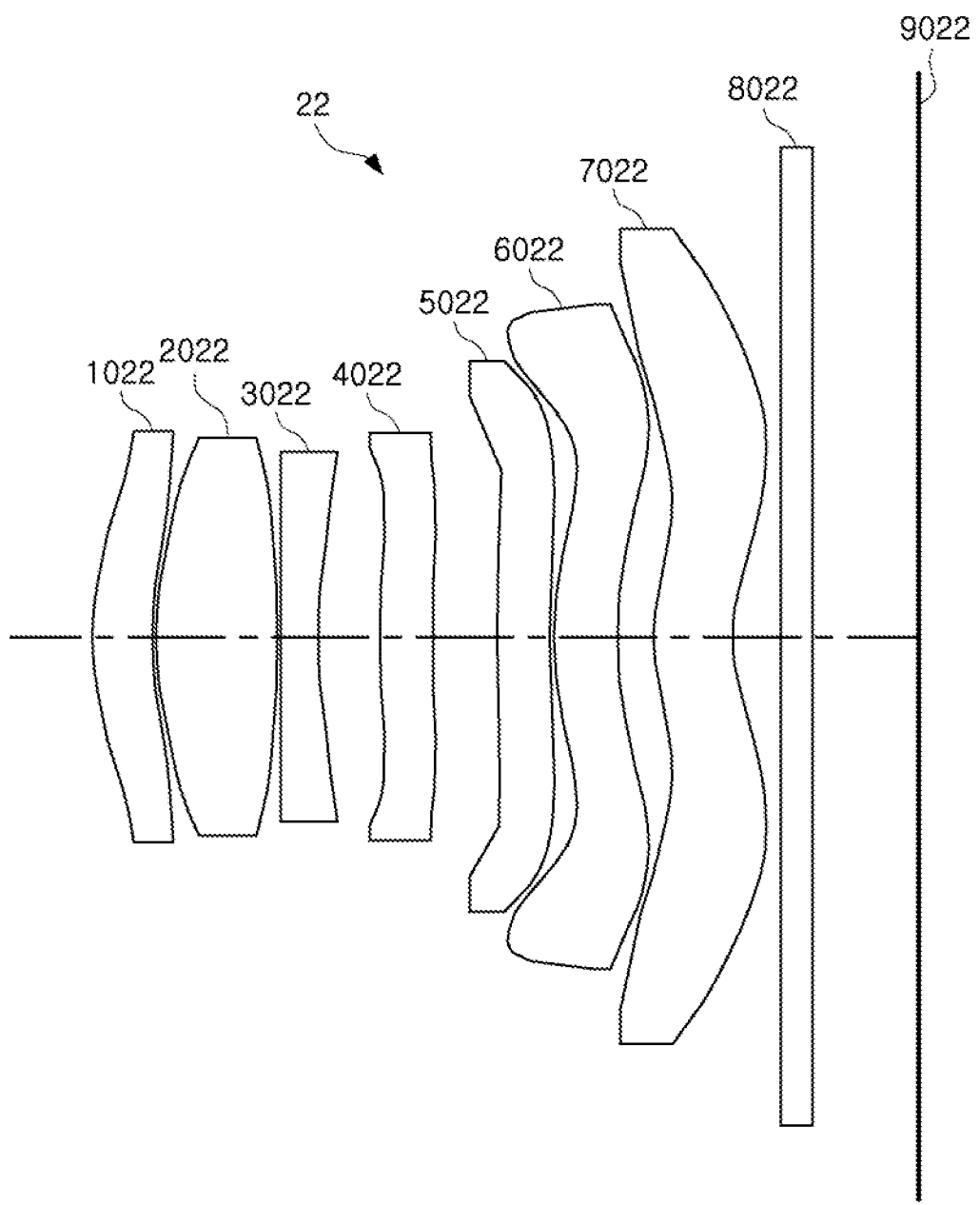
FIG. 43 is a view illustrating a twenty-second example of an optical imaging system.
Figure 44:
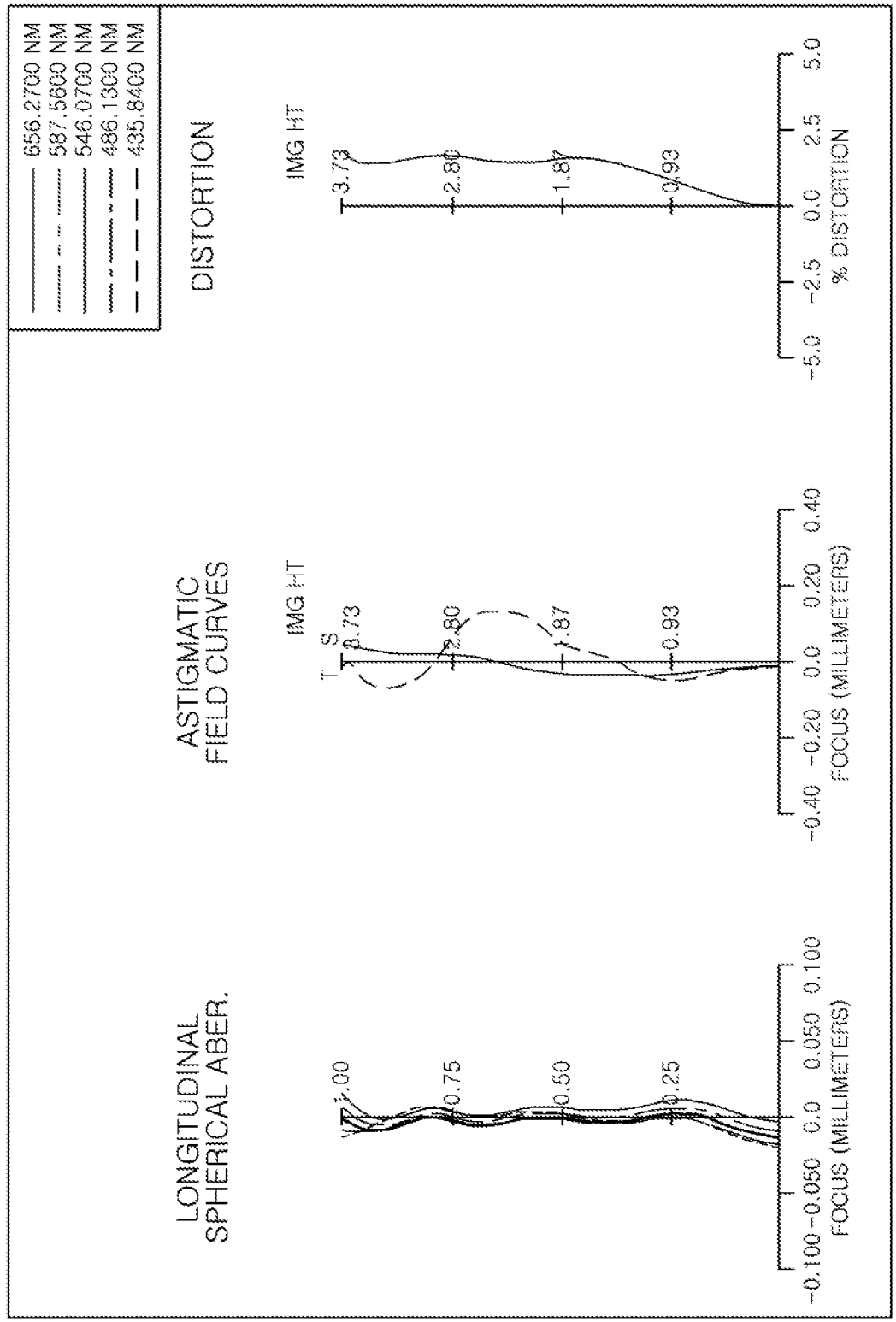
FIG. 44 illustrates aberration curves of the optical imaging system of FIG. 43.

FIG. 43 is a view illustrating a twenty-second example of an optical imaging system, and FIG. 44 illustrates aberration curves of the optical imaging system of FIG. 43.

An optical imaging system 22 includes a first lens 1022, a second lens 2022, a third lens 3022, a fourth lens 4022, a fifth lens 5022, a sixth lens 6022, and a seventh lens 7022.

The first lens 1022 has a positive refractive power, and an object-side surface thereof is convex and an image-side surface thereof is concave. The second lens 2022 has a positive refractive power, and an object-side surface thereof is convex and an image-side surface thereof is convex. The third lens 3022 has a negative refractive power, and an object-side surface thereof is convex and an image-side surface thereof is concave. The fourth lens 4022 has a positive refractive power, and an object-side surface thereof is convex and an image-side surface thereof is concave. The fifth lens 5022 has a negative refractive power, and an object-side surface thereof is convex and an image-side surface thereof is concave. The sixth lens 6022 has a positive refractive power, and an object-side surface thereof is convex and an image-side surface thereof is concave. In addition, at least one inflection point is formed on either one or both of the object-side surface and the image-side surface of the sixth lens 6022. The seventh lens 7022 has a positive refractive power, and an object-side surface thereof is convex and an image-side surface thereof is concave. In addition, one inflection point is formed on each of the object-side surface and the image-side surface of the seventh lens 7022.

The optical imaging system 22 further includes a stop, a filter 8022, and an image sensor 9022. The stop is disposed between the second lens 2022 and the third lens 3022 to adjust an amount of light incident on the image sensor 9022. The filter 8022 is disposed between the seventh lens 7022 and the image sensor 9022 to block infrared rays. The image sensor 9022 forms an imaging plane on which an image of a subject is formed. Although not illustrated in FIG. 43, the stop is disposed at a distance of 1.2251 mm from the object-side surface of the first lens 1022 toward the imaging plane of the optical imaging system 22. This distance is equal to TTL-SL and can be calculated from the values of TTL and SL for Example 22 listed in Table 57 that appears later in this application.

Table 43 below shows physical properties of the lenses and other elements of the optical imaging system of FIG. 43, and Table 44 below shows aspherical surface coefficients of the lenses of FIG. 43.

TABLE 43

| Surface No. | Element | Radius of Curvature | Thickness/ Distance | Index of Refraction | Abbe Number | Effective Aperture Radius |
|---|---|---|---|---|---|---|
| S1 | First | 2.2670 | 0.4000 | 1.546 | 56.114 | 1.380 |
| S2 | Lens | 2.6691 | 0.0251 |  |  | 1.337 |
| S3 | Second | 2.6238 | 0.8000 | 1.546 | 56.114 | 1.337 |
| S4 | Lens (Stop) | −11.8758 | 0.0250 |  |  | 1.298 |
| S5 | Third | 19.0032 | 0.2526 | 1.679 | 19.236 | 1.202 |
| S6 | Lens | 4.0676 | 0.4108 |  |  | 1.242 |
| S7 | Fourth | 6.6991 | 0.3500 | 1.679 | 19.236 | 1.265 |
| S8 | Lens | 7.2200 | 0.4296 |  |  | 1.369 |
| S9 | Fifth | 21.5310 | 0.3500 | 1.546 | 56.114 | 1.600 |
| S10 | Lens | 7.8918 | 0.0250 |  |  | 1.853 |
| S11 | Sixth | 2.5030 | 0.4300 | 1.546 | 56.114 | 1.908 |
| S12 | Lens | 2.4093 | 0.2399 |  |  | 2.372 |
| S13 | Seventh | 1.3275 | 0.5254 | 1.546 | 56.114 | 2.507 |
| S14 | Lens | 1.1947 | 0.3215 |  |  | 2.738 |
| S15 | Filter | Infinity | 0.2100 | 1.518 | 64.197 | 3.205 |
| S16 |  | Infinity | 0.6902 |  |  | 3.285 |
| S17 | Imaging Plane | Infinity | 0.0150 |  |  | 3.781 |

TABLE 44

|  | K | A | B | C | D | E | F | G | H | J |
|---|---|---|---|---|---|---|---|---|---|---|
| S1 | −1 | 0.0012 | −0.0631 | 0.0884 | −0.0759 | −0.0183 | 0.0824 | −0.0602 | 0.019 | −0.0023 |
| S2 | −11.056 | 0.038 | 0.1354 | −0.9871 | 1.5641 | −1.0995 | 0.3265 | 0.0108 | −0.0287 | 0.0048 |
| S3 | −0.7436 | −0.0807 | 0.579 | −1.9725 | 2.9346 | −2.2115 | 0.8223 | −0.0859 | −0.0317 | 0.0076 |
| S4 | −7.2488 | −0.1245 | 0.5877 | −1.6544 | 2.8953 | −3.2415 | 2.3118 | −1.0127 | 0.2473 | −0.0257 |
| S5 | 12.337 | −0.1601 | 0.4751 | −0.9119 | 1.1418 | −0.9059 | 0.4213 | −0.0904 | −0.0021 | 0.0031 |
| S6 | −0.7614 | −0.0925 | 0.1749 | −0.2349 | 0.2283 | −0.1666 | 0.0772 | −0.0124 | −0.0054 | 0.0021 |
| S7 | −12.018 | 0.047 | −0.734 | 2.692 | −5.8982 | 8.0627 | −6.9318 | 3.6331 | −1.0592 | 0.1316 |
| S8 | 5.8397 | −0.055 | 0.0238 | −0.178 | 0.4679 | −0.6732 | 0.5802 | −0.2983 | 0.0845 | −0.0101 |
| S9 | −43.467 | 0.0208 | −0.0298 | 0.0644 | −0.1157 | 0.1018 | −0.0488 | 0.0125 | −0.0016 | 7E−05 |
| S10 | −10.152 | −0.0392 | 0.0146 | 0.0256 | −0.0749 | 0.0675 | −0.0305 | 0.0074 | −0.0009 | 5E−05 |
| S11 | −16.19 | 0.0915 | −0.1594 | 0.2045 | −0.2282 | 0.1461 | −0.0541 | 0.0117 | −0.0014 | 7E−05 |
| S12 | −0.0871 | −0.1985 | 0.3277 | −0.3309 | 0.1866 | −0.0647 | 0.0141 | −0.0019 | 0.0001 | −4E−06 |
| S13 | −0.8728 | −0.462 | 0.2873 | −0.1331 | 0.0447 | −0.0104 | 0.0016 | −0.0002 | 9E−06 | −2E−07 |
| S14 | −1.5388 | −0.3036 | 0.1844 | −0.0807 | 0.0232 | −0.0042 | 0.0005 | −3E−05 | 1E−06 | −1E−08 |

Twenty-Third Example

Figure 45:
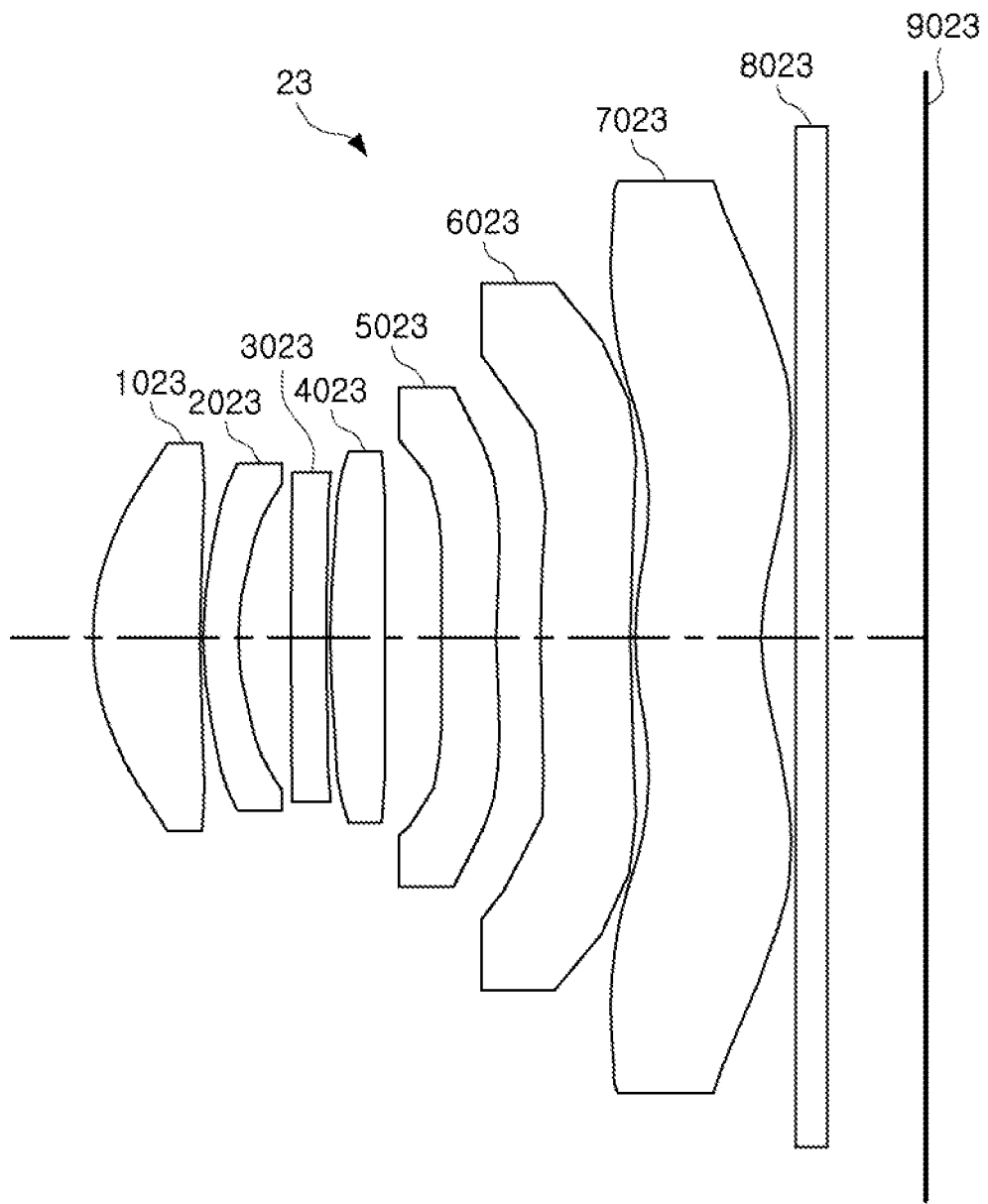
FIG. 45 is a view illustrating a twenty-third example of an optical imaging system.
Figure 46:
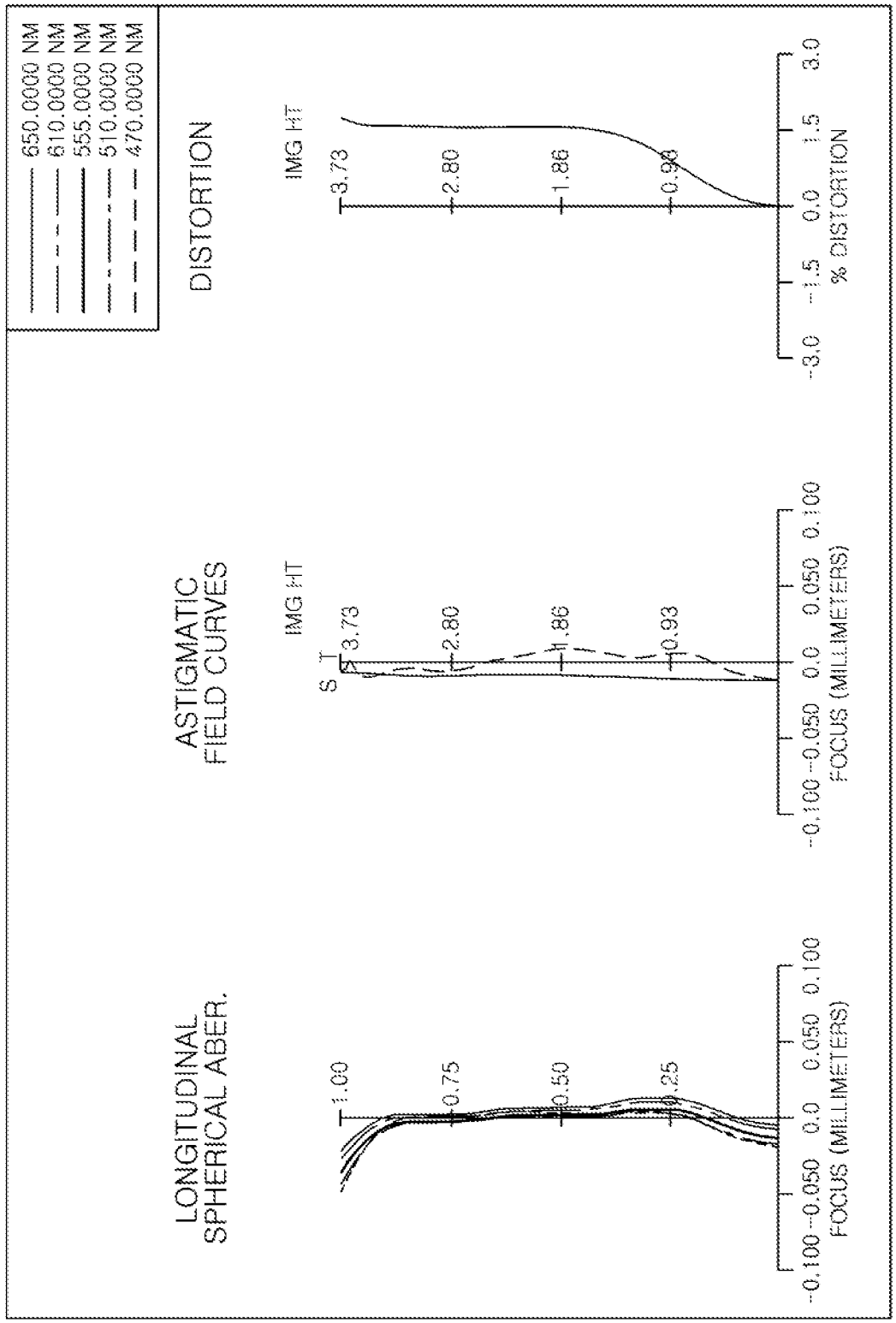
FIG. 46 illustrates aberration curves of the optical imaging system of FIG. 45.

FIG. 45 is a view illustrating a twenty-third example of an optical imaging system, and FIG. 46 illustrates aberration curves of the optical imaging system of FIG. 45.

An optical imaging system 23 includes a first lens 1023, a second lens 2023, a third lens 3023, a fourth lens 4023, a fifth lens 5023, a sixth lens 6023, and a seventh lens 7023.

The first lens 1023 has a positive refractive power, and an object-side surface thereof is convex and an image-side surface thereof is concave. The second lens 2023 has a negative refractive power, and an object-side surface thereof is convex and an image-side surface thereof is concave. The third lens 3023 has a negative refractive power, and an object-side surface thereof is convex and an image-side surface thereof is concave. The fourth lens 4023 has a positive refractive power, and an object-side surface thereof is convex and an image-side surface thereof is concave. The fifth lens 5023 has a negative refractive power, and an object-side surface thereof is convex and an image-side surface thereof is concave. The sixth lens 6023 has a negative refractive power, and an object-side surface thereof is concave and an image-side surface thereof is concave. In addition, at least one inflection point is formed on either one or both of the object-side surface and the image-side surface of the sixth lens 6023. The seventh lens 7023 has a positive refractive power, and an object-side surface thereof is convex and an image-side surface thereof is concave. In addition, two inflection points are formed on the object-side surface of the seventh lens 7023, and one inflection point is formed on the image-side surface of the seventh lens 7023.

The optical imaging system 23 further includes a stop, a filter 8023, and an image sensor 9023. The stop is disposed between the second lens 2023 and the third lens 3023 to adjust an amount of light incident on the image sensor 9023. The filter 8023 is disposed between the seventh lens 7023 and the image sensor 9023 to block infrared rays. The image sensor 9023 forms an imaging plane on which an image of a subject is formed. Although not illustrated in FIG. 45, the stop is disposed at a distance of 0.9515 mm from the object-side surface of the first lens 1023 toward the imaging plane of the optical imaging system 23. This distance is equal to TTL-SL and can be calculated from the values of TTL and SL for Example 23 listed in Table 57 that appears later in this application.

Table 45 below shows physical properties of the lenses and other elements of the optical imaging system of FIG. 45, and Table 46 below shows aspherical surface coefficients of the lenses of FIG. 45.

TABLE 45

| Surface No. | Element | Radius of Curvature | Thickness/ Distance | Index of Refraction | Abbe Number | Effective Aperture Radius |
|---|---|---|---|---|---|---|
| S1 | First | 1.7473 | 0.6964 | 1.546 | 56.114 | 1.280 |
| S2 | Lens | 9.4084 | 0.0250 | | | 1.247 |
| S3 | Second | 2.9766 | 0.2300 | 1.667 | 20.353 | 1.150 |
| S4 | Lens (Stop) | 1.9564 | 0.3428 | | | 1.007 |
| S5 | Third | 16.8676 | 0.2300 | 1.667 | 20.353 | 1.032 |
| S6 | Lens | 16.0126 | 0.0294 | | | 1.089 |
| S7 | Fourth | 7.3144 | 0.3570 | 1.546 | 56.114 | 1.130 |
| S8 | Lens | 17.3919 | 0.3708 | | | 1.228 |
| S9 | Fifth | 11.5617 | 0.3608 | 1.656 | 21.525 | 1.317 |
| S10 | Lens | 6.9184 | 0.2917 | | | 1.657 |
| S11 | Sixth | −97.1635 | 0.5908 | 1.656 | 21.525 | 1.878 |
| S12 | Lens | 17.2767 | 0.0301 | | | 2.338 |
| S13 | Seventh | 1.9322 | 0.8258 | 1.546 | 56.114 | 2.961 |
| S14 | Lens | 1.7390 | 0.2207 | | | 3.015 |
| S15 | Filter | Infinity | 0.2100 | 1.518 | 64.197 | 3.305 |
| S16 | | Infinity | 0.6356 | | | 3.375 |
| S17 | Imaging Plane | Infinity | 0.0143 | | | 3.731 |

TABLE 46

| | K | A | B | C | D | E | F | G | H | J |
|---|---|---|---|---|---|---|---|---|---|---|
| S1 | −0.3029 | 0.0003 | 0.0248 | −0.0645 | 0.0887 | −0.0757 | 0.0373 | −0.0109 | 0.0014 | 0 |
| S2 | 0.9997 | −0.0385 | 0.0595 | −0.0639 | 0.0052 | 0.0552 | −0.0624 | 0.0296 | −0.0054 | 0 |
| S3 | −1.759 | −0.0559 | 0.0769 | −0.084 | 0.0959 | −0.0711 | 0.0309 | −0.0026 | −0.0012 | 0 |
| S4 | −0.2233 | −0.022 | −0.0153 | 0.1358 | −0.2648 | 0.3311 | −0.2167 | 0.051 | 0.0098 | 0 |
| S5 | −0.8179 | −0.0092 | −0.0103 | −0.1607 | 0.6303 | −1.1881 | 1.2746 | −0.7449 | 0.1847 | 0 |
| S6 | −0.0005 | 0.02 | −0.1312 | 0.1142 | −0.0014 | 0.0632 | −0.1761 | 0.1336 | −0.0335 | 0 |
| S7 | −31.717 | 0.0266 | −0.0935 | −0.0104 | 0.2126 | −0.2049 | 0.0541 | 0.02 | −0.0098 | 0 |
| S8 | −1.0151 | −0.0315 | 0.0288 | −0.0714 | 0.0935 | −0.1394 | 0.1768 | −0.1344 | 0.0524 | −0.0076 |
| S9 | 0.382 | −0.1094 | 0.0327 | −0.0826 | 0.2138 | −0.3162 | 0.2427 | −0.0962 | 0.0156 | 0 |
| S10 | −27.524 | −0.0394 | −0.117 | 0.1628 | −0.1238 | 0.0551 | −0.0144 | 0.0023 | −0.0002 | 0 |
| S11 | 23.203 | 0.1802 | −0.2793 | 0.2208 | −0.1258 | 0.0475 | −0.0113 | 0.0016 | −0.0001 | 0 |
| S12 | −49.948 | 0.0336 | −0.0362 | 0.0098 | −0.0011 | −0.0001 | 8E−05 | −1E−05 | 6E−07 | 0 |
| S13 | −1.8504 | −0.2437 | 0.1076 | −0.031 | 0.0066 | −0.001 | 0.0001 | −6E−06 | 1E−07 | 0 |
| S14 | −0.8299 | −0.173 | 0.0629 | −0.0196 | 0.0044 | −0.0006 | 6E−05 | −3E−06 | 6E−08 | 0 |

Twenty-Fourth Example

Figure 47:
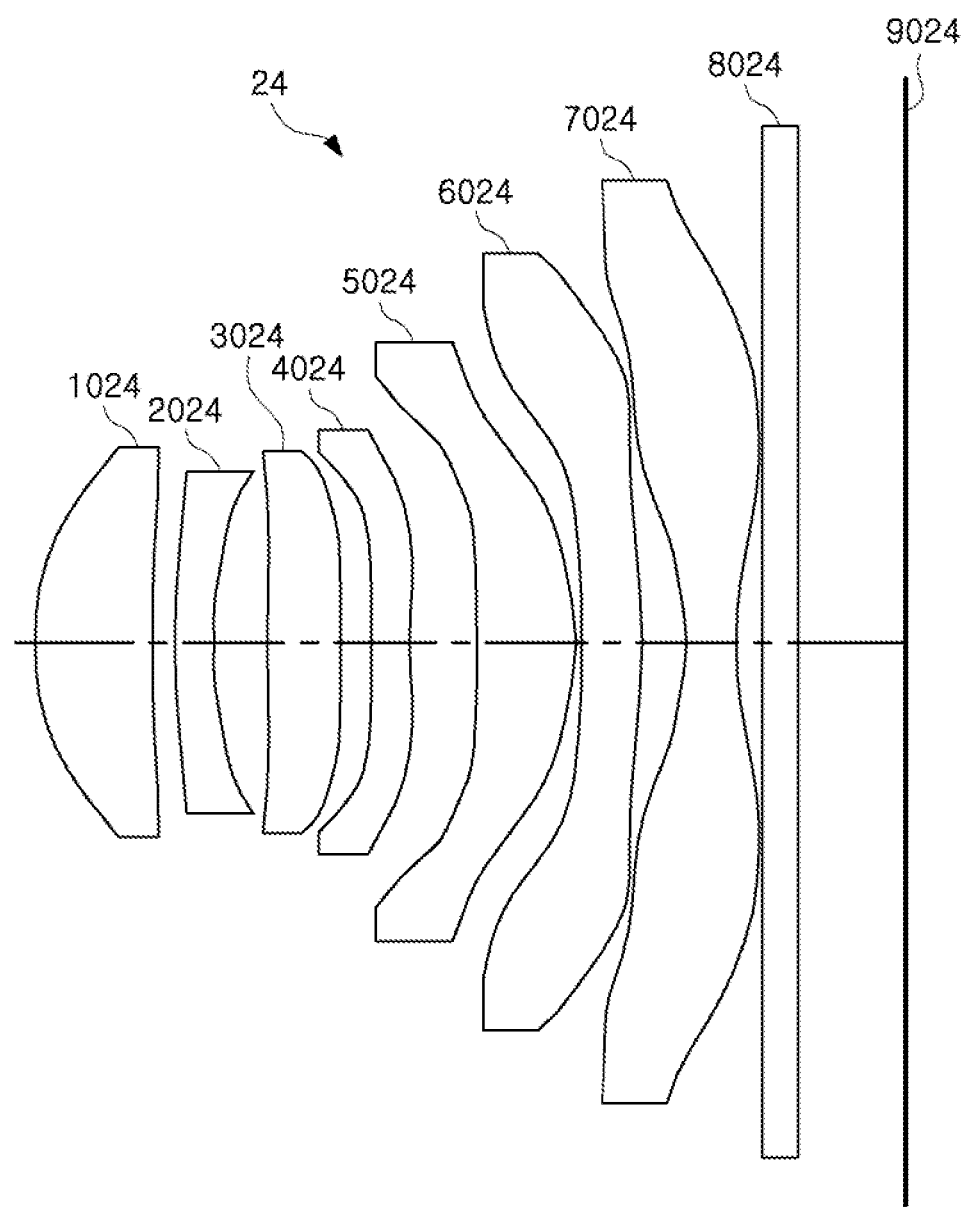
FIG. 47 is a view illustrating a twenty-fourth example of an optical imaging system.
Figure 48:
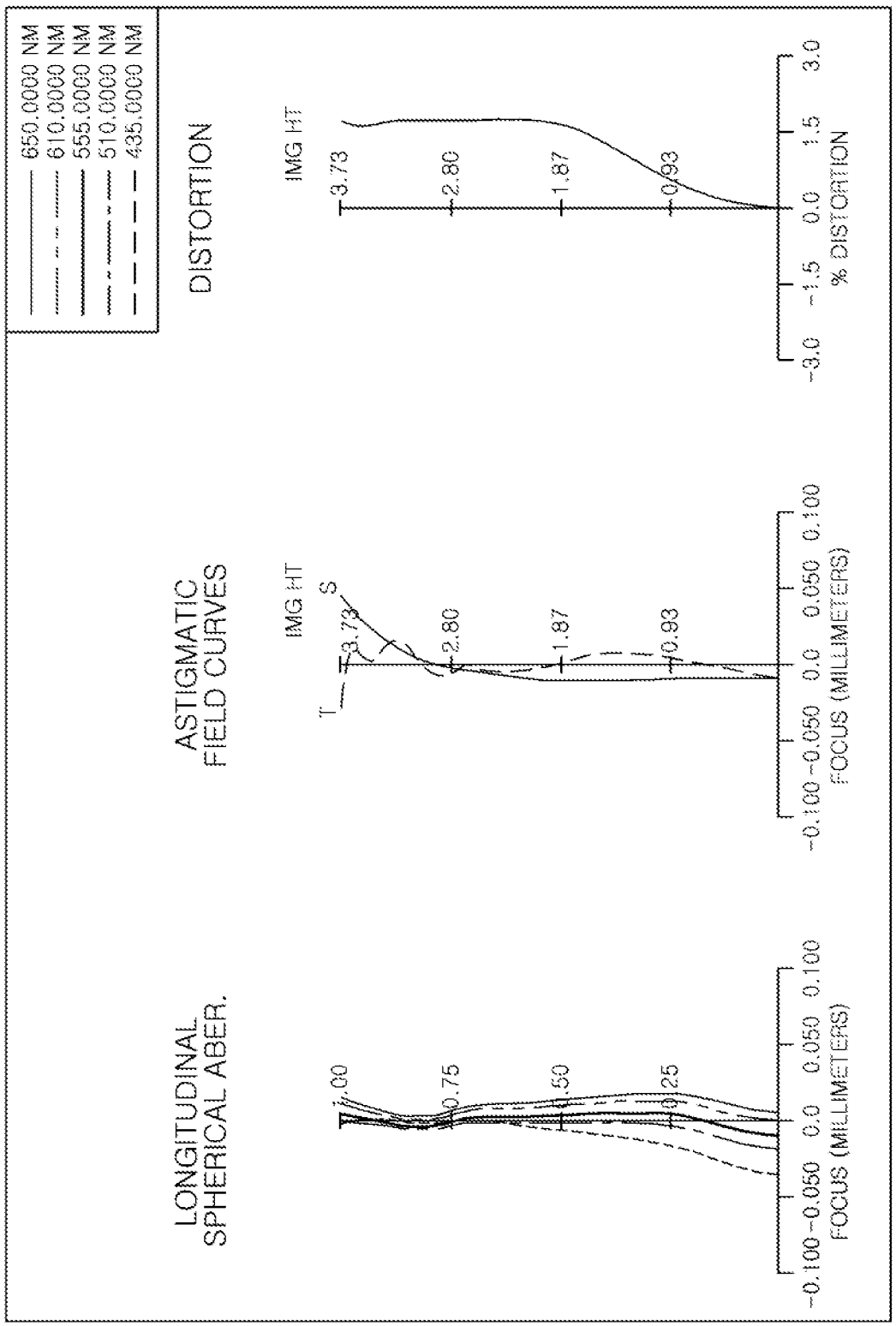
FIG. 48 illustrates aberration curves of the optical imaging system of FIG. 47.

FIG. 47 is a view illustrating a twenty-fourth example of an optical imaging system, and FIG. 48 illustrates aberration curves of the optical imaging system of FIG. 47.

An optical imaging system 24 includes a first lens 1024, a second lens 2024, a third lens 3024, a fourth lens 4024, a fifth lens 5024, a sixth lens 6024, and a seventh lens 7024.

The first lens 1024 has a positive refractive power, and an object-side surface thereof is convex and an image-side surface thereof is concave. The second lens 2024 has a negative refractive power, and an object-side surface thereof is convex and an image-side surface thereof is concave. The third lens 3024 has a positive refractive power, and an object-side surface thereof is convex and an image-side surface thereof is concave. The fourth lens 4024 has a positive refractive power, and an object-side surface thereof is convex and an image-side surface thereof is concave. The fifth lens 5024 has a positive refractive power, and an object-side surface thereof is concave and an image-side surface thereof is convex. The sixth lens 6024 has a positive refractive power, and an object-side surface thereof is concave and an image-side surface thereof is convex. In addition, at least one inflection point is formed on either one or both of the object-side surface and the image-side surface of the sixth lens 6024. The seventh lens 7024 has a negative refractive power, and an object-side surface thereof is concave and an image-side surface thereof is concave. In addition, no inflection point is formed on the object-side surface of the seventh lens 7024, and one inflection point is formed on the image-side surface of the seventh lens 7024.

The optical imaging system 24 further includes a stop, a filter 8024, and an image sensor 9024. The stop is disposed between the first lens 1024 and the second lens 2024 to adjust an amount of light incident on the image sensor 9024. The filter 8024 is disposed between the seventh lens 7024 and the image sensor 9024 to block infrared rays. The image sensor 9024 forms an imaging plane on which an image of a subject is formed. Although not illustrated in FIG. 47, the stop is disposed at a distance of 0.8574 mm from the object-side surface of the first lens 1024 toward the imaging plane of the optical imaging system 24. This distance is equal to TTL-SL and can be calculated from the values of TTL and SL for Example 24 listed in Table 57 that appears later in this application.

Table 47 below shows physical properties of the lenses and other elements of the optical imaging system of FIG. 47, and Table 48 below shows aspherical surface coefficients of the lenses of FIG. 47.

TABLE 47

| Surface No. | Element | Radius of Curvature | Thickness/ Distance | Index of Refraction | Abbe Number | Effective Aperture Radius |
|---|---|---|---|---|---|---|
| S1 | First | 1.8263 | 0.7034 | 1.546 | 56.114 | 1.290 |
| S2 | Lens | 7.7056 | 0.1540 | | | 1.215 |
| S3 | (Stop) | 4.6213 | 0.2200 | 1.679 | 19.236 | 1.127 |
| S4 | Second Lens | 2.7291 | 0.3146 | | | 1.109 |
| S5 | Third | 6.6824 | 0.4391 | 1.546 | 56.114 | 1.151 |
| S6 | Lens | 11.7185 | 0.1811 | | | 1.250 |
| S7 | Fourth | 6.8604 | 0.2500 | 1.679 | 19.236 | 1.259 |
| S8 | Lens | 7.4620 | 0.4065 | | | 1.408 |
| S9 | Fifth | −9.8497 | 0.5939 | 1.546 | 56.114 | 1.604 |
| S10 | Lens | −1.8870 | 0.0250 | | | 1.970 |
| S11 | Sixth | −41.8807 | 0.3701 | 1.546 | 56.114 | 2.299 |
| S12 | Lens | −3.7454 | 0.2569 | | | 2.568 |
| S13 | Seventh | −2.0634 | 0.3200 | 1.546 | 56.114 | 2.855 |
| S14 | Lens | 2.6116 | 0.1554 | | | 3.055 |

TABLE 47-continued

| Surface No. | Element | Radius of Curvature | Thickness/ Distance | Index of Refraction | Abbe Number | Effective Aperture Radius |
|---|---|---|---|---|---|---|
| S15 | Filter | Infinity | 0.2100 | 1.518 | 64.197 | 3.346 |
| S16 | | Infinity | 0.6400 | | | 3.410 |
| S17 | Imaging Plane | Infinity | 0.0100 | | | 3.730 |

TABLE 48

| | K | A | B | C | D | E | F | G | H | J |
|---|---|---|---|---|---|---|---|---|---|---|
| S1 | −1.0945 | 0.0136 | 0.0506 | −0.1839 | 0.416 | −0.5839 | 0.51 | −0.2705 | 0.0795 | −0.01 |
| S2 | 3.251 | −0.0482 | 0.0508 | −0.085 | 0.2198 | −0.436 | 0.5133 | −0.3477 | 0.1258 | −0.0189 |
| S3 | −13.699 | −0.1155 | 0.1942 | −0.4376 | 1.335 | −2.7707 | 3.4839 | −2.5718 | 1.0289 | −0.1723 |
| S4 | −4.0179 | −0.0945 | 0.2406 | −0.7546 | 2.4023 | −4.9111 | 6.1463 | −4.5679 | 1.8552 | −0.3168 |
| S5 | −6.6783 | −0.0675 | 0.1229 | −0.5308 | 1.3347 | −2.1668 | 2.2329 | −1.4059 | 0.4923 | −0.0729 |
| S6 | 2.6687 | −0.1089 | 0.0811 | −0.1248 | 0.0166 | 0.1977 | −0.3307 | 0.2573 | −0.1017 | 0.0162 |
| S7 | 7.0258 | −0.2027 | 0.0564 | −0.0521 | 0.0446 | −0.0418 | 0.0403 | −0.0212 | 0.001 | 0.0016 |
| S8 | −10.8 | −0.1484 | 0.0297 | −0.0692 | 0.1666 | −0.2292 | 0.2033 | −0.1109 | 0.0326 | −0.0038 |
| S9 | −26.465 | 0.0072 | −0.0015 | −0.1473 | 0.2748 | −0.3047 | 0.2171 | −0.0939 | 0.0219 | −0.0021 |
| S10 | −1.4915 | 0.1141 | −0.2124 | 0.1883 | −0.1127 | 0.0475 | −0.0129 | 0.0021 | −0.0002 | 6E−06 |
| S11 | −6.8308 | 0.0507 | −0.1087 | 0.0643 | −0.0416 | 0.0215 | −0.0064 | 0.0011 | −9E−05 | 3E−06 |
| S12 | −10.262 | 0.0544 | 0.062 | −0.1082 | 0.0705 | −0.0254 | 0.0054 | −0.0007 | 4E−05 | −1E−06 |
| S13 | −6.0066 | 0.0037 | −0.0456 | 0.0731 | −0.0405 | 0.0115 | −0.0019 | 0.0002 | −9E−06 | 2E−07 |
| S14 | −0.8095 | −0.1128 | 0.0401 | −0.0105 | 0.0011 | 0.0002 | −7E−05 | 8E−06 | −5E−07 | 1E−08 |

Twenty-Fifth Example

Figure 49:
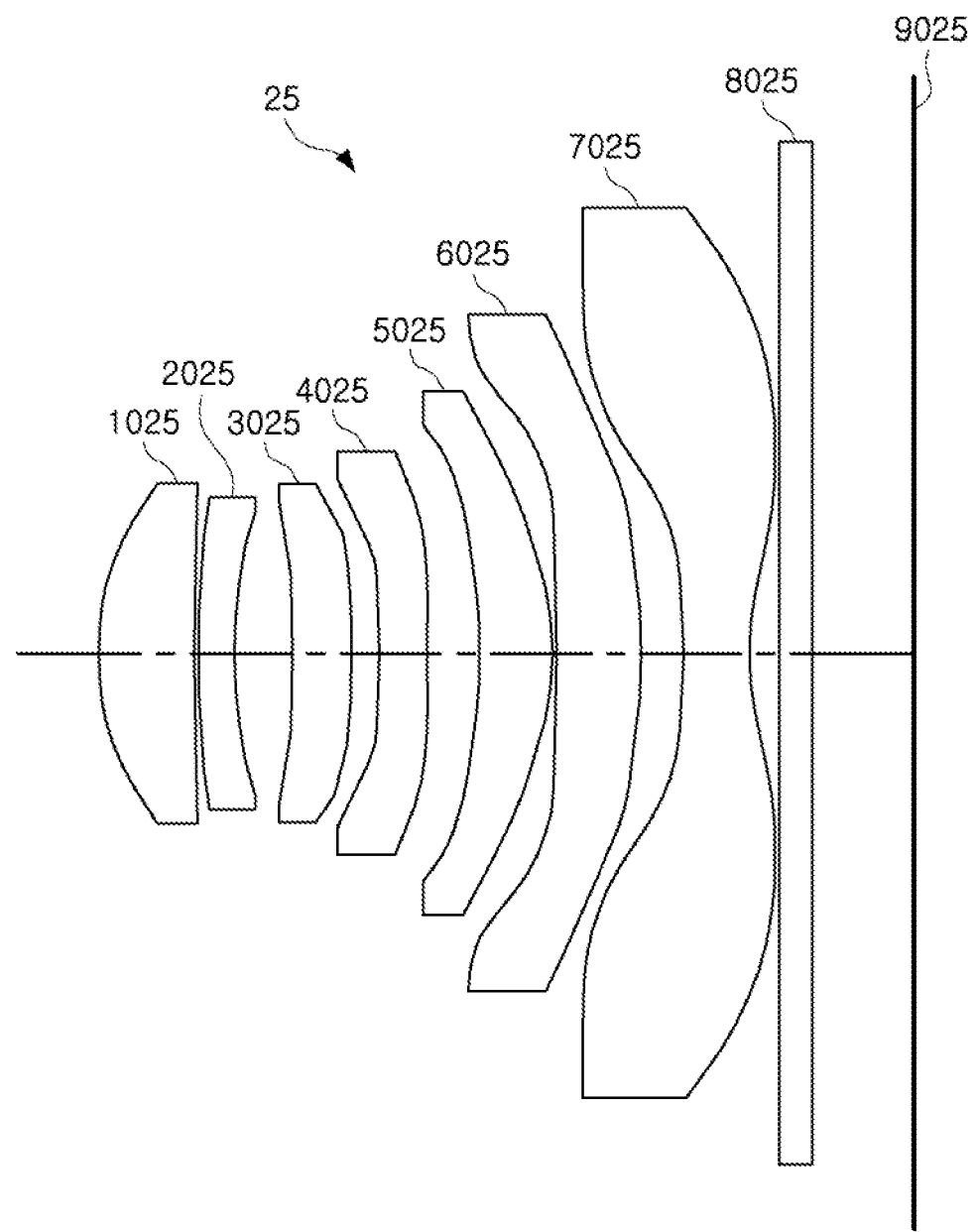
FIG. 49 is a view illustrating a twenty-fifth example of an optical imaging system.
Figure 50:
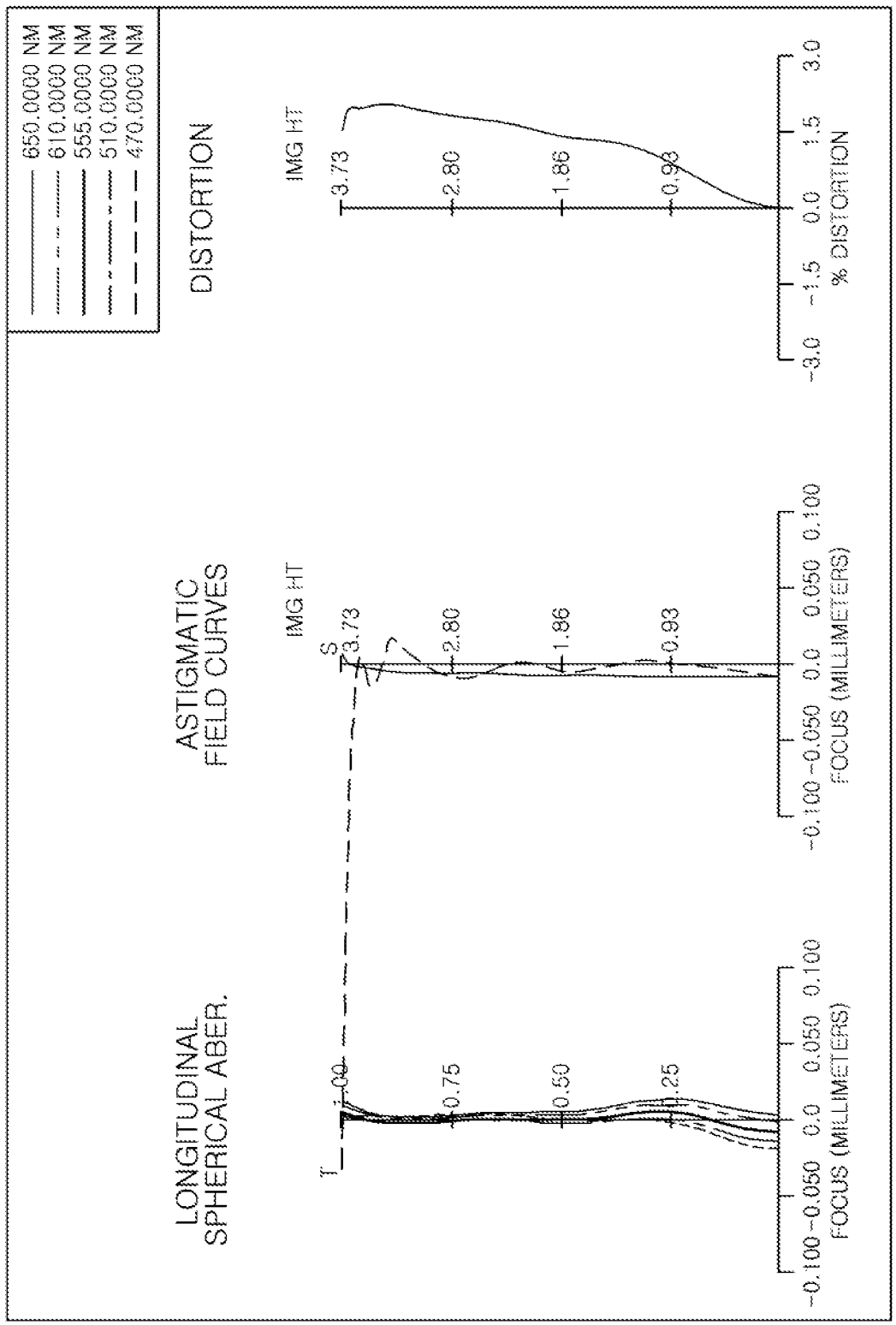
FIG. 50 illustrates aberration curves of the optical imaging system of FIG. 49.

FIG. 49 is a view illustrating a twenty-fifth example of an optical imaging system, and FIG. 50 illustrates aberration curves of the optical imaging system of FIG. 49.

An optical imaging system 25 includes a first lens 1025, a second lens 2025, a third lens 3025, a fourth lens 4025, a fifth lens 5025, a sixth lens 6025, and a seventh lens 7025.

The first lens 1025 has a positive refractive power, and an object-side surface thereof is convex and an image-side surface thereof is concave. The second lens 2025 has a negative refractive power, and an object-side surface thereof is convex and an image-side surface thereof is concave. The third lens 3025 has a positive refractive power, and an object-side surface thereof is concave and an image-side surface thereof is convex. The fourth lens 4025 has a negative refractive power, and an object-side surface thereof is convex and an image-side surface thereof is concave. The fifth lens 5025 has a positive refractive power, and an object-side surface thereof is concave and an image-side surface thereof is convex. The sixth lens 6025 has a positive refractive power, and an object-side surface thereof is concave and an image-side surface thereof is convex. In addition, at least one inflection point is formed on either one or both of the object-side surface and the image-side surface of the sixth lens 6025. The seventh lens 7025 has a negative refractive power, and an object-side surface thereof is concave and an image-side surface thereof is concave. In addition, no inflection point is formed on the object-side surface of the seventh lens 7025, and one inflection point is formed on the image-side surface of the seventh lens 7025.

The optical imaging system 25 further includes a stop, a filter 8025, and an image sensor 9025. The stop is disposed between the second lens 2025 and the third lens 3025 to adjust an amount of light incident on the image sensor 9025. The filter 8025 is disposed between the seventh lens 7025 and the image sensor 9025 to block infrared rays. The image sensor 9025 forms an imaging plane on which an image of a subject is formed. Although not illustrated in FIG. 49, the stop is disposed at a distance of 0.8722 mm from the object-side surface of the first lens 1025 toward the imaging plane of the optical imaging system 25. This distance is equal to TTL-SL and can be calculated from the values of TTL and SL for Example 25 listed in Table 57 that appears later in this application.

Table 49 below shows physical properties of the lenses and other elements of the optical imaging system of FIG. 49, and Table 50 below shows aspherical surface coefficients of the lenses of FIG. 49.

TABLE 49

| Surface No. | Element | Radius of Curvature | Thickness/ Distance | Index of Refraction | Abbe Number | Effective Aperture Radius |
|---|---|---|---|---|---|---|
| S1 | First | 1.7603 | 0.6172 | 1.546 | 56.114 | 1.100 |
| S2 | Lens | 14.1233 | 0.0250 | | | 1.040 |
| S3 | Second | 5.8341 | 0.2300 | 1.667 | 20.353 | 1.011 |
| S4 | Lens (Stop) | 3.1227 | 0.3733 | | | 0.919 |
| S5 | Third | −49.9417 | 0.3799 | 1.546 | 56.114 | 0.995 |
| S6 | Lens | −15.1870 | 0.1809 | | | 1.096 |
| S7 | Fourth | 23.3680 | 0.3032 | 1.667 | 20.353 | 1.124 |
| S8 | Lens | 12.2098 | 0.3354 | | | 1.309 |
| S9 | Fifth | −4.3948 | 0.4729 | 1.546 | 56.114 | 1.471 |
| S10 | Lens | −1.5983 | 0.0250 | | | 1.698 |
| S11 | Sixth | −6.0815 | 0.5447 | 1.546 | 56.114 | 1.822 |
| S12 | Lens | −3.0145 | 0.2724 | | | 2.192 |
| S13 | Seventh | −6.1494 | 0.4224 | 1.546 | 56.114 | 2.462 |
| S14 | Lens | 1.6367 | 0.1933 | | | 2.880 |
| S15 | Filter | Infinity | 0.2100 | 1.518 | 64.197 | 3.223 |
| S16 | | Infinity | 0.6445 | | | 3.300 |
| S17 | Imaging Plane | Infinity | 0.0099 | | | 3.728 |

TABLE 50

| | K | A | B | C | D | E | F | G | H | J |
|---|---|---|---|---|---|---|---|---|---|---|
| S1 | −1.0054 | 0.0225 | 0.0222 | −0.0696 | 0.1604 | −0.2238 | 0.1806 | −0.0791 | 0.0141 | 0 |
| S2 | −1.5097 | −0.1275 | 0.3975 | −0.6982 | 0.6801 | −0.322 | 0.0288 | 0.029 | −0.0076 | 0 |
| S3 | 6.0294 | −0.163 | 0.4504 | −0.8514 | 1.0525 | −0.8203 | 0.4235 | −0.138 | 0.0213 | 0 |
| S4 | −0.8846 | −0.0449 | 0.0393 | 0.1574 | −0.6934 | 1.3171 | −1.3069 | 0.6799 | −0.143 | 0 |
| S5 | 0 | −0.0513 | −0.0193 | −0.016 | 0.0043 | 0.0034 | −0.0155 | 0.0319 | −0.0128 | 0 |
| S6 | 0 | −0.1089 | −0.0569 | 0.3576 | −0.9255 | 1.1947 | −0.8604 | 0.3322 | −0.0547 | 0 |
| S7 | −7.5 | −0.2139 | −0.0107 | 0.1788 | −0.1827 | −0.1159 | 0.3046 | −0.1897 | 0.0405 | 0 |
| S8 | −43.341 | −0.1402 | −0.061 | 0.2777 | −0.4123 | 0.3523 | −0.1857 | 0.0564 | −0.0071 | 0 |
| S9 | −35.081 | −0.0602 | 0.0736 | −0.1046 | 0.1084 | −0.0726 | 0.0255 | −0.0041 | 0.0002 | 0 |
| S10 | −1.5734 | 0.1621 | −0.2197 | 0.1896 | −0.107 | 0.0396 | −0.0091 | 0.0011 | −6E−05 | 0 |
| S11 | 0.5153 | 0.2137 | −0.3167 | 0.2399 | −0.1217 | 0.0384 | −0.0069 | 0.0007 | −3E−05 | 0 |
| S12 | −1.1466 | 0.1967 | −0.2565 | 0.1542 | −0.0532 | 0.0115 | −0.0015 | 0.0001 | −4E−06 | 0 |
| S13 | −0.9056 | −0.0077 | −0.2094 | 0.1883 | −0.0749 | 0.0167 | −0.0022 | 0.0002 | −5E−06 | 0 |
| S14 | −1.2797 | −0.2192 | 0.1006 | −0.0338 | 0.0088 | −0.0018 | 0.0003 | −2E−05 | 1E−06 | −3E−08 |

Twenty-Sixth Example

Figure 51:
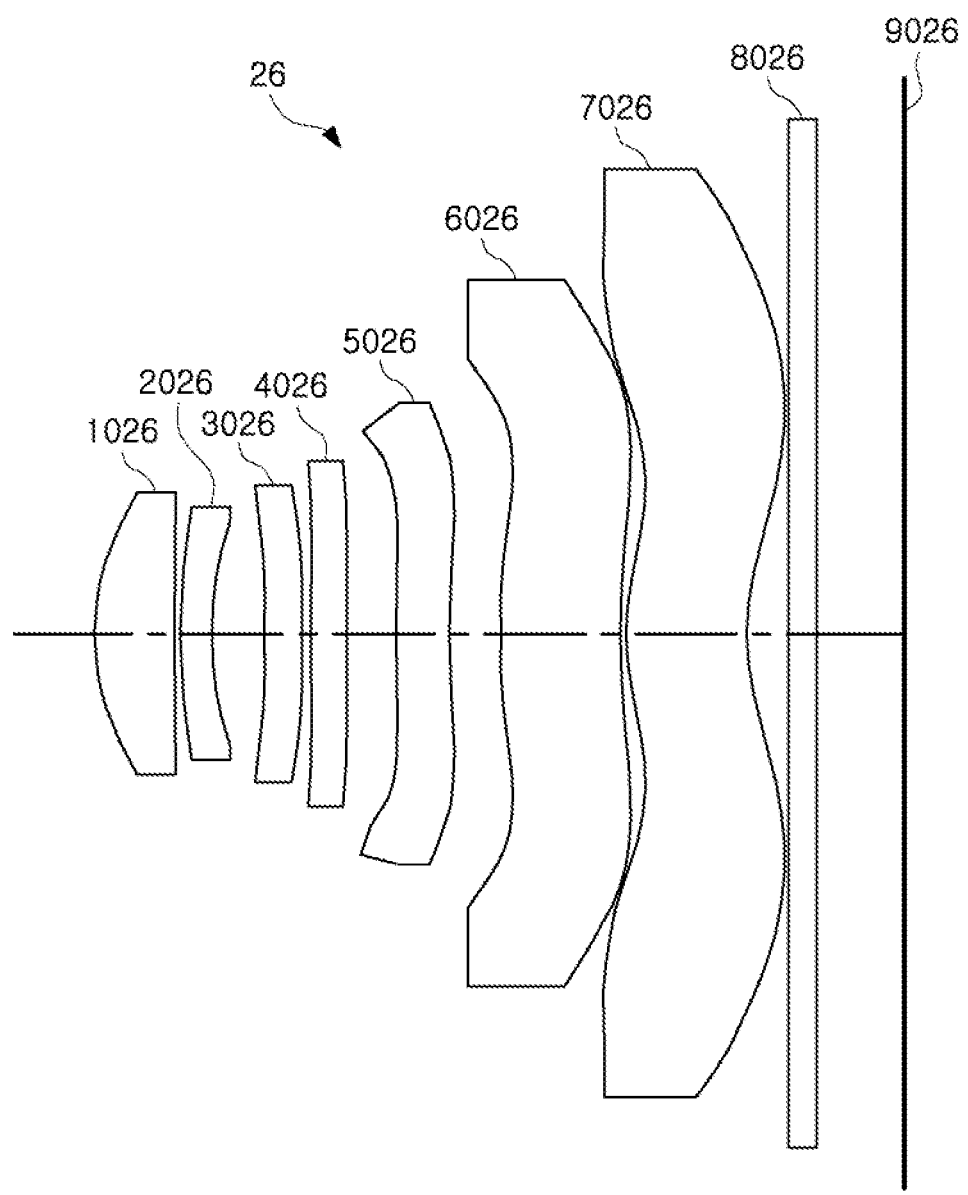
FIG. 51 is a view illustrating a twenty-sixth example of an optical imaging system.
Figure 52:
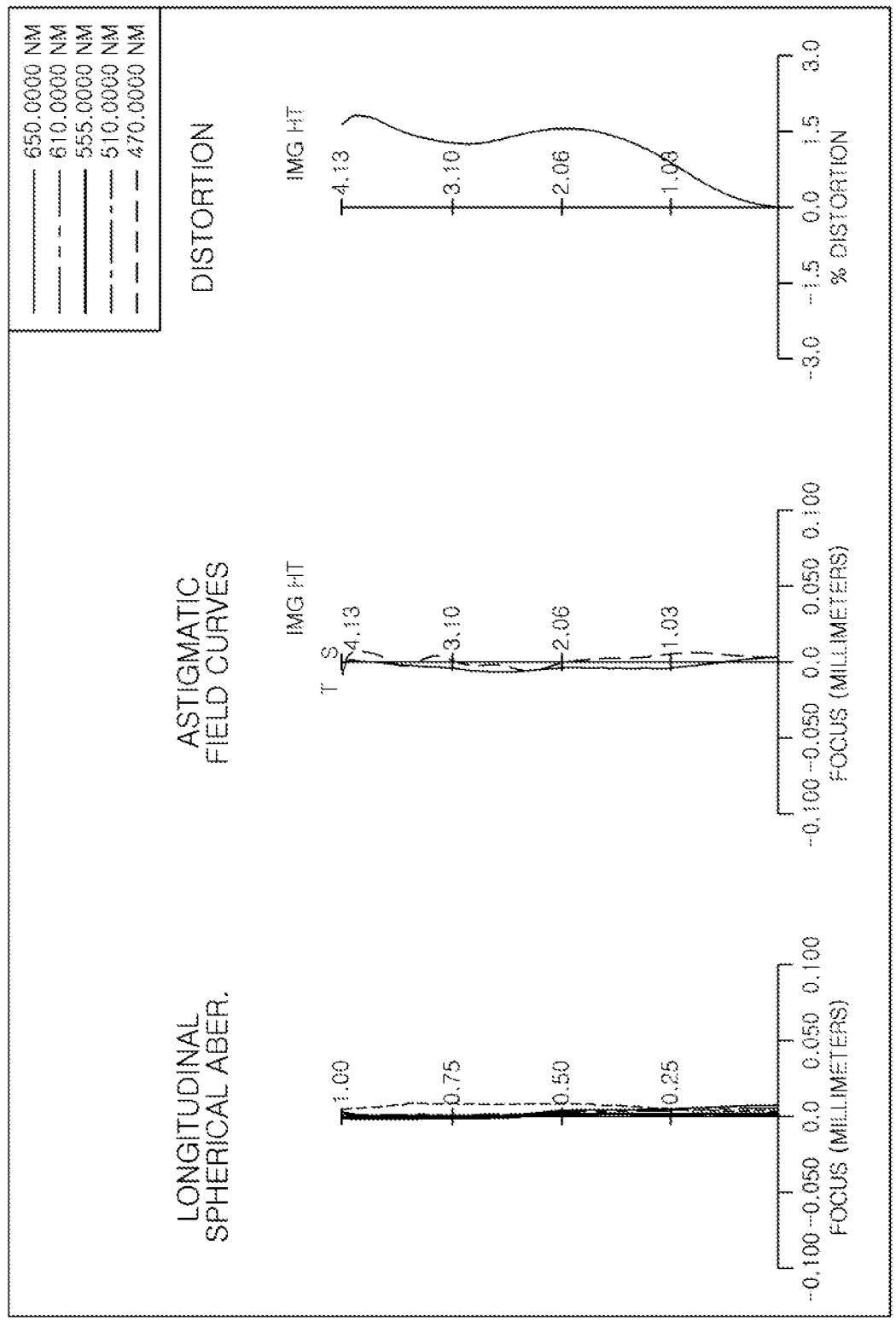
FIG. 52 illustrates aberration curves of the optical imaging system of FIG. 51.

FIG. 51 is a view illustrating a twenty-sixth example of an optical imaging system, and FIG. 52 illustrates aberration curves of the optical imaging system of FIG. 51.

An optical imaging system 26 includes a first lens 1026, a second lens 2026, a third lens 3026, a fourth lens 4026, a fifth lens 5026, a sixth lens 6026, and a seventh lens 7026.

The first lens 1026 has a positive refractive power, and an object-side surface thereof is convex and an image-side surface thereof is concave. The second lens 2026 has a negative refractive power, and an object-side surface thereof is convex and an image-side surface thereof is concave. The third lens 3026 has a positive refractive power, and an object-side surface thereof is concave and an image-side surface thereof is convex. The fourth lens 4026 has a positive refractive power, and an object-side surface thereof is convex and an image-side surface thereof is concave. The fifth lens 5026 has a negative refractive power, and an object-side surface thereof is convex and an image-side surface thereof is concave. The sixth lens 6026 has a positive refractive power, and an object-side surface thereof is convex and an image-side surface thereof is concave. In addition, at least one inflection point is formed on either one or both of the object-side surface and the image-side surface of the sixth lens 6026. The seventh lens 7026 has a positive refractive power, and an object-side surface thereof is convex and an image-side surface thereof is concave. In addition, two inflection points are formed on the object-side surface of the seventh lens 7026, and one inflection point is formed on the image-side surface of the seventh lens 7026.

The optical imaging system 26 further includes a stop, a filter 8026, and an image sensor 9026. The stop is disposed between the second lens 2026 and the third lens 3026 to adjust an amount of light incident on the image sensor 9026. The filter 8026 is disposed between the seventh lens 7026 and the image sensor 9026 to block infrared rays. The image sensor 9026 forms an imaging plane on which an image of a subject is formed. Although not illustrated in FIG. 51, the stop is disposed at a distance of 0.8664 mm from the object-side surface of the first lens 1026 toward the imaging plane of the optical imaging system 26. This distance is equal to TTL-SL and can be calculated from the values of TTL and SL for Example 26 listed in Table 57 that appears later in this application.

Table 51 below shows physical properties of the lenses and other elements of the optical imaging system of FIG. 51, and Table 52 below shows aspherical surface coefficients of the lenses of FIG. 51.

TABLE 51

| Surface No. | Element | Radius of Curvature | Thickness/ Distance | Index of Refraction | Abbe Number | Effective Aperture Radius |
|---|---|---|---|---|---|---|
| S1 | First | 1.8830 | 0.5872 | 1.546 | 56.114 | 1.050 |
| S2 | Lens | 18.0733 | 0.0492 | | | 0.962 |
| S3 | Second Lens | 4.5995 | 0.2300 | 1.667 | 20.353 | 0.934 |
| S4 | (Stop) | 2.5464 | 0.3929 | | | 0.837 |
| S5 | Third | −21.7546 | 0.2745 | 1.546 | 56.114 | 1.100 |
| S6 | Lens | −13.5144 | 0.0611 | | | 1.106 |
| S7 | Fourth | 25.3349 | 0.2655 | 1.546 | 56.114 | 1.200 |
| S8 | Lens | 25.3360 | 0.3710 | | | 1.285 |
| S9 | Fifth | 9.4682 | 0.3930 | 1.656 | 21.525 | 1.500 |
| S10 | Lens | 5.1029 | 0.3790 | | | 1.754 |
| S11 | Sixth | 6.4162 | 0.8885 | 1.546 | 56.114 | 2.041 |
| S12 | Lens | 6.3521 | 0.0460 | | | 2.631 |
| S13 | Seventh | 1.9665 | 0.8854 | 1.536 | 55.656 | 3.050 |

TABLE 51-continued

| Surface No. | Element | Radius of Curvature | Thickness/ Distance | Index of Refraction | Abbe Number | Effective Aperture Radius |
|---|---|---|---|---|---|---|
| S14 | Lens | 1.7699 | 0.3098 | | | 3.456 |
| S15 | Filter | Infinity | 0.2100 | 1.518 | 64.197 | 3.768 |
| S16 | | Infinity | 0.6537 | | | 3.829 |
| S17 | Imaging Plane | Infinity | -0.0037 | | | 4.129 |

TABLE 52

| | K | A | B | C | D | E | F | G | H | J |
|---|---|---|---|---|---|---|---|---|---|---|
| S1 | -0.1525 | 0.0035 | 0.0054 | -0.0238 | 0.0587 | -0.0925 | 0.0808 | -0.0376 | 0.0069 | 0 |
| S2 | -36.188 | -0.0554 | 0.191 | -0.4954 | 0.9092 | -1.1194 | 0.849 | -0.3546 | 0.0617 | 0 |
| S3 | -0.1164 | -0.0883 | 0.2264 | -0.5273 | 0.9947 | -1.274 | 1.0104 | -0.4343 | 0.076 | 0 |
| S4 | 0.3326 | -0.0462 | 0.097 | -0.2316 | 0.5455 | -0.848 | 0.7854 | -0.3759 | 0.0708 | 0 |
| S5 | 51.758 | -0.0119 | -0.0911 | 0.3617 | -0.9067 | 1.3845 | -1.3014 | 0.6835 | -0.1493 | 0 |
| S6 | 42.164 | 0.0924 | -0.5269 | 1.3558 | -2.2584 | 2.5093 | -1.8107 | 0.7611 | -0.139 | 0 |
| S7 | -4.7579 | 0.1336 | -0.5938 | 1.261 | -1.8115 | 1.7924 | -1.1666 | 0.4427 | -0.0728 | 0 |
| S8 | -3.4393 | 0.0471 | -0.1842 | 0.2886 | -0.3575 | 0.3273 | -0.1971 | 0.067 | -0.0093 | 0 |
| S9 | -8.5449 | -0.0502 | -0.0588 | 0.1599 | -0.2027 | 0.1398 | -0.0542 | 0.0105 | -0.0007 | 0 |
| S10 | -18.064 | -0.044 | -0.0734 | 0.1425 | -0.1303 | 0.0691 | -0.0217 | 0.0038 | -0.0003 | 0 |
| S11 | -4.6497 | 0.0633 | -0.1193 | 0.0882 | -0.0426 | 0.0135 | -0.0028 | 0.0004 | -2E-05 | 0 |
| S12 | -50 | 0.034 | -0.0497 | 0.0246 | -0.0072 | 0.0013 | -0.0001 | 7E-06 | -2E-07 | 0 |
| S13 | -2.4291 | -0.1201 | 0.0167 | 0.0022 | -0.0009 | 0.0001 | -6E-06 | 1E-07 | 9E-10 | 0 |
| S14 | -1.0032 | -0.1111 | 0.0248 | -0.0032 | -0.0001 | 0.0001 | -2E-05 | 2E-06 | -8E-08 | 1E-09 |

Twenty-Seventh Example

Figure 53:
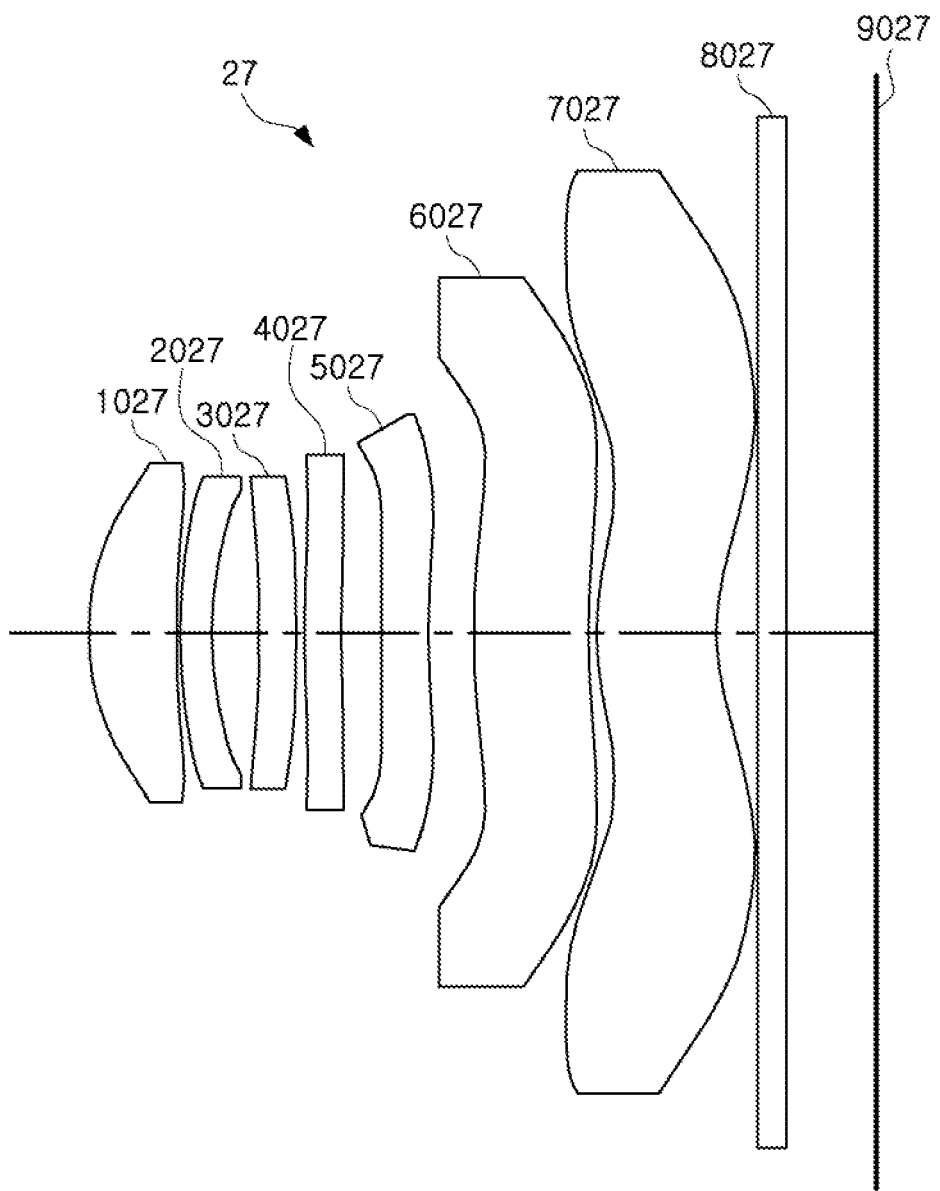
FIG. 53 is a view illustrating a twenty-seventh example of an optical imaging system.
Figure 54:
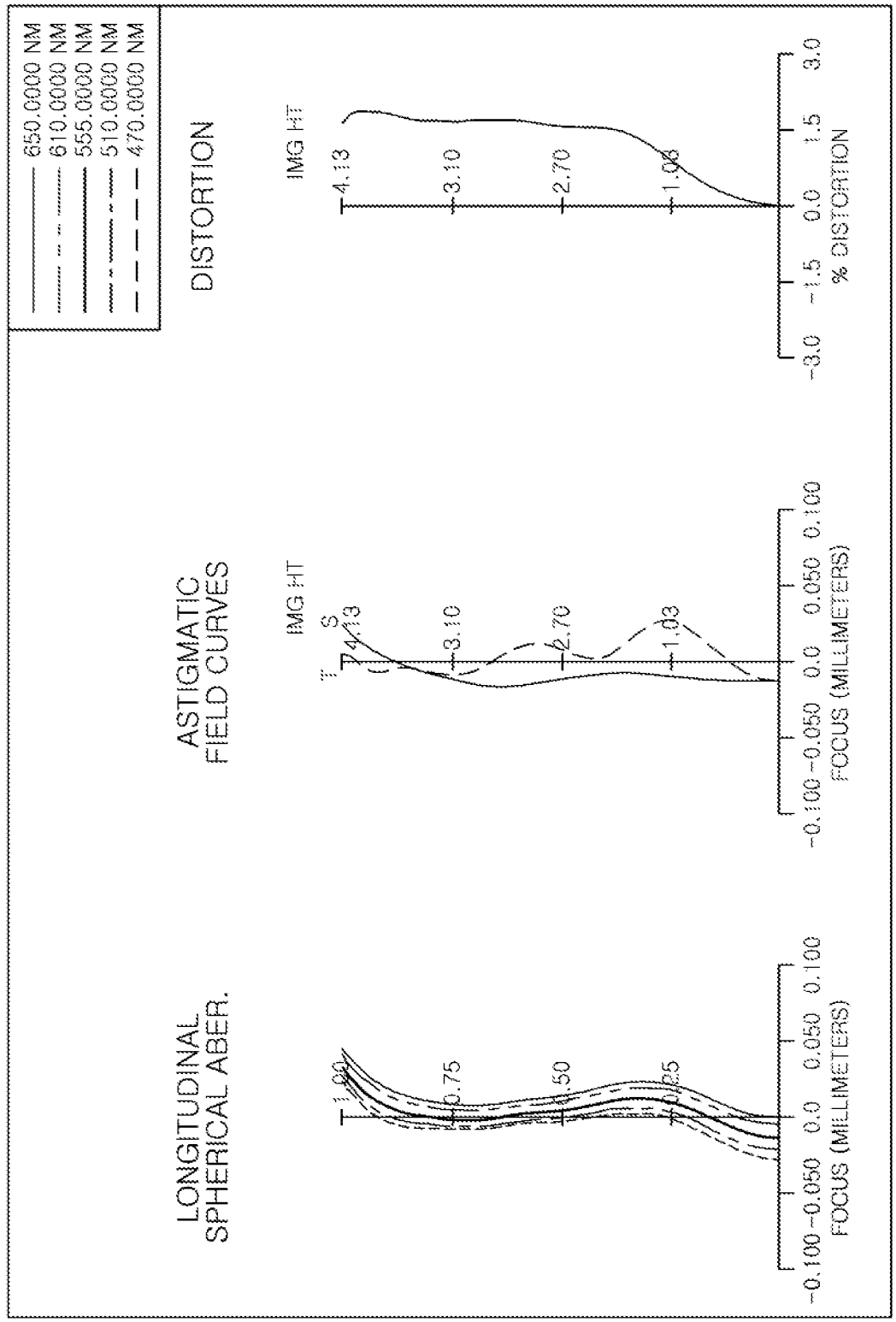
FIG. 54 illustrates aberration curves of the optical imaging system of FIG. 53.

FIG. 53 is a view illustrating a twenty-seventh example of an optical imaging system, and FIG. 54 illustrates aberration curves of the optical imaging system of FIG. 53.

An optical imaging system 27 includes a first lens 1027, a second lens 2027, a third lens 3027, a fourth lens 4027, a fifth lens 5027, a sixth lens 6027, and a seventh lens 7027.

The first lens 1027 has a positive refractive power, and an object-side surface thereof is convex and an image-side surface thereof is concave. The second lens 2027 has a negative refractive power, and an object-side surface thereof is convex and an image-side surface thereof is concave. The third lens 3027 has a positive refractive power, and an object-side surface thereof is concave and an image-side surface thereof is convex. The fourth lens 4027 has a positive refractive power, and an object-side surface thereof is convex and an image-side surface thereof is concave. The fifth lens 5027 has a negative refractive power, and an object-side surface thereof is convex and an image-side surface thereof is concave. The sixth lens 6027 has a positive refractive power, and an object-side surface thereof is convex and an image-side surface thereof is concave. In addition, at least one inflection point is formed on either one or both of the object-side surface and the image-side surface of the sixth lens 6027. The seventh lens 7027 has a positive refractive power, and an object-side surface thereof is convex and an image-side surface thereof is concave. In addition, two inflection points are formed on the object-side surface of the seventh lens 7027, and one inflection point is formed on the image-side surface of the seventh lens 7027.

The optical imaging system 27 further includes a stop, a filter 8027, and an image sensor 9027. The stop is disposed between the second lens 2027 and the third lens 3027 to adjust an amount of light incident on the image sensor 9027. The filter 8027 is disposed between the seventh lens 7027 and the image sensor 9027 to block infrared rays. The image sensor 9027 forms an imaging plane on which an image of a subject is formed. Although not illustrated in FIG. 53, the stop is disposed at a distance of 0.9037 mm from the object-side surface of the first lens 1027 toward the imaging plane of the optical imaging system 27. This distance is equal to TTL-SL and can be calculated from the values of TTL and SL for Example 27 listed in Table 57 that appears later in this application.

Table 53 below shows physical properties of the lenses and other elements of the optical imaging system of FIG. 53, and Table 54 below shows aspherical surface coefficients of the lenses of FIG. 53.

TABLE 53

| Surface No. | Element | Radius of Curvature | Thickness/ Distance | Index of Refraction | Abbe Number | Effective Aperture Radius |
|---|---|---|---|---|---|---|
| S1 | First | 1.8987 | 0.6486 | 1.546 | 56.114 | 1.260 |
| S2 | Lens | 7.3568 | 0.0250 | | | 1.216 |
| S3 | Second | 3.8789 | 0.2300 | 1.667 | 20.353 | 1.161 |
| S4 | Lens (Stop) | 2.7620 | 0.3408 | | | 1.053 |
| S5 | Third | -50.1242 | 0.2819 | 1.546 | 56.114 | 1.120 |
| S6 | Lens | -14.9889 | 0.0597 | | | 1.158 |
| S7 | Fourth | 12.0498 | 0.2698 | 1.546 | 56.114 | 1.220 |
| S8 | Lens | 12.5657 | 0.2919 | | | 1.320 |
| S9 | Fifth | 9.5926 | 0.3500 | 1.667 | 20.353 | 1.520 |
| S10 | Lens | 5.2748 | 0.3344 | | | 1.762 |
| S11 | Sixth | 6.8735 | 0.8484 | 1.546 | 56.114 | 2.052 |
| S12 | Lens | 7.4933 | 0.0591 | | | 2.641 |
| S13 | Seventh | 2.0337 | 0.8836 | 1.536 | 55.656 | 3.070 |
| S14 | Lens | 1.8436 | 0.3048 | | | 3.425 |
| S15 | Filter | Infinity | 0.2100 | 1.518 | 64.197 | 3.764 |
| S16 | | Infinity | 0.6441 | | | 3.825 |
| S17 | Imaging Plane | Infinity | 0.0150 | | | 4.134 |

TABLE 54

|  | K | A | B | C | D | E | F | G | H | J |
|---|---|---|---|---|---|---|---|---|---|---|
| S1 | −0.1061 | −0.0082 | 0.0469 | −0.0925 | 0.0811 | −0.0129 | −0.032 | 0.0224 | −0.0047 | 0 |
| S2 | −36.188 | −0.0502 | 0.1624 | −0.4029 | 0.6931 | −0.7643 | 0.5021 | −0.1789 | 0.0264 | 0 |
| S3 | 0.0036 | −0.0795 | 0.2057 | −0.548 | 1.0742 | −1.291 | 0.9097 | −0.3412 | 0.052 | 0 |
| S4 | 0.4038 | −0.0325 | 0.0884 | −0.3009 | 0.7004 | −0.9194 | 0.6738 | −0.2424 | 0.0308 | 0 |
| S5 | 51.758 | 0.0055 | −0.1746 | 0.5018 | −0.9395 | 1.1442 | −0.9144 | 0.4407 | −0.0937 | 0 |
| S6 | 42.164 | 0.0953 | −0.4992 | 1.0397 | −1.2284 | 0.8169 | −0.2802 | 0.0384 | 4E−06 | 0 |
| S7 | −4.7579 | 0.1185 | −0.4938 | 0.8554 | −0.8643 | 0.5167 | −0.185 | 0.0417 | −0.0054 | 0 |
| S8 | −3.4393 | 0.0492 | −0.194 | 0.3147 | −0.3773 | 0.3249 | −0.1878 | 0.063 | −0.0088 | 0 |
| S9 | −8.5449 | −0.0638 | 0.0289 | −0.0884 | 0.1649 | −0.171 | 0.0983 | −0.0306 | 0.0041 | 0 |
| S10 | −18.064 | −0.0543 | −0.0172 | 0.0321 | −0.0179 | 0.004 | 5E−06 | −0.0001 | 8E−06 | 0 |
| S11 | −4.6497 | 0.0535 | −0.0909 | 0.0613 | −0.0311 | 0.011 | −0.0026 | 0.0004 | −2E−05 | 0 |
| S12 | −50 | 0.0103 | −0.0176 | 0.0057 | −0.0015 | 0.0003 | −4E−05 | 2E−06 | −6E−08 | 0 |
| S13 | −2.606 | −0.1177 | 0.0192 | −0.0004 | −1E−04 | −1E−05 | 4E−06 | −4E−07 | 9E−09 | 0 |
| S14 | −1.0102 | −0.0979 | 0.0187 | −0.0024 | 0.0001 | 2E−05 | −6E−06 | 6E−07 | −3E−08 | 6E−10 |

Twenty-Eighth Example

Figure 55:
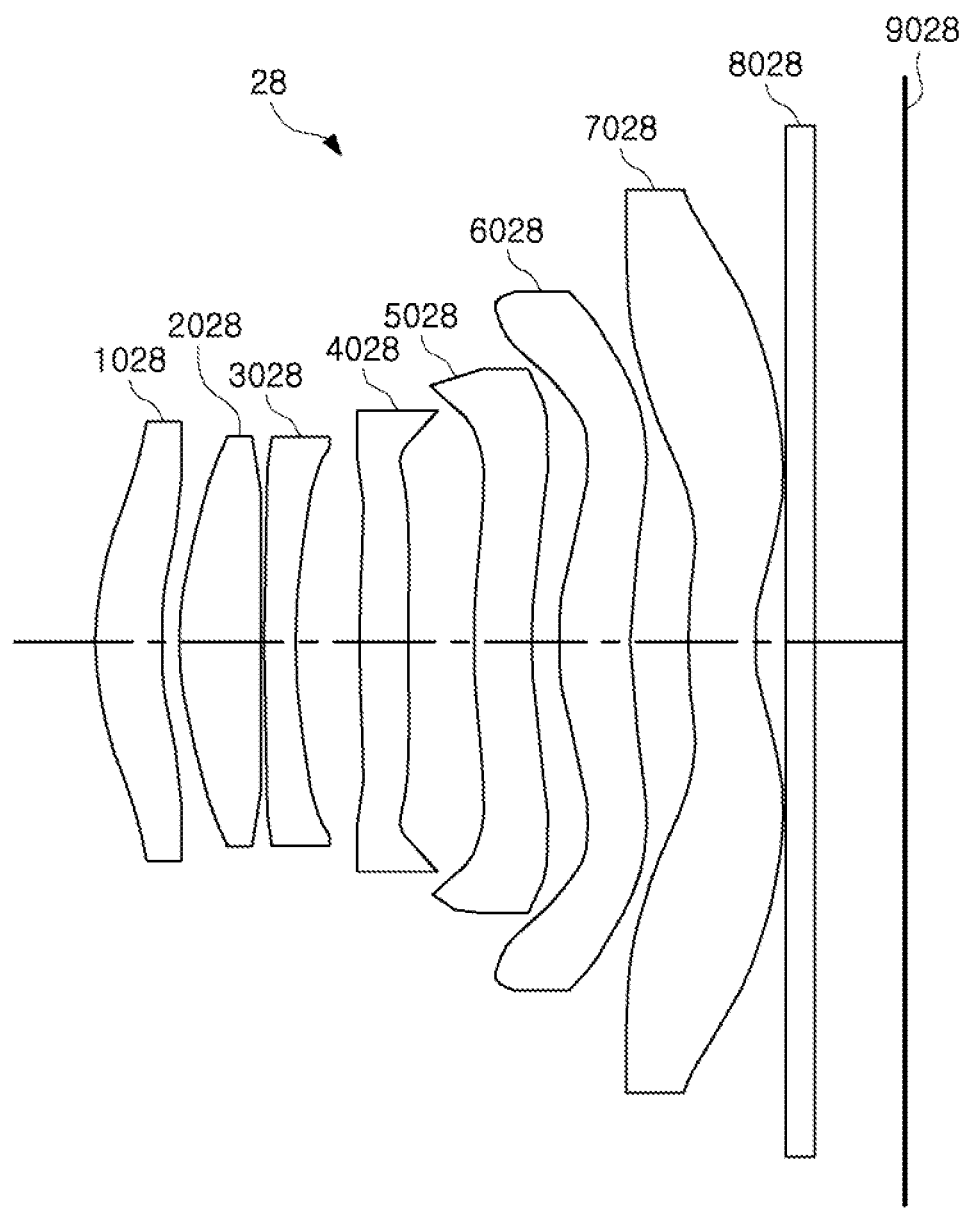
FIG. 55 is a view illustrating a twenty-eighth example of an optical imaging system.
Figure 56:
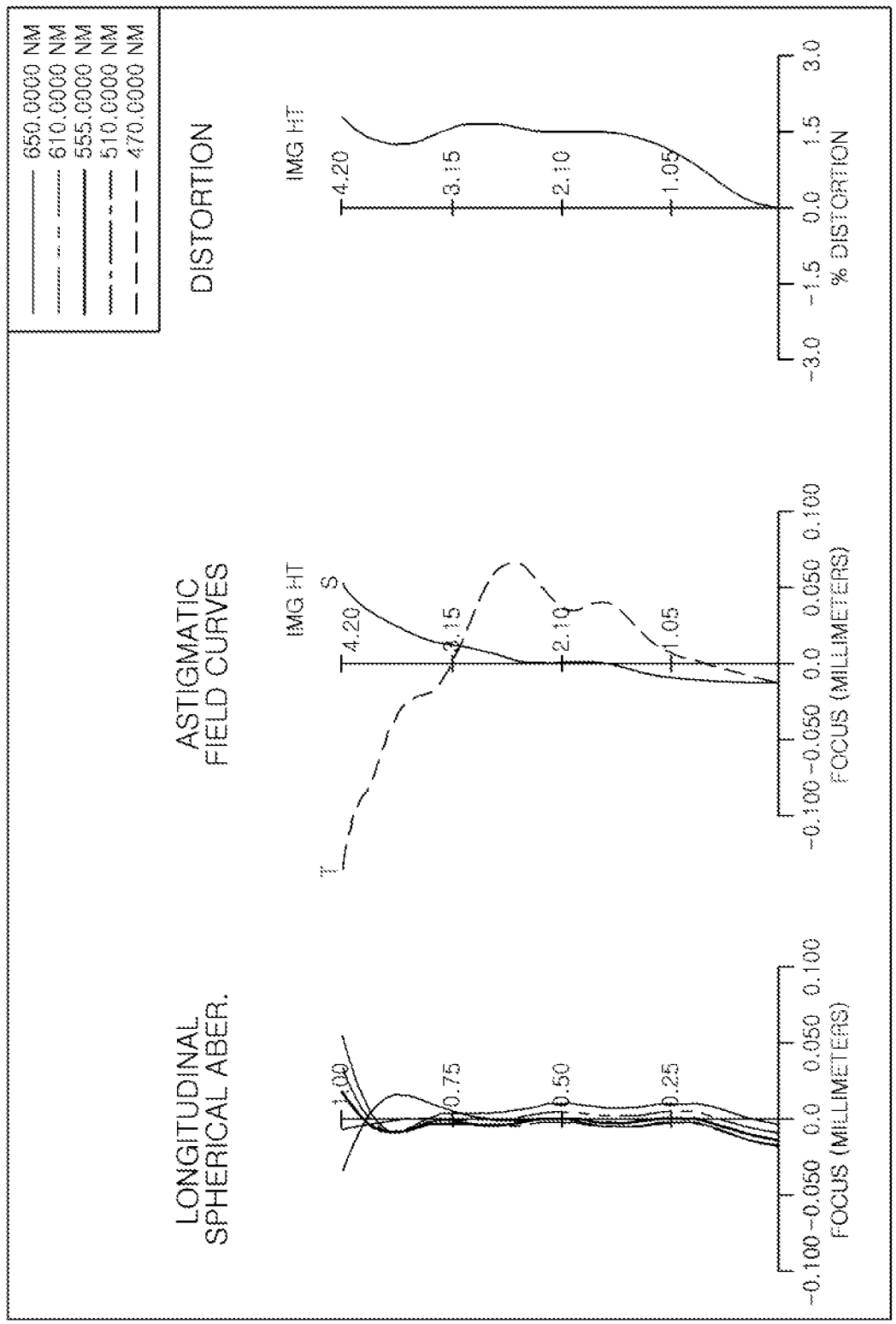
FIG. 56 illustrates aberration curves of the optical imaging system of FIG. 55.

FIG. 55 is a view illustrating a twenty-eighth example of an optical imaging system, and FIG. 56 illustrates aberration curves of the optical imaging system of FIG. 55.

An optical imaging system 28 includes a first lens 1028, a second lens 2028, a third lens 3028, a fourth lens 4028, a fifth lens 5028, a sixth lens 6028, and a seventh lens 7028.

The first lens 1028 has a positive refractive power, and an object-side surface thereof is convex and an image-side surface thereof is concave. The second lens 2028 has a positive refractive power, and an object-side surface thereof is convex and an image-side surface thereof is concave. The third lens 3028 has a negative refractive power, and an object-side surface thereof is convex and an image-side surface thereof is concave. The fourth lens 4028 has a positive refractive power, and an object-side surface thereof is convex and an image-side surface thereof is concave. The fifth lens 5028 has a negative refractive power, and an object-side surface thereof is convex and an image-side surface thereof is concave. The sixth lens 6028 has a positive refractive power, and an object-side surface thereof is convex and an image-side surface thereof is concave. In addition, at least one inflection point is formed on either one or both of the object-side surface and the image-side surface of the sixth lens 6028. The seventh lens 7028 has a negative refractive power, and an object-side surface thereof is convex and an image-side surface thereof is concave. In addition, one inflection point is formed on each of the object-side surface and the image-side surface of the seventh lens 7028.

The optical imaging system 28 further includes a stop, a filter 8028, and an image sensor 9028. The stop is disposed between the second lens 2028 and the third lens 3028 to adjust an amount of light incident on the image sensor 9028. The filter 8028 is disposed between the seventh lens 7028 and the image sensor 9028 to block infrared rays. The image sensor 9028 forms an imaging plane on which an image of a subject is formed. Although not illustrated in FIG. 55, the stop is disposed at a distance of 1.2500 mm from the object-side surface of the first lens 1028 toward the imaging plane of the optical imaging system 28. This distance is equal to TTL-SL and can be calculated from the values of TTL and SL for Example 28 listed in Table 57 that appears later in this application.

Table 55 below shows physical properties of the lenses and other elements of the optical imaging system of FIG. 55, and Table 56 below shows aspherical surface coefficients of the lenses of FIG. 55.

TABLE 55

| Surface No. | Element | Radius of Curvature | Thickness/ Distance | Index of Refraction | Abbe Number | Effective Aperture Radius |
|---|---|---|---|---|---|---|
| S1 | First | 2.2813 | 0.4941 | 1.546 | 56.114 | 1.640 |
| S2 | Lens | 2.7190 | 0.1308 |  |  | 1.629 |
| S3 | Second | 2.7090 | 0.6000 | 1.546 | 56.114 | 1.595 |
| S4 | Lens | 37.2451 | 0.0250 |  |  | 1.593 |
| S5 | (Stop) | 11.0960 | 0.2300 | 1.679 | 19.236 | 1.522 |
| S6 | Third | 4.3260 | 0.4820 |  |  | 1.450 |
| S7 | Lens Fourth | 8.7091 | 0.3517 | 1.656 | 21.525 | 1.514 |
| S8 | Lens | 14.9889 | 0.4926 |  |  | 1.555 |
| S9 | Fifth | 5.3406 | 0.4257 | 1.679 | 19.236 | 1.840 |
| S10 | Lens | 2.9721 | 0.1952 |  |  | 2.415 |
| S11 | Sixth | 2.1211 | 0.5425 | 1.546 | 56.114 | 2.362 |
| S12 | Lens | 4.9818 | 0.4212 |  |  | 2.717 |
| S13 | Seventh | 2.4999 | 0.5046 | 1.546 | 56.114 | 3.169 |
| S14 | Lens | 1.4794 | 0.2230 |  |  | 3.372 |
| S15 | Filter | Infinity | 0.2100 | 1.518 | 64.197 | 3.779 |
| S16 |  | Infinity | 0.6566 |  |  | 3.848 |
| S17 | Imaging Plane | Infinity | 0.0150 |  |  | 4.210 |

TABLE 56

|  | K | A | B | C | D | E | F | G | H | J |
|---|---|---|---|---|---|---|---|---|---|---|
| S1 | −0.9867 | −0.0114 | 0.0111 | −0.0538 | 0.0917 | −0.0925 | 0.0542 | −0.0183 | 0.0033 | −0.0003 |
| S2 | −12.035 | 0.0479 | −0.173 | 0.2637 | −0.3194 | 0.2597 | −0.1301 | 0.0386 | −0.0062 | 0.0004 |
| S3 | −0.9455 | −0.0107 | −0.0528 | 0.1054 | −0.1922 | 0.2187 | −0.1388 | 0.0499 | −0.0096 | 0.0008 |
| S4 | 3.0384 | −0.0418 | 0.2162 | −0.5714 | 0.8143 | −0.6941 | 0.3642 | −0.1154 | 0.0202 | −0.0015 |
| S5 | 10.164 | −0.0842 | 0.2583 | −0.5961 | 0.8439 | −0.7413 | 0.4043 | −0.1328 | 0.0241 | −0.0018 |
| S6 | 2.0809 | −0.0648 | 0.1424 | −0.2905 | 0.4095 | −0.3776 | 0.2224 | −0.0802 | 0.0163 | −0.0014 |
| S7 | −13.097 | −0.0215 | −0.0518 | 0.145 | −0.2583 | 0.2777 | −0.1843 | 0.0733 | −0.0157 | 0.0014 |
| S8 | 5.8592 | −0.0435 | 0.0377 | −0.0856 | 0.1074 | −0.0887 | 0.0479 | −0.0161 | 0.0031 | −0.0003 |
| S9 | −43.521 | −0.0279 | 0.0228 | 0.0104 | −0.0468 | 0.0468 | −0.0253 | 0.0078 | −0.0013 | 9E−05 |
| S10 | −17.628 | −0.0671 | 0.0426 | −0.0048 | −0.0103 | 0.0068 | −0.0022 | 0.0004 | −4E−05 | 1E−06 |
| S11 | −9.8081 | 0.0426 | −0.1025 | 0.0919 | −0.0514 | 0.0177 | −0.0039 | 0.0006 | −5E−05 | 2E−06 |

TABLE 56-continued

| | K | A | B | C | D | E | F | G | H | J |
|---|---|---|---|---|---|---|---|---|---|---|
| S12 | −0.0695 | 0.0048 | −0.0496 | 0.0379 | −0.0164 | 0.004 | −0.0005 | 4E−05 | −8E−07 | −1E−08 |
| S13 | −0.6908 | −0.2261 | 0.0409 | 0.0129 | −0.0077 | 0.0017 | −0.0002 | 1E−05 | −6E−07 | 1E−08 |
| S14 | −1.419 | −0.2123 | 0.0904 | −0.0281 | 0.0063 | −0.001 | 9E−05 | −6E−06 | 2E−07 | −2E−09 |

Table 57 below shows an overall focal length f of the optical imaging system, an overall length TTL of the optical imaging system (a distance from the object-side surface of the first lens to the imaging plane), a distance SL from the stop to the imaging plane, an f-number (F No.) of the optical imaging system (the overall focal length f of the optical imaging system divided by the diameter of an entrance pupil of the optical imaging system, where both f and the diameter of the entrance pupil are expressed in mm), an image height (IMG HT) on the imaging plane (one-half of a diagonal length of the imaging plane), and a field of view (FOV) of the optical imaging system for each of Examples 1-28 described herein. The values of f, TTL, SL, and IMG HT are expressed in mm. The values of F No. are dimensionless values. The values of FOV are expressed in degrees.

TABLE 57

| Example | f | TTL | SL | F No. | IMG HT | FOV | f134567 |
|---|---|---|---|---|---|---|---|
| 1 | 4.8480 | 6.000 | 5.0965 | 1.540 | 4.000 | 77.800 | 3.4441 |
| 2 | 4.2829 | 5.1899 | 3.9385 | 1.5853 | 3.6900 | 79.815 | −23.2030 |
| 3 | 4.7800 | 5.8272 | 4.4022 | 1.5729 | 4.0500 | 79.019 | −42.8744 |
| 4 | 3.9500 | 4.8189 | 3.6503 | 1.5808 | 3.2500 | 77.470 | −30.5480 |
| 5 | 4.3500 | 5.3000 | 4.9170 | 1.5800 | 3.3844 | 79.580 | −5.2273 |
| 6 | 4.2800 | 5.1000 | 4.3688 | 1.7100 | 3.5352 | 77.840 | 2.7518 |
| 7 | 4.4011 | 5.3000 | 4.1423 | 1.6897 | 3.7280 | 79.310 | −26.4128 |
| 8 | 4.5110 | 5.4999 | 4.4199 | 1.6585 | 3.7280 | 77.849 | 392.6438 |
| 9 | 4.5442 | 5.5000 | 4.4233 | 1.6724 | 3.7280 | 77.539 | −58.4566 |
| 10 | 4.8227 | 5.8648 | 4.6866 | 1.6639 | 3.7280 | 73.384 | 89.9938 |
| 11 | 4.5369 | 5.5000 | 4.2704 | 1.5688 | 3.7280 | 77.565 | −21.5648 |
| 12 | 4.8309 | 5.9552 | 4.7759 | 1.6624 | 4.1280 | 79.742 | −11.9581 |
| 13 | 5.0858 | 5.9999 | 4.7947 | 1.5909 | 4.1280 | 76.863 | −8.3987 |
| 14 | 4.4468 | 5.1439 | 4.8939 | 2.0717 | 3.5280 | 75.627 | 2.5748 |
| 15 | 4.4000 | 5.2000 | | 1.8078 | 3.2610 | 72.552 | 3.0701 |
| 16 | 3.9935 | 5.1246 | 4.4837 | 1.5723 | 3.2610 | 77.383 | 3.8824 |
| 17 | 3.9200 | 4.7000 | 4.0189 | 1.8300 | 3.2610 | 78.330 | 2.7493 |
| 18 | 4.0052 | 4.9400 | 3.8888 | 1.5800 | 3.2260 | 76.500 | 6.5989 |
| 19 | 4.3329 | 5.3200 | 4.9460 | 1.4980 | 3.7520 | 80.300 | −5.0314 |
| 20 | 4.7371 | 5.8000 | 4.7399 | 1.5686 | 4.2500 | 82.209 | 3.7697 |
| 21 | 4.5877 | 5.6173 | 4.4893 | 1.6867 | 3.7280 | 76.901 | −157.3713 |
| 22 | 4.4980 | 5.5000 | 4.2749 | 1.6297 | 3.7280 | 78.012 | −9.9003 |
| 23 | 4.5861 | 5.4613 | 4.5098 | 1.7914 | 3.7280 | 76.963 | 3.1230 |
| 24 | 4.3158 | 5.2500 | 4.3926 | 1.6913 | 3.7280 | 80.429 | 3.0710 |
| 25 | 4.3017 | 5.2400 | 4.3678 | 1.9545 | 3.7280 | 80.465 | 3.0059 |
| 26 | 4.9659 | 5.9933 | 5.1269 | 2.3647 | 4.1280 | 78.448 | 3.1668 |
| 27 | 4.6674 | 5.7971 | 4.8934 | 1.8451 | 4.1280 | 81.802 | 3.6413 |
| 28 | 4.8700 | 6.0000 | 4.7500 | 1.4848 | 4.2000 | 80.288 | −23.7892 |

Table 58 below shows in mm a focal length f1 of the first lens, a focal length f2 of the second lens, a focal length f3 of the third lens, a focal length f4 of the fourth lens, a focal length f5 of the fifth lens, a focal length f6 of the sixth lens, and a focal length f7 of the seventh lens for each of Examples 1-28 described herein.

TABLE 58

| Example | f1 | f2 | f3 | f4 | f5 | f6 | f7 |
|---|---|---|---|---|---|---|---|
| 1 | 4.699 | −11.772 | 21.070 | −38.885 | −12.922 | 2.771 | −2.453 |
| 2 | 9.5890 | 4.5406 | −6.9872 | 17555492 | 558.7000 | −30.322 | 1998.195 |
| 3 | 10.0345 | 5.2922 | −7.6128 | 22346862 | 86.5836 | −27.728 | 146.074 |
| 4 | 8.4094 | 4.3550 | −6.5204 | −4512 | 74.3686 | −22.452 | 1842.731 |
| 5 | −64.2326 | 3.2480 | −7.4275 | −43.7223 | 52.4247 | 3.010 | −2.424 |
| 6 | 3.5960 | −7.3490 | −1245.24 | 15.6567 | −19.7232 | 2.662 | −2.171 |
| 7 | 9.9516 | 4.9854 | −9.0419 | −60.9593 | 28.4615 | −19.130 | −36.205 |
| 8 | 12.2172 | 6.0167 | −9.9247 | 25.3582 | 28.7232 | −32.884 | −16.737 |
| 9 | 13.4191 | 5.6271 | −8.9208 | 16.1417 | −36.7578 | 29.873 | −12.281 |
| 10 | 13.6636 | 6.5561 | −11.4351 | 32.2946 | 28.3279 | −36.885 | −22.967 |
| 11 | 17.0122 | 4.9962 | −9.0344 | 25.7533 | 24.3015 | −79.899 | −10.773 |
| 12 | 32.0696 | 4.9582 | −9.5104 | 22.5720 | 16.1804 | −12.867 | −20.135 |
| 13 | 43.5223 | 4.4621 | −8.8732 | 52.4923 | 16.2883 | −17.315 | −19.385 |

TABLE 58-continued

| Example | f1 | f2 | f3 | f4 | f5 | f6 | f7 |
|---|---|---|---|---|---|---|---|
| 14 | 3.6264 | −6.9779 | 10.5508 | 125.3810 | −28.1554 | −367.720 | −9.031 |
| 15 | 4.2900 | −10.6063 | 30.9779 | 14.8711 | −21.1331 | 3.784 | −2.465 |
| 16 | 5.6767 | −73.5511 | −122.7160 | 15.5097 | 207.3750 | 3.799 | −2.466 |
| 17 | 3.5400 | −8.7600 | −87.3600 | 14.1800 | −64.1800 | −799.990 | −18.040 |
| 18 | 5.0178 | 11.6357 | −8.1681 | −18.7682 | 18.1322 | 2.601 | −2.226 |
| 19 | −31.5304 | 3.1365 | −7.5452 | −130.0329 | 80.8864 | 2.966 | −2.423 |
| 20 | 5.1067 | −17.5830 | 27.4583 | −30.2565 | −75.8106 | 2.526 | −2.062 |
| 21 | 14.2697 | 5.4868 | −9.0060 | 21.0725 | −18.2040 | 43.002 | 92.362 |
| 22 | 20.3702 | 4.0105 | −7.6691 | 107.4534 | −23.0047 | 189.703 | 54.850 |
| 23 | 3.8083 | −9.4079 | −530.7502 | 22.8366 | −27.1051 | −22.324 | 66.015 |
| 24 | 4.2066 | −10.3310 | 27.6314 | 107.6478 | 4.1658 | 7.509 | −2.062 |
| 25 | 3.6197 | −10.4284 | 39.8209 | −38.7622 | 4.3417 | 10.303 | −2.323 |
| 26 | 3.8015 | −8.9549 | 64.5946 | 12384.8 | −17.5030 | 299.093 | 57.797 |
| 27 | 4.4990 | −15.6740 | 39.0579 | 453.7793 | −18.1602 | 102.612 | 59.134 |
| 28 | 18.5366 | 5.3131 | −10.5800 | 30.6731 | −10.6364 | 6.334 | −8.036 |

Table 59 below shows in mm a thickness (DedgeT) of an edge of the first lens, a thickness (L2edgeT) of an edge of the second lens, a thickness (L3edgeT) of an edge of the third lens, a thickness (L4edgeT) of an edge of the fourth lens, a thickness (L5edgeT) of an edge of the fifth lens, a thickness (L6edgeT) of an edge of the sixth lens, and a thickness (L7edgeT) of an edge of the seventh lens for each of Examples 1-28 described herein.

TABLE 59

| Example | L1edgeT | L2edgeT | L3edgeT | L4edgeT | L5edgeT | L6edgeT | L7edgeT |
|---|---|---|---|---|---|---|---|
| 1 | 0.2527 | 0.3544 | 0.2546 | 0.3479 | 0.2843 | 0.2558 | 0.8308 |
| 2 | 0.2513 | 0.2829 | 0.3599 | 0.2195 | 0.2899 | 0.3277 | 0.3914 |
| 3 | 0.2822 | 0.3127 | 0.4160 | 0.2370 | 0.3248 | 0.3709 | 0.3823 |
| 4 | 0.2327 | 0.2588 | 0.3335 | 0.2027 | 0.2718 | 0.3298 | 0.3765 |
| 5 | 0.2200 | 0.2700 | 0.3480 | 0.2240 | 0.2590 | 0.2690 | 0.4370 |
| 6 | 0.2216 | 0.3773 | 0.2347 | 0.2401 | 0.1894 | 0.2600 | 0.3234 |
| 7 | 0.2568 | 0.2552 | 0.3401 | 0.2756 | 0.3650 | 0.3065 | 0.2776 |
| 8 | 0.2535 | 0.2550 | 0.4864 | 0.2519 | 0.3609 | 0.4901 | 0.4086 |
| 9 | 0.2497 | 0.2500 | 0.4399 | 0.2704 | 0.3183 | 0.6519 | 0.2941 |
| 10 | 0.2855 | 0.3362 | 0.4980 | 0.2610 | 0.4273 | 0.4966 | 0.4889 |
| 11 | 0.2582 | 0.2578 | 0.4040 | 0.2530 | 0.4107 | 0.2818 | 0.4636 |
| 12 | 0.2479 | 0.3333 | 0.3826 | 0.3612 | 0.5824 | 0.3553 | 0.6406 |
| 13 | 0.2542 | 0.1246 | 0.4252 | 0.2768 | 0.3797 | 0.4611 | 0.3277 |
| 14 | 0.2688 | 0.3078 | 0.1901 | 0.2300 | 0.4099 | 0.7139 | 0.3000 |
| 15 | 0.2048 | 0.4069 | 0.2010 | 0.3332 | 0.2778 | 0.3483 | 0.8151 |
| 16 | 0.2180 | 0.3468 | 0.2110 | 0.2593 | 0.2768 | 0.2512 | 0.9497 |
| 17 | 0.1000 | 0.2800 | 0.1200 | 0.4200 | 0.1600 | 0.4100 | 0.5800 |
| 18 | 0.2320 | 0.2180 | 0.3500 | 0.2220 | 0.2410 | 0.3730 | 0.3970 |
| 19 | 0.2203 | 0.2484 | 0.3500 | 0.2373 | 0.2517 | 0.2418 | 0.5401 |
| 20 | 0.4351 | 0.3299 | 0.2145 | 0.3306 | 0.1429 | 0.2681 | 0.5558 |
| 21 | 0.2502 | 0.3421 | 0.3843 | 0.4086 | 0.2945 | 0.7273 | 0.2827 |
| 22 | 0.2675 | 0.3957 | 0.3836 | 0.4004 | 0.2278 | 0.5887 | 0.3421 |
| 23 | 0.2307 | 0.2892 | 0.2545 | 0.2544 | 0.3605 | 0.4762 | 0.6576 |
| 24 | 0.2501 | 0.3506 | 0.2323 | 0.3110 | 0.3641 | 0.3267 | 0.3719 |
| 25 | 0.2520 | 0.2935 | 0.2377 | 0.3745 | 0.2580 | 0.4152 | 0.6857 |
| 26 | 0.2927 | 0.2979 | 0.2516 | 0.2513 | 0.4092 | 0.7155 | 0.6778 |
| 27 | 0.2463 | 0.2800 | 0.2542 | 0.2728 | 0.3562 | 0.6300 | 0.6917 |
| 28 | 0.2515 | 0.1596 | 0.4288 | 0.3024 | 0.4301 | 0.3912 | 0.4326 |

Table 60 below shows in mm a sag (L5S1 sag) of an object-side surface of the fifth lens, a sag (L5S2 sag) of an image-side surface of the fifth lens, a thickness (Yc71P1) of the seventh lens at a first inflection point on the object-side surface of the seventh lens, a thickness (Yc71P2) of the seventh lens at a second inflection point on the object-side surface of the seventh lens, a thickness (Yc72P1) of the seventh lens at a first inflection point on the image-side surface of the seventh lens, and a thickness (Yc72P2) of the seventh lens at a second inflection point on the image-side surface of the seventh lens for each of Examples 1-28 described herein.

TABLE 60

| Example | L5S1 sag | L5S2 sag | Yc71P1 | Yc71P2 | Yc72P1 | Yc72P2 |
|---|---|---|---|---|---|---|
| 1 | −0.4639 | −0.4961 | 1.3100 | — | 0.9900 | — |
| 2 | 0.1069 | 0.1580 | 0.5970 | 0.6980 | 0.6920 | — |
| 3 | 0.1973 | 0.1988 | 0.6780 | 0.8030 | 0.7950 | — |

TABLE 60-continued

| Example | L5S1 sag | L5S2 sag | Yc71P1 | Yc71P2 | Yc72P1 | Yc72P2 |
|---|---|---|---|---|---|---|
| 4 | 0.2004 | 0.2021 | 0.5680 | 0.6700 | 0.6670 | — |
| 5 | 0.1154 | 0.1393 | 0.9300 | — | 0.8110 | — |
| 6 | −0.4658 | −0.5261 | 2.9330 | — | 4.1420 | — |
| 7 | 0.2103 | 0.2454 | 0.5690 | 0.6410 | 0.6700 | — |
| 8 | 0.1024 | 0.1416 | 0.5620 | — | 0.6860 | — |
| 9 | 0.1850 | 0.2667 | 0.5270 | 0.4850 | 0.6470 | — |
| 10 | 0.0544 | 0.0531 | 0.6070 | — | 0.7170 | — |
| 11 | 0.1496 | 0.0888 | 0.5070 | 0.7380 | 0.6370 | — |
| 12 | 0.1290 | 0.0520 | 0.6280 | 0.9230 | 0.7900 | — |

TABLE 60-continued

| Example | L5S1 sag | L5S2 sag | Yc71P1 | Yc71P2 | Yc72P1 | Yc72P2 |
|---|---|---|---|---|---|---|
| 13 | 0.0698 | 0.0604 | 0.6330 | 0.5190 | 0.7380 | — |
| 14 | −0.2605 | −0.2625 | 0.4730 | — | 0.6310 | — |
| 15 | −0.4848 | −0.4070 | 0.8900 | — | 0.9200 | — |
| 16 | −0.4791 | −0.4221 | — | — | 0.7810 | — |
| 17 | −0.4400 | −0.4500 | 0.7300 | — | 1.1200 | — |
| 18 | −0.3405 | −0.5395 | 0.8247 | — | 0.7357 | — |
| 19 | 0.2023 | 0.2006 | 0.9670 | — | 0.5350 | 0.9040 |
| 20 | 0.3540 | 0.4306 | 1.0040 | — | 0.5110 | 0.9130 |
| 21 | 0.2211 | 0.3179 | 0.5700 | 0.4520 | 0.6330 | — |
| 22 | 0.1756 | 0.3016 | 0.5950 | — | 0.6720 | — |
| 23 | 0.2805 | 0.2808 | 0.8830 | 0.9150 | 0.9880 | — |
| 24 | 0.4949 | 0.7331 | — | — | 0.7340 | — |
| 25 | 0.2760 | 0.5093 | — | — | 0.9680 | — |
| 26 | 0.0918 | 0.1026 | 0.9550 | 1.1030 | 1.1280 | — |
| 27 | 0.1793 | 0.1731 | 0.9640 | 1.1140 | 1.1300 | — |
| 28 | 0.2606 | 0.2562 | 0.5870 | — | 0.7630 | — |

Table 61 below shows in mm an inner diameter of each of the first to seventh spacers for each of Examples 1-28 described herein. S1d is an inner diameter of the first spacer SP1, S2d is an inner diameter of the second spacer SP2, S3d is an inner diameter of the third spacer SP3, S4d is an inner diameter of the fourth spacer SP4, S5d is an inner diameter of the fifth spacer SP5, S6d is an inner diameter of the sixth spacer SP6, and S7d is an inner diameter of the seventh spacer SP7.

TABLE 61

| Example | S1d | S2d | S3d | S4d | S5d | S6d | S7d |
|---|---|---|---|---|---|---|---|
| 1 | 2.8400 | 2.5300 | 2.8300 | 3.2900 | 4.3400 | 6.3100 | — |
| 2 | 1.3500 | 1.2300 | 1.1400 | 1.5300 | 2.0700 | 2.7800 | — |
| 3 | 1.5000 | 1.3400 | 1.3200 | 1.7200 | 2.3100 | 3.0300 | — |
| 4 | 1.2400 | 1.1500 | 1.0300 | 1.4800 | 1.9000 | 2.4600 | — |
| 5 | 1.3400 | 1.2300 | 1.0300 | 1.5000 | 1.9800 | 2.6600 | — |
| 6 | 2.3100 | 2.1600 | 2.5400 | 2.9400 | 4.0600 | 4.8400 | 5.12 |
| 7 | 2.5800 | 2.4000 | 2.4900 | 2.9700 | 4.1600 | 4.8900 | 5.51 |
| 8 | 2.5900 | 2.5000 | 2.5300 | 2.9000 | 3.8000 | 4.9000 | — |
| 9 | 2.6500 | 2.4600 | 2.3900 | 2.9000 | 3.8000 | 5.1500 | — |
| 10 | 2.7700 | 2.6100 | 2.7900 | 3.1200 | 4.0300 | 4.8900 | — |
| 11 | 2.8100 | 2.6300 | 2.6500 | 3.1200 | 4.0300 | 4.9100 | — |
| 12 | 2.8000 | 2.6500 | 2.7300 | 3.5400 | 3.4200 | 4.4400 | 5.74 |
| 13 | 3.1700 | 3.0000 | 2.7900 | 3.0800 | 4.1800 | 5.4900 | — |
| 14 | 2.1200 | 2.1000 | 2.0400 | 2.1200 | 2.8100 | 4.6400 | — |
| 15 | 2.3200 | 2.3600 | 2.5600 | 2.9300 | 3.7000 | 4.3500 | — |
| 16 | 2.4100 | 2.3000 | 2.6600 | 3.0300 | 3.7600 | — | — |
| 17 | 2.1060 | 1.8860 | 2.0080 | 2.7000 | 3.0740 | 4.4840 | — |
| 18 | 2.4200 | 2.2300 | 2.0900 | 2.4700 | 3.2000 | 4.3300 | — |
| 19 | 2.8800 | 2.6300 | 2.2900 | 2.9300 | 4.3800 | 5.5100 | — |
| 20 | 2.6600 | 2.4700 | X | 3.1300 | 3.7800 | 5.1300 | — |
| 21 | 2.6700 | 2.5000 | 2.4400 | 2.9900 | 3.8000 | 5.2700 | — |
| 22 | 2.7100 | 2.5300 | 2.5200 | 3.0300 | 3.7800 | 4.8300 | — |
| 23 | 2.3600 | 2.0300 | 2.2500 | 2.6500 | 3.6400 | 5.1400 | 5.3 |
| 24 | 2.3300 | 2.2700 | 2.5300 | 3.1700 | 4.5200 | 5.3100 | 5.64 |
| 25 | 2.0600 | 1.8900 | 2.1500 | 2.7000 | 3.6100 | 4.5600 | 4.84 |
| 26 | 1.8900 | 1.8400 | 2.3300 | 2.7300 | 3.7300 | 5.4300 | 6.03 |
| 27 | 2.3900 | 2.1500 | 2.4000 | 2.8200 | 3.9400 | 5.6800 | 6.02 |
| 28 | 3.2200 | 3.1100 | 2.9200 | 3.2500 | 4.6000 | 5.6000 | 6.15 |

Table 62 below shows in mm³ a volume of each of the first to seventh lenses for each of Examples 1-28 described herein. L1v is a volume of the first lens, L2v is a volume of the second lens, L3v is a volume of the third lens, L4v is a volume of the fourth lens, L5v is a volume of the fifth lens, L6v is a volume of the sixth lens, and L7v is a volume of the seventh lens.

TABLE 62

| Example | L1v | L2v | L3v | L4v | L5v | L6v | L7v |
|---|---|---|---|---|---|---|---|
| 1 | 9.4074 | 6.0389 | 7.8806 | 9.9733 | 14.2491 | 18.7217 | 48.3733 |
| 2 | 6.5805 | 7.1213 | 7.7660 | 6.6371 | 11.7744 | 12.5638 | 20.4308 |
| 3 | 8.0184 | 9.5628 | 9.6052 | 8.4128 | 12.0326 | 16.7196 | 28.0267 |
| 4 | 6.3442 | 6.9494 | 7.7597 | 6.2076 | 6.8959 | 10.3364 | 16.5597 |
| 5 | 5.7249 | 8.0179 | 8.3774 | 7.9589 | 10.3434 | 11.1031 | 27.1511 |
| 6 | 5.2342 | 5.0595 | 5.1455 | 4.1402 | 5.9856 | 8.1378 | 19.6812 |
| 7 | 5.6390 | 4.8580 | 6.6748 | 7.1627 | 11.0369 | 11.9357 | 27.1217 |
| 8 | 5.1778 | 5.1427 | 8.2986 | 6.3777 | 12.6369 | 14.9811 | 20.7310 |
| 9 | 5.1650 | 5.3015 | 6.2461 | 7.0472 | 12.2503 | 19.1335 | 17.9152 |
| 10 | 5.9227 | 6.9971 | 9.1275 | 7.0250 | 12.2307 | 15.4792 | 23.2093 |
| 11 | 6.0930 | 6.3798 | 6.8569 | 7.4035 | 9.7509 | 11.7344 | 23.4758 |
| 12 | 5.1989 | 7.9980 | 6.6804 | 7.9875 | 20.4160 | 20.0925 | 36.0790 |
| 13 | 6.7496 | 7.2862 | 8.8499 | 8.0745 | 13.4156 | 20.3714 | 25.3575 |
| 14 | 3.8115 | 4.6714 | 4.0552 | 5.0631 | 11.2844 | 25.7618 | 16.5646 |
| 15 | 4.2347 | 5.5368 | 5.5931 | 7.5471 | 9.4202 | 8.9992 | 27.3258 |
| 16 | 4.6529 | 4.6572 | 6.2312 | 6.7131 | 10.2673 | 11.7401 | 33.5372 |
| 17 | 2.5134 | 3.7749 | 2.3033 | 9.4226 | 4.0073 | 16.0487 | 22.2874 |
| 18 | 4.3198 | 3.6956 | 4.1821 | 5.1874 | 8.1714 | 10.5471 | 19.1646 |
| 19 | 5.6174 | 7.9604 | 6.8464 | 7.2237 | 12.5253 | 12.8147 | 28.5967 |
| 20 | 11.1287 | 6.0119 | 5.8018 | 9.6434 | 7.9251 | 20.0604 | 37.3066 |
| 21 | 5.0360 | 6.7314 | 5.9764 | 9.3728 | 10.4859 | 21.6926 | 17.1978 |
| 22 | 4.9598 | 8.1220 | 7.2222 | 8.2929 | 8.6024 | 18.8370 | 19.7464 |
| 23 | 5.4854 | 3.9796 | 4.1274 | 4.6927 | 9.8848 | 20.3357 | 35.3318 |
| 24 | 5.5446 | 5.0525 | 4.5199 | 5.6552 | 9.8279 | 14.9067 | 22.4415 |
| 25 | 3.8100 | 3.9751 | 3.9272 | 6.1885 | 7.5160 | 13.0347 | 31.8586 |
| 26 | 4.7517 | 4.3655 | 6.4562 | 5.0723 | 9.8674 | 36.8705 | 47.4701 |
| 27 | 5.6273 | 4.9490 | 5.1423 | 5.0791 | 9.3624 | 31.5832 | 47.9081 |
| 28 | 7.5192 | 7.1322 | 12.3605 | 9.0385 | 17.2925 | 20.5539 | 33.5701 |

Table 63 below shows in mg a weight of each of the first to seventh lenses for each of Examples 1-28 described herein. L1w is a weight of the first lens, L2w is a weight of the second lens, L3w is a weight of the third lens, L4w is a weight of the fourth lens, L5w is a weight of the fifth lens, L6w is a weight of the sixth lens, and L7w is a weight of the seventh lens.

TABLE 63

| Example | L1w | L2w | L3w | L4w | L5w | L6w | L7w |
|---|---|---|---|---|---|---|---|
| 1 | 9.7837 | 7.4278 | 8.1958 | 12.2672 | 17.8114 | 19.4706 | 50.3082 |
| 2 | 6.8437 | 7.4062 | 9.7075 | 8.2964 | 12.2454 | 15.7048 | 20.6351 |
| 3 | 8.3391 | 9.9453 | 12.0065 | 10.5160 | 12.5139 | 20.8995 | 28.3070 |
| 4 | 6.5980 | 7.2274 | 9.6996 | 7.7595 | 7.1717 | 12.9205 | 16.7253 |
| 5 | 5.9539 | 8.3386 | 10.4718 | 9.7099 | 12.6189 | 11.5472 | 28.2371 |
| 6 | 5.4436 | 6.2232 | 5.3513 | 4.3058 | 7.3623 | 8.4633 | 20.4684 |
| 7 | 5.8646 | 5.0523 | 8.3435 | 8.9534 | 11.4784 | 14.9196 | 27.3929 |
| 8 | 5.3849 | 5.3484 | 10.3733 | 6.6328 | 13.1424 | 15.5803 | 21.5602 |
| 9 | 5.3716 | 5.5136 | 7.8076 | 7.3291 | 15.3129 | 19.8988 | 18.6318 |
| 10 | 6.1596 | 7.2770 | 11.4094 | 7.3060 | 12.7199 | 19.3490 | 24.1377 |
| 11 | 6.3367 | 6.6350 | 8.5711 | 7.6996 | 10.1409 | 14.6680 | 24.4148 |
| 12 | 5.4069 | 8.3179 | 8.3505 | 8.3070 | 21.2326 | 25.1156 | 37.5222 |
| 13 | 7.0196 | 7.5776 | 11.0624 | 10.0931 | 13.9522 | 25.4643 | 26.3718 |
| 14 | 3.9640 | 5.7458 | 4.2174 | 5.2656 | 14.1055 | 26.7923 | 17.2272 |
| 15 | 4.4041 | 6.8103 | 5.8168 | 7.8490 | 11.5868 | 9.3592 | 28.4188 |
| 16 | 4.8390 | 5.7284 | 6.4804 | 6.9816 | 12.6288 | 12.2097 | 34.8787 |
| 17 | 2.6139 | 4.6431 | 2.8331 | 9.7995 | 5.0091 | 20.0609 | 22.5103 |
| 18 | 4.4926 | 3.8434 | 5.1440 | 5.3949 | 10.2143 | 10.9690 | 19.9312 |
| 19 | 5.8421 | 8.2788 | 8.5580 | 9.0296 | 15.6566 | 13.3273 | 29.7406 |
| 20 | 11.5738 | 7.5149 | 6.0339 | 11.8614 | 9.6686 | 20.8628 | 38.7989 |
| 21 | 5.2374 | 7.0007 | 7.4705 | 9.7477 | 13.1074 | 22.5603 | 17.8857 |
| 22 | 5.1582 | 8.4469 | 9.0278 | 10.3661 | 8.9465 | 19.5905 | 20.5363 |
| 23 | 5.7048 | 4.8949 | 5.0767 | 4.8804 | 12.3560 | 25.4196 | 35.6851 |
| 24 | 5.7664 | 6.3156 | 4.7007 | 7.0690 | 10.2210 | 15.5030 | 23.3392 |
| 25 | 3.9624 | 4.8894 | 4.0843 | 7.6119 | 7.8166 | 13.5561 | 33.1329 |
| 26 | 4.9418 | 5.3696 | 6.7144 | 5.2752 | 12.3343 | 38.3453 | 47.9448 |
| 27 | 5.8524 | 6.0873 | 5.3480 | 5.2823 | 11.5158 | 32.8465 | 48.3872 |
| 28 | 7.8200 | 7.4175 | 15.4506 | 11.2981 | 21.6156 | 21.3761 | 34.9129 |

Table 64 below shows in mm an overall outer diameter (including a rib) of each of the first to seventh lenses for each of Examples 1-28 described herein. L1TR is an overall outer diameter of the first lens, L2TR is an overall outer diameter of the second lens, L3TR is an overall outer diameter of the third lens, L4TR is an overall outer diameter of the fourth lens, L5TR is an overall outer diameter of the fifth lens, L6TR is an overall outer diameter of the sixth lens, and L7TR is an overall outer diameter of the seventh lens.

TABLE 64

| Example | L1TR | L2TR | L3TR | L4TR | L5TR | L6TR | L7TR |
|---|---|---|---|---|---|---|---|
| 1 | 4.930 | 5.130 | 5.630 | 6.230 | 7.200 | 7.600 | 7.800 |
| 2 | 2.270 | 2.390 | 2.520 | 2.750 | 3.020 | 3.210 | 3.320 |
| 3 | 2.440 | 2.540 | 2.690 | 2.900 | 3.190 | 3.440 | 3.620 |
| 4 | 2.290 | 2.400 | 2.540 | 2.630 | 2.780 | 2.910 | 3.040 |
| 5 | 2.460 | 2.580 | 2.690 | 2.800 | 3.170 | 3.310 | 3.470 |
| 6 | 4.220 | 4.420 | 4.540 | 4.720 | 5.400 | 5.740 | 6.300 |
| 7 | 4.210 | 4.300 | 4.440 | 4.840 | 5.470 | 6.120 | 6.900 |
| 8 | 4.250 | 4.340 | 4.480 | 4.880 | 5.510 | 6.160 | 6.480 |
| 9 | 4.190 | 4.280 | 4.410 | 4.810 | 5.510 | 6.160 | 6.520 |
| 10 | 4.430 | 4.520 | 4.660 | 5.060 | 5.500 | 6.260 | 6.580 |
| 11 | 4.430 | 4.520 | 4.660 | 5.060 | 5.500 | 6.260 | 6.570 |
| 12 | 4.470 | 4.560 | 4.700 | 5.030 | 6.660 | 7.180 | 7.430 |
| 13 | 4.730 | 4.820 | 4.960 | 5.290 | 5.880 | 6.810 | 7.060 |
| 14 | 3.510 | 3.810 | 4.390 | 4.980 | 5.850 | 6.150 | 6.250 |
| 15 | 3.930 | 4.130 | 4.710 | 6.170 | 5.300 | 6.570 | 6.670 |
| 16 | 4.030 | 4.230 | 4.810 | 5.400 | 6.270 | 6.670 | 6.770 |
| 17 | 3.830 | 4.078 | 4.220 | 4.980 | 5.740 | 6.174 | 6.510 |
| 18 | 3.930 | 4.130 | 4.330 | 4.930 | 5.420 | 5.820 | 6.020 |
| 19 | 4.630 | 4.830 | 5.030 | 5.830 | 6.320 | 6.720 | 6.920 |
| 20 | 4.830 | 5.030 | 5.230 | 6.030 | 6.520 | 6.920 | 7.120 |
| 21 | 4.250 | 4.340 | 4.480 | 4.880 | 5.510 | 6.330 | 6.700 |
| 22 | 4.290 | 4.380 | 4.520 | 4.920 | 5.650 | 6.260 | 6.770 |
| 23 | 4.090 | 4.180 | 4.300 | 4.530 | 5.220 | 6.620 | 7.320 |
| 24 | 4.110 | 4.200 | 4.340 | 4.612 | 5.550 | 6.350 | 7.210 |
| 25 | 3.730 | 3.820 | 3.960 | 4.390 | 4.960 | 6.000 | 6.860 |
| 26 | 3.970 | 4.060 | 4.190 | 4.630 | 5.200 | 7.150 | 8.020 |
| 27 | 4.390 | 4.480 | 4.610 | 5.040 | 5.610 | 7.090 | 7.950 |
| 28 | 4.870 | 4.960 | 5.090 | 5.520 | 6.370 | 7.410 | 7.840 |

Table 65 below shows in mm a thickness of a flat portion of the rib of each of the first to seventh lenses for each of Examples 1-28 described herein. L1rt is a thickness of a flat portion of the rib of the first lens, L2rt is a thickness of a flat portion of the rib of the second lens, L3rt is a thickness of a flat portion of the rib of the third lens, L4rt is a thickness of a flat portion of the rib of the fourth lens, L5rt is a thickness of a flat portion of the rib of the fifth lens, L6rt is a thickness of a flat portion of the rib of the sixth lens, and L7rt is a thickness of a flat portion of the rib of the seventh lens.

TABLE 65

| Example | L1rt | L2rt | L3rt | L4rt | L5rt | L6rt | L7rt |
|---|---|---|---|---|---|---|---|
| 1 | 0.580 | 0.380 | 0.330 | 0.300 | 0.390 | 0.475 | 0.920 |
| 2 | 0.590 | 0.480 | 0.510 | 0.270 | 0.480 | 0.310 | 0.410 |
| 3 | 0.600 | 0.580 | 0.560 | 0.470 | 0.340 | 0.400 | 0.470 |
| 4 | 0.540 | 0.500 | 0.520 | 0.420 | 0.210 | 0.390 | 0.400 |
| 5 | 0.390 | 0.440 | 0.470 | 0.360 | 0.420 | 0.380 | 0.470 |
| 6 | 0.435 | 0.430 | 0.360 | 0.215 | 0.320 | 0.330 | 0.405 |
| 7 | 0.550 | 0.380 | 0.580 | 0.410 | 0.500 | 0.320 | 0.530 |
| 8 | 0.490 | 0.390 | 0.680 | 0.360 | 0.630 | 0.490 | 0.480 |
| 9 | 0.520 | 0.420 | 0.520 | 0.410 | 0.610 | 0.700 | 0.370 |
| 10 | 0.490 | 0.470 | 0.710 | 0.470 | 0.560 | 0.500 | 0.550 |
| 11 | 0.560 | 0.430 | 0.560 | 0.510 | 0.400 | 0.350 | 0.550 |
| 12 | 0.490 | 0.530 | 0.520 | 0.370 | 0.620 | 0.520 | 0.690 |
| 13 | 0.600 | 0.440 | 0.600 | 0.460 | 0.580 | 0.600 | 0.440 |
| 14 | 0.482 | 0.395 | 0.316 | 0.328 | 0.422 | 0.885 | 0.409 |
| 15 | 0.431 | 0.556 | 0.361 | 0.429 | 0.380 | 0.380 | 0.667 |
| 16 | 0.431 | 0.457 | 0.361 | 0.364 | 0.380 | 0.334 | 0.729 |
| 17 | 0.326 | 0.433 | 0.265 | 0.472 | 0.156 | 0.520 | 0.641 |
| 18 | 0.440 | 0.330 | 0.300 | 0.260 | 0.425 | 0.500 | 0.518 |
| 19 | 0.540 | 0.480 | 0.460 | 0.250 | 0.555 | 0.395 | 0.688 |
| 20 | 0.620 | 0.400 | 0.270 | 0.430 | 0.300 | 0.520 | 0.760 |
| 21 | 0.480 | 0.490 | 0.480 | 0.500 | 0.470 | 0.830 | 0.320 |
| 22 | 0.480 | 0.560 | 0.580 | 0.470 | 0.340 | 0.620 | 0.440 |
| 23 | 0.510 | 0.250 | 0.320 | 0.320 | 0.510 | 0.530 | 0.720 |
| 24 | 0.510 | 0.450 | 0.340 | 0.430 | 0.410 | 0.410 | 0.420 |
| 25 | 0.400 | 0.420 | 0.370 | 0.500 | 0.320 | 0.460 | 0.720 |
| 26 | 0.470 | 0.410 | 0.450 | 0.410 | 0.470 | 0.930 | 0.700 |
| 27 | 0.440 | 0.390 | 0.400 | 0.400 | 0.380 | 0.740 | 0.720 |
| 28 | 0.560 | 0.410 | 0.560 | 0.540 | 0.520 | 0.440 | 0.540 |

Table 66 below shows, for each of Examples 1-28 described herein, dimensionless values of each of the ratio L1w/L7w in Conditional Expressions 1 and 7, the ratio S6d/f in Conditional Expressions 2 and 8, the ratio L1TR/L7TR in Conditional Expressions 3 and 9, the ratio L1234TRavg/L7TR in Conditional Expressions 4 and 10, the ratio L12345TRavg/L7TR in Conditional Expressions 5 and 11, and the ratio |f1345674|/f in Conditional Expressions 6 and 12. The dimensionless value of each of these ratios is obtained by dividing two values expressed in a same unit of measurement.

TABLE 66

| Example | L1w/L7w | S6d/f | L1TR/L7TR | L1234TRavg/L7TR | L12345TRavg/L7TR | |f134567-f|/f |
|---|---|---|---|---|---|---|
| 1 | 0.1945 | 1.3016 | 0.6321 | 0.703 | 0.747 | 0.290 |
| 2 | 0.3317 | 0.6491 | 0.6837 | 0.748 | 0.780 | 6.418 |
| 3 | 0.2946 | 0.6339 | 0.6740 | 0.730 | 0.760 | 9.970 |
| 4 | 0.3945 | 0.6228 | 0.7533 | 0.811 | 0.832 | 8.734 |
| 5 | 0.2109 | 0.6115 | 0.7089 | 0.759 | 0.790 | 2.202 |
| 6 | 0.2660 | 1.1308 | 0.6698 | 0.710 | 0.740 | 0.357 |
| 7 | 0.2141 | 1.1111 | 0.6101 | 0.645 | 0.674 | 7.001 |
| 8 | 0.2498 | 1.0862 | 0.6559 | 0.693 | 0.724 | 86.041 |
| 9 | 0.2883 | 1.1333 | 0.6426 | 0.678 | 0.712 | 13.864 |
| 10 | 0.2552 | 1.0140 | 0.6733 | 0.709 | 0.735 | 17.660 |
| 11 | 0.2595 | 1.0822 | 0.6743 | 0.710 | 0.736 | 5.753 |
| 12 | 0.1441 | 0.9191 | 0.6016 | 0.631 | 0.684 | 3.475 |
| 13 | 0.2662 | 1.0795 | 0.6700 | 0.701 | 0.727 | 2.651 |
| 14 | 0.2301 | 1.0434 | 0.5616 | 0.668 | 0.721 | 0.421 |
| 15 | 0.1550 | 0.9886 | 0.5892 | 0.710 | 0.727 | 0.302 |
| 16 | 0.1387 | | 0.5953 | 0.682 | 0.731 | 0.028 |
| 17 | 0.1161 | 1.1439 | 0.5883 | 0.657 | 0.702 | 0.299 |

TABLE 66-continued

| Example | L1w/L7w | S6d/f | L1TR/L7TR | L1234TRavg/L7TR | L12345TRavg/L7TR | \|f134567-f\|/f |
|---|---|---|---|---|---|---|
| 18 | 0.2254 | 1.0811 | 0.6528 | 0.719 | 0.755 | 0.648 |
| 19 | 0.1964 | 1.2717 | 0.6691 | 0.734 | 0.770 | 2.161 |
| 20 | 0.2983 | 1.0829 | 0.6784 | 0.742 | 0.776 | 0.204 |
| 21 | 0.2928 | 1.1487 | 0.6343 | 0.670 | 0.700 | 35.303 |
| 22 | 0.2512 | 1.0738 | 0.6337 | 0.669 | 0.702 | 3.201 |
| 23 | 0.1599 | 1.1208 | 0.5587 | 0.584 | 0.610 | 0.319 |
| 24 | 0.2471 | 1.2304 | 0.5700 | 0.599 | 0.633 | 0.288 |
| 25 | 0.1196 | 1.0600 | 0.5437 | 0.579 | 0.608 | 0.301 |
| 26 | 0.1031 | 1.0935 | 0.4950 | 0.525 | 0.550 | 0.362 |
| 27 | 0.1209 | 1.2170 | 0.5522 | 0.582 | 0.607 | 0.220 |
| 28 | 0.2240 | 1.1499 | 0.6212 | 0.652 | 0.684 | 5.885 |

Figure 57:
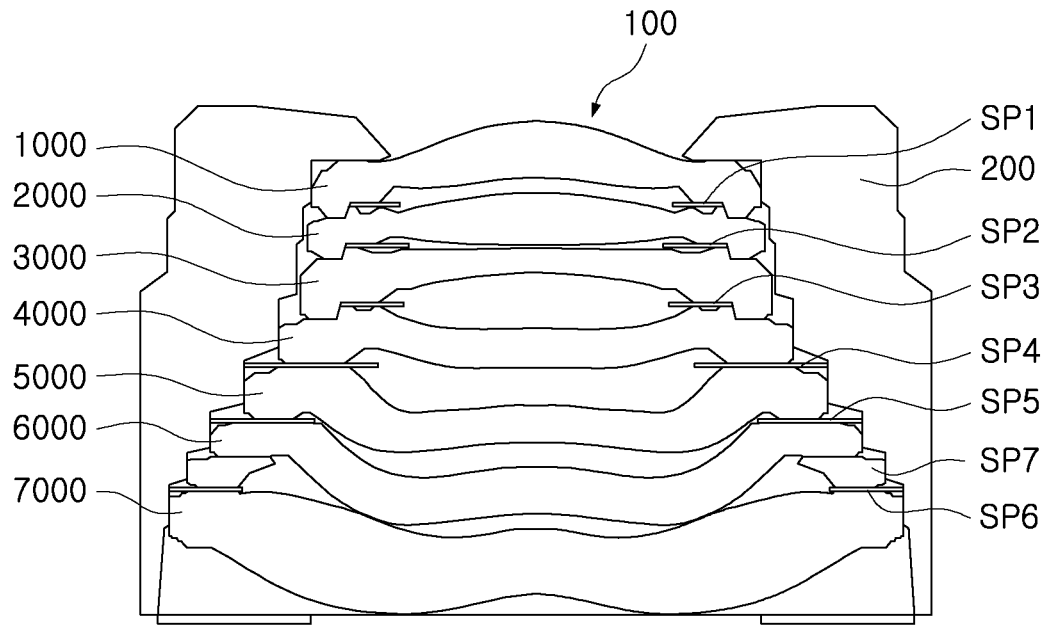
FIGS. 57 and 58 are cross-sectional views illustrating examples of an optical imaging system and a lens barrel coupled to each other.
Figure 58:
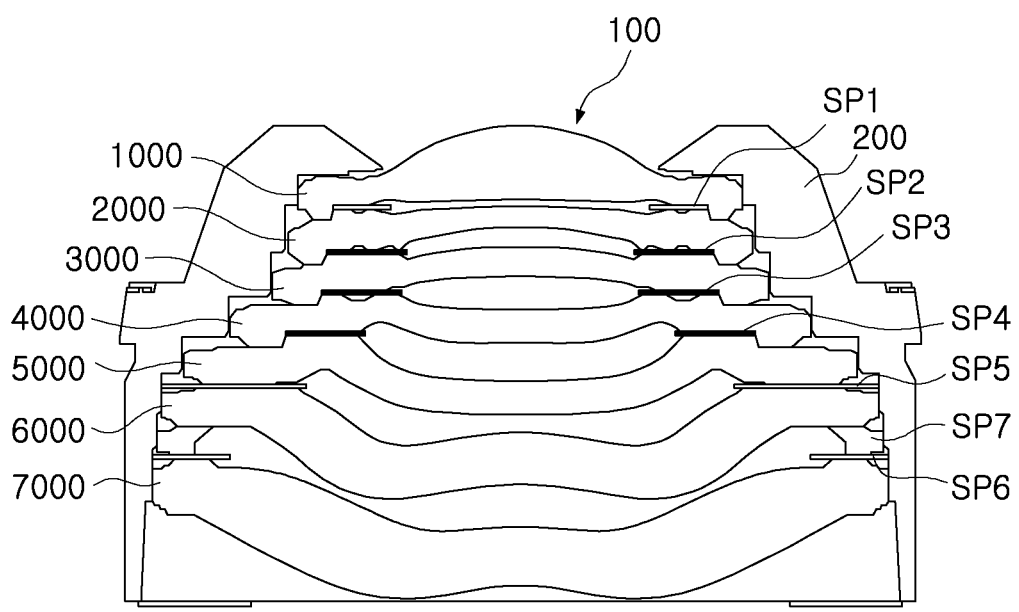

FIGS. 57 and 58 are cross-sectional views illustrating examples of an optical imaging system and a lens barrel coupled to each other.

The examples of the optical imaging system 100 described in this application may include a self-alignment structure as illustrated in FIGS. 57 and 58.

In one example illustrated in FIG. 57, the optical imaging system 100 includes a self-alignment structure in which optical axes of four consecutive lenses 1000, 2000, 3000, and 4000 are aligned with an optical axis of the optical imaging system 100 by coupling the four lenses 1000, 2000, 3000, and 4000 to one another.

The first lens 1000 disposed closest to the object side of the optical imaging system 100 is disposed in contact with an inner surface of a lens barrel 200 to align the optical axis of the first lens 1000 with the optical axis of the optical imaging system 100, the second lens 2000 is coupled to the first lens 1000 to align the optical axis of the second lens 2000 with the optical axis of the optical imaging system 100, the third lens 3000 is coupled to the second lens 2000 to align the optical axis of the third lens 3000 with the optical axis of the optical imaging system 100, and the fourth lens 4000 is coupled to the third lens 3000 to align the optical axis of the fourth lens 4000 with the optical axis of the optical imaging system 100. The second lens 2000 to the fourth lens 4000 may not be disposed in contact with the inner surface of the lens barrel 200.

Although FIG. 57 illustrates that the first lens 1000 to the fourth lens 4000 are coupled to one another, the four consecutive lenses that are coupled to one another may be changed to the second lens 2000 to a fifth lens 5000, or the third lens 3000 to a sixth lens 6000, or the fourth lens 4000 to a seventh lens 7000.

In another example illustrated in FIG. 58, the optical imaging system 100 includes a self-alignment structure in which optical axes of five consecutive lenses 1000, 2000, 3000, 4000, and 5000 are aligned with an optical axis of the optical imaging system 100 by coupling the five lenses 1000, 2000, 3000, 4000, and 5000 to one another.

The first lens 1000 disposed closest to the object side of the optical imaging system 100 is disposed in contact with an inner surface of the lens barrel 200 to align the optical axis of the first lens 1000 with the optical axis of the optical imaging system 100, the second lens 2000 is coupled to the first lens 1000 to align the optical axis of the second lens 2000 with the optical axis of the optical imaging system 100, the third lens 3000 is coupled to the second lens 2000 to align the optical axis of the third lens 3000 with the optical axis of the optical imaging system 100, the fourth lens 4000 is coupled to the third lens 3000 to align the optical axis of the fourth lens 4000 with the optical axis of the optical imaging system 100, and the fifth lens 5000 is coupled to the fourth lens 4000 to align the optical axis of the fifth lens 5000 with the optical axis of the optical imaging system 100. The second lens 2000 to the fifth lens 5000 may not be disposed in contact with the inner surface of the lens barrel 200.

Although FIG. 58 illustrates that the first lens 1000 to the fifth lens 5000 are coupled to one another, the five consecutive lenses that are coupled to one another may be changed to the second lens 2000 to a sixth lens 6000, or the third lens 3000 to a seventh lens 7000.

Figure 59:
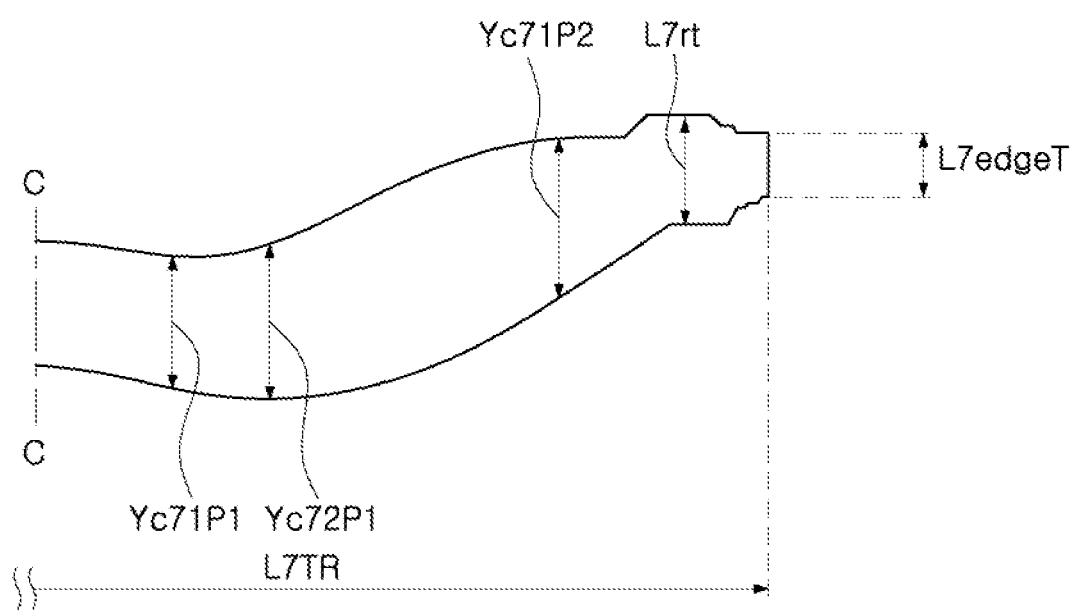
FIG. 59 is a cross-sectional view illustrating an example of a seventh lens.

FIG. 59 is a cross-sectional view illustrating an example of a seventh lens.

FIG. 59 illustrates the overall outer diameter (L7TR) of the seventh lens, the thickness (L7rt) of the flat portion of the rib of the seventh lens, the thickness (L7edgeT) of the edge of the seventh lens, the thickness (Yc71P1) of the seventh lens at the first inflection point on the object-side surface of the seventh lens, the thickness (Yc71P2) of the seventh lens at the second inflection point on the object-side surface of the seventh lens, and the thickness (Yc72P1) of the seventh lens at the first inflection point on the image-side surface of the seventh lens. Although not illustrated in FIG. 59, the seventh lens may also have a second inflection point on the image-side surface of the seventh lens, and a thickness of the seventh lens at this inflection point is Yc72P2 as listed in Table 60.

Figure 60:
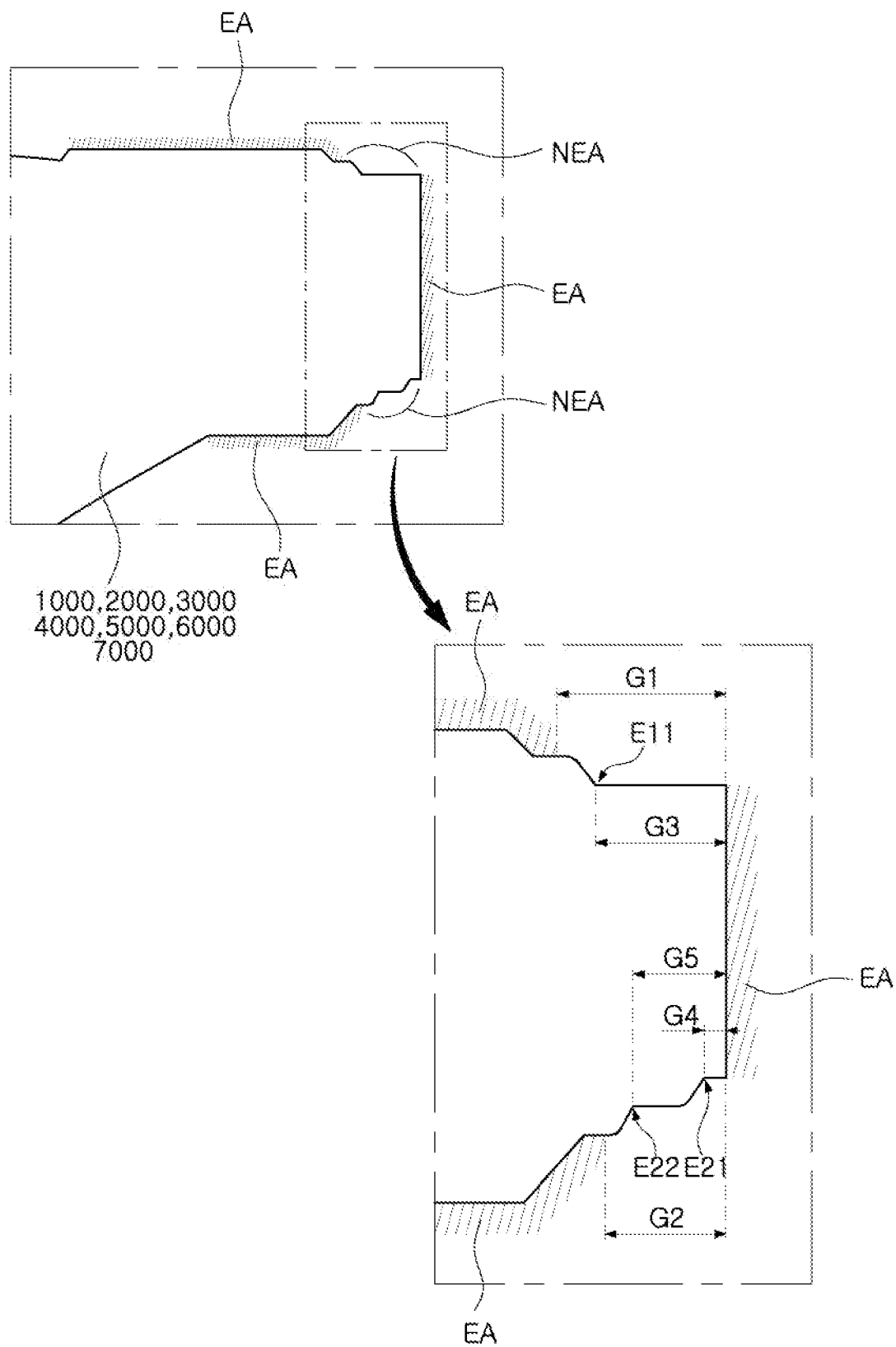
FIG. 60 is a cross-sectional view illustrating an example of a shape of a rib of a lens.

FIG. 60 is a cross-sectional view illustrating an example of a shape of a rib of a lens.

The examples of the optical imaging system 100 described in this application may include a structure for preventing a flare phenomenon and reflection.

For example, the ribs of the first to seventh lenses 1000, 2000, 3000, 4000, 5000, 6000, and 7000 of the optical imaging system may be partially surface-treated to make the surface of the rib rough as illustrated in FIG. 60. Methods of surface treatment may include chemical etching, physical grinding, or any other surface treatment method capable of increasing a roughness of a surface.

A surface-treated area EA may be formed in an entire area from an edge of the optical portion of the lens through which light actually passes to an outer end of the rib. However, as illustrated in FIG. 60, non-treated areas NEA including step portions E11, E21, and E22 may not be surface-treated, or may be surface-treated to have a roughness less than a roughness of the surface-treated area EA. The step portions E11, E21, and E22 are portions where the thickness of the rib abruptly changes. A width G1 of a first non-treated area NEA formed on an object-side surface of the lens and including a first step portion E11 may be different from a width G2 of a second non-treated area NEA formed on an image-side surface of the lens and including a second step portion E21 and a third step portion E22. In the example illustrated in FIG. 60, G1 is greater than G2.

The width G1 of the first non-treated area NEA includes the first step portion E11, the second step portion E21, and the third step portion E22 when viewed in an optical axis direction, and the width G2 of the second non-treated area NEA includes the second step portion E21 and the third step portion E22 but not the first step portion E11 when viewed in the optical axis direction. A distance G4 from the outer end of the rib to the second step portion E21 is smaller than a distance G3 from the outer end of the rib to the first step portion E11. Also, a distance G5 from the outer end of the rib to the third step portion E22 is smaller than the distance G3 from the outer end of the rib to the first step portion E11.

The positions at which the non-treated areas NEA and the step portions E11, E21, and E22 are formed as described above may be advantageous for measuring a concentricity of the lens.

The examples described above enable the optical imaging system to be miniaturized and aberrations to be easily corrected.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising positive refractive power and a concave image-side surface;
a second lens comprising negative refractive power;
a third lens comprising a refractive power;
a fourth lens comprising a concave image-side surface;
a fifth lens comprising a refractive power;
a sixth lens comprising a refractive power; and
a seventh lens comprising a refractive power,
wherein the first to seventh lenses are disposed in order along an optical axis of the optical imaging system from an object side of the optical imaging system toward an imaging plane,
wherein a radius of curvature of an object-side surface of the fourth lens is greater than a radius of curvature of an object-side surface of the second lens,
wherein a radius of curvature of the object-side surface of the second lens is greater than a radius of curvature of an object-side surface of the sixth lens, and
wherein $0.05<R1/R6<0.9$, where R1 is a radius of curvature of an object-side surface of the first lens and R6 is a radius of curvature of an image-side surface of the third lens.

2. The optical imaging system of claim 1, wherein $0.01<R1/R4<1.3$, where R4 is a radius of curvature of an image-side surface of the second lens.

3. The optical imaging system of claim 1, wherein $0.4<D13/D57<1.2$, where D13 is a distance from an object-side surface of the first lens to an image-side surface of the third lens and D57 is a distance from an object-side surface of the fifth lens to an image-side surface of the seventh lens.

4. The optical imaging system of claim 1, wherein $0.1<(1/f1+1/f2+1/f3+1/f4+1/f5+1/f6+1/f7)*f<0.8$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f is an overall focal length of the optical imaging system.

5. The optical imaging system of claim 1, wherein $0.1<(1/f1+1/f2+1/f3+1/f4+1/f5+1/f6+1/f7)*TTL<1.0$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and TTL is a distance along the optical axis from the object-side surface of the first lens to the imaging plane.

6. The optical imaging system of claim 1, wherein $0.6<TTL/(2*(IMG\ HT))<0.9$, where and TTL is a distance along the optical axis from the object-side surface of the first lens to the imaging plane and IMG HT is one-half of a diagonal length of the imaging plane.

7. The optical imaging system of claim 1, wherein $0.2<\Sigma SD/\Sigma TD<0.7$, where $\Sigma SD$ is a sum of air gaps along the optical axis between the first to seventh lenses, and $\Sigma TD$ is a sum of thicknesses along the optical axis of the first to seventh lenses.

8. The optical imaging system of claim 1, wherein $0<\min(f1:f3)/\max(f4:f7)<0.4$, where $\min(f1:f3)$ is a minimum value of absolute values of focal lengths of the first to third lenses and $\max(f4:f7)$ is a maximum value of absolute values of focal lengths of the fourth to seventh lenses.

9. The optical imaging system of claim 1, wherein $0.4<(\Sigma TD)/TTL<0.7$, where $\Sigma TD$ is a sum of thicknesses along the optical axis of the first to seventh lenses and TTL is a distance along the optical axis from the object-side surface of the first lens to the imaging plane.

10. An optical imaging system comprising:
a first lens comprising positive refractive power and a concave image-side surface;
a second lens comprising negative refractive power;
a third lens comprising a refractive power;
a fourth lens comprising a refractive power;
a fifth lens comprising positive refractive power;
a sixth lens comprising a refractive power; and
a seventh lens comprising a refractive power,
wherein the first to seventh lenses are disposed in order along an optical axis of the optical imaging system from an object side of the optical imaging system toward an imaging plane,
wherein a radius of curvature of an image-side surface of the fifth lens is greater than a radius of curvature of an image-side surface of the third lens,
wherein a distance from an image-side surface of the fourth lens to an object-side surface of the fifth lens is greater than a thickness along an optical axis of the second lens, and
wherein $0.8<R1/R14<1.2$, where R1 is a radius of curvature of an object-side surface of the first lens and R14 is a radius of curvature of an image-side surface of the seventh lens.

11. The optical imaging system of claim 10, wherein $0.01 < R1/R4 < 1.3$, where R1 is a radius of curvature of an object-side surface of the first lens and R4 is a radius of curvature of an image-side surface of the second lens.

12. The optical imaging system of claim 10, wherein $0.4 < D13/D57 < 1.2$, where D13 is a distance from an object-side surface of the first lens to an image-side surface of the third lens and D57 is a distance from an object-side surface of the fifth lens to an image-side surface of the seventh lens.

13. The optical imaging system of claim 10, wherein $0.1 < (1/f1+1/f2+1/f3+1/f4+1/f5+1/f6+1/f7)*f < 0.8$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f is an overall focal length of the optical imaging system.

14. The optical imaging system of claim 10, wherein $0.1 < (1/f1+1/f2+1/f3+1/f4+1/f5+1/f6+1/f7)*TTL < 1.0$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and TTL is a distance along the optical axis from the object-side surface of the first lens to the imaging plane.

15. The optical imaging system of claim 10, wherein $0.6 < TTL/(2*(IMG\ HT)) < 0.9$, where and TTL is a distance along the optical axis from the object-side surface of the first lens to the imaging plane and IMG HT is one-half of a diagonal length of the imaging plane.

16. The optical imaging system of claim 10, wherein $0.2 < \Sigma SD/\Sigma TD < 0.7$, where $\Sigma SD$ is a sum of air gaps along the optical axis between the first to seventh lenses, and $\Sigma TD$ is a sum of thicknesses along the optical axis of the first to seventh lenses.

17. The optical imaging system of claim 10, wherein $0 < \min(f1:f3)/\max(f4:f7) < 0.4$, where min (f1:f3) is a minimum value of absolute values of focal lengths of the first to third lenses and max (f4: f7) is a maximum value of absolute values of focal lengths of the fourth to seventh lenses.

18. The optical imaging system of claim 10, wherein $0.4 < (\Sigma TD)/TTL < 0.7$, where $\Sigma TD$ is a sum of thicknesses along the optical axis of the first to seventh lenses and TTL is a distance along the optical axis from the object-side surface of the first lens to the imaging plane.

* * * * *